(12) United States Patent
Kawaguchi et al.

(10) Patent No.: US 12,103,160 B2
(45) Date of Patent: Oct. 1, 2024

(54) ROTATION CONNECTING MECHANISM, ROBOT, ROBOT ARM, AND ROBOT HAND

(71) Applicant: Mitsubishi Electric Corporation, Chiyoda-ku (JP)

(72) Inventors: Noboru Kawaguchi, Chiyoda-ku (JP); Tomoya Hattori, Chiyoda-ku (JP); Masaki Haruna, Chiyoda-ku (JP); Koji Hirose, Chiyoda-ku (JP); Ken Ueda, Chiyoda-ku (JP); Shingo Kimura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 1021 days.

(21) Appl. No.: 17/048,525

(22) PCT Filed: Apr. 24, 2019

(86) PCT No.: PCT/JP2019/017482
§ 371 (c)(1),
(2) Date: Oct. 16, 2020

(87) PCT Pub. No.: WO2019/208652
PCT Pub. Date: Oct. 31, 2019

(65) Prior Publication Data
US 2021/0162602 A1    Jun. 3, 2021

(30) Foreign Application Priority Data

Apr. 25, 2018    (JP) .................................. 2018-084072

(51) Int. Cl.
*B25J 11/00*        (2006.01)
*B25J 15/00*        (2006.01)
(Continued)

(52) U.S. Cl.
CPC .......... *B25J 11/00* (2013.01); *B25J 15/0009* (2013.01); *B25J 17/00* (2013.01); *B62D 57/032* (2013.01);
(Continued)

(58) Field of Classification Search
CPC ........ B25J 11/00; B25J 15/0009; B25J 17/00; B25J 9/003; B62D 57/032;
(Continued)

(56) References Cited

U.S. PATENT DOCUMENTS 4,957,320 A     9/1990  Urlich
5,355,743 A  * 10/1994  Tesar ..................... B25J 9/126
                                                475/341
(Continued)

FOREIGN PATENT DOCUMENTS

CN      102672714 A  *  9/2012
CN      112873266 B  *  5/2022  .......... B25J 17/0258
(Continued)

OTHER PUBLICATIONS

U.S. Appl. No. 16/341,821, filed Apr. 12, 2019, US 2019/0240832 A1, Noboru Kawagucvhi et al.
(Continued)

*Primary Examiner* — Victor L MacArthur
(74) *Attorney, Agent, or Firm* — Oblon, McClelland, Maier & Neustadt, L.L.P.

(57) ABSTRACT

A rotation connecting mechanism includes: a joint that connects a second member rotatably to a first member with three rotational degrees of freedom; a first link and a third link in each of which one end is attached rotatably to second member with at least two rotational degrees of freedom while the other end is attached rotatably to first member with at least two rotational degrees of freedom, each of first link and third link having a variable length and five rotational (Continued)

degrees of freedom; a second link in which one end is attached rotatably to first link with at least two rotational degrees of freedom while the other end is attached rotatably to first member with at least two rotational degrees of freedom, second link having a variable length and five rotational degrees of freedom; and motors that generate force changing lengths of the three links.

29 Claims, 145 Drawing Sheets

(51) Int. Cl.
  *B25J 17/00* (2006.01)
  *B62D 57/032* (2006.01)
  *F16H 25/20* (2006.01)
  *F16H 25/24* (2006.01)
(52) U.S. Cl.
  CPC ............... *F15B 2211/7053* (2013.01); *F16H 2025/2081* (2013.01); *F16H 25/2454* (2013.01)
(58) Field of Classification Search
  CPC ......... F15B 2211/7053; F16H 25/2454; F16H 2025/2081
  See application file for complete search history.

(56) References Cited

U.S. PATENT DOCUMENTS

| | | |
|---|---|---|
| 2004/0133307 A1 | 7/2004 | Lee et al. |
| 2006/0012197 A1 | 1/2006 | Anderson et al. |
| 2009/0050191 A1* | 2/2009 | Young .................... G01J 1/20 250/203.1 |
| 2009/0145254 A1 | 6/2009 | Hirabayashi et al. |
| 2011/0088500 A1* | 4/2011 | Stuart ................. B25J 17/0266 901/21 |
| 2011/0147103 A1 | 6/2011 | Alfayad et al. |
| 2013/0057004 A1 | 3/2013 | Murata et al. |
| 2013/0175816 A1 | 7/2013 | Kawasaki et al. |
| 2015/0128930 A1* | 5/2015 | Chang .................... F24S 30/45 126/607 |
| 2017/0326736 A1* | 11/2017 | Nagatsuka ................ B25J 9/10 |

FOREIGN PATENT DOCUMENTS

| | | | | |
|---|---|---|---|---|
| EP | 1669171 A1 * | 6/2006 | .......... | B25J 17/0216 |
| JP | 4-501682 A | 3/1992 | | |
| JP | 2003-172418 A | 6/2003 | | |
| JP | 2004-202676 A | 7/2004 | | |
| JP | 2007-516854 A | 6/2007 | | |
| JP | 2011-527641 A | 11/2011 | | |
| KR | 20080035068 A * | 4/2008 | | |
| WO | WO 2007/077698 A1 | 7/2007 | | |
| WO | WO 2011/118646 A1 | 9/2011 | | |
| WO | WO 2012/039479 A1 | 3/2012 | | |
| WO | WO-2017094922 A1 * | 6/2017 | ............. | B25J 17/00 |

OTHER PUBLICATIONS

International Search Report issued Jul. 16, 2019 in PCT/JP2019/017482, 4 pages.

* cited by examiner

ROTATION CONNECTING MECHANISM, ROBOT, ROBOT ARM, AND ROBOT HAND

TECHNICAL FIELD

The present disclosure relates to a rotation connecting mechanism used in a joint of a robot capable of making a motion close to a human, and a robot, a robot arm, and a robot hand, in which the rotation connecting mechanism is used.

BACKGROUND ART

A humanoid robot including a body, arms, legs, and a head similarly to a human is being developed. In a conventional humanoid robot, typically a motor and a gear are disposed in a joint and a joint intersection is disposed on an axis of the gear. In such a humanoid robot, it is necessary to dispose the gear in the joint by a rotational degree of freedom, and the joint becomes large. Patent Document 1 proposes a biped walking robot in which a skeleton is connected by the joint and the joint is driven with two rotational degrees of freedom by expansion and contraction of a link by two actuators for each joint. Patent Document 2 proposes a robot that drives the joint with two rotational degrees of freedom by expansion and contraction of the link by two actuators and drives an ankle, a wrist, and a neck with three rotational degrees of freedom in which one rotary actuator is added to the two actuators. Patent Document 3 proposes a parallel link mechanism including one fixed length link, in which one end is connected to a bearing with three degrees of freedom provided on a fixed side member while the other end is connected to a movable side member, and three variable length links, in each of which one end is connected to the fixed side member by a bearing with three rotational degrees of freedom while the other end is connected to the movable side member by a bearing with three degrees of freedom.

A closed worm gear type finger joint unit that can be used in a hand part or a robot hand of a humanoid robot has been proposed (Patent Document 4). The closed worm gear type finger joint unit illustrated in Patent Document 4 has one joint shaft. Nothing is disclosed about application of a worm gear mechanism to a finger including a plurality of finger joints.

CITATION LIST

Patent Document

Patent Document 1: Japanese Patent Laid-Open No. 2004-202676
Patent Document 2: National Patent Publication No. 2011-527641
Patent Document 3: Japanese Patent Laid-Open No. 2003-172418
Patent Document 4: WO 2007/077698

SUMMARY OF INVENTION

Technical Problems

The joint can be made compact using the actuator. However, when the joint has two rotational degrees of freedom, for example, motion accompanied by twist cannot be performed by a wrist. When the motion accompanied by torsion cannot be made, sometimes the motion close to a human cannot be made.

A structure of the three-rotational-degree-of-freedom joint described in Patent Document 2 is complicated. An ankle and the wrist cannot be thickened because a shape similar to a human is required to be obtained, and an interval of a distance between the joint that is a fulcrum and a connection point of the link that is an action point is narrowed. For this reason, it is considered that sometimes the robot cannot output enough power.

In the parallel link mechanism of Patent Document 3, it is necessary to provide a connecting unit having two rotational degrees of freedom at both ends of each of three variable length links. A movable member 5 is connected to a base member 1 at a total of four points including a connecting rod 4 and three expansion mechanisms 7. That is, in the parallel link mechanism of Patent Document 3, the positions of the four points of the movable member 5 in the three-dimensional space are determined. Because a plane in a space is determined by three points, controlling of load distribution and positioning of the four points is difficult in the parallel link mechanism of Patent Document 3 in which the positions of the four points are determined.

In order to put the robot into practical use, it is necessary to have a technique that enables the robot that can be manufactured at low cost as much as possible in addition to being able to perform the motion close to a human as in the past. The connecting unit having at least two rotational degrees of freedom is more expensive than the connecting unit having one rotational degree of freedom. Desirably the number of connecting units having at least two rotational degrees of freedom is decreased in the joint having two rotational degrees of freedom, and three-point support is adopted to facilitate the control in the joint having three rotational degrees of freedom.

The present disclosure has been made to solve the above problems, and an object of the present disclosure is to obtain a rotation connecting mechanism that is lower in cost than conventional one.

Solution to Problems

According to one aspect of the present disclosure, a rotation connecting mechanism includes: a joint to connect a second member rotatably to a first member with at least two rotational degrees of freedom; a first actuator; and a second actuator. The first actuator includes: a first link having four rotational degrees of freedom or five rotational degrees of freedom; a second-member first attaching unit provided in the second member and having a fixed positional relationship with respect to the joint, one end of the first link being attached rotatably to the second-member first attaching unit with at least two rotational degrees of freedom; a first-member first attaching unit to which the other end of the first link is attached rotatably with at least two rotational degrees of freedom; and a first power source to generate force changing a distance between the second-member first attaching unit and a first reference point provided in the first member and having a fixed positional relationship with respect to the joint. The second actuator includes: a second link having three rotational degrees of freedom, four rotational degrees of freedom, or five rotational degrees of freedom; a first-link second attaching unit provided on the first link having a fixed positional relationship with respect to the second-member first attaching unit, one end of the second link being attached rotatably to the first-link second attaching unit with at least one rotational degree of freedom; a first-member second attaching unit to which the other end of the second link is attached rotatably with at least two rotational degrees of freedom; and a second power source to generate force changing a distance between the first-link second attaching unit and a second reference point provided in the first member and having a fixed positional relationship with respect to the joint.

According to another aspect of the present disclosure, a rotation connecting mechanism includes: a joint to connect a second member rotatably to a first member with at least two rotational degrees of freedom; a first actuator; and a second actuator. The first actuator includes: a first link having a variable length and four rotational degrees of freedom or five rotational degrees of freedom, a second-member first attaching unit provided in the second member and having a fixed positional relationship with respect to the joint, one end of the first link being attached rotatably to the second-member first attaching unit with at least two rotational degrees of freedom; a first-member first attaching unit provided in the first member and having a fixed positional relationship with respect to the joint, the other end of the first link being attached rotatably to the first-member first attaching unit with at least two rotational degrees of freedom; and a first power source to generate force changing a length of the first link. The second actuator includes: a second link having a variable length and three rotational degrees of freedom, four rotational degrees of freedom, or five rotational degrees of freedom; a first-link second attaching unit provided on the first link having a fixed positional relationship with respect to the second-member first attaching unit, one end of the second link being attached rotatably to the first-link second attaching unit with at least one rotational degree of freedom; a first-member second attaching unit provided in the first member and having a fixed positional relationship with respect to the joint, the other end of the second link being attached rotatably to the first-member second attaching unit with at least two rotational degrees of freedom; and a second power source to generate force changing a length of the second link.

According to another aspect of the present disclosure, a rotation connecting mechanism includes: a joint to connect a second member rotatably to a first member with at least two rotational degrees of freedom; a first actuator; and a second actuator. The first actuator includes: a first link having a fixed length and five rotational degrees of freedom; a second-member first attaching unit provided in the second member and having a fixed positional relationship with respect to the joint, one end of the first link being attached rotatably to the second-member first attaching unit with at least two rotational degrees of freedom; a first-member first attaching unit to which the other end of the first link is attached rotatably with at least two rotational degrees of freedom; a first moving member in which the first-member first attaching unit is provided; a first guide including a first moving shaft, and to guide the first moving member such that the first moving member is moved along the first moving shaft, the first guide being provided in the first member and having a fixed positional relationship with respect to the joint; and a first power source to generate force changing a position of the first moving member with respect to the first guide. The second actuator includes: a second link having a fixed length and five rotational degrees of freedom; a first-link second attaching unit provided on the first link having a fixed positional relationship with respect to the second-member first attaching unit, one end of the second link being attached rotatably to the first-link second attaching unit with at least two rotational degrees of freedom; a first-member second attaching unit to which the other end of the second link is attached rotatably with at least two rotational degrees of freedom; a second moving member in which the first-member second attaching unit is provided; a second guide including a second moving shaft, and to guide the second moving member such that the second moving member is moved along the second moving shaft, the second guide being provided in the first member and having a fixed positional relationship with respect to the joint; and a second power source to generate force changing a position of the second moving member with respect to the second guide According to yet another aspect of the present disclosure, a robot hand includes: a base; and at least three fingers, each of the at least three fingers includes a first dactylus, a second dactylus, and a third dactylus, the first dactylus, the second dactylus, and the third dactylus being connected in series from the base, and three finger joints connecting a tip-side member being one of the first dactylus, the second dactylus, and the third dactylus rotatably to a base-side member provided on a side on which the base exists. In each of a first finger joint being the finger joint connecting the first dactylus rotatably to the base and a second finger joint being the finger joint connecting the second dactylus rotatably to the first dactylus, the tip-side member is rotated with respect to the base-side member by a worm gear mechanism, the worm gear mechanism including a motor disposed in the base-side member, a worm rotated by the motor, and a worm wheel meshing with the worm to be rotated around a rotation shaft of the finger joint together with the tip-side member.

Advantageous Effects of Invention

According to the present disclosure, it is possible to obtain a rotation connecting mechanism that is lower in cost than conventional one.

BRIEF DESCRIPTION OF DRAWINGS

FIG. 121 is a front view illustrating the body bending unit included in the humanoid upper half body robot of the fifth embodiment.

FIG. 122 is a left side view illustrating the body bending unit included in the humanoid upper half body robot of the fifth embodiment.

FIG. 123 is a right side view illustrating the body bending unit included in the humanoid upper half body robot of the fifth embodiment.

FIG. 124 is a perspective view illustrating link arrangement of the body bending unit included in the humanoid upper half body robot of the fifth embodiment.

FIG. 125 is a view illustrating the link arrangement in a reference state of the body bending unit included in the humanoid upper half body robot of the fifth embodiment viewing from the direction in which a backbone extends.

FIG. 126 is a view illustrating variables for evaluating the link arrangement in the reference state of the body bending unit included in the humanoid upper half body robot of the fifth embodiment.

FIG. 127 is a front view illustrating a shoulder included in the humanoid upper half body robot of the fifth embodiment.

FIG. 128 is a plan view of the shoulder included in the humanoid upper half body robot of the fifth embodiment.

FIG. 129 is a right side view of the shoulder included in the humanoid upper half body robot of the fifth embodiment.

FIG. 130 is a view of a left shoulder of the humanoid upper half body robot of the fifth embodiment viewing from below.

FIG. 131 is a perspective view illustrating the left shoulder of the humanoid robot of fifth embodiment.

FIG. 132 is another perspective view illustrating the left shoulder of the humanoid upper half body robot of the fifth embodiment.

Figure 133:
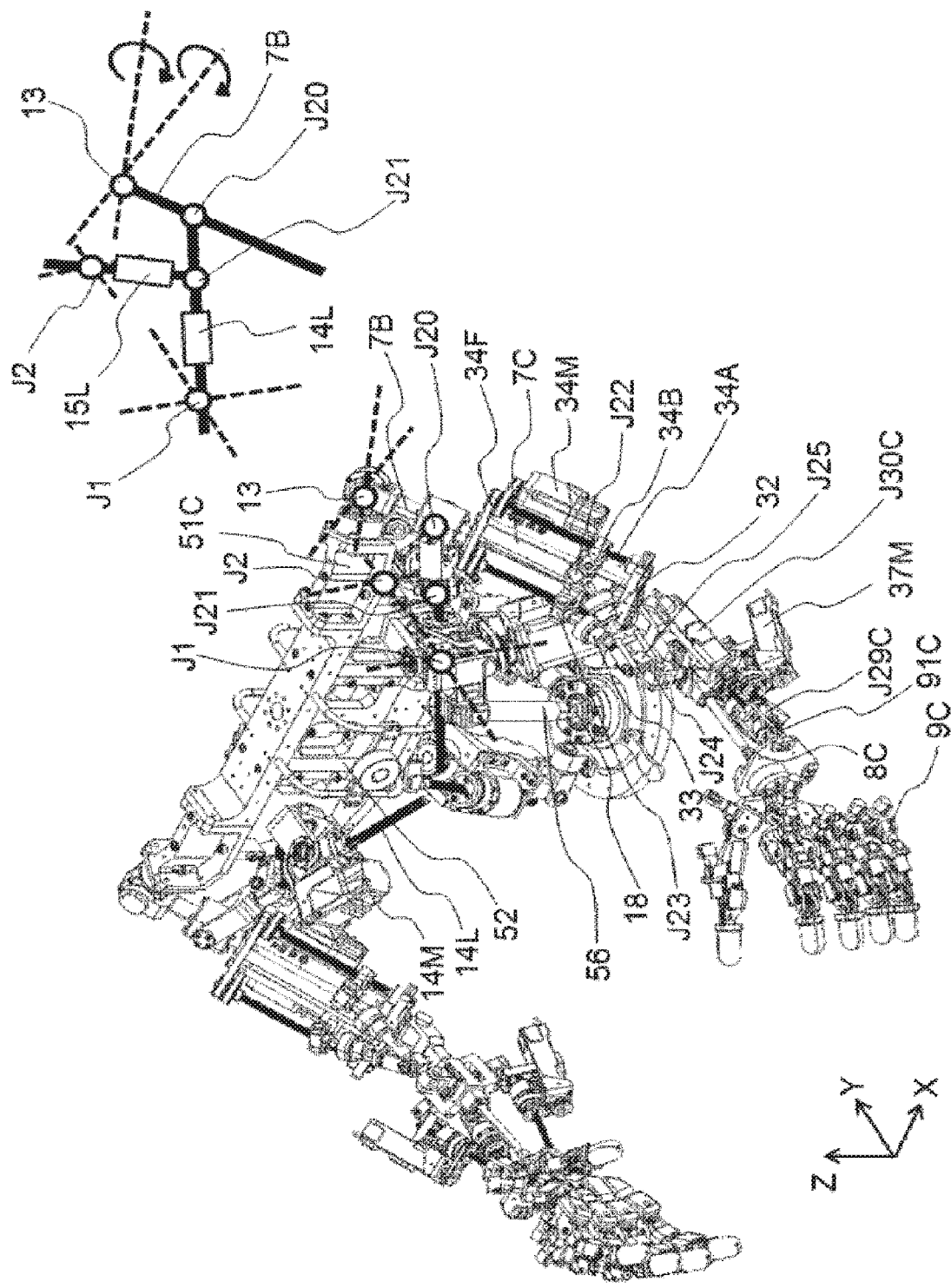

FIG. 133 is a perspective view illustrating the link arrangement of the shoulder included in the humanoid upper half body robot of the fifth embodiment.

Figure 134:
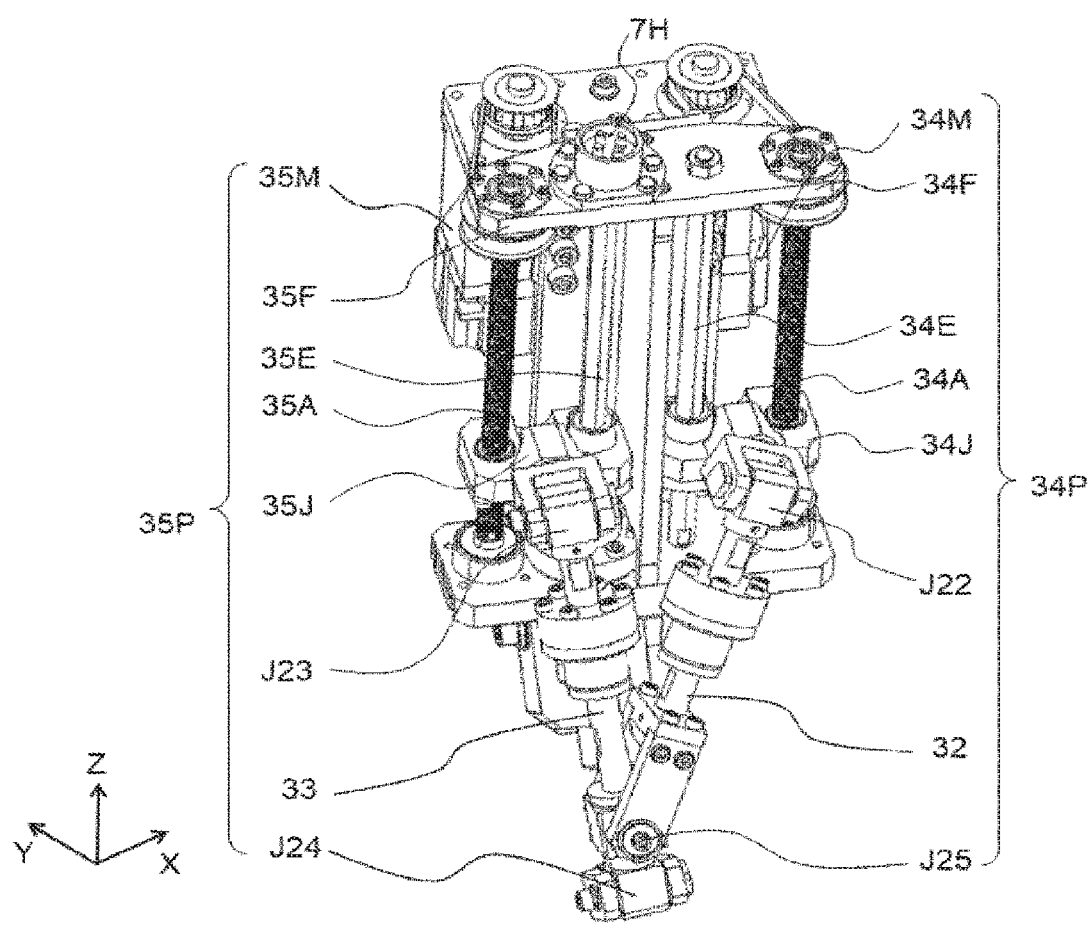

FIG. 134 is a perspective view illustrating an elbow included in the humanoid upper half body robot of the fifth embodiment.

Figure 135:
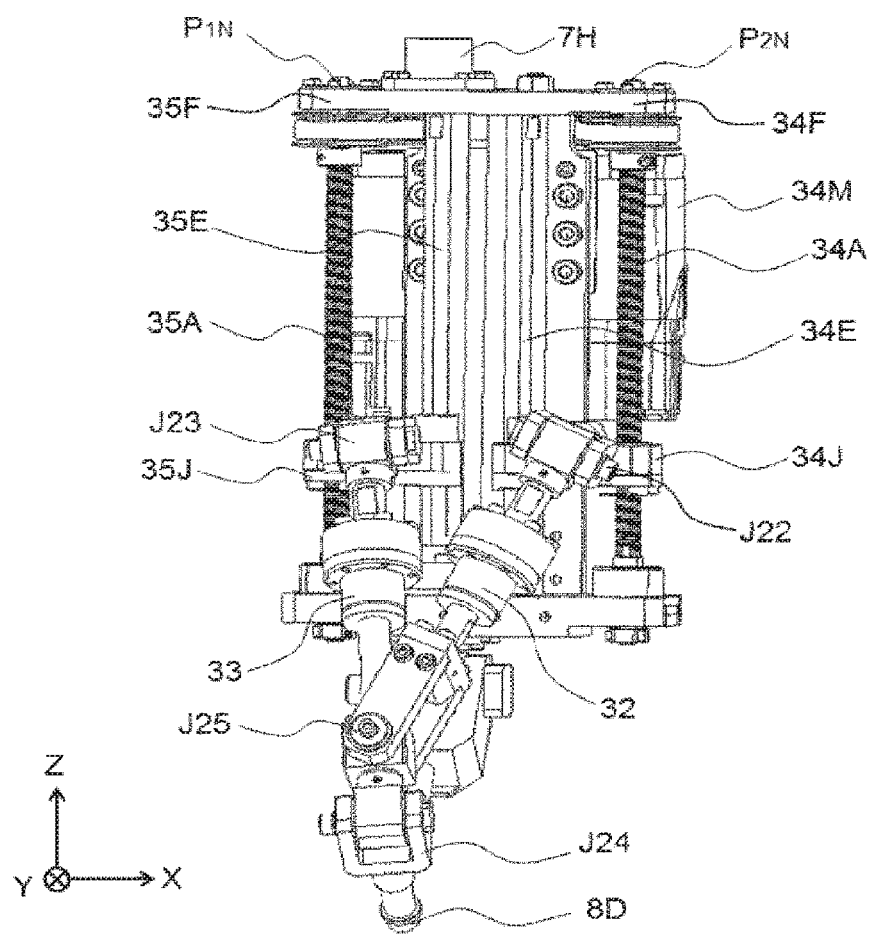

FIG. 135 is a front view illustrating the elbow included in the humanoid robot of the fifth embodiment.

Figure 136:
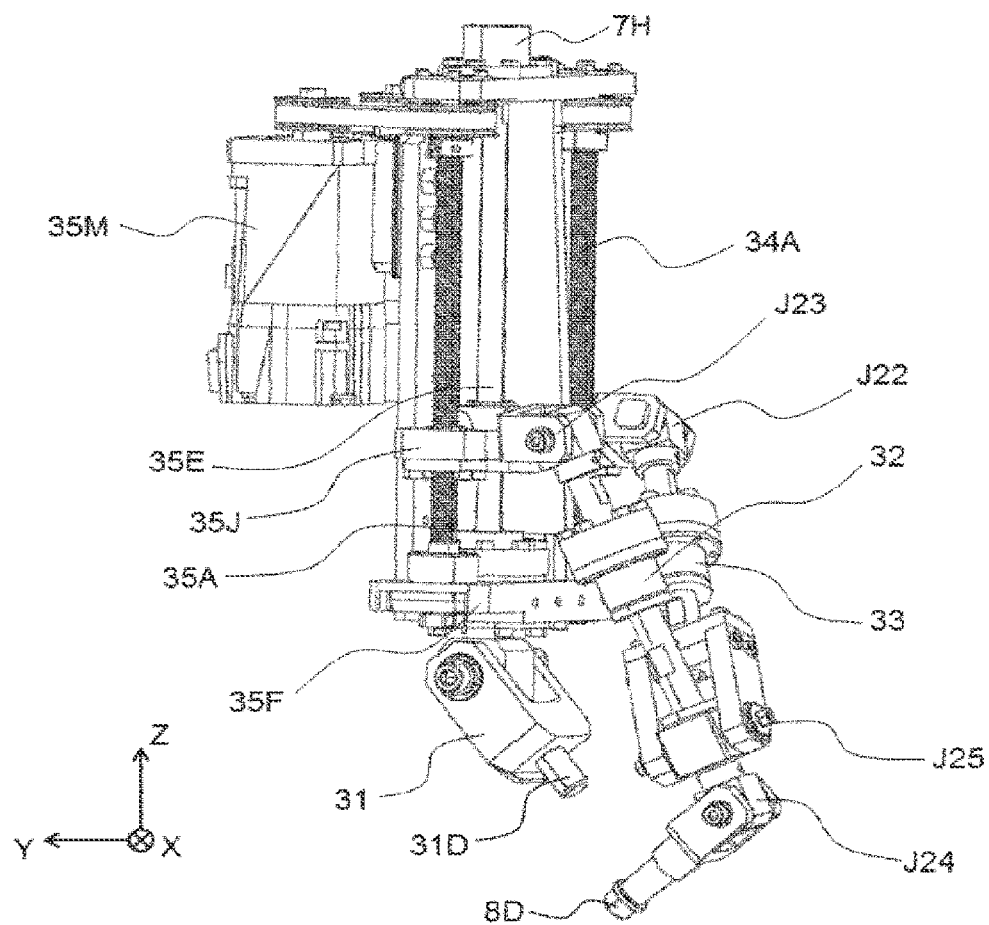

FIG. 136 is a left side view illustrating the elbow included in the humanoid robot of the fifth embodiment.

Figure 137:
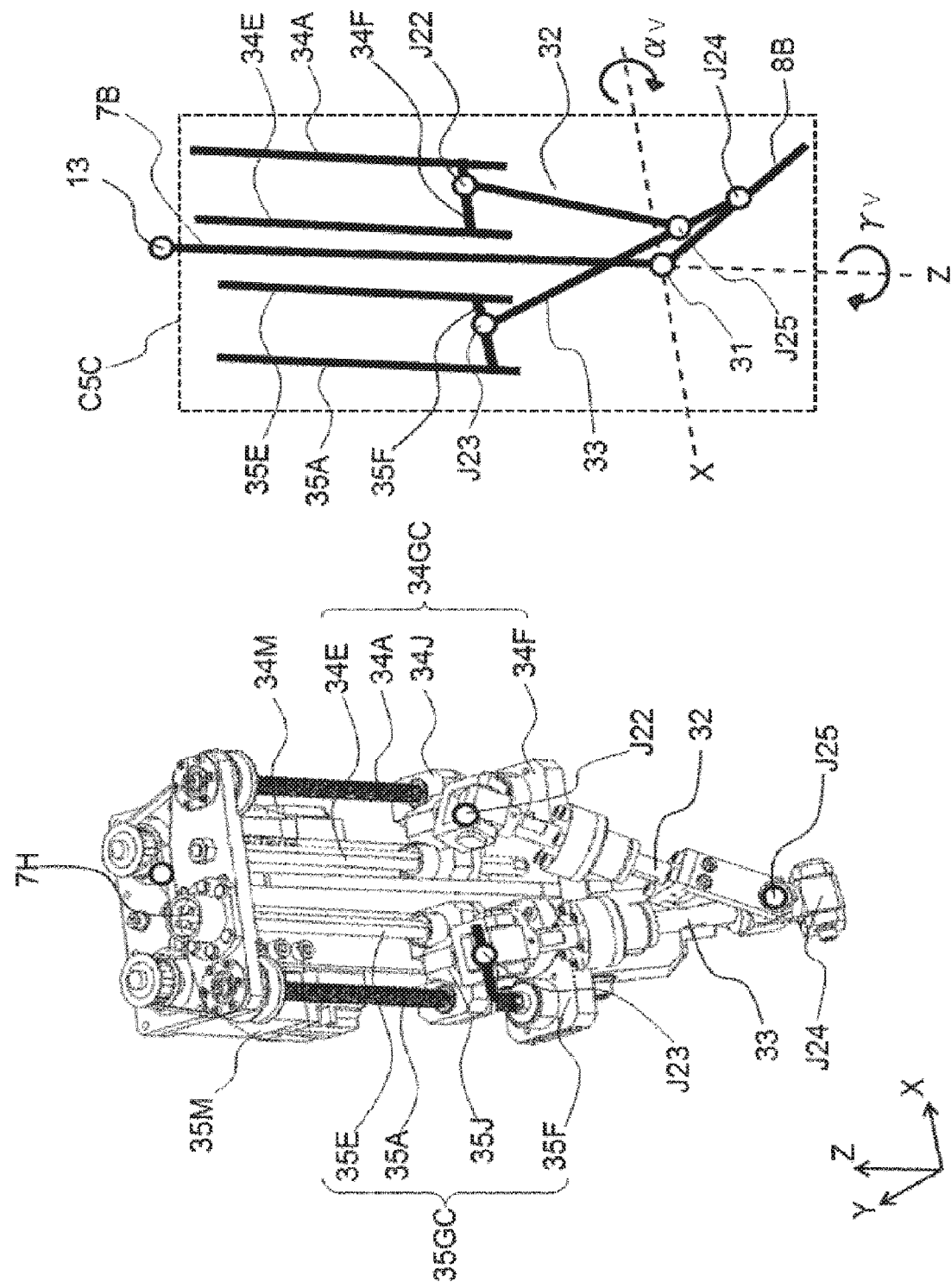

FIG. 137 is a perspective view illustrating the link arrangement of the elbow included in the humanoid upper half body robot of the fifth embodiment.

Figure 138:
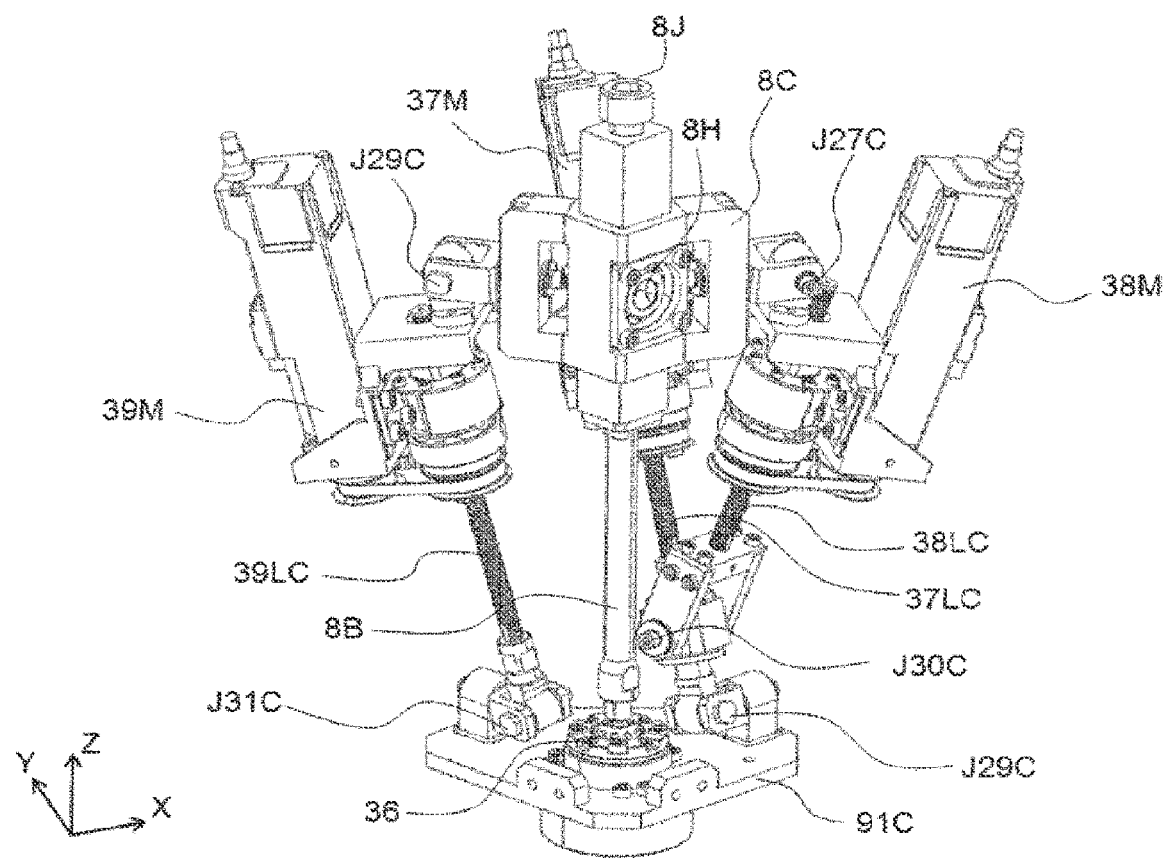

FIG. 138 is a perspective view illustrating a wrist included in the humanoid upper half body robot of the fifth embodiment.

Figure 139:
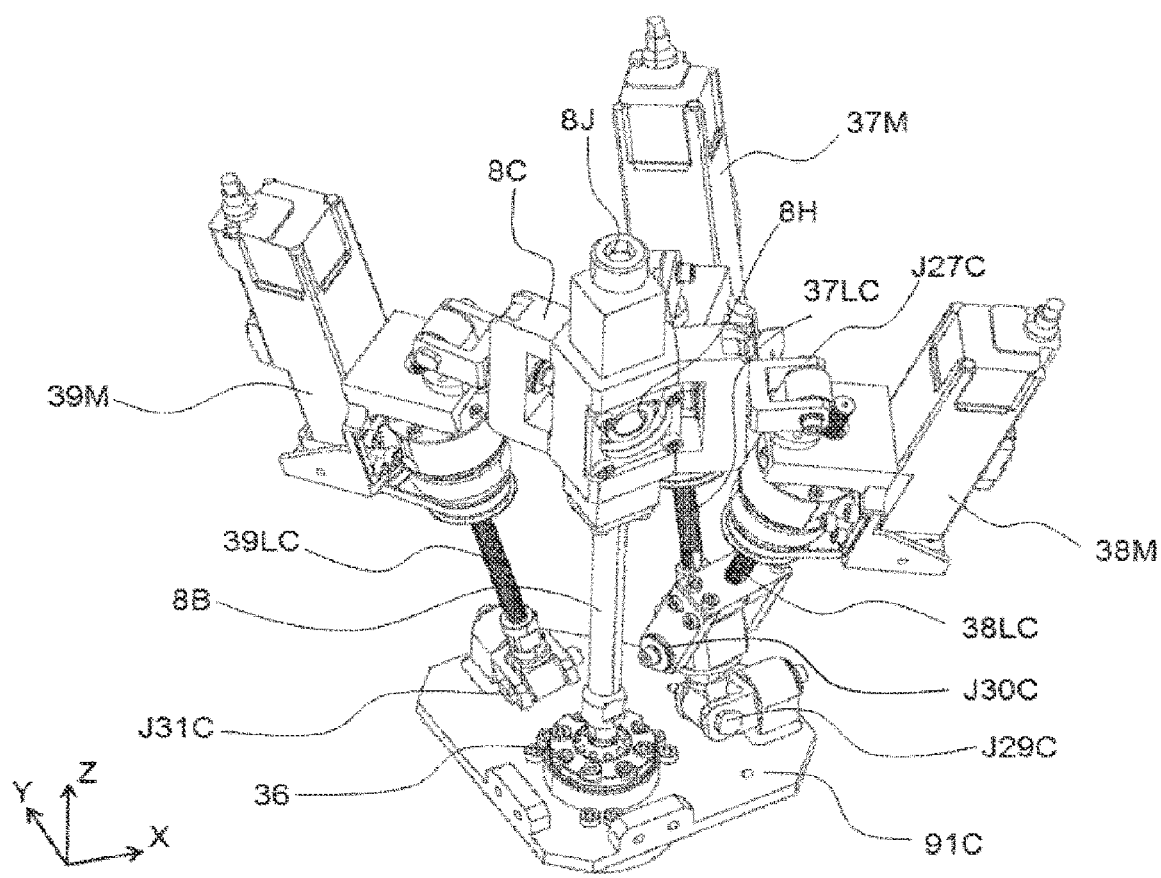

FIG. 139 is another perspective view illustrating the wrist included in the humanoid upper half body robot of the fifth embodiment.

Figure 140:
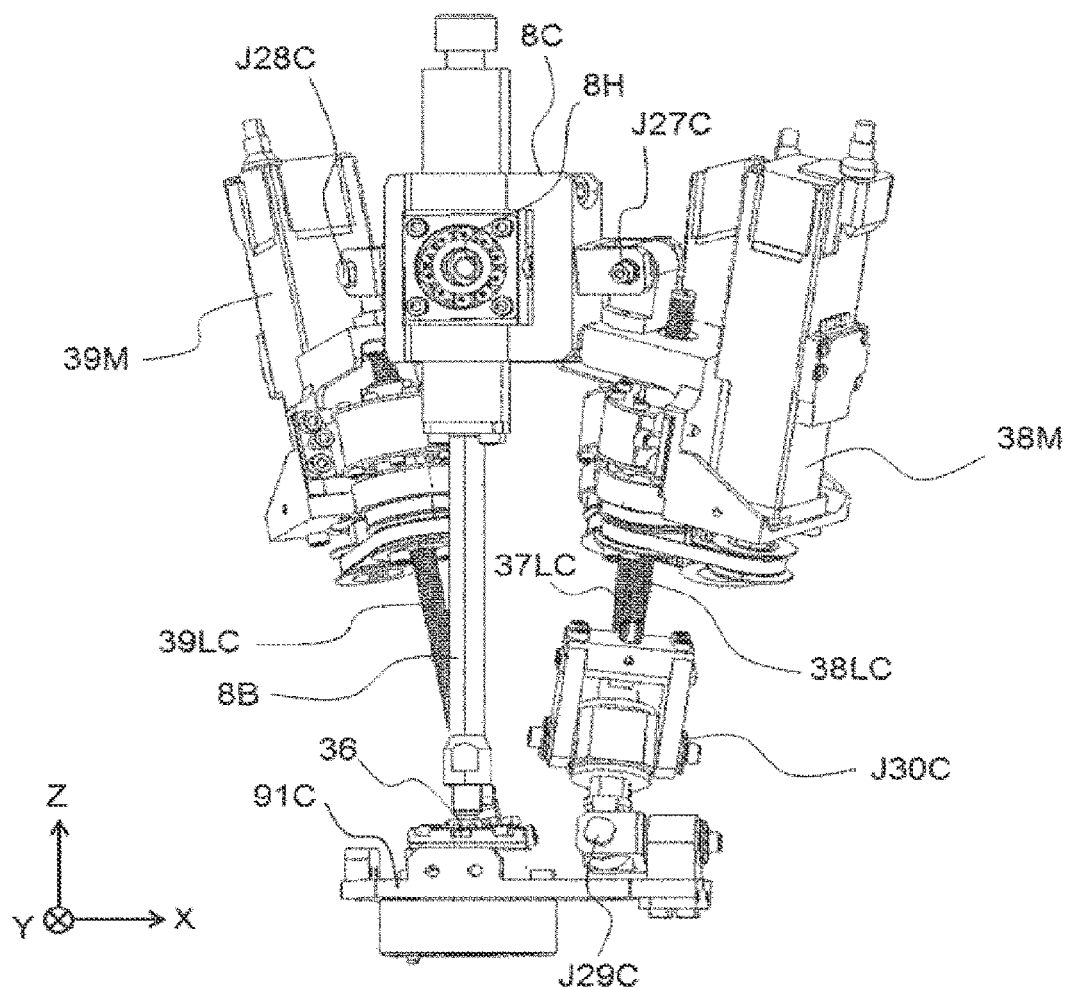

FIG. 140 is a front view illustrating the wrist included in the humanoid upper half body robot of the fifth embodiment.

Figure 141:
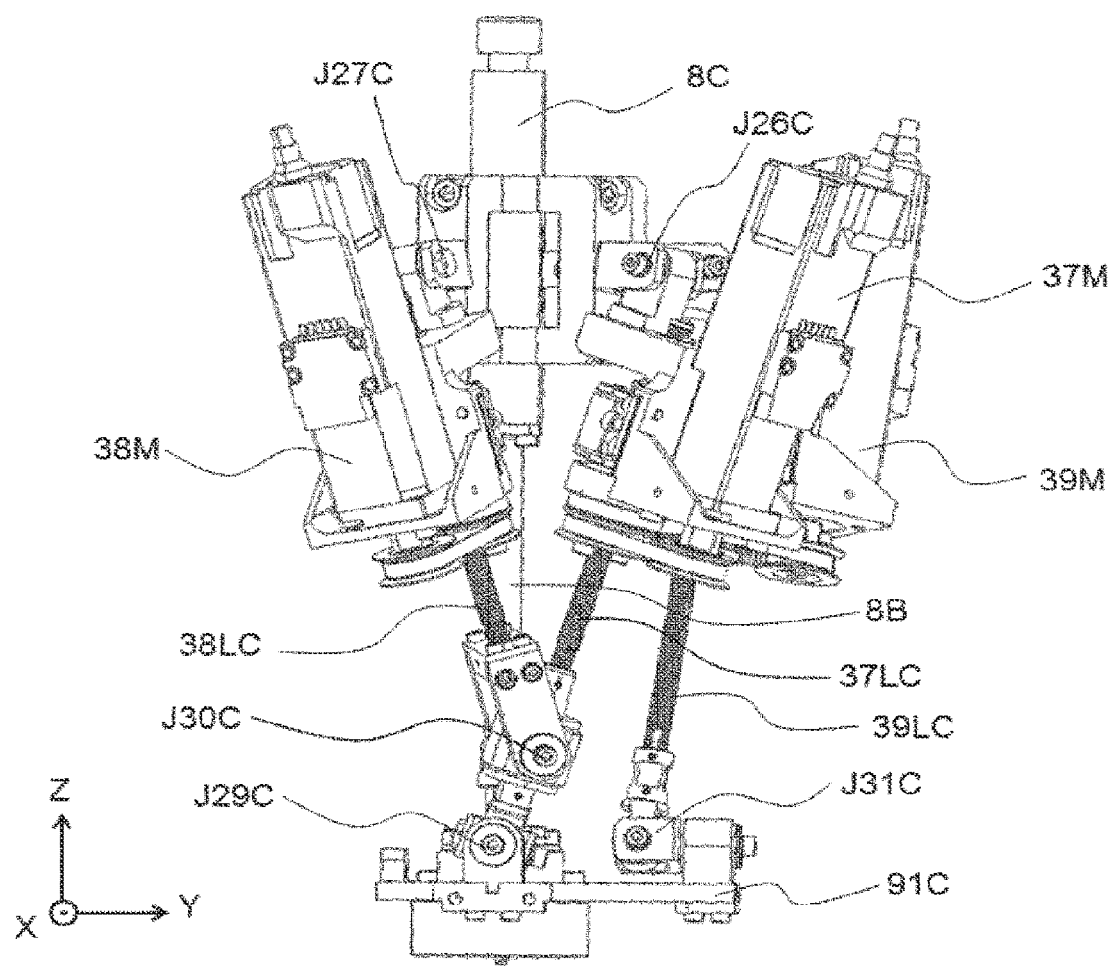

FIG. 141 is a right side view illustrating the wrist included in the humanoid upper half body robot of the fifth embodiment.

Figure 142:
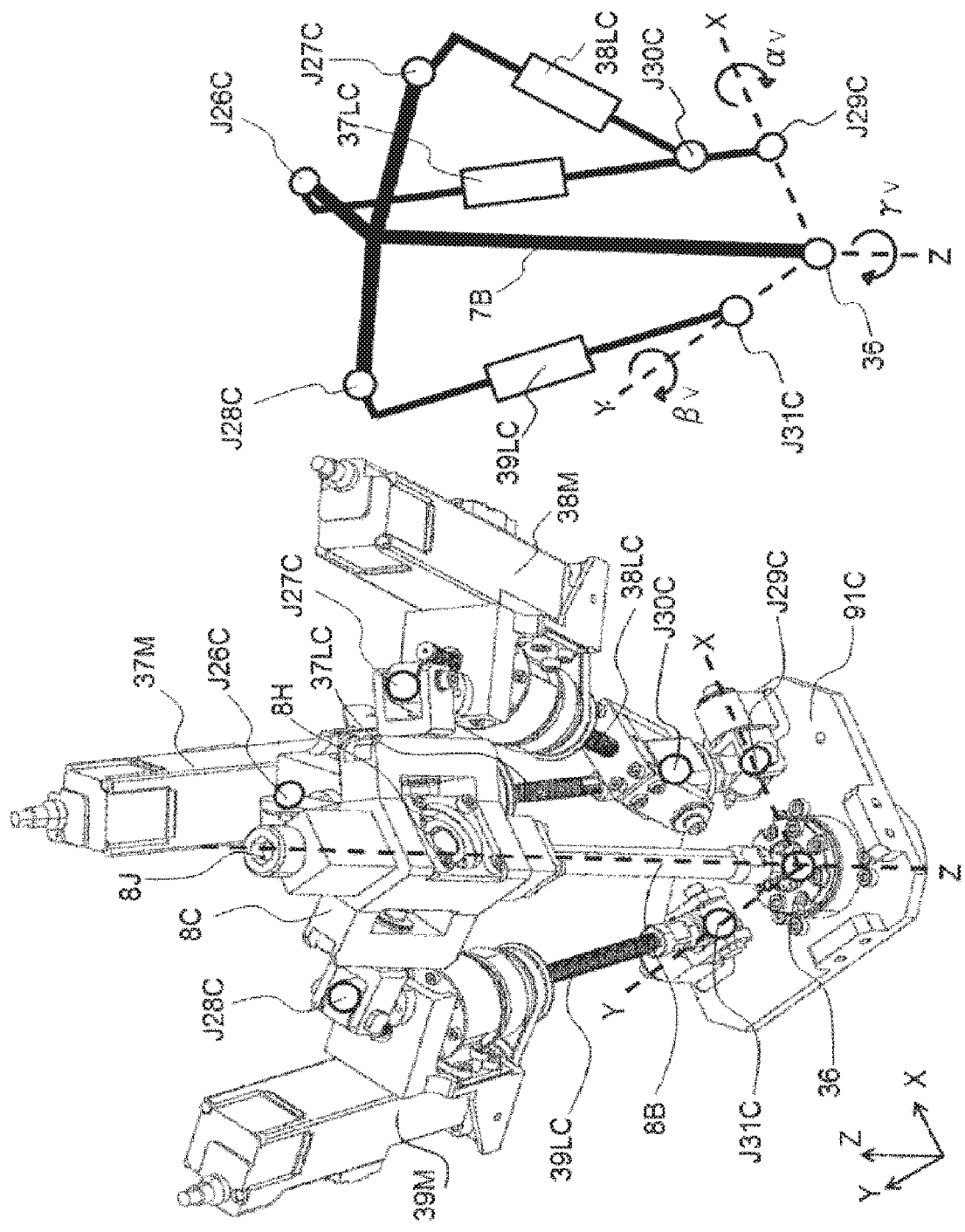

FIG. 142 is a perspective view illustrating the link arrangement of the elbow included in the humanoid upper half body robot of the fifth embodiment.

Figure 143:
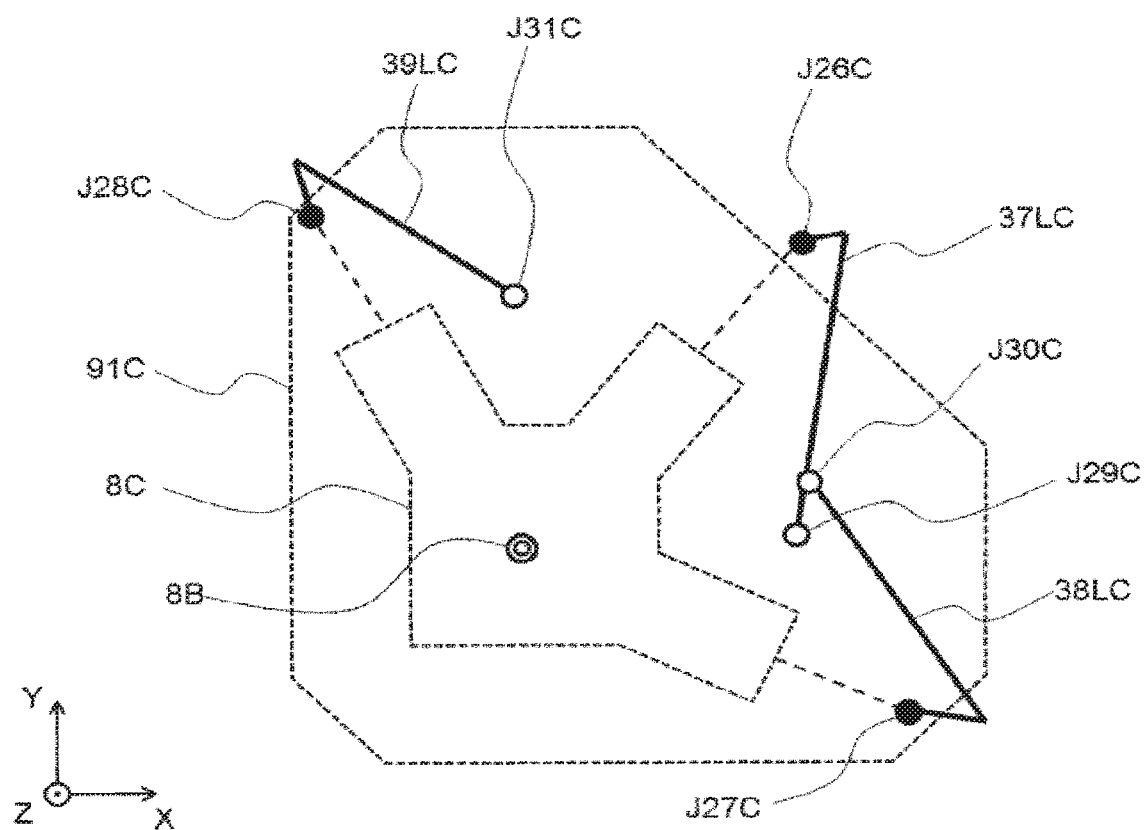

FIG. 143 is a view illustrating the link arrangement in the reference state of the wrist included in the humanoid upper half body robot of the fifth embodiment viewing from the direction in which a forearm extends.

Figure 144:
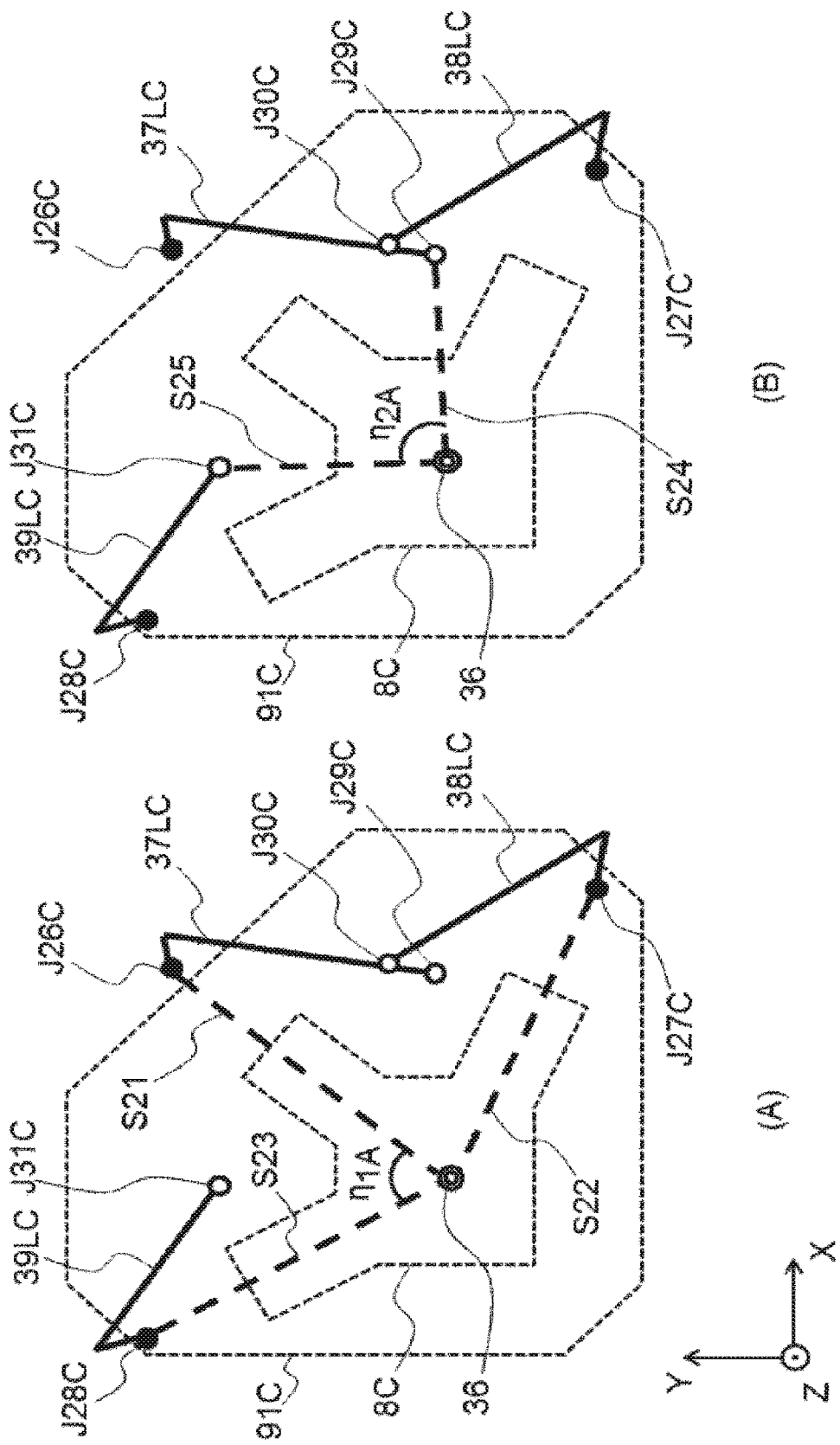

FIG. 144 is a view illustrating variables for evaluating the link arrangement in the reference state of the wrist included in the humanoid upper half body robot of the fifth embodiment.

Figure 145:
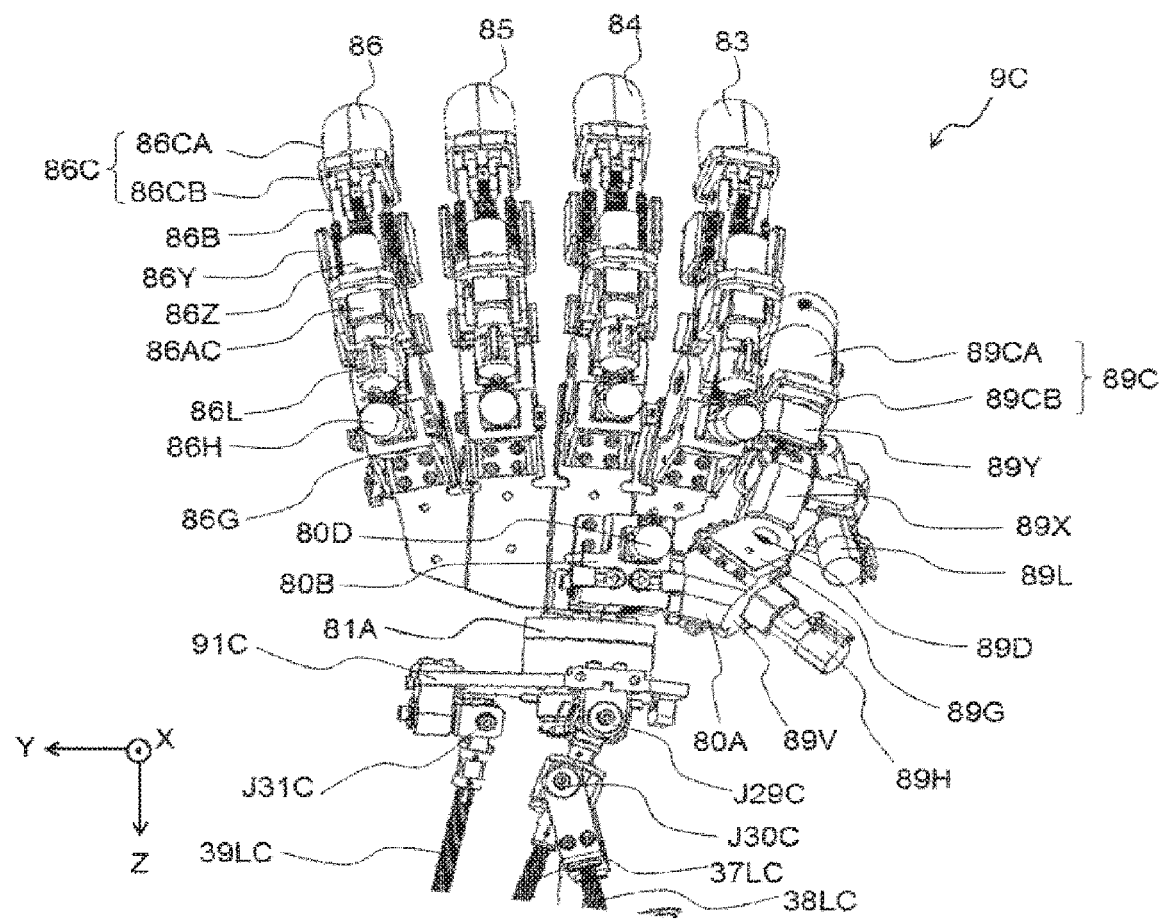

FIG. 145 is a view illustrating a hand with a wrist included in the humanoid upper half body robot of the fifth embodiment viewing from the backside of the hand.

Figure 146:
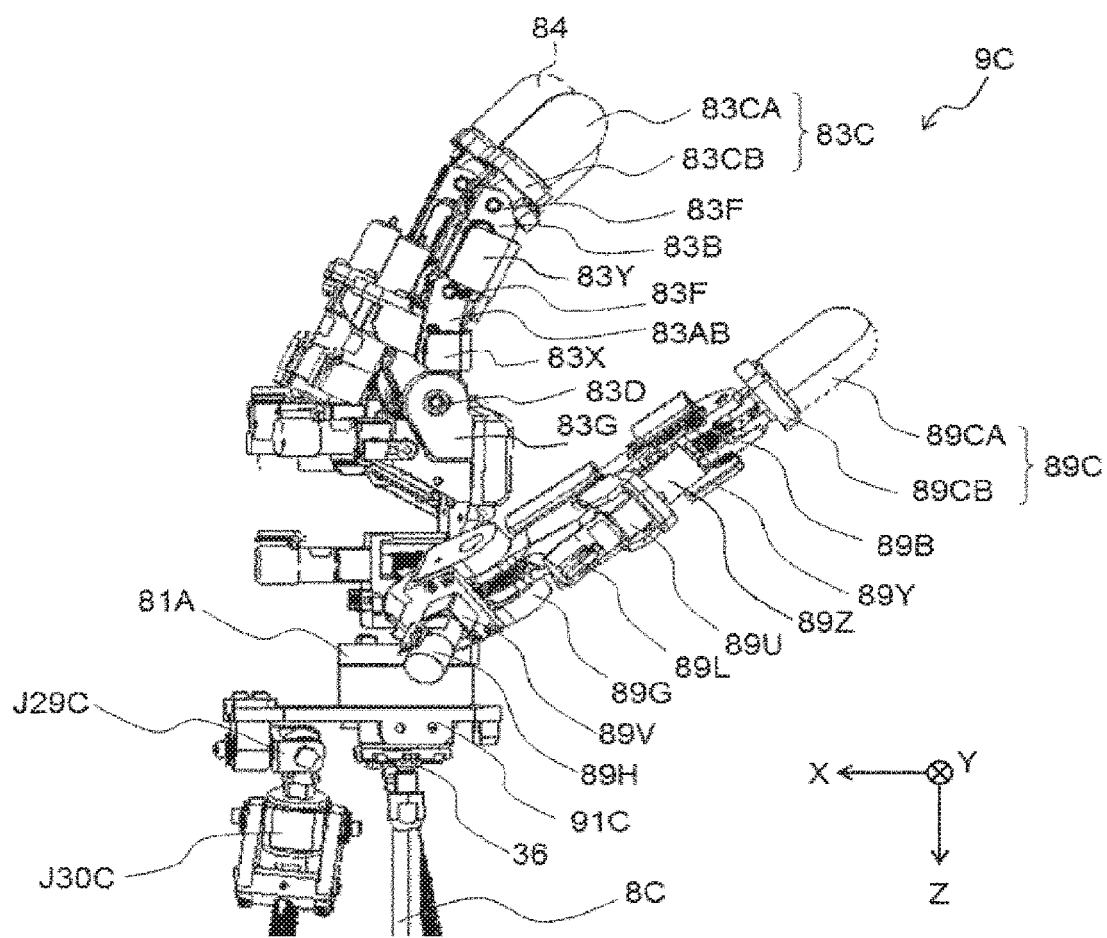

FIG. 146 is a view illustrating the hand with the wrist included in the humanoid upper half body robot of the fifth embodiment viewing from a side.

Figure 147:
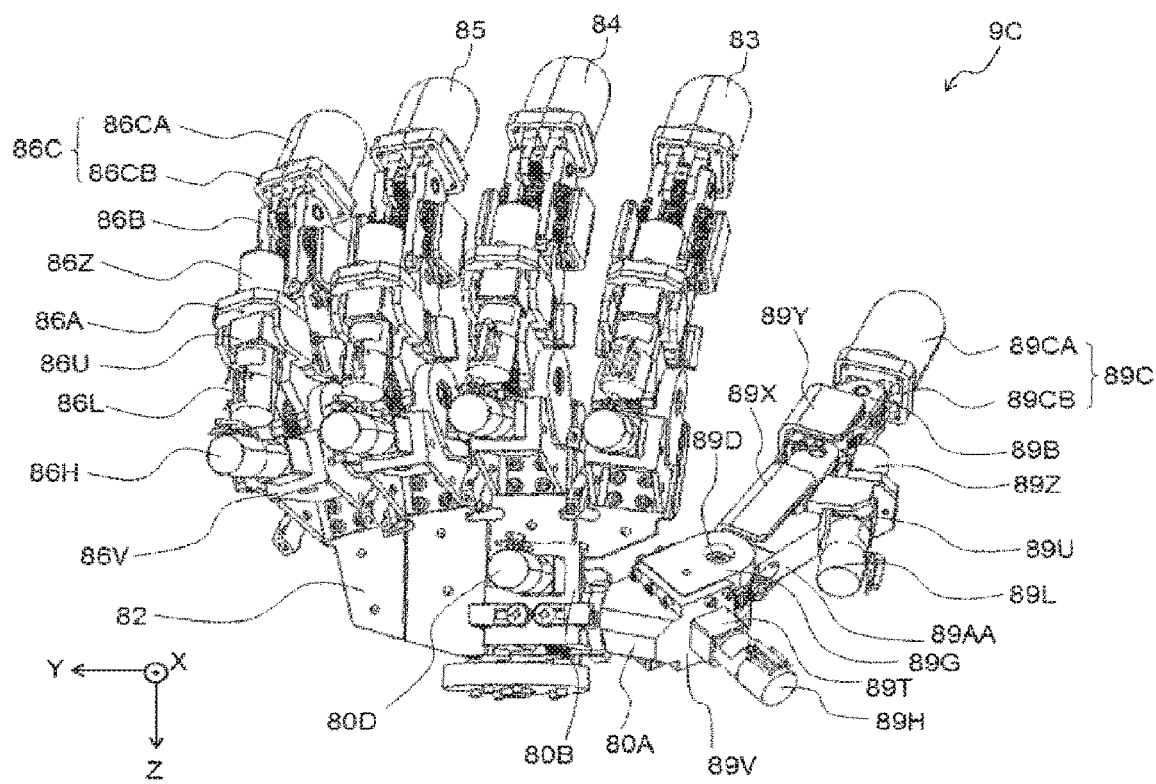

FIG. 147 is a view illustrating the hand included in the humanoid upper half body robot of the fifth embodiment viewing from the backside of the hand.

Figure 148:
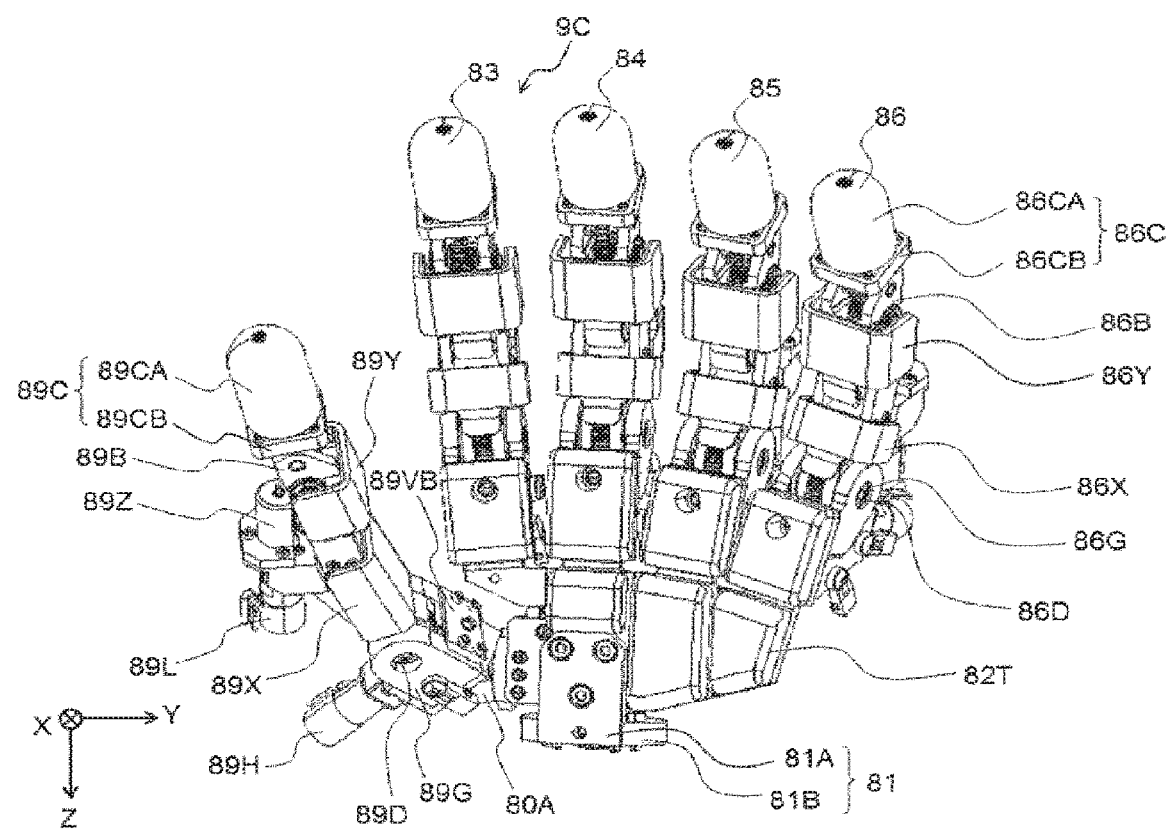

FIG. 148 is a view illustrating the hand included in the humanoid upper half body robot of the fifth embodiment viewing from a palm side.

Figure 149:
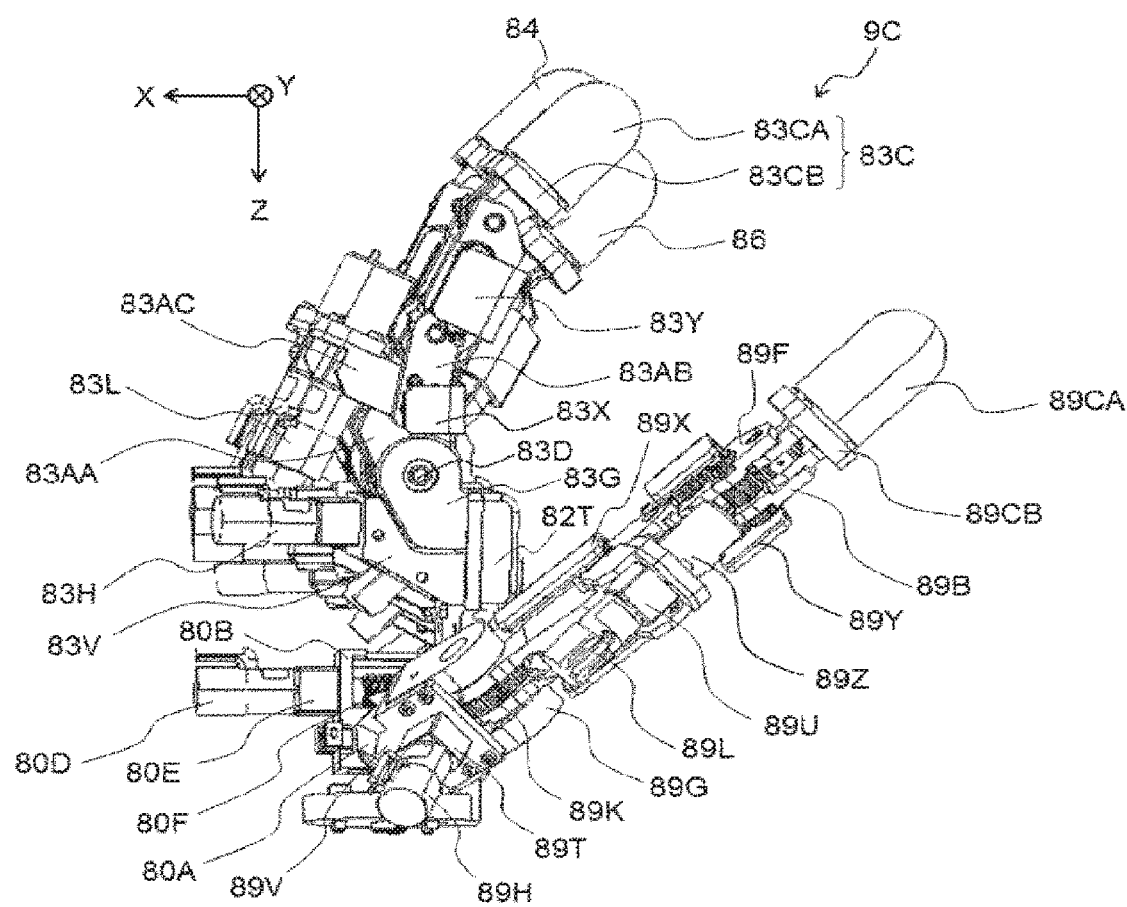

FIG. 149 is a view illustrating the hand included in the humanoid upper half body robot of the fifth embodiment viewing from a side.

Figure 150:
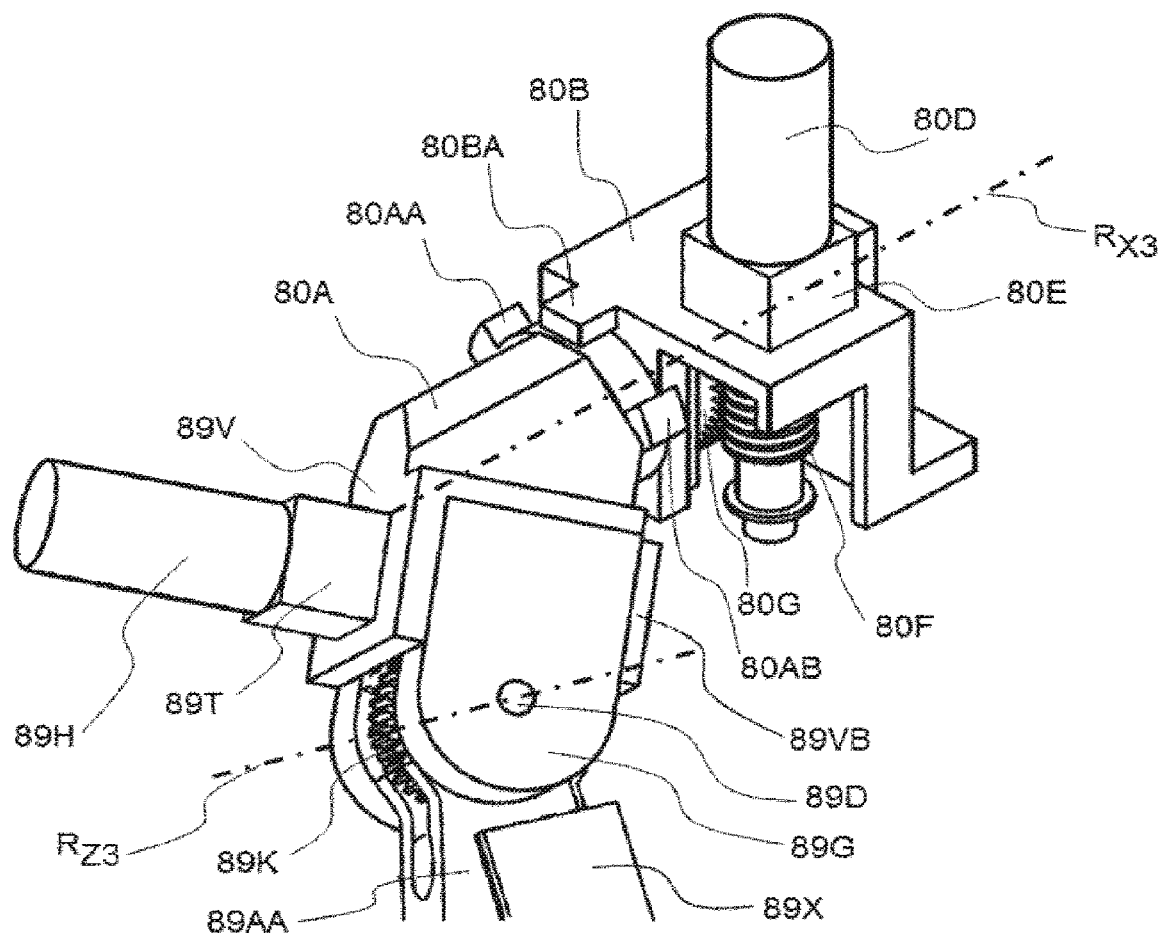

FIG. 150 is a perspective view illustrating a finger base that rotates a two-way rotation finger around a finger base axis, the finger base being included in the humanoid upper half body robot of the fifth embodiment.

Figure 151:
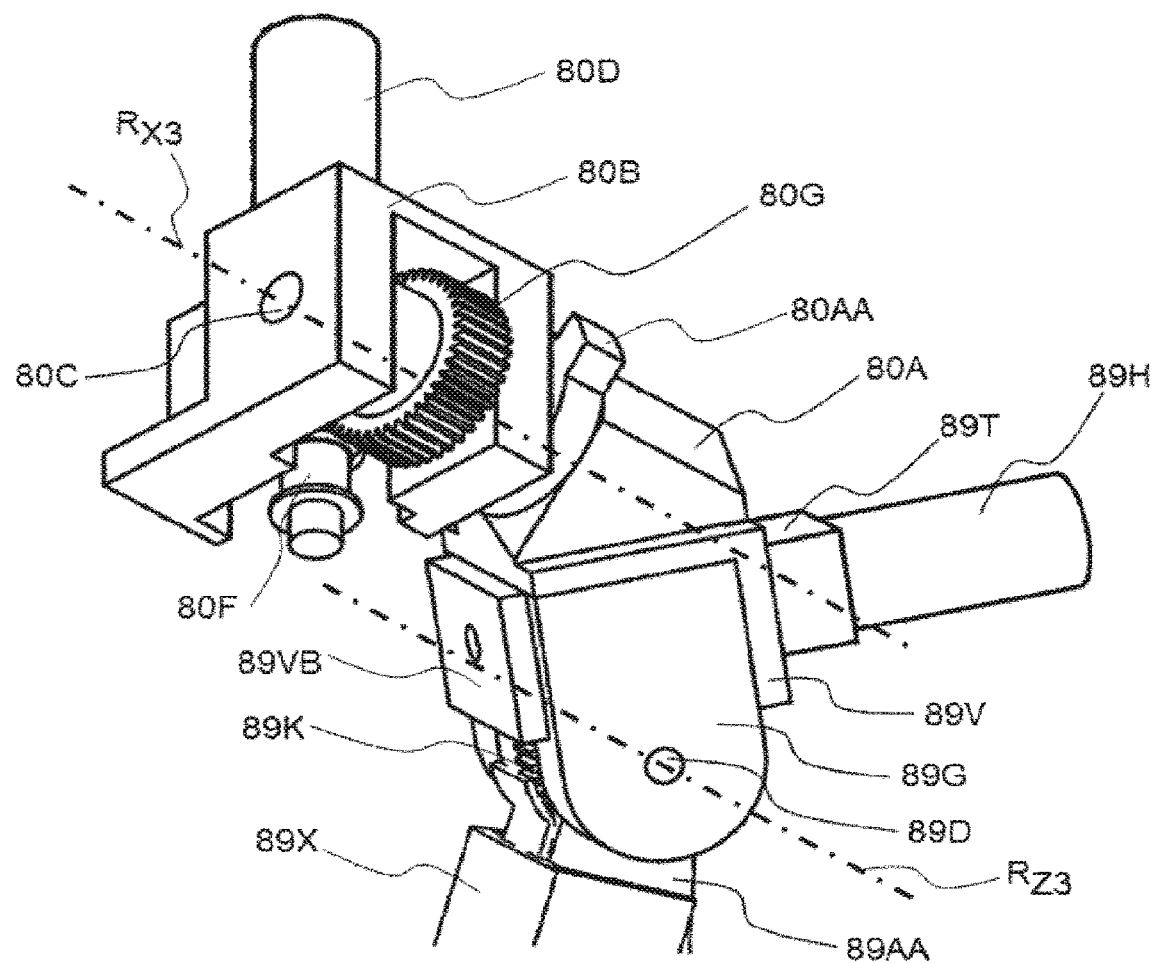

FIG. 151 is another perspective view illustrating the finger base that rotates the two-way rotation finger around the finger base axis, the finger base being included in the humanoid upper half body robot of the fifth embodiment.

Figure 152:
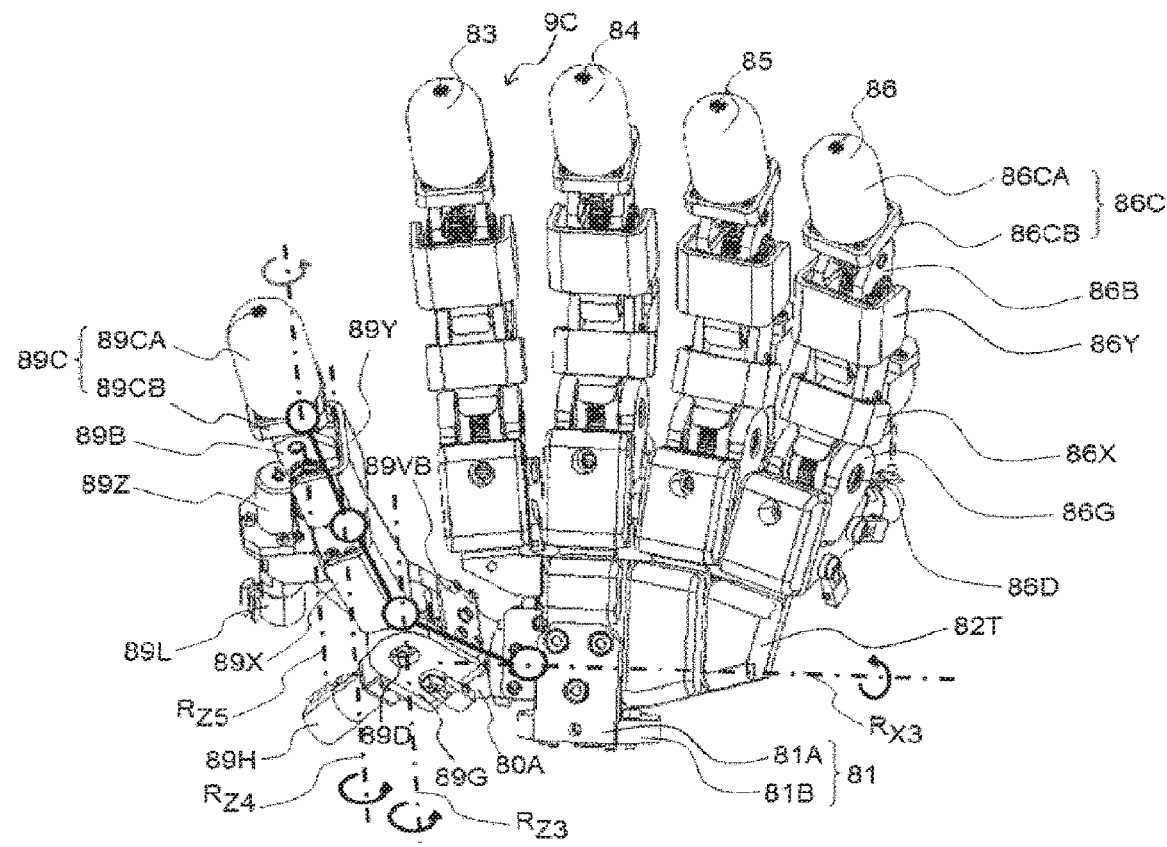

FIG. 152 is a view illustrating a link arrangement of a thumb of the hand included in the humanoid upper half body robot of the fifth embodiment.

Figure 153:
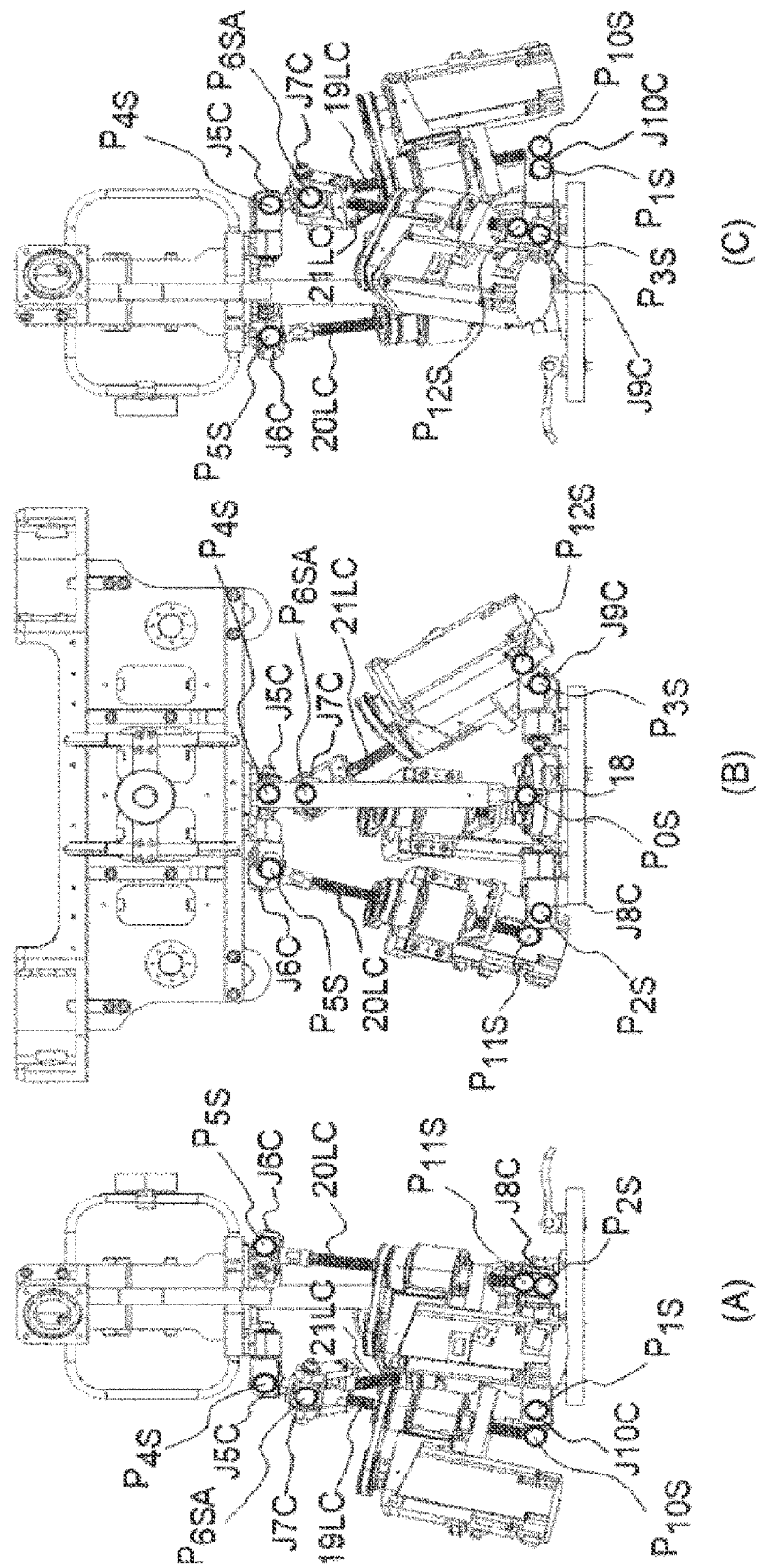

FIG. 153 is a view illustrating variables for expressing positions of the joint and the link attaching unit in the body bending unit included in the humanoid upper half body robot of the fifth embodiment.

Figure 154:
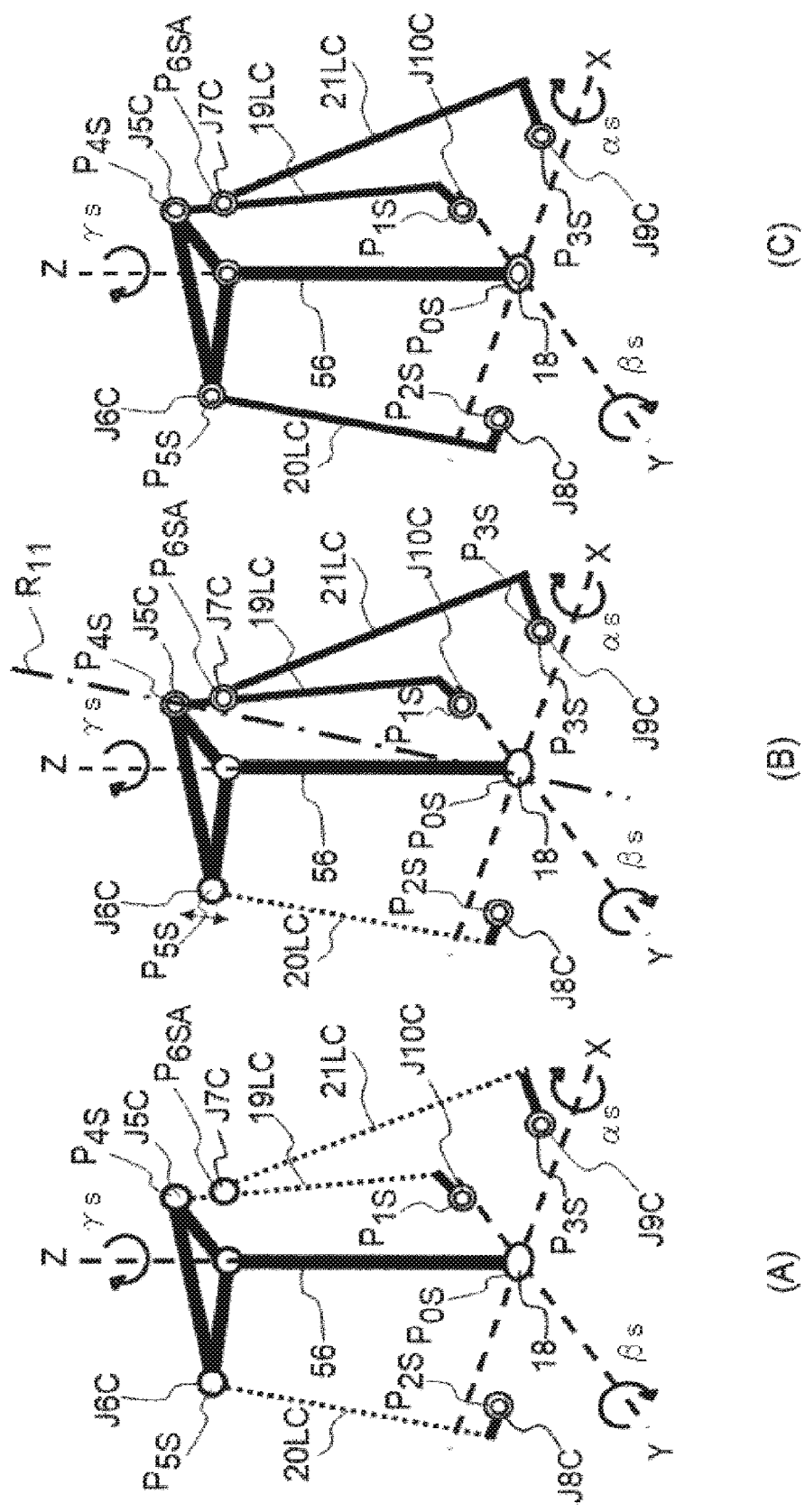

FIG. 154 is a view illustrating a point where the position is fixed by determining the link length in the body bending unit included in the humanoid upper half body robot of the fifth embodiment.

Figure 155:
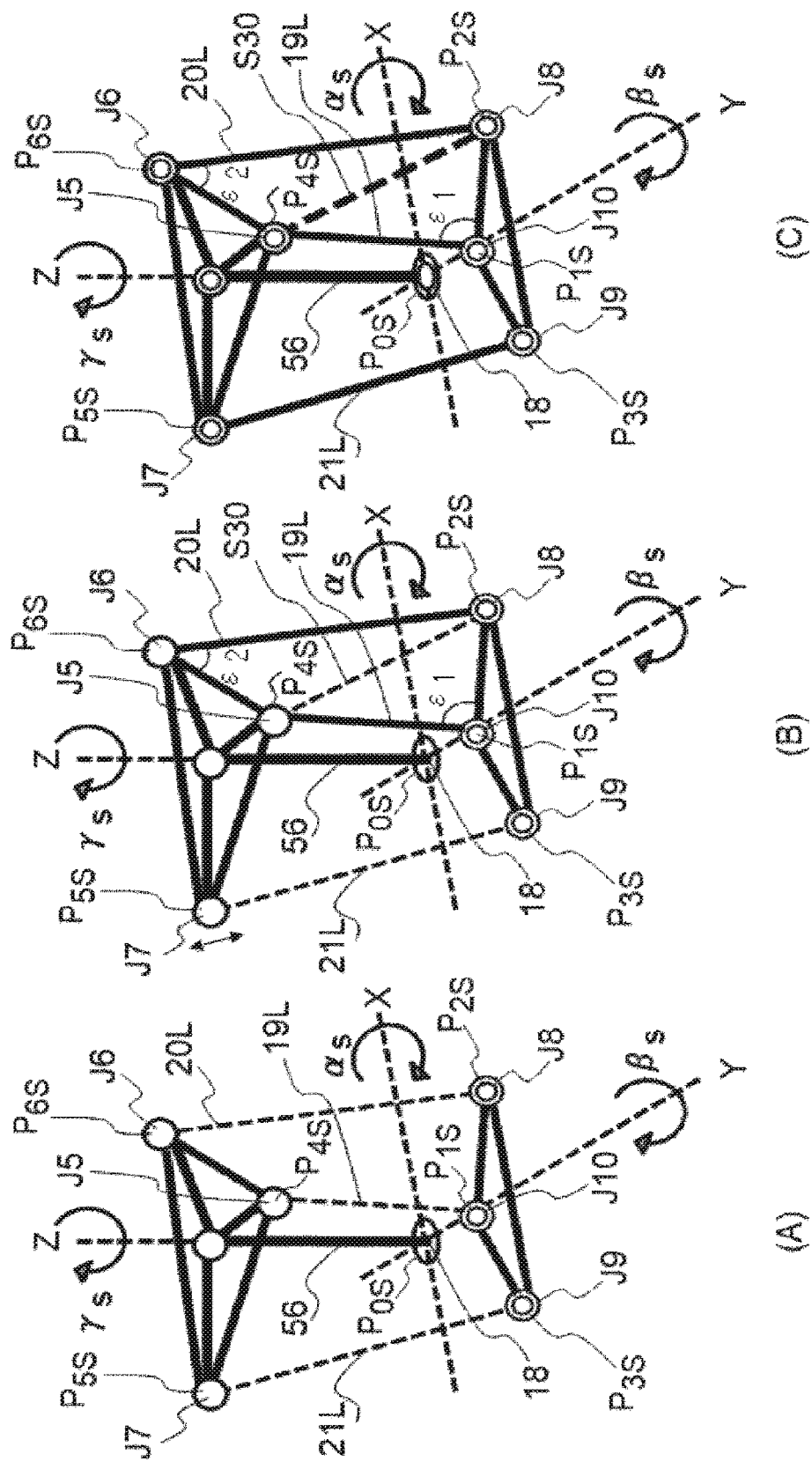

FIG. 155 is a view illustrating a point where the position is fixed by determining the link length in the body bending unit included in the humanoid robot of the first embodiment as a comparative example.

Figure 156:
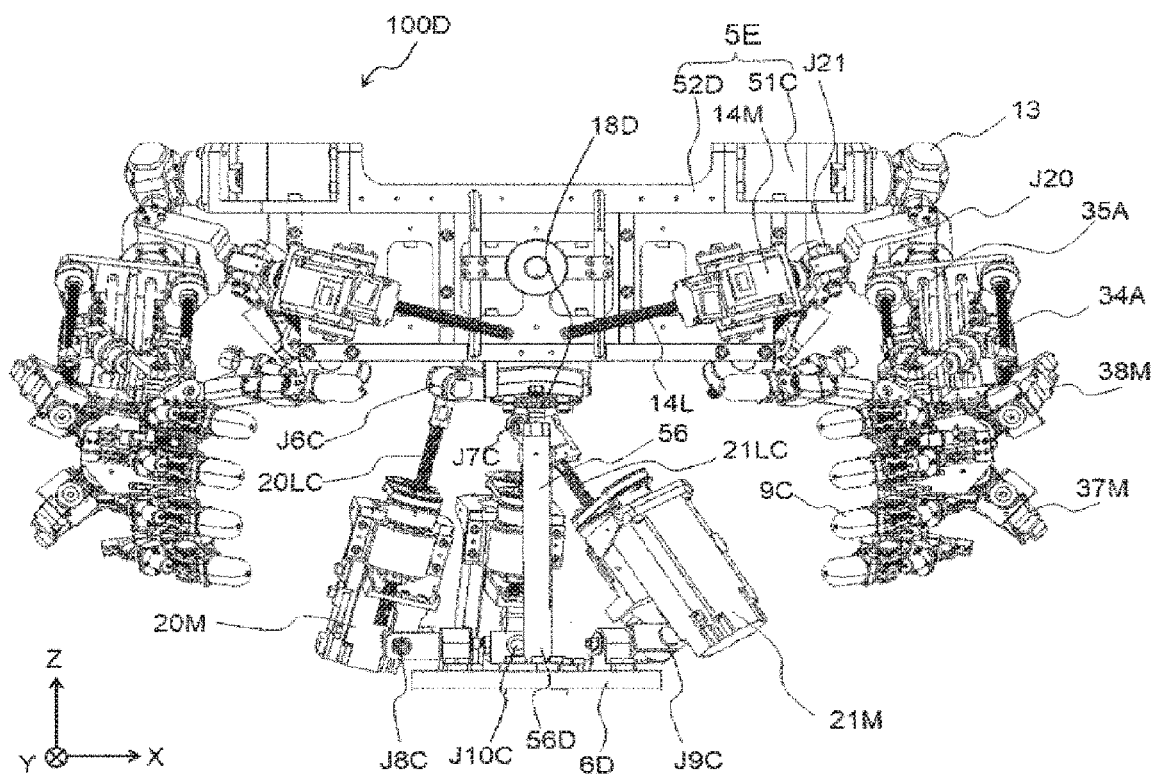

FIG. 156 is a front view illustrating a humanoid upper half body robot according to a sixth embodiment of the present disclosure.

Figure 157:
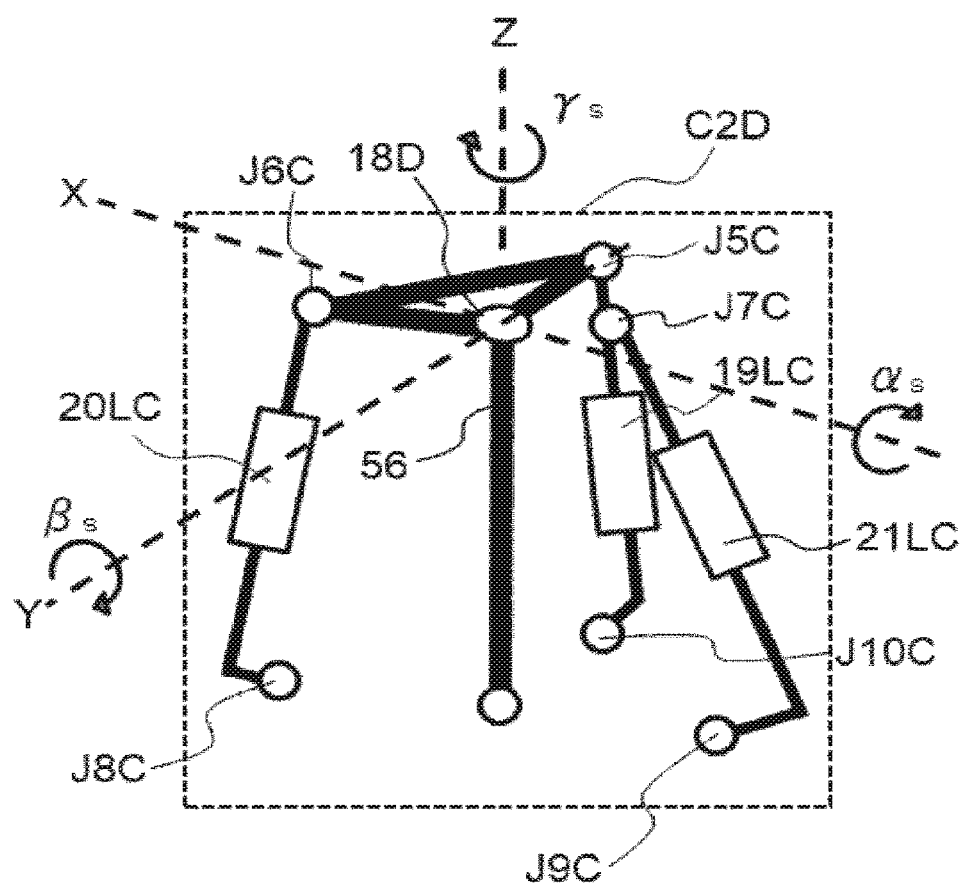

FIG. 157 is a perspective view illustrating a link arrangement of a body bending unit included in the humanoid upper half body robot of the sixth embodiment.

Figure 158:
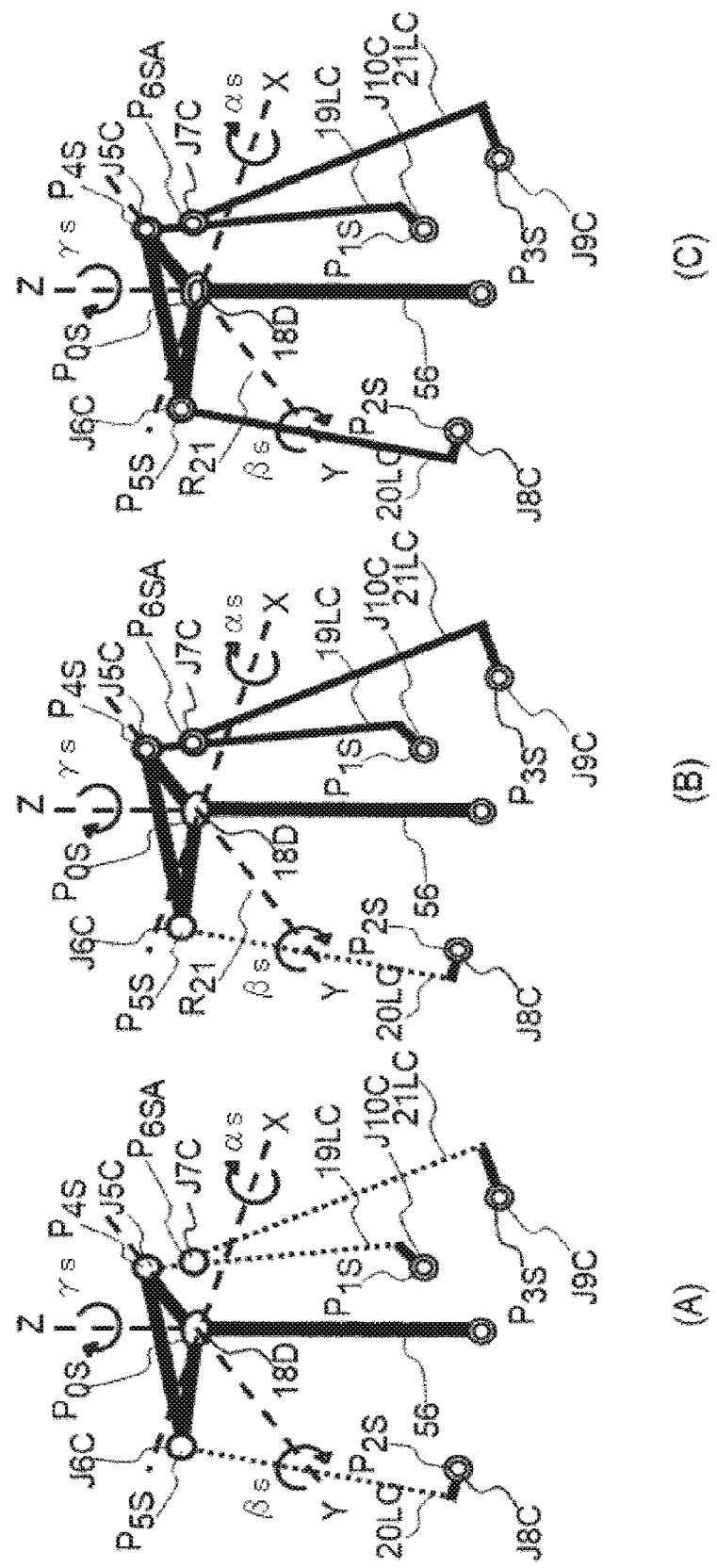

FIG. 158 is a view illustrating a point where the position is fixed by determining the link length in the body bending unit included in the humanoid upper half body robot of the sixth embodiment.

DESCRIPTION OF EMBODIMENTS

First Embodiment

Figure 1:
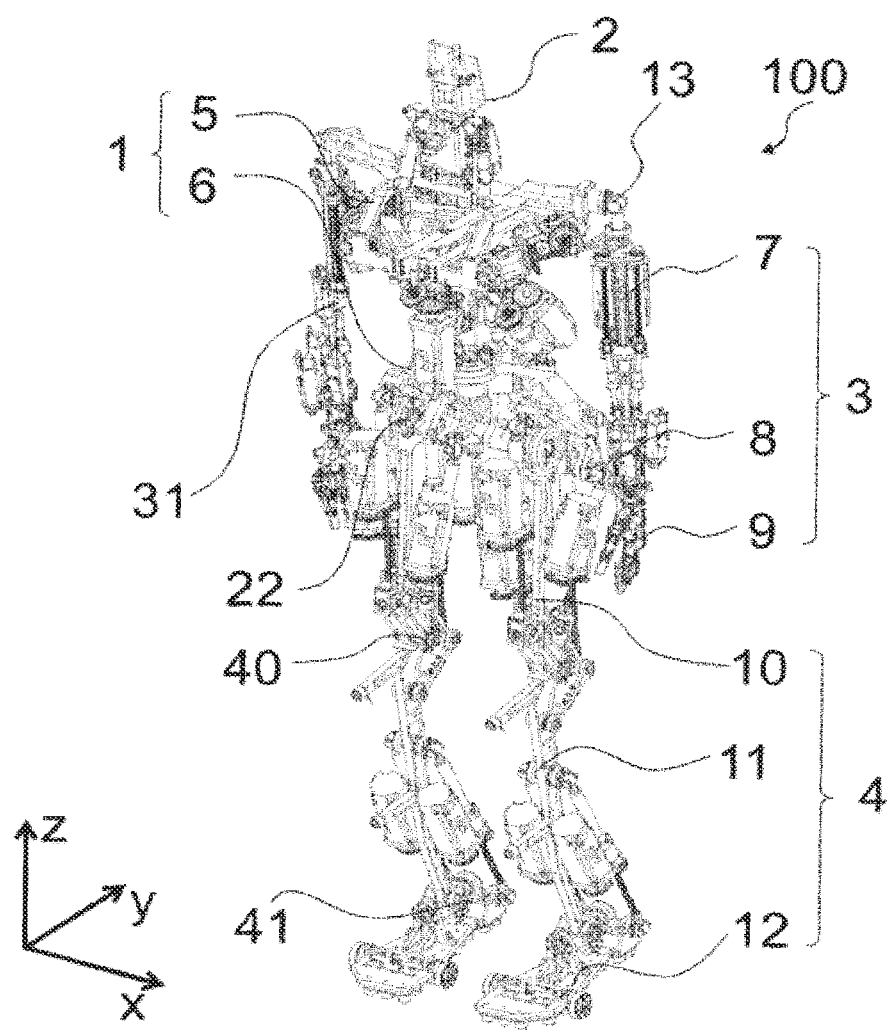
FIG. 1 is a perspective view illustrating a humanoid robot according to a first embodiment of the present disclosure.
Figure 2:
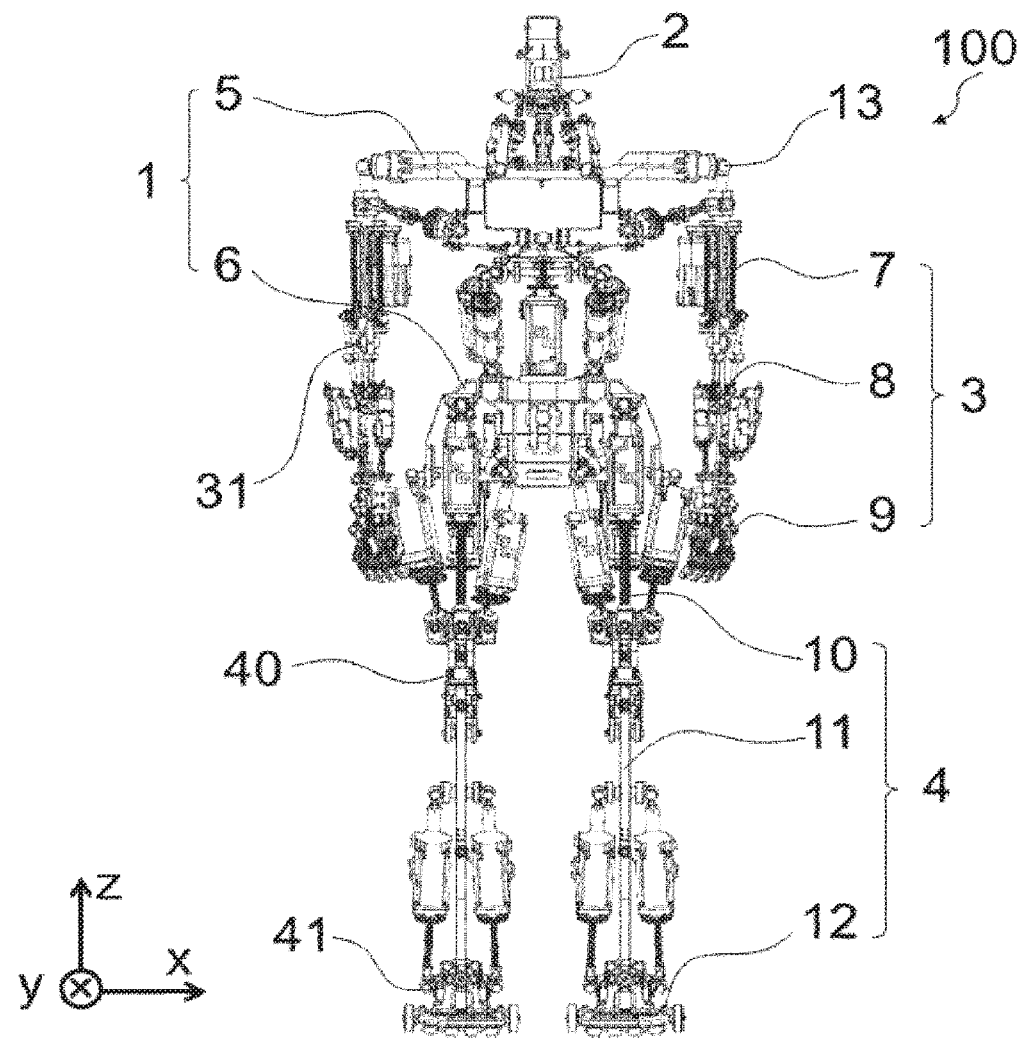
FIG. 2 is a front view illustrating the humanoid robot of the first embodiment.
Figure 3:
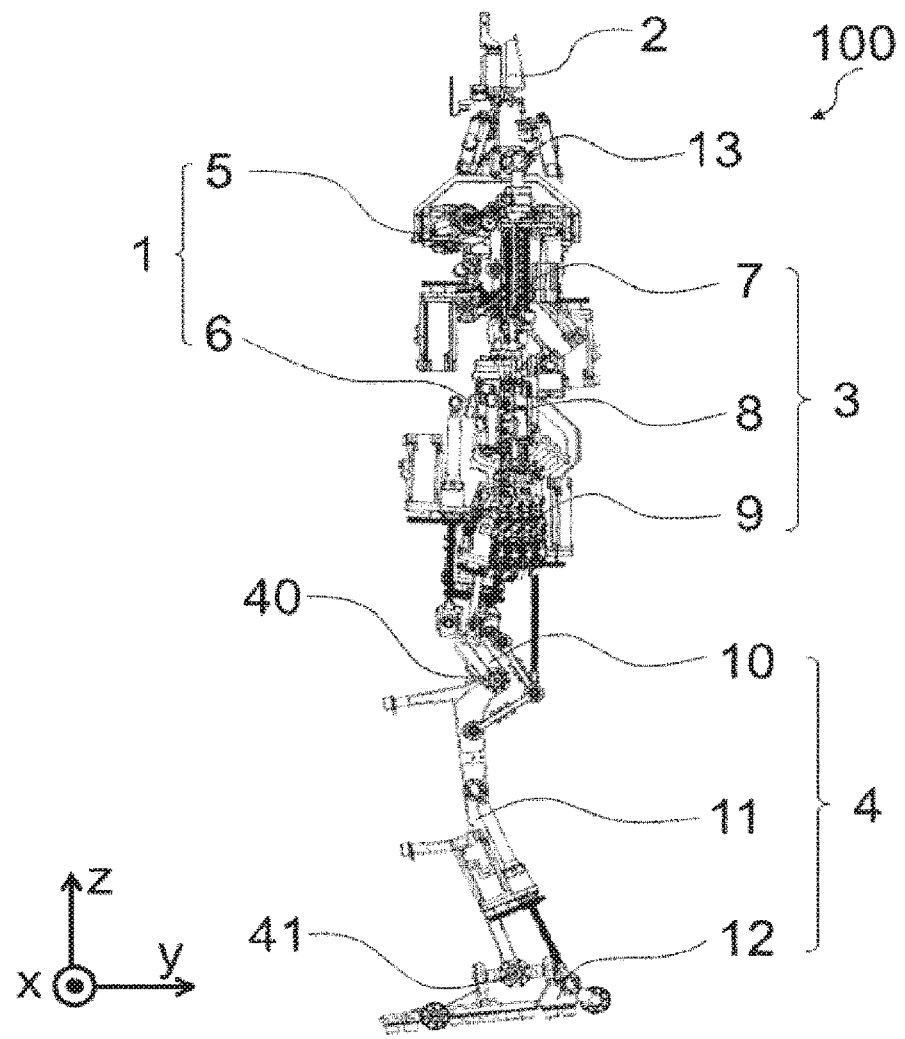
FIG. 3 is a left side view illustrating the humanoid robot of the first embodiment.
Figure 4:
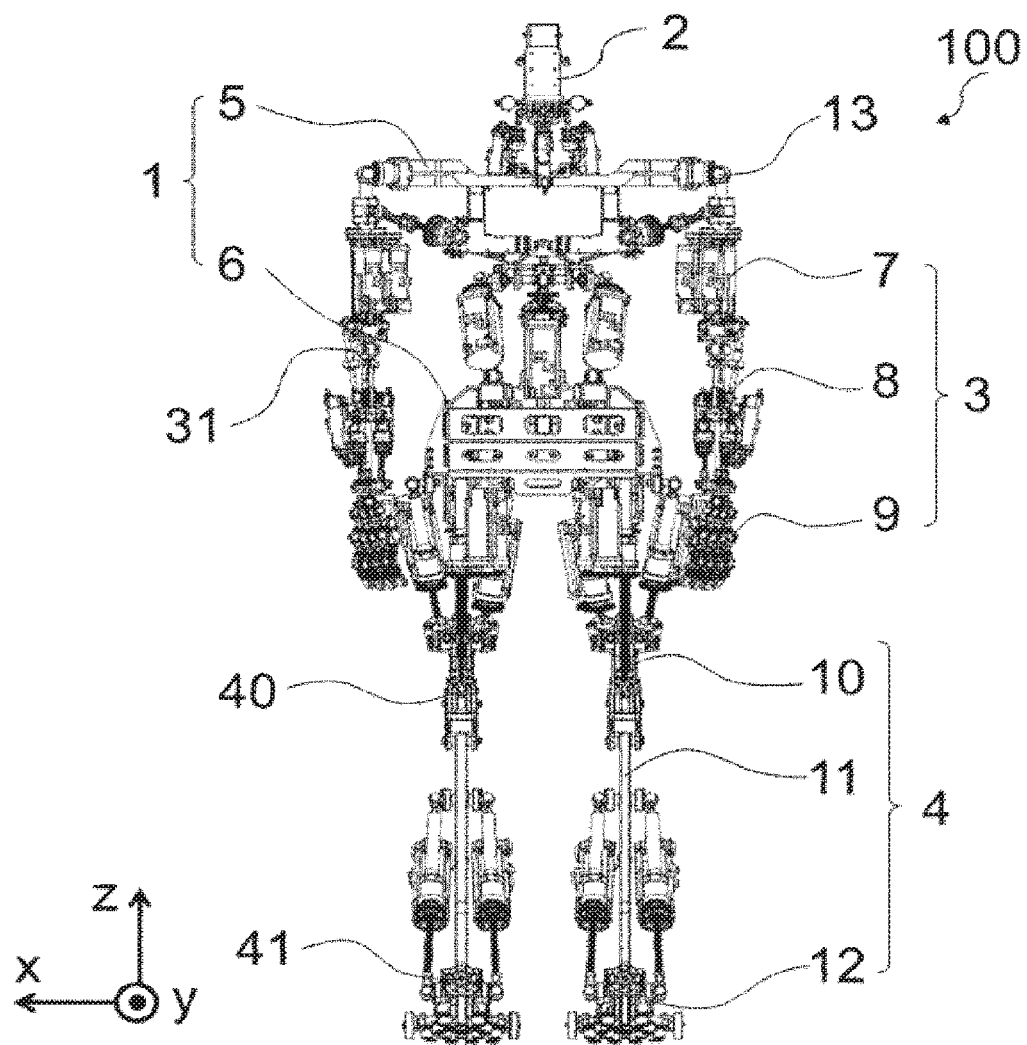
FIG. 4 is a rear view illustrating the humanoid robot of the first embodiment.

FIG. 1 is a perspective view of a humanoid robot 100 according to a first embodiment of the present disclosure. FIGS. 2, 3, 4, and 5 are a front view, a left side view, a rear view, and a plan view of humanoid robot 100, respectively. FIG. 6 is a perspective view explaining a skeleton structure of humanoid robot 100. FIGS. 7, 8, 9, and 10 are a front view, a left side view, a rear view, and a plan view of humanoid robot 100 having only a skeleton, respectively. An axis of a right and left direction of humanoid robot 100 is defined as an X-axis, an axis of a front-back direction is defined as a Y-axis, and an axis in a height direction is defined as a Z-axis. A direction from the right to the left is defined as a positive direction of the X-axis, a direction from the front to the rear is defined as a positive direction of the Y-axis, and a direction from a bottom to a top is defined as a positive direction of the Z-axis.

A posture in which humanoid robot 100 stands upright and lowers both arms as illustrated in FIGS. 1 to 5 is referred to as a reference state. The reference state is a posture often taken when humanoid robot 100 is used. The reference state is not necessary to be upright. Desirably the posture used as a starting point for various motions is determined to be the reference state.

Humanoid robot 100 has a structure similar to a human body. Humanoid robot 100 includes a trunk 1, a head 2 connected to an upper center of trunk 1, a pair of upper limbs 3 protruding from the right and left of an upper part of trunk 1, and a pair of right and left lower limbs 4 protruding from a lower part of trunk 1. Trunk 1 is divided into a chest 5 on an upper side and a waist 6 on a lower side. In upper limb 3, an upper arm 7, a forearm 8, and a hand 9 are connected in series. In lower limb 4, a thigh 10, a lower leg 11, and a foot 12 are sequentially connected in series from waist 6. The pair of right and left upper limbs 3 has a structure in which right upper limb 3 and left upper limb 3 become a mirror image relationship. Similarly, the mirror image relationship also holds for the pair of right and left lower limbs 4. Right and left upper limbs 3 may have a portion in which the mirror image relationship does not hold. Right and left lower limbs 4 may also have the portion in which the mirror image relationship does not hold.

In humanoid robot 100, each joint connecting rotatably a skeleton is moved by changing a length of a link (variable length link) having a variable length included in an actuator corresponding to a muscle. The number of variable length links that move the joints is the same as a degree of a rotational degree of freedom required at the joint. The length of the variable length link can be changed within a movable range of the variable length link, and any length within the movable range can be maintained. The actuator also includes a motor as a power source that generates force changing the length of the variable length link. A reference sign XXL denotes the link included in an actuator XX, and a reference sign XXM denotes a motor. The variable length link XXL and the motor XXM are illustrated in the drawings. Generally, a reference sign XX of the actuator is not illustrated in the drawings.

In this description, the term "link" is used to express a member that has one end and the other end and connects the point where one end is attached and the point where the other end is attached. A freedom degree of rotation of the link is a sum of the rotational degree of freedom at the point where one end is attached, at the point where the other end is attached, and the rotational degree of freedom of the link itself. With respect to the rotational degree of freedom of the link itself, the link has one rotational degree of freedom when the link can twist. When the link cannot twist, the link has no rotational degree of freedom, that is, zero rotational degree of freedom. When a link A is attached to a link B, the rotational degree of freedom of a link attaching unit is included in the rotational degree of freedom of link A and not included in the rotational degree of freedom of link B.

The term "actuator" is used to express an object that has the link and moves a second member connected to one end of the link with respect to a first member connected to the other end. The first member is a fixed-side member. The second member is a member that is moved with respect to the first member. There are the following two methods for moving the second member.

(Method 1) the link length is changed.
(Method 2) the other end of the fixed length link is moved.

The actuator includes the link, the link attaching unit to which each of one end and the other end of the link is attached, and a power source. For the actuator that moves the other end of the link, the actuator also includes a member to move the other end of the link.

In many conventional humanoid robots, the motor and the gear are disposed in each joint, and joint intersection is disposed on the axis of the gear. For this reason, a space necessary for the joint becomes large, the compact joint is hardly made. On the other hand, in humanoid robot 100, it is unnecessary to dispose a gear near the joint, so that the joint can be made compact. Additionally, the link exists in parallel with the skeleton connected by the joint, so that the joint can withstand force larger than that of the case of only the joint. Each joint has the rotational degree of freedom of the necessary degree, so that humanoid robot 100 can make motion close to that of a human. For example, being able to make the motion similar to that of a human is a necessary condition as a robot that work on behalf of a human in an area where a human cannot enter.

In the neck, the wrist, the crotch, and a connection between chest 5 and waist 6, each joint of humanoid robot 100 has three rotational degrees of freedom, at which the joint can be moved back and forth and right and left and be twisted. In the shoulder, the elbow, and the ankle, the joint has two rotational degrees of freedom, at which the joint can be moved back and forth and right and left. In the knee, the joint has one rotational degree of freedom, at which the joint can be moved back and forth. In the shoulder, the ankle, and the elbow, the joint may have three rotational degrees of freedom.

Chest 5 is divided into a chest upper portion 5U and a chest lower portion 5D. Upper arm 7 and head 1 are connected to chest upper portion 5U. Chest lower portion 5D is connected to waist 6. An angle of chest upper portion 5U can be changed vertically with respect to chest lower portion 5D with one rotational degree of freedom. Chest 5 includes a chest bending unit C1 (illustrated in FIG. 26) connecting chest upper portion 5U rotatably to chest lower portion 5D with one rotational degree of freedom.

Figure 11:
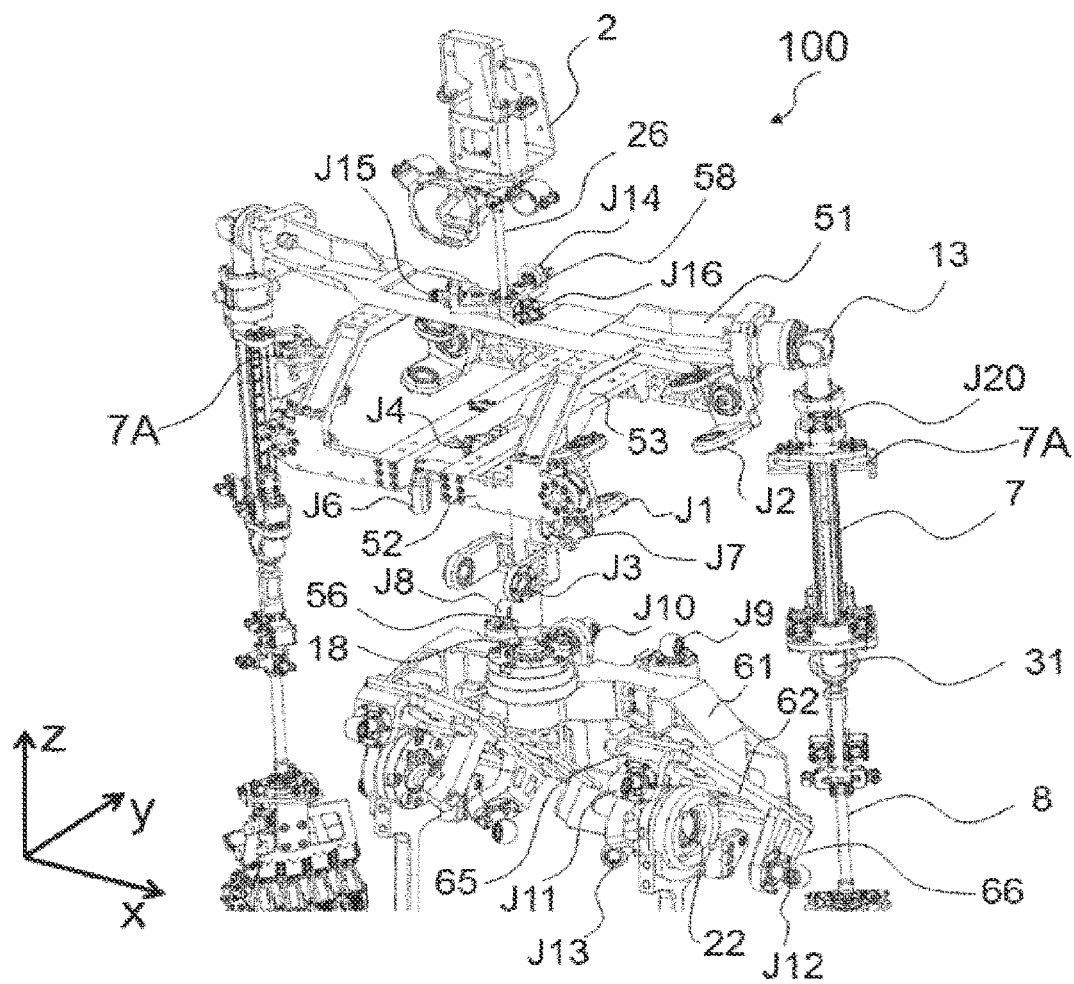
FIG. 11 is a perspective view illustrating an upper half body in the skeletal structure of the humanoid robot of the first embodiment viewing from an oblique front on a left hand side.
Figure 12:
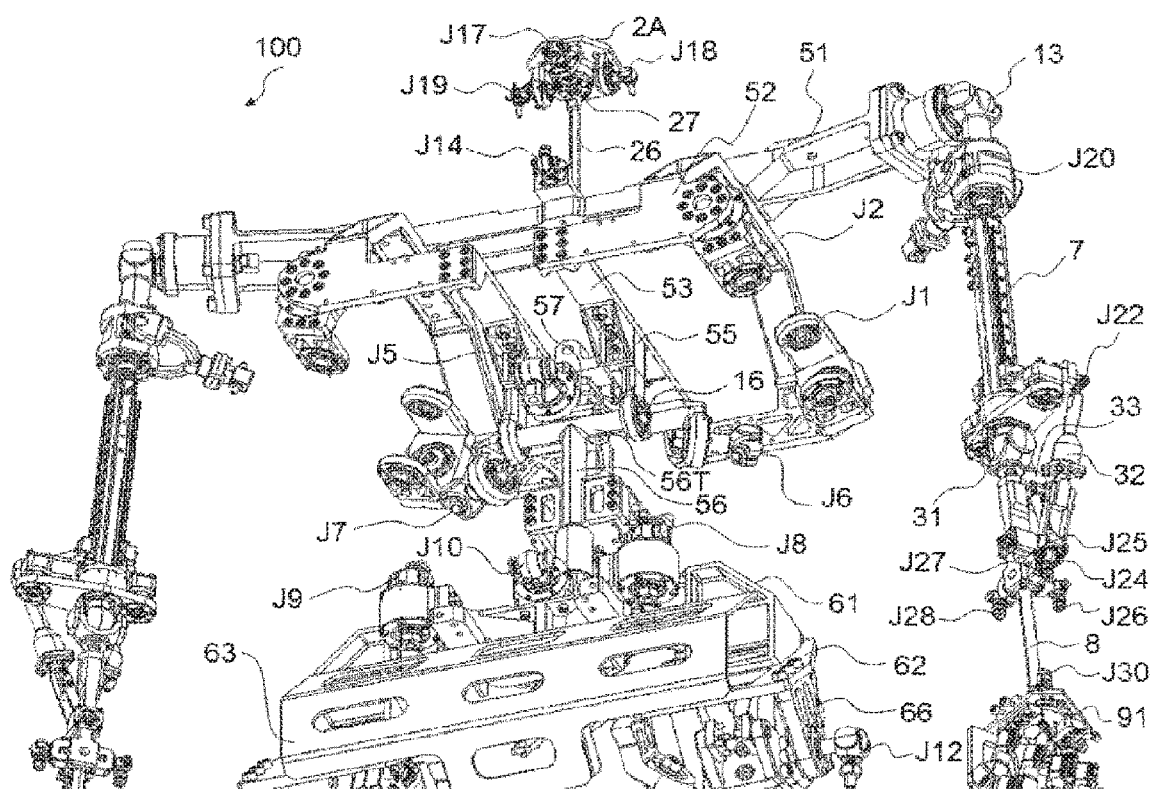
FIG. 12 is a perspective view illustrating the upper half body in the skeletal structure of the humanoid robot of the first embodiment viewing up from an oblique rear on the right hand side.
Figure 13:
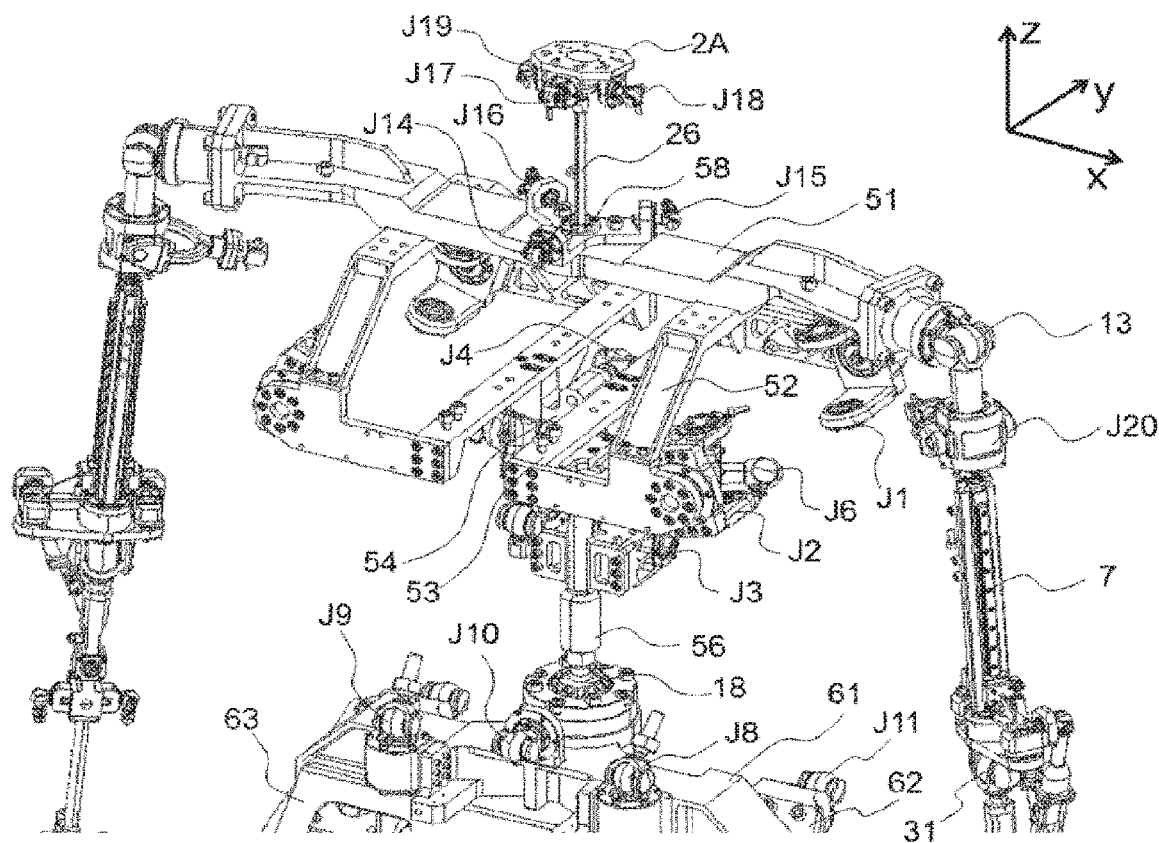
FIG. 13 is a perspective view illustrating the upper half body in the skeletal structure of the humanoid robot of the first embodiment viewing down from the oblique rear on the right hand side.
Figure 14:
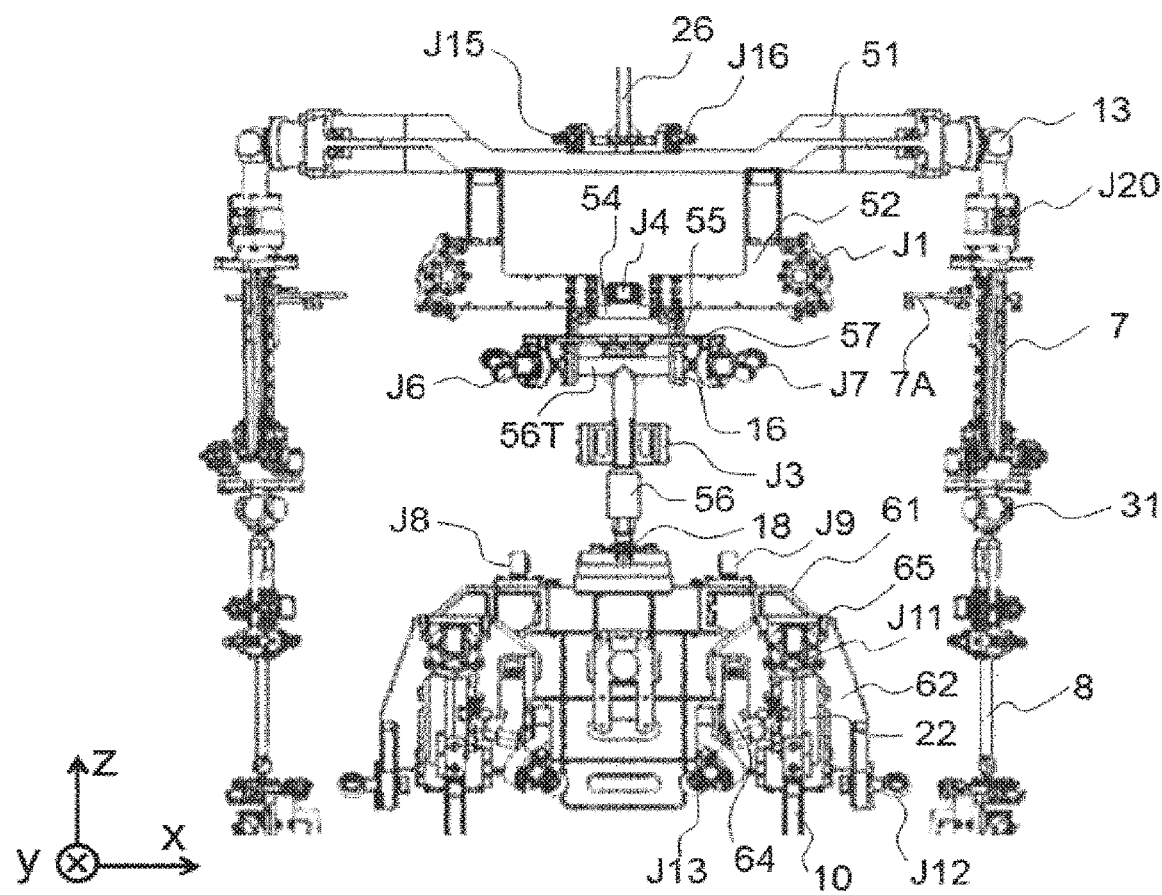
FIG. 14 is an enlarged front view illustrating a trunk in the skeletal structure of the humanoid robot of the first embodiment.
Figure 15:
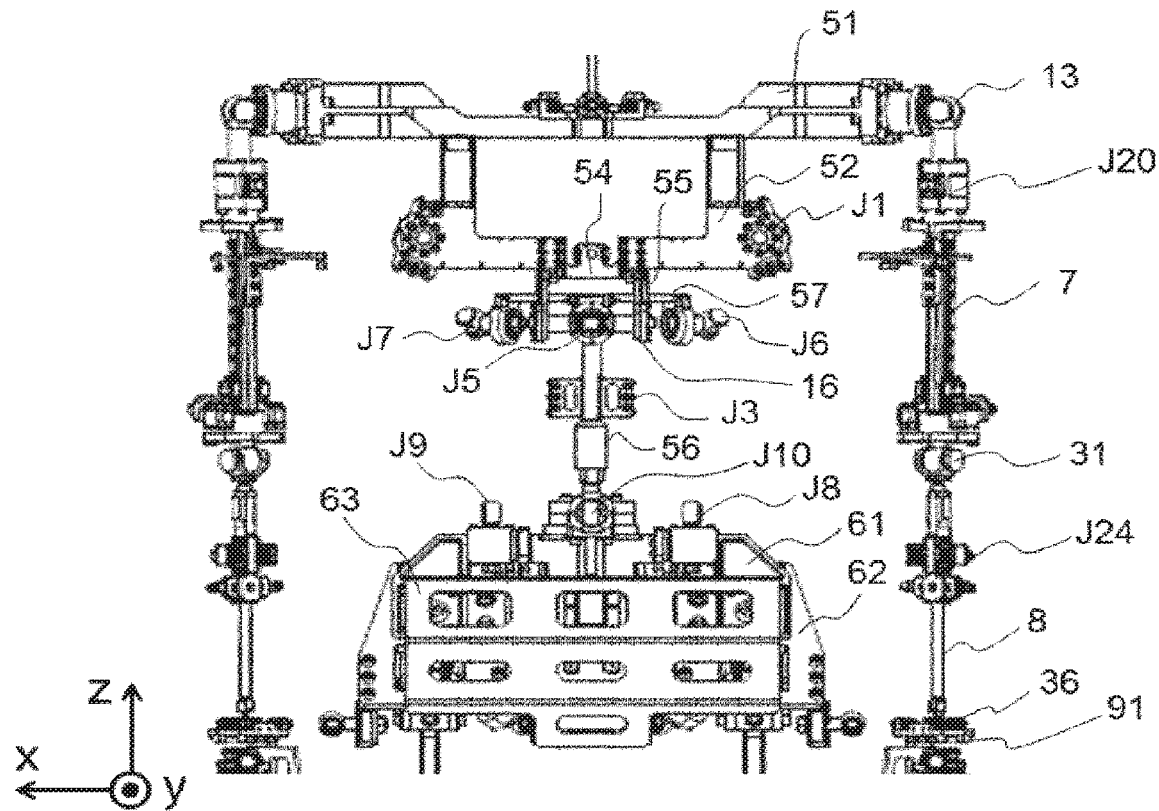
FIG. 15 is an enlarged rear view of the trunk in the skeletal structure of the humanoid robot of the first embodiment.
Figure 16:
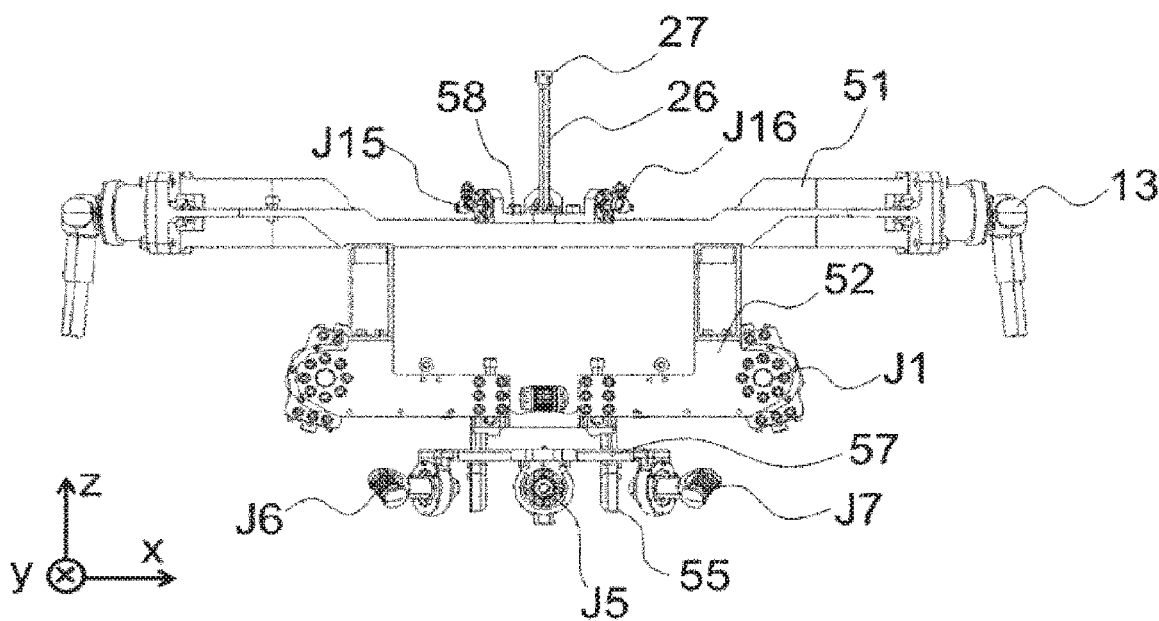
FIG. 16 is a front view illustrating a chest upper portion included in the humanoid robot of the first embodiment.
Figure 17:
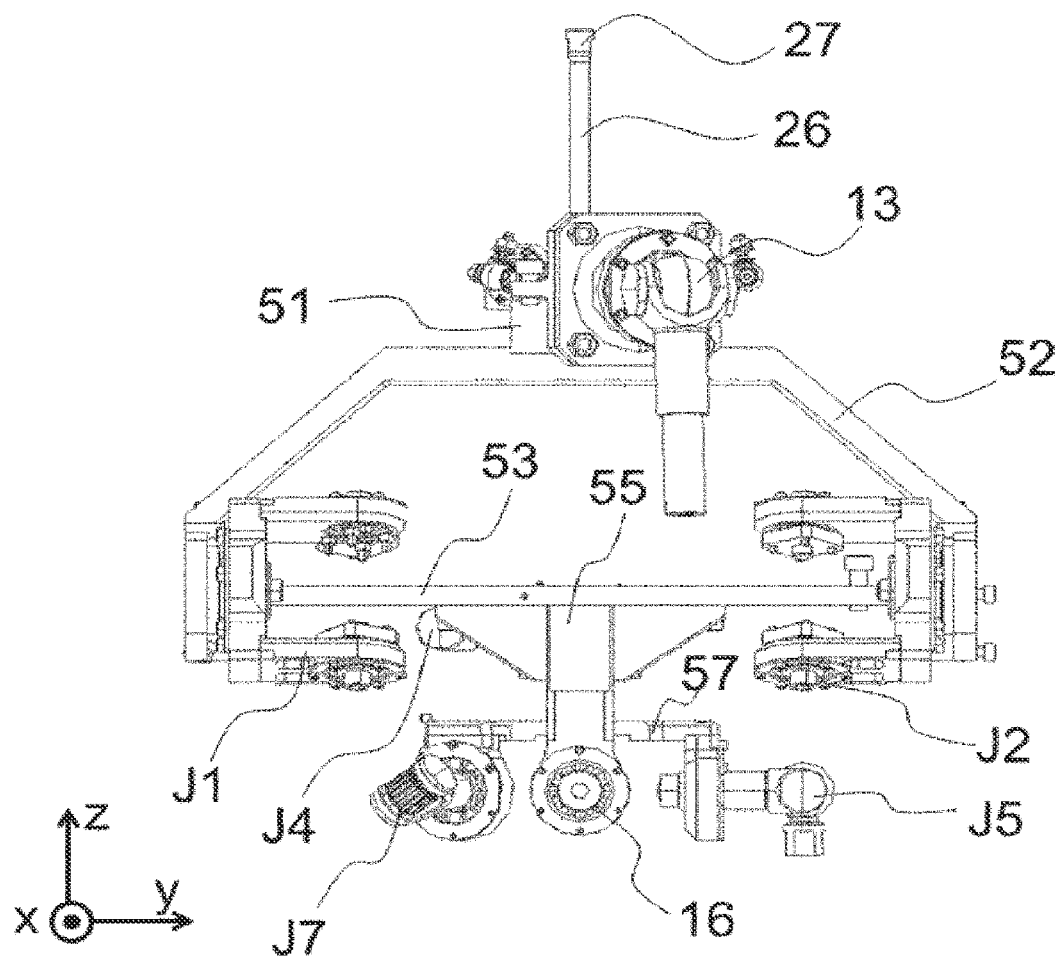
FIG. 17 is a left side view illustrating the chest upper portion included in the humanoid robot of the first embodiment.
Figure 18:
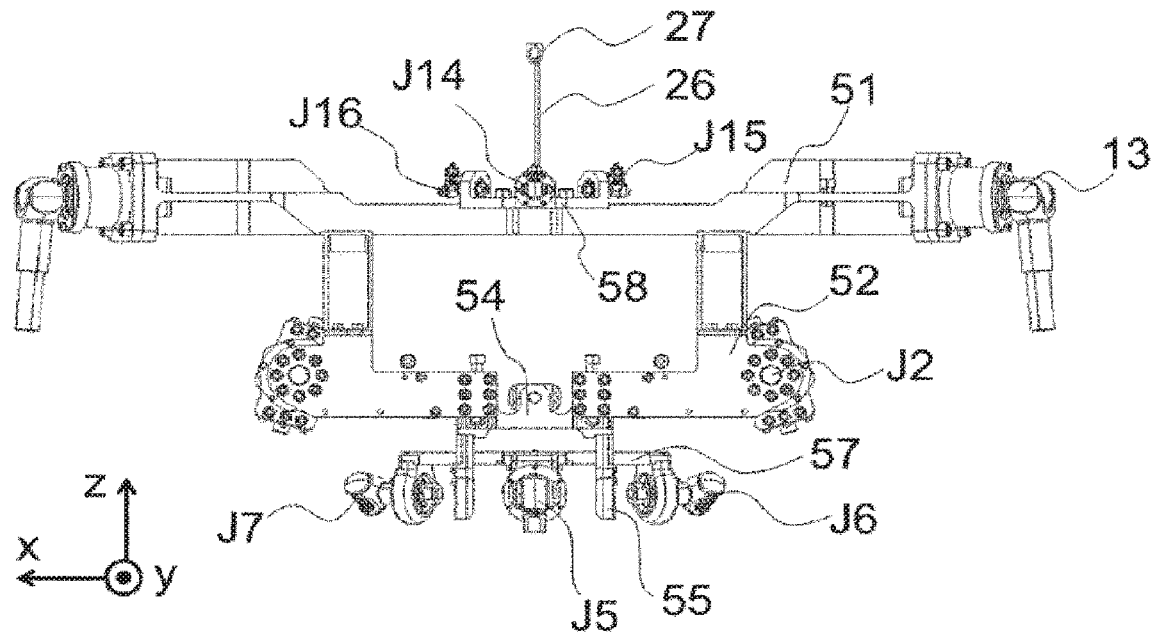
FIG. 18 is a rear view illustrating the chest upper portion included in the humanoid robot of the first embodiment.
Figure 19:
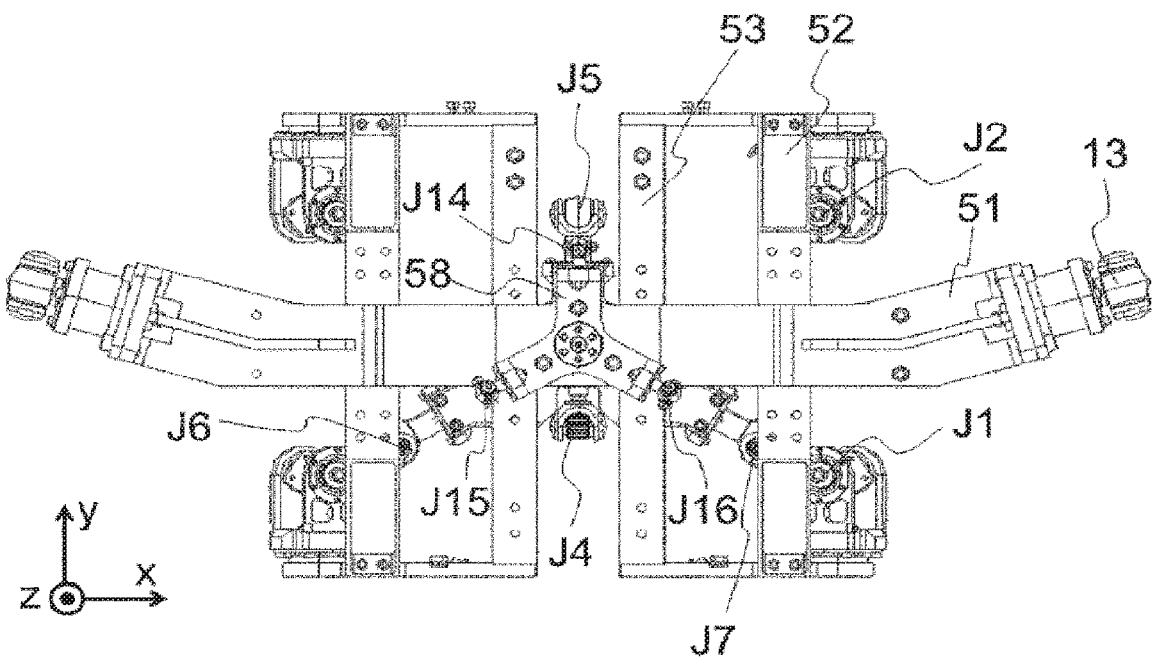
FIG. 19 is a plan view illustrating the chest upper portion included in the humanoid robot of the first embodiment viewing from above.
Figure 20:
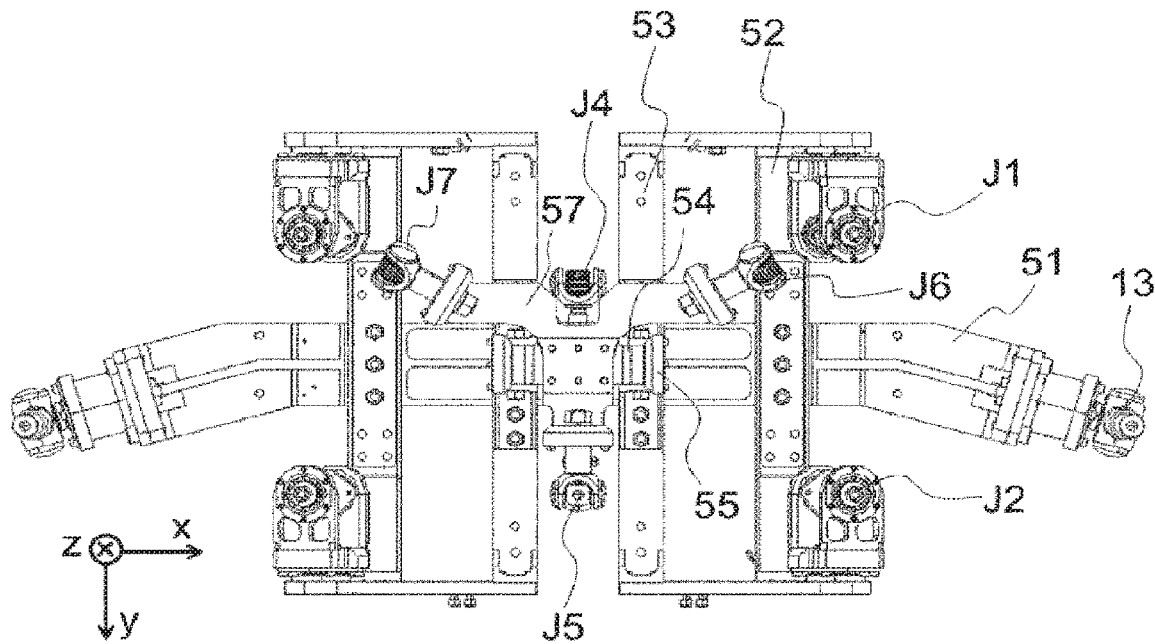
FIG. 20 is a plan view illustrating the chest upper portion included in the humanoid robot of the first embodiment viewing from below.
Figure 21:
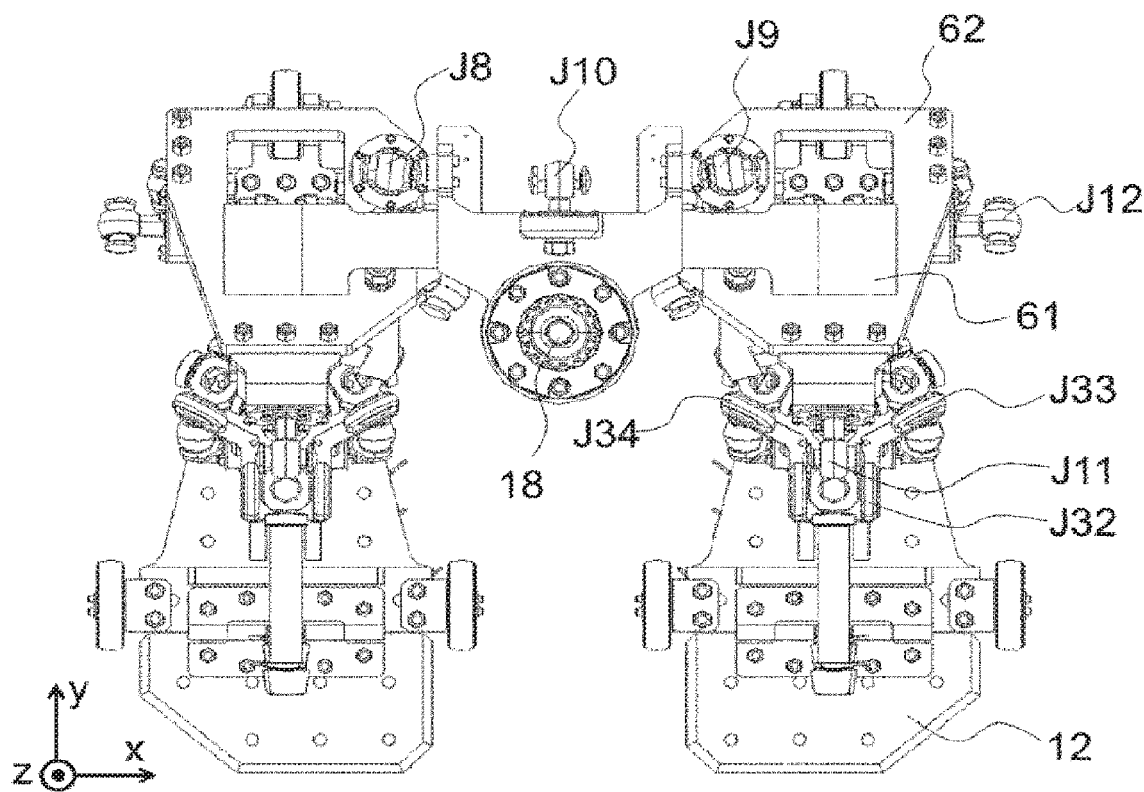
FIG. 21 is a plan view illustrating a portion below a waist in the skeleton structure of the humanoid robot of the first embodiment viewing from above.
Figure 22:
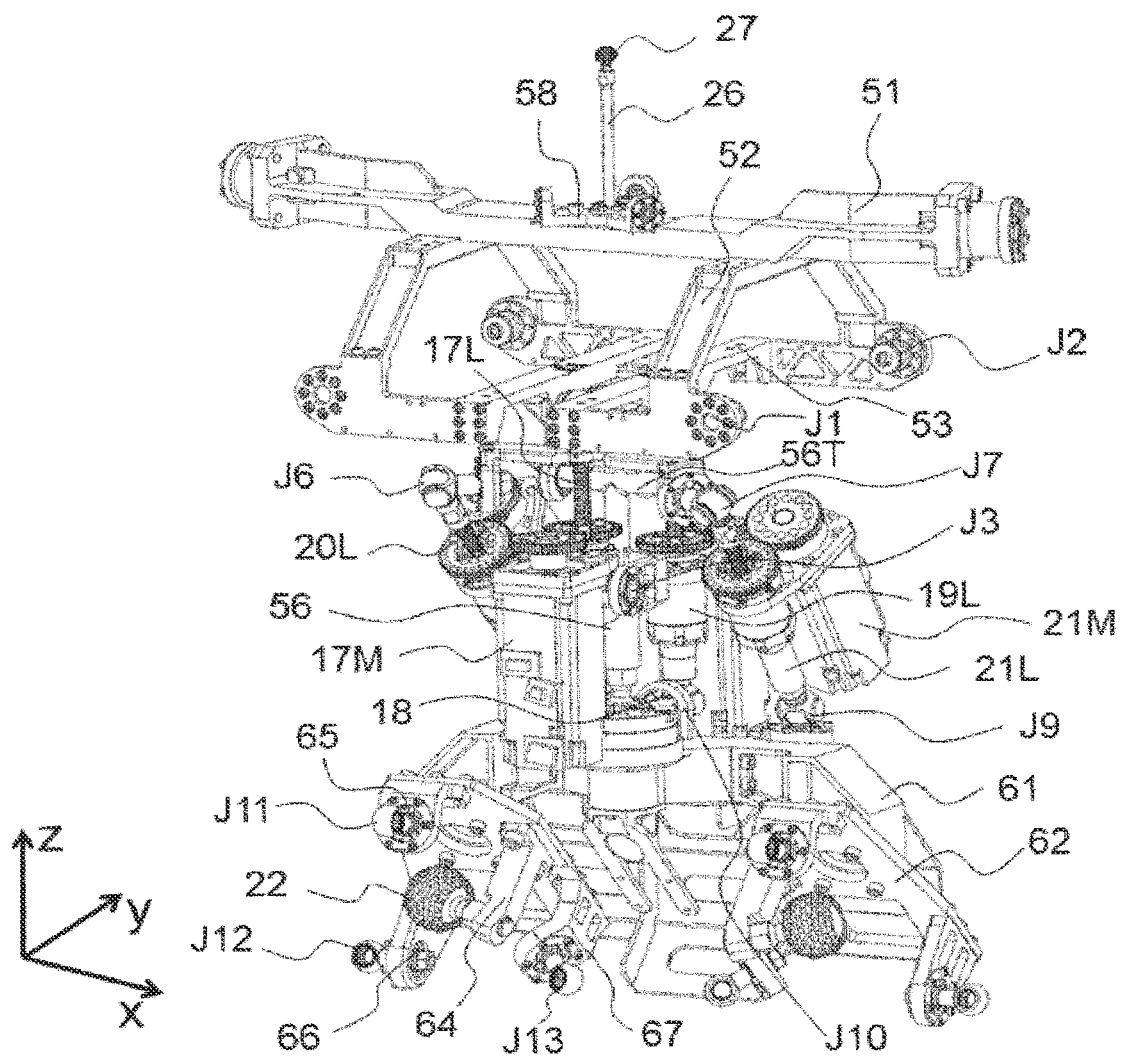
FIG. 22 is a perspective view illustrating the trunk included in the humanoid robot of the first embodiment viewing from an oblique front on the left hand side.
Figure 23:
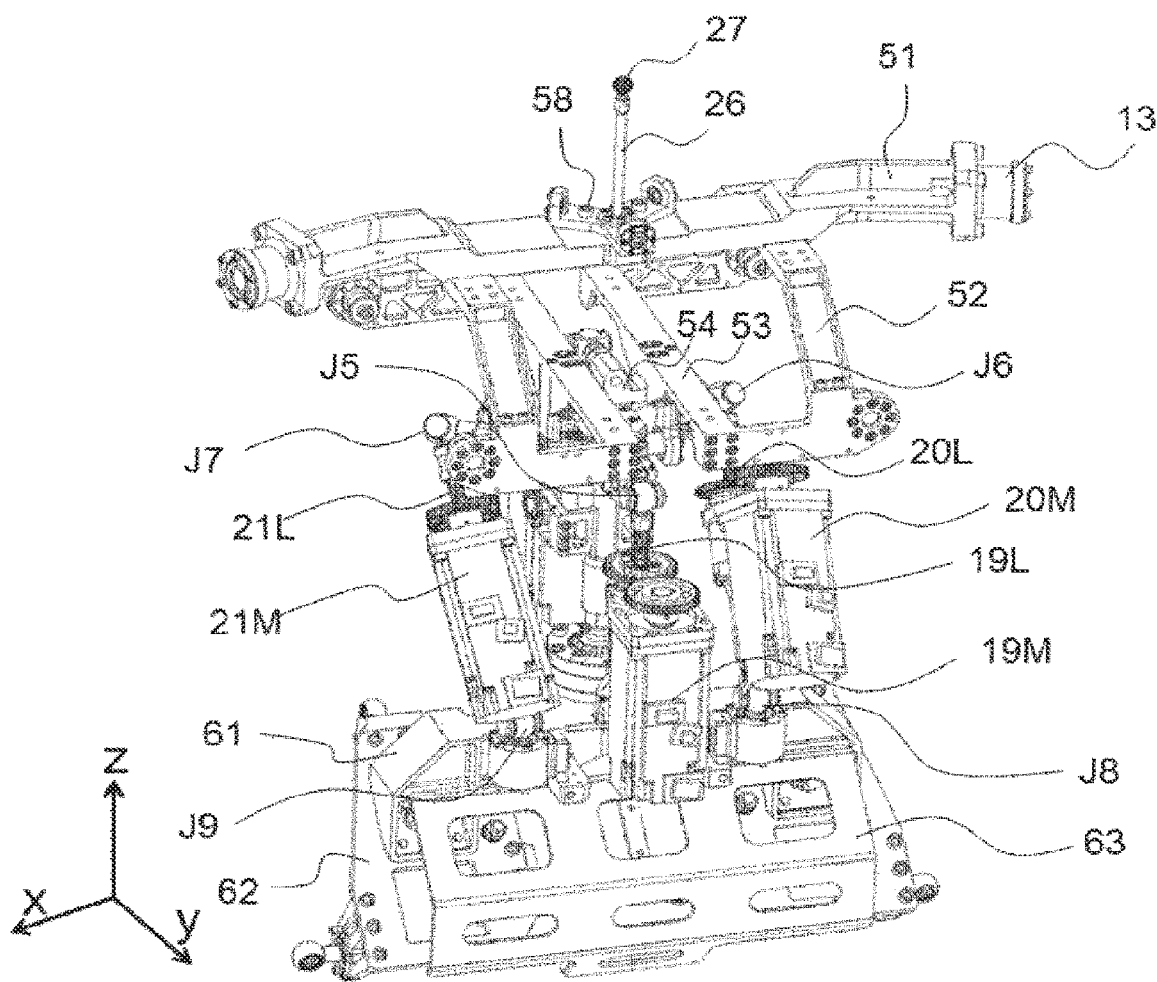
FIG. 23 is a perspective view illustrating the trunk included in the humanoid robot of the first embodiment viewing from the oblique rear on the left hand side.
Figure 24:
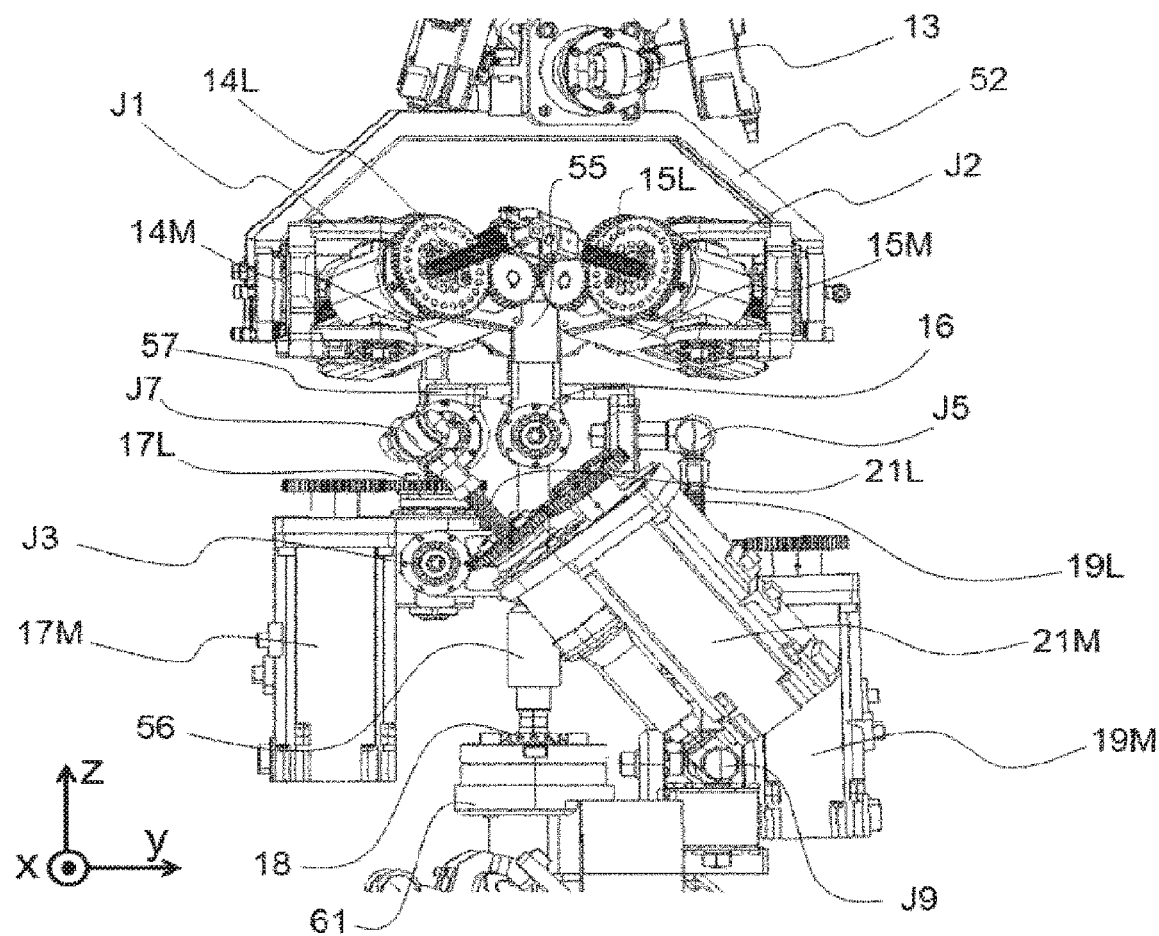
FIG. 24 is a left side view illustrating the trunk when an upper limb of the humanoid robot of the first embodiment does not exist.

Referring to FIGS. 10 to 24, a structure of the trunk 1 is described. FIG. 11 is a perspective view illustrating an upper half body in a skeleton structure viewing from an oblique front on a left hand side. FIG. 12 is a perspective view illustrating the upper half body in the skeleton structure viewing up from an oblique rear on the right hand side. FIG. 13 is a perspective view illustrating the upper half body in the skeletal structure viewing down from the oblique rear on the right hand side. FIG. 14 is an enlarged front view illustrating trunk 1 in the skeleton structure. FIG. 15 is an enlarged rear view illustrating trunk 1 in the skeleton structure. FIGS. 16 to 18 are a front view, a left side view, and a rear view of chest upper portion 5U. FIG. 19 is a plan view illustrating chest upper portion 5U viewing from above. FIG. 20 is a plan view illustrating chest upper portion 5U viewing from below. FIG. 21 is a plan view illustrating a portion below waist 6 in the skeleton structure. FIG. 22 is a perspective view illustrating trunk 1 viewing from an oblique front on the left hand side. FIG. 23 is a perspective view illustrating trunk 1 viewing from an oblique rear on the left hand side. FIG. 24 is a left side view illustrating trunk 1 without upper limb 3.

Referring mainly to FIGS. 10 to 21, the skeleton constituting trunk 1 and a place to which the variable length link of the actuator, corresponding to a muscle, is attached is described. Chest 5 includes a shoulder frame 51, a thorax frame 52, a thorax front-back coupling frame 53, a chest center coupling frame 54, an intrathoracic joint frame 55, a backbone 56, and a link attaching frame 57. Chest upper portion 5U is configured to include shoulder frame 51, thorax frame 52, thorax front-back coupling frame 53, chest center coupling frame 54, and intrathoracic joint frame 55. Chest lower portion 5D is configured to include backbone 56 and link attaching frame 57. Intrathoracic joint 16 connects chest upper portion 5U and chest lower portion 5D with one rotational degree of freedom at which chest upper portion 5U and chest lower portion 5D can be rotated vertically.

Shoulder frame 51 is a frame connecting positions corresponding to both shoulders. Thorax frame 52 is a bent frame provided on the right and left on a lower side of shoulder frame 51. The variable length link that moves upper arm 7 is attached to thorax frame 52. Thorax front-back coupling frame 53 is a frame connecting thorax frames 52 in a front-back direction. Chest center coupling frame 54 is a frame connecting right and left thorax front-back coupling frames 53. Intrathoracic joint frame 55 is a plate-shaped frame provided on the lower side of each of right and left thorax front-back coupling frames 53. Intrathoracic joint frame 55 constitutes intrathoracic joint 16 together with backbone 56.

Backbone 56 is a T-shaped rod viewing from the front. A horizontal cylindrical portion on an upper side of backbone 56 is referred to as an intrathoracic rotation shaft 56T. Intrathoracic rotation shaft 56T is sandwiched rotatably between two intrathoracic joint frames 55 to form intrathoracic joint 16.

A vertically extending portion of backbone 56 has a columnar shape. Backbone 56 is a coupling rod coupling chest 5 and waist 6. A thoracolumbar joint 18 connecting backbone 56 rotatably to waist 6 with three rotational degrees of freedom is provided at a lower end of backbone 56. A spherical bearing is used for thoracolumbar joint 18. Link attaching frame 57 is connected to the upper side of intrathoracic rotation shaft 56T. The variable length link that rotates chest 5 with respect to waist 6 is attached to link attaching frame 57. In FIGS. 16 to 20, not only members included in chest upper portion 5U but also link attaching frame 57 provided in chest lower portion 5D are illustrated in order to identify an attaching position of the variable length link that rotates chest 5 with respect to waist 6.

Figure 5:
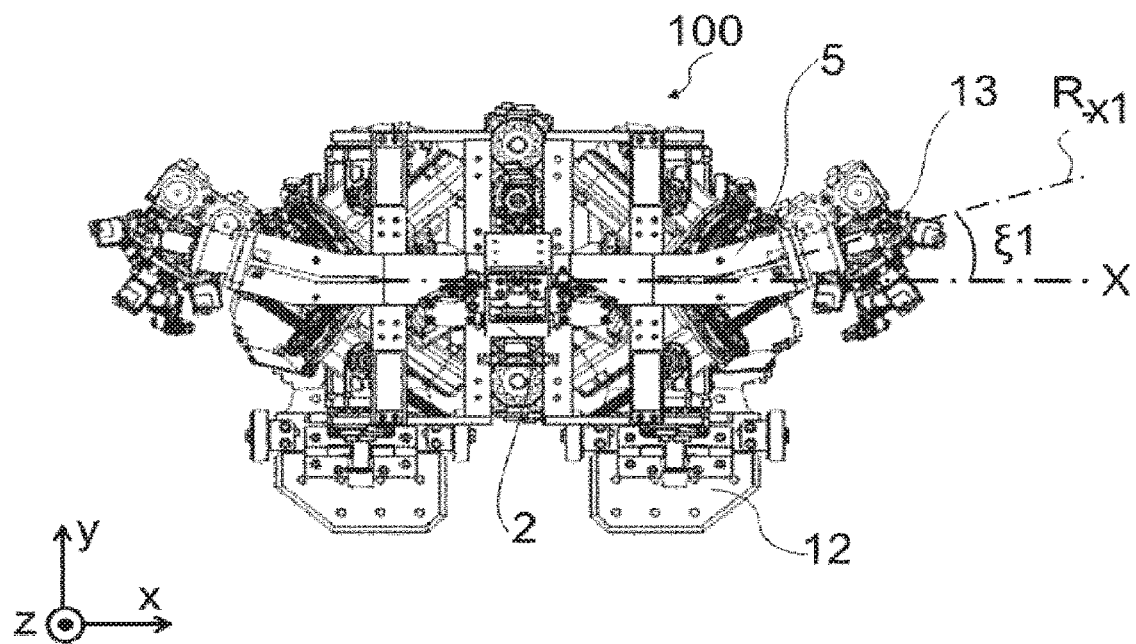
FIG. 5 is a plan view illustrating the humanoid robot of the first embodiment viewing from above.
Figure 6:
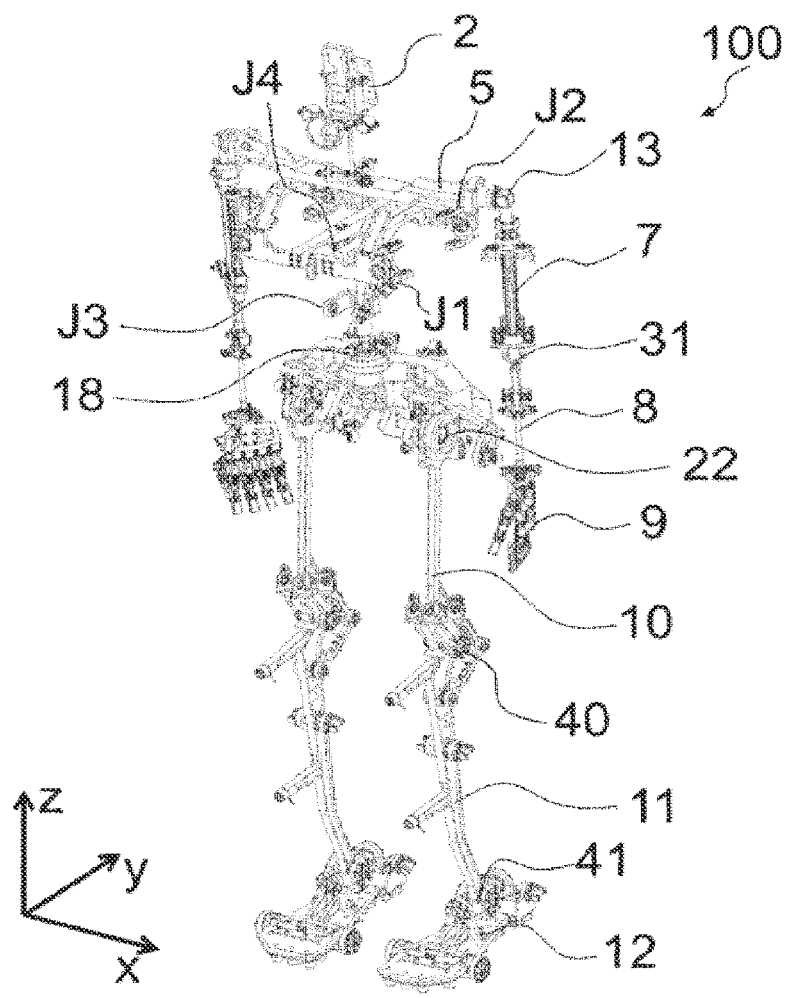
FIG. 6 is a perspective view illustrating a skeleton structure of the humanoid robot of the first embodiment.
Figure 7:
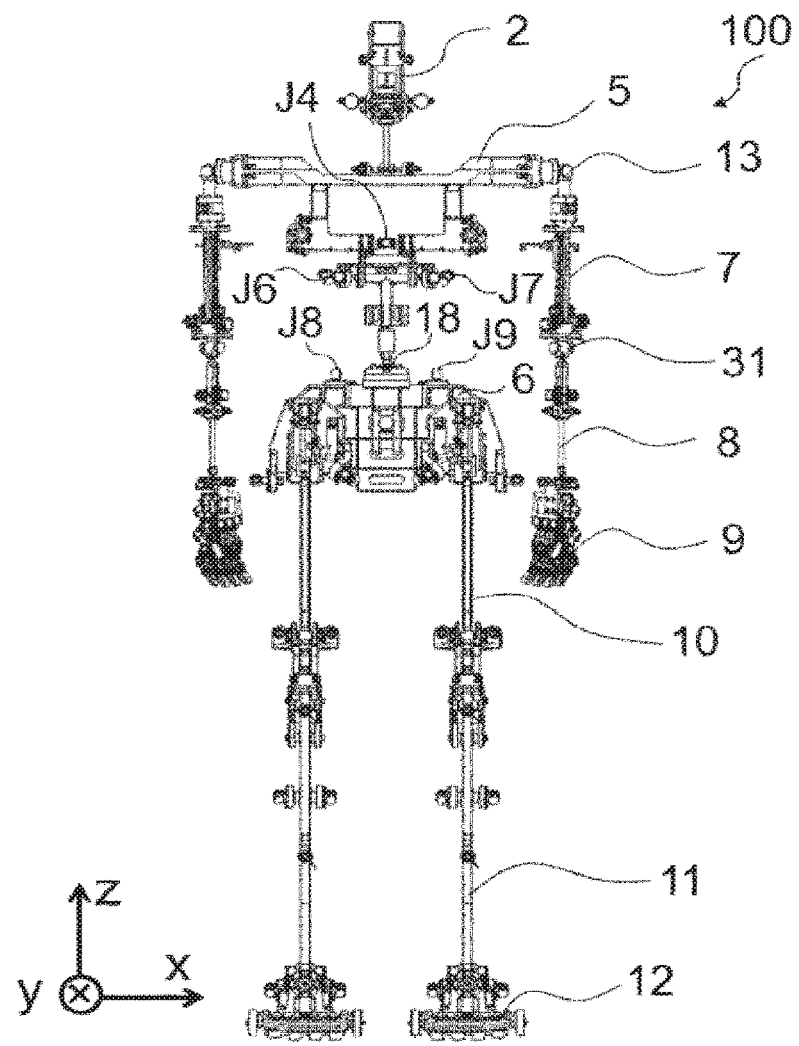
FIG. 7 is a front view illustrating the skeleton structure of the humanoid robot of the first embodiment.
Figure 8:
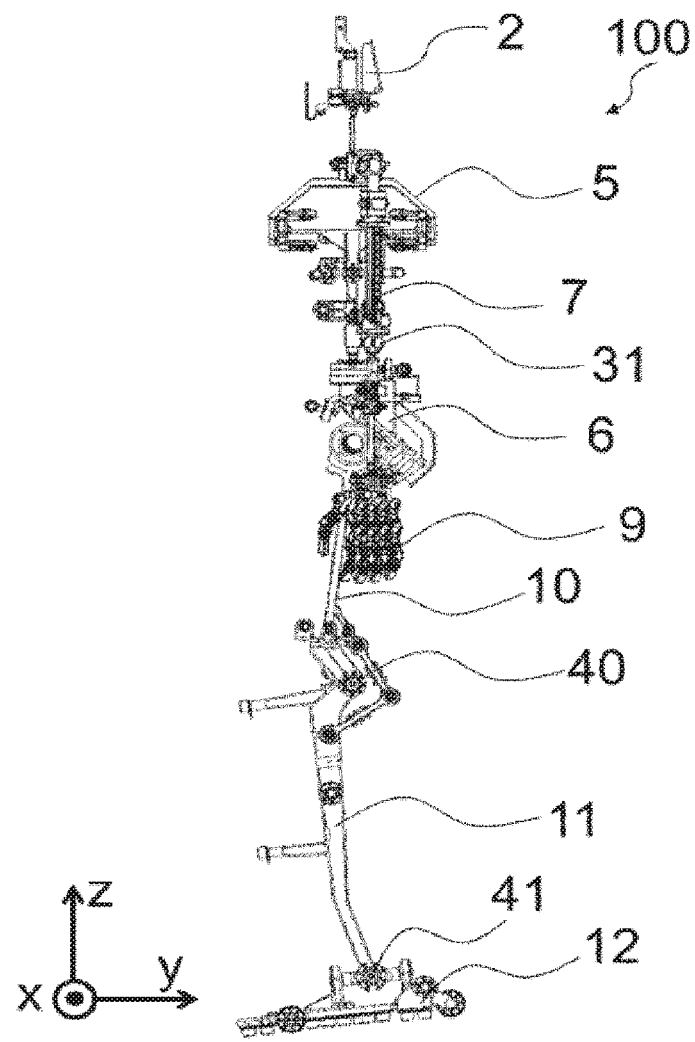
FIG. 8 is a left side view illustrating the skeleton structure of the humanoid robot of the first embodiment.
Figure 9:
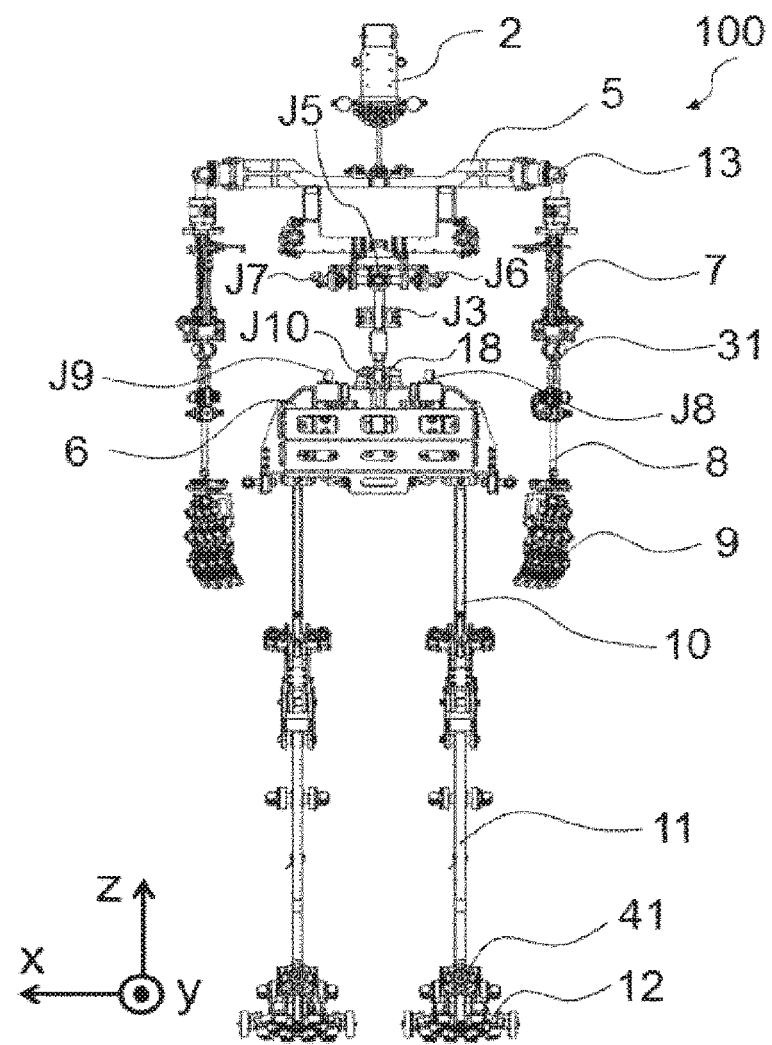
FIG. 9 is a rear view illustrating the skeleton structure of the humanoid robot of the first embodiment.
Figure 10:
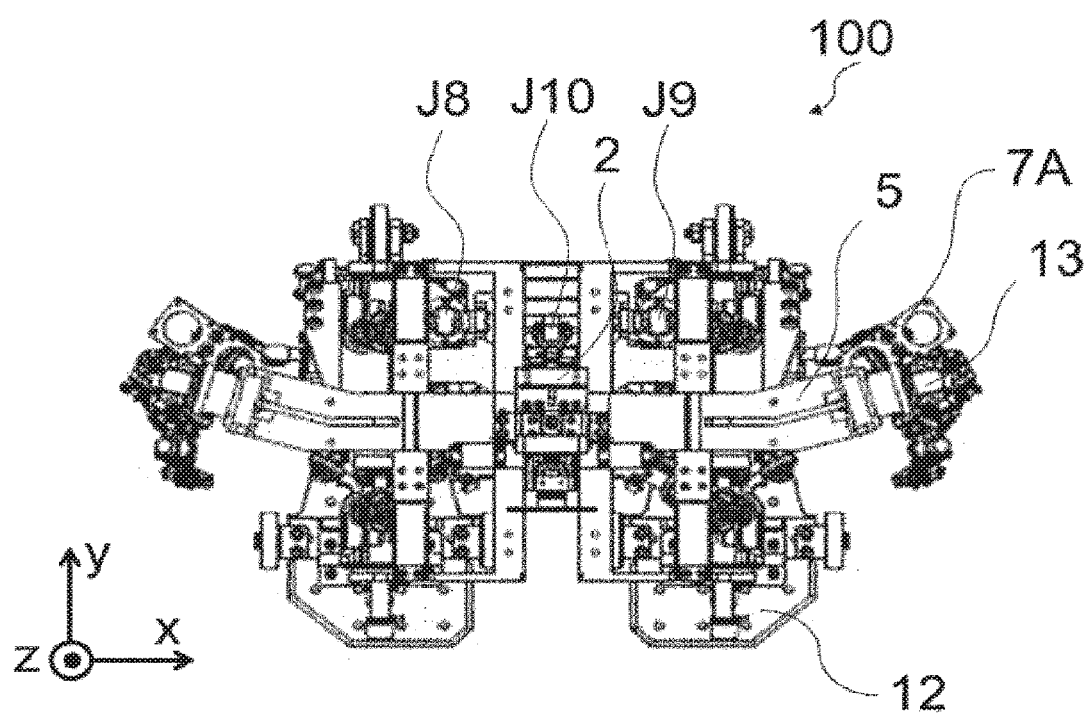
FIG. 10 is a plan view illustrating the skeleton structure of the humanoid robot of the first embodiment.

As illustrated in FIG. 5, portions near right and left ends of shoulder frame 51 are bent backward by an angle ξ1 with respect to the X-axis. Shoulder joint 13 connecting upper arm 7 rotatably to chest 5 with two rotational degrees of freedom is connected to each of two ends of shoulder frame 51. Shoulder joint 13 is a biaxial gimbal having two rotation axes orthogonal to each other. A biaxial gimbal of shoulder joint 13 has a shape, in which a member (referred to as a rotation member) that is rotated around a rotation axis Rx1 existing in a direction of shoulder frame 51 is sandwiched by a yoke provided in upper arm 7 such that an angle formed by upper arm 7 and the rotation member can be changed (rotatably). The yoke has members opposed to each other, and holes or protrusions for holding another member rotatably are provided in the yoke. A member, which is held in holes provided in the yoke and enable to rotate another member, is referred to as a shaft member. In the biaxial gimbal, the rotation axis of the rotation member and the shaft member are orthogonal to each other. In shoulder joint 13, two protrusions existing on a straight line orthogonal to the rotation axis of the rotation member are inserted in holes provided in the yoke. This enables the yoke to hold the rotation member rotatably. Shoulder joint 13 has the structure described above, so that upper arm 7 can be rotated around the rotation axis existing in the direction in which shoulder frame 51 extends. The angle formed by upper arm 7 and shoulder frame 51 can also be changed.

Thorax frame 52 is connected to the lower side of shoulder frame 51 at a place slightly closer to the center side than the places where portions near the right and left ends of shoulder frame 51 are bent backward. Thorax frame 52 has an L-shape viewing from the front-back direction, and has a shape like a rectangle without lower side in which both upper corners of the rectangle are cut viewing from the side. Thorax frame 52 extending downward in the front-back direction from shoulder frame 51 is bent into an L-shape and extends horizontally toward the center side. Portions extending horizontally at the front side and the rear side of thorax frame 52 are coupled together on the center side by thorax front-back coupling frame 53. Right and left thorax front-back coupling frames 53 are coupled together by chest center coupling frame 54.

A chest-side main link attaching unit J1 is provided at the L-shaped corner portion on the front side of thorax frame 52. An upper arm drive main link 14L (illustrated in FIG. 37), which is a variable length link of an upper arm drive main actuator 14 that moves upper arm 7, is attached rotatably to a chest-side main link attaching unit J1 with two rotational degrees of freedom. A chest-side auxiliary link attaching unit J2 is provided at the L-shaped corner portion on a rear side. Chest-side auxiliary link attaching unit J2 is a biaxial gimbal to which an upper arm drive auxiliary link 15L is attached rotatably with two rotational degrees of freedom. There exists a space where upper arm drive main actuator 14 and upper arm drive auxiliary actuator 15 can move freely between thorax frames 52 on the lower side of shoulder frame 51.

Chest-side main link attaching unit J1 has a structure in which a yoke provided on a rotation member sandwiches and holds a columnar protrusion (shaft member) provided on upper arm drive main link 14L rotatably. The rotation member is a member that is rotated around the rotation axis (Y-axis) perpendicular to thorax frames 52. The protrusions (shaft members) protrude vertically from both side surfaces opposite to each other in the rectangular tubular portion of upper arm drive main link 14L. Chest-side auxiliary link attaching unit J2 has the same structure. That is, chest-side main link attaching unit J1 and chest-side auxiliary link attaching unit J2 are biaxial gimbals each including the rotation member and the yoke provided on thorax frame 52. The rotation axis around which the rotation member of chest-side main link attaching unit J1 is rotated and the rotation axis around which the rotation member of chest-side auxiliary link attaching unit J2 is rotated exist on the same straight line.

Plate-shaped intrathoracic joint frame 55 parallel to a YZ-plane is connected to the lower side in the central of thorax front-back coupling frame 53. A mechanism that holds rotatably the intrathoracic rotation shaft 56T is provided in intrathoracic joint frame 55. Intrathoracic rotation shaft 56T is a horizontal cylindrical portion provided in an upper portion of backbone 56. Intrathoracic rotation shaft 56T is sandwiched rotatably between two intrathoracic joint frames 55 to form intrathoracic joint 16. Intrathoracic joint 16 connects chest upper portion 5U and chest lower portion 5D with one rotational degree of freedom at which chest upper portion 5U and chest lower portion 5D are rotatable in the front-back direction. A connection angle between chest upper portion 5U and chest lower portion 5D is determined by a length of an intrathoracic link 17L (illustrated in FIG. 22) in which one end is connected to chest upper portion 5U while the other end is connected to chest lower portion 5D. Intrathoracic actuator 17 is provided in the center on the front side of chest 5.

One end of intrathoracic link 17L is attached rotatably to backbone 56 through a lower intrathoracic link attaching unit J3. The yoke of lower intrathoracic link attaching unit J3 protrudes forward from backbone 56, and intrathoracic link 17L is sandwiched rotatably by the yoke. The other end of intrathoracic link 17L is attached rotatably to chest center coupling frame 54 through an upper intrathoracic link attaching unit J4. The yoke of upper intrathoracic link attaching unit J4 is provided in chest center coupling frame 54. A chest bending unit C1 is configured to include intrathoracic joint 16, intrathoracic actuator 17, upper intrathoracic link attaching unit J4, and lower intrathoracic link attaching unit J3.

As illustrated in FIGS. 22, 23, and 24, a thoracolumbar center actuator 19, a thoracolumbar right actuator 20, and a thoracolumbar left actuator 21 exist between chest 5 and waist 6. A thoracolumbar center link 19L connects a center point existing on the rear side in the lower portion of chest 5 and a center point existing on the rear side in thoracolumbar joint 18 of the waist 6. A thoracolumbar right link 20L connects a tight point existing on the front side in the lower portion of chest 5 and a right point existing on the rear side of waist 6. A thoracolumbar left link 21L connects a left point existing on the front side in the lower portion of chest 5 and a left point existing on the rear side of waist 6. Viewing from above, thoracolumbar right link 20L and thoracolumbar left link 21L exist so that they sandwich backbone 56. Thoracolumbar right link 20L and thoracolumbar left link 21L are directed from the front-side position in chest 5 to the rear-side position in waist 6.

In link attaching frame 57, a chest center link attaching unit J5 is provided in the center on the rear side, a chest right link attaching unit J6 is provided on the right of the front side, and a chest left link attaching unit J7 is provided on the left of the front side. Chest center link attaching unit J5, chest right link attaching unit J6, and chest left link attaching unit J7 are provided so that they are located at the same height as intrathoracic joint 16 in the reference state. One ends of thoracolumbar center link 19L, thoracolumbar right link 20L, and thoracolumbar left link 21L are attached rotatably to chest center link attaching unit J5, chest right link attaching unit J6, and chest left link attaching unit J7 with two rotational degrees of freedom, respectively.

Chest center link attaching unit J5 has the structure in which thoracolumbar center link 19L is sandwiched rotatably by the yoke, which protrudes from the link attaching frame 57 to the rear side and is rotated around the rotation axis parallel to the Y-axis. Chest right link attaching unit J6 has the structure in which thoracolumbar right link 20L is sandwiched rotatably by the yoke, which protrudes from link attaching frame 57 to the front oblique right and is rotated around the rotation axis. Chest left link attaching unit J7 has the structure in which thoracolumbar left link 21L is sandwiched rotatably by the yoke, which protrudes from link attaching frame 57 to the front oblique left and is rotated around the rotation axis.

Figure 25:
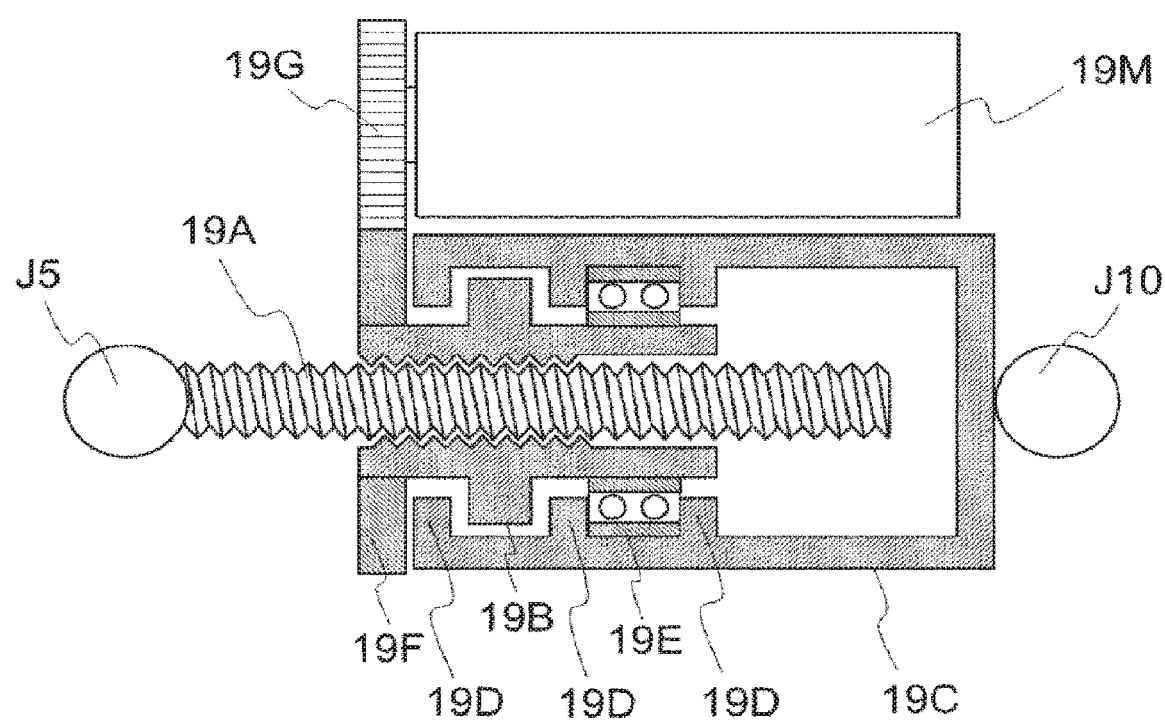
FIG. 25 is a cross-sectional view illustrating a structure of a variable length link included in an actuator used in the humanoid robot of the first embodiment.

The structure of the variable length link is described with thoracolumbar center link 19L being the variable length link included in thoracolumbar center actuator 19 as an example. FIG. 25 is a cross-sectional view illustrating the structure of the variable length link included in the actuator. FIG. 25 also illustrates a motor 19M not illustrated in cross-sectional view. A positional relationship between motor 19M and cylinder 19C is fixed. Thoracolumbar center link 19L includes a screw rod 19A, a nut 19B, a cylinder 19C, a nut position fixer 19D, a nut rotation holder 19E, and a nut gear 19F. Screw rod 19A is a rod having a circular shape in cross section, and male threads are provided on a side surface of screw rod 19A. Nut 19B is a female screw member including a through-hole in which female threads meshing with screw rod 19A is provided on the inner surface. Cylinder 19C accommodates a part of screw rod 19A and nut 19B therein. Nut position fixer 19D fixes the axial position of nut 19B with respect to cylinder 19C. Nut rotation holder 19E holds rotatably nut 19B with respect to cylinder 19C. Nut gear 19F is a gear that is rotated together with nut 19B.

Nut position fixer 19D is protrusions circumferentially provided in cylinder 19C to prevent nut 19B from moving. The protrusions being nut position fixer 19D are provided so that they sandwich the circumferentially-provided protrusion included in nut 19B. Nut position fixer 19D is provided at three places. The three places are the connecting portion between nut gear 19F and nut 19B and both sides of nut rotation holder 19E. Any nut position fixer 19D may be used as long as nut position fixer 19D fixes the relative position in the axial direction of nut 19B with respect to cylinder 19C. The axial direction of screw rod 19A is also the length direction of cylinder 19C.

Nut gear 19F is disposed outside cylinder 19C. Nut gear 19F meshes with a drive gear 19G provided on the rotation shaft of motor 19M. Nut gear 19F and nut 19B are rotated when drive gear 19G is rotated. Nut 19B is moved with respect to screw rod 19A when nut 19B is rotated. Because the position of nut 19B is fixed with respect to the length direction of cylinder 19C, screw rod 19A is moved with respect to nut 19B and cylinder 19C when nut 19B is rotated. Screw rod 19A is moved by force generated by motor 19M.

One end of screw rod 19A is attached rotatably to link attaching frame 57 through chest center link attaching unit J5. One end of cylinder 19C is attached rotatably to a waist main frame 61 through a waist center link attaching unit J10. A distance between chest center link attaching unit J5 and waist center link attaching unit J10 increases when screw rod 19A is moved in the direction protruding from cylinder 19C. The distance between chest center link attaching unit J5 and waist center link attaching unit J10 is shorten when screw rod 19A is moved in the direction entering into cylinder 19C. In this way, the length of thoracolumbar center link 19L can be changed, and the distance between two points being attached with both ends of thoracolumbar center link 19L can be changed.

The end of thoracolumbar center link 19L on the side where screw rod 19A exists may be attached to waist 6 instead of chest 5. In this case, cylinder 19C is attached to chest 5. One end of screw rod 19A in which the male threads are provided is attached to one of the link attaching units on both sides of thoracolumbar center link 19L. One end of cylinder 19C is attached to the link attaching unit not being attached with screw rod 19A among the link attaching units at both ends of thoracolumbar center link 19L.

Nut 19B includes a through-hole in which female threads meshing with male threads provided on screw rod 19A is provided on an inner surface. Nut 19B is rotated by transmitting the force from motor 19M. Nut 19B is referred to as a perforated member because nut 19B has a through-hole. Cylinder 19C is a tube that accommodates screw rod 19A and nut 19B. Nut position fixer 19D is a perforated member position fixer that fixes a position of nut 19B with respect to cylinder 19C in the axial direction of screw rod 19A. Nut rotation holder 19E is a perforated member holder, which is provided between nut 19B and cylinder 19C and holds nut 19B rotatably with respect to cylinder 19C. Because thoracolumbar center link 19L includes the perforated member holder, thoracolumbar center link 19L being a variable length link has one rotational degree of freedom, that is, thoracolumbar center link 19L can be rotated around the axis. The rotation around the axis means that both ends of the link differ from each other in the rotation angle around the axis. The variable length link has one rotational degree of freedom, so that the link attaching units being attached with both ends of the variable length link may have two rotational degrees of freedom. In the case that the variable length link does not have one rotational degree of freedom, the link attaching unit being attached with either end of the variable length link has three rotational degrees of freedom. Here, the case where the variable length link has one rotational degree of freedom around the axis and includes both ends attached to the link attaching units with two rotational degrees of freedom, and the case where one end of the variable length link is attached to the link attaching unit with three rotational degrees of freedom and the other end is attached to the link attaching unit with two rotational degrees of freedom are defined as the variable length link having five rotational degrees of freedom.

The variable length links included in thoracolumbar right link 20L, thoracolumbar left link 21L, and other actuators also have the same structure.

A screw, such as a ball screw and a bench screw, which has a small friction coefficient while rotating, is used as a screw between the screw rod and the nut. When a screw pitch is the same, the force necessary to change the length of the variable length link is decreased with decreasing friction coefficient. For this reason, the maximum output of the motor may be smaller than that of the case that the friction coefficient is large. Power consumption required for operation of the actuator is also decreased. Frictional force in a still state is set to such magnitude that the nut is not rotated when the motor does not generate drive force. This enables the angle before interruption of electric power supply to be maintained at each joint of the humanoid robot can be maintained when the electric power supply is interrupted. When the humanoid robot is in a still state, its posture can be maintained. When the humanoid robot holds an object, the state in which the humanoid robot holds the object can be maintained.

It is assumed that the magnitude of the frictional force is set such the magnitude that the angle of each joint can be changed by the force of one or a plurality of persons when the electric power supply is interrupted. In a disaster in which the electric power supply is interrupted, there is a possibility that the humanoid robot may interfere with rescue of injured person. When the posture of the humanoid robot can be changed, for example, the humanoid robot can be changed to the posture so as not to interfere with the rescue, or the humanoid robot can be moved. Whether the nut is rotated by the force trying to change the length of the variable length link depends on not only the friction coefficient of the screw but also the pitch. When the friction coefficient is the same, the minimum value of the force with which the nut is rotated can be increased when the pitch is decreased. A screw pitch and a friction coefficient are determined such that the minimum value of the force that can change the length of the variable length link by rotating the nut becomes a proper value.

The tube accommodating the screw rod and the nut may be a square tube, or have a side surface in which a flat surface and a curved surface are combined with each other. A diameter of the tube may be changed in a length direction. The variable length link may have any structure as long as one end of the screw rod is attached to the link attaching unit with at least two rotational degrees of freedom and the other end on the side where the tube or motor exists is attached to the link attaching unit with at least two rotational degrees of freedom. The end on the tube or motor side may be attached to the link attaching unit with an attachment interposed therebetween. A portion that is not the end of the tube may be attached to the link attaching unit. In this case, the variable length link is up to the place of the tube attached to the link attaching unit, and one end of the variable length link is attached to the link attaching unit.

Waist 6 includes a waist main frame 61 in which thoracolumbar joint 18 is provided, a lower limb connecting frame 62 to which lower limb 4 is connected, and a waist cover 63 covering a lower portion on the rear side of waist main frame 61. Lower limb connecting frame 62 is provided on each of the right and left. In a space between waist cover 63 and waist main frame 61, a power supply device is disposed, and wiring and the like are routed.

When viewed from above, waist main frame 61 has a shape in which a rectangle and a circle are combined such that a part of the circle overlaps with the front side of the rectangle. Waist main frame 61 includes two thick plate-shaped portions protruding rearward from the rectangular portion at symmetrical positions on the rear side. When viewed from above, the circular portion is a cylinder in which thoracolumbar joint 18 exists. Thoracolumbar joint 18 includes a spherical bearing that holds a spherical surface provided at one end of backbone 56 with three rotational degrees of freedom. As illustrated in FIG. 12, waist right link attaching unit J8 and waist left link attaching unit J9, to which the other ends of thoracolumbar right link 20L and thoracolumbar left link 21L are attached rotatably with two rotational degrees of freedom, respectively, are provided on the upper side of the two thick plate-shaped portions protruding rearward. Waist center link attaching unit J10 to which thoracolumbar center link 19L is attached rotatably with two rotational degrees of freedom is provided in the center on the rear side in the upper portion of waist main frame 61.

Each of waist right link attaching unit J8, waist left link attaching unit J9, and waist center link attaching unit J10 is a biaxial gimbal. A yoke including a through-hole is provided rotatably and facing upward, in waist right link attaching unit J8 and waist left link attaching unit J9. The shaft member provided on the variable length link is inserted into the through-hole. In waist center link attaching unit J10, the yoke having the through-hole is provided rotatably so that it is directed toward the rear side.

Figure 26:
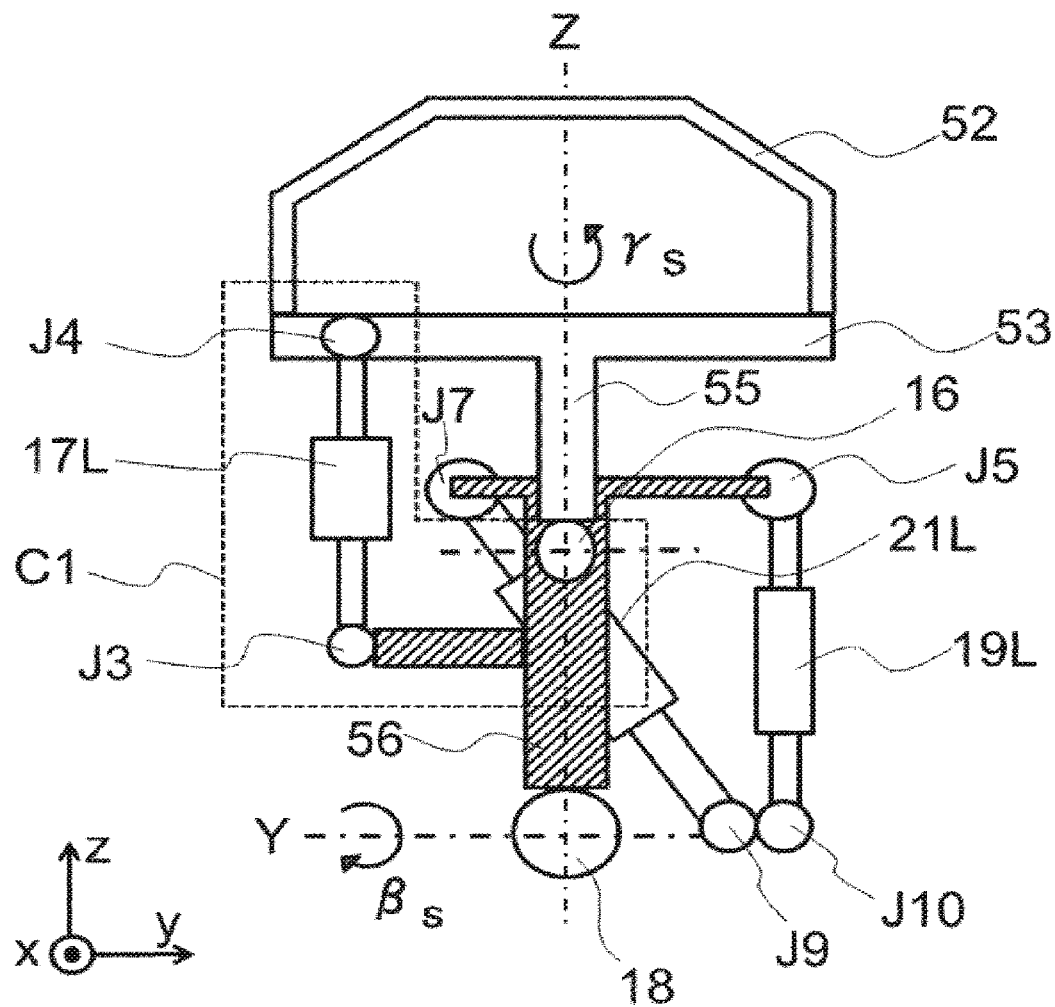
FIG. 26 is a schematic diagram illustrating a division between the chest upper portion and a chest lower portion and arrangement of the variable length links that drive a chest in the humanoid robot of the first embodiment viewing from a side.
Figure 27:
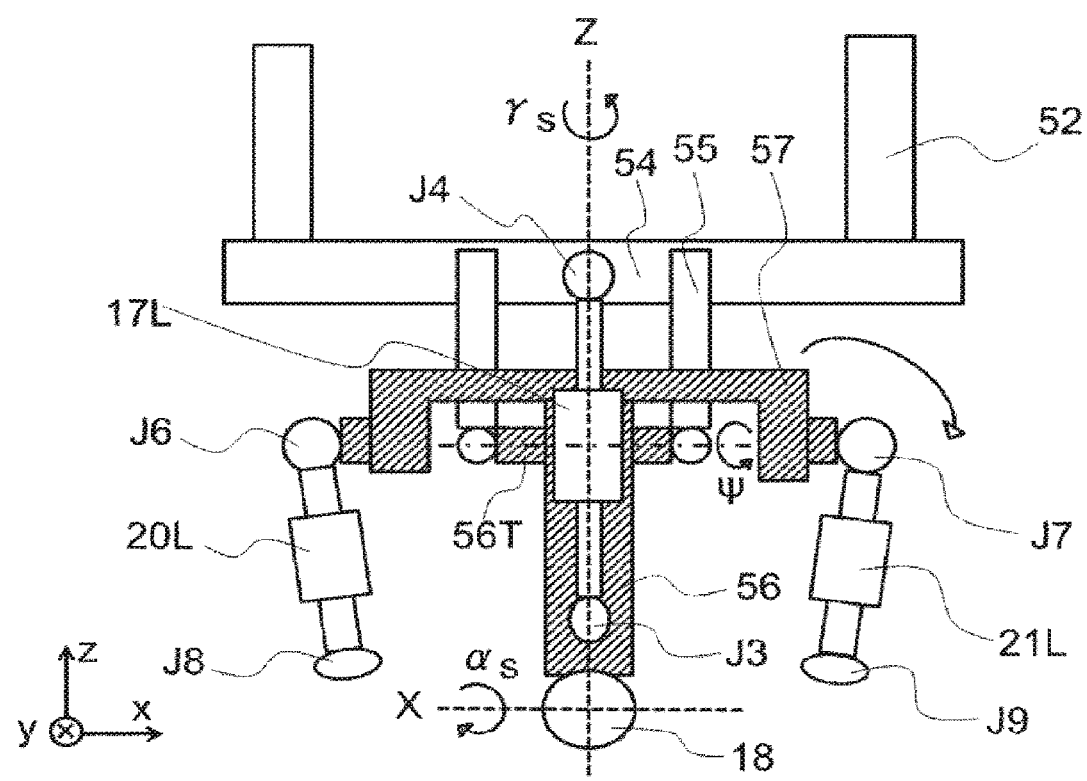
FIG. 27 is a schematic diagram illustrating the division between the chest upper portion and the chest lower portion and the arrangement of the variable length links that drive the chest in the humanoid robot of the first embodiment viewing from a front.

FIG. 26 is a schematic diagram illustrating a division between chest upper portion 5U and chest lower portion 5D and arrangement of the variable length links that drive chest 5. In FIG. 26, for the purpose of easy understanding of the link arrangement, intrathoracic link 17L is illustrated on the front side than an actual position. FIG. 27 is a schematic view illustrating the division and the arrangement viewing from the front. Chest lower portion 5D is illustrated with hatching. Chest lower portion 5D can be rotated around thoracolumbar joint 18 around the X-axis, the Y-axis, and the Z-axis by three variable length links. Chest upper portion 5U can be rotated around the X-axis by one variable length link with respect to chest lower portion 5D.

A body bending unit C2 is a three-rotational-degree-of-freedom connection mechanism that connects chest 5 rotatably to waist 6 with three rotational degrees of freedom. Body bending unit C2 includes thoracolumbar joint 18, thoracolumbar center actuator 19, thoracolumbar right actuator 20, thoracolumbar left actuator 21, chest center link attaching unit J5, chest right link attaching unit J6, chest left link attaching unit J7, waist center link attaching unit J10, waist right link attaching unit J8, and waist left link attaching unit J9. The three rotational degrees of freedom means that the rotation can be performed with a total of three degrees of freedom including one degree of freedom by tilting chest 5 to the front-back direction (the rotation around the X-axis) with respect to waist 6, one degree of freedom by tilting chest 5 in the right and left direction (the rotation around the Y-axis), and one degree of freedom by turning chest 5 around backbone 56 (Z-axis) with respect to waist 6.

The three-rotational-degree-of-freedom connection mechanism according to the present disclosure has a simple structure including a three-rotational-degree-of-freedom joint and three actuators. When considered more broadly, the three-rotational-degree-of-freedom connection mechanism is a rotation connecting mechanism that connects a second member rotatably to a first member. The rotation connecting mechanisms in which the joint has three rotational degrees of freedom is the three-rotational-degree-of-freedom connection mechanism.

When body bending unit C2 is generally considered as the three-rotational-degree-of-freedom connection mechanism, body bending unit C2 connects chest 5 being the second member on the connecting side rotatably to waist 6 being the first member on the connected side with three rotational degrees of freedom. Thoracolumbar joint 18 is a joint part that connects chest 5 rotatably to waist 6 with three rotational degrees of freedom. Backbone 56 is a torsion axis in which the direction is fixed with respect to chest 5. Chest 5 is rotatable around backbone 56 with respect to waist 6. In the three-rotational-degree-of-freedom connection mechanism, a member provided on the side closer to waist 6 is defined as the first member. A member provided on the side far from waist 6 is defined as the second member. Thoracolumbar joint 18 allows chest 5 being the second member to be rotated around the torsion axis with respect to the waist 6 being the first member, and connects the second member rotatably to the first member with three rotational degrees of freedom.

Thoracolumbar center actuator 19, thoracolumbar right actuator 20, and thoracolumbar left actuator 21 are three actuators each including the variable length link having the variable length and the motor that generates force changing the length of the variable length link. Waist center link attaching unit J10, waist right link attaching unit J8, and waist left link attaching unit J9 are three first-member-side link attaching units provided in waist 6 (first member). One end of each of the three actuators is attached rotatably to each of the three first-member-side link attaching units with at least two rotational degrees of freedom. The positional relationships among waist center link attaching unit J10, waist right link attaching unit J8, and waist left link attaching unit J9 are fixed with respect to thoracolumbar joint 18. Chest center link attaching unit J5, chest right link attaching unit J6, and chest left link attaching unit J7 are three second-member-side link attaching units provided in chest 5 (second member). The other end of each of the three actuators is attached rotatably to each of the three second-member-side link attaching units with at least two rotational degrees of freedom. The positional relationships among chest center link attaching unit J5, chest right link attaching unit J6, and chest left link attaching unit J7 are fixed with respect to thoracolumbar joint 18.

In the reference state in which humanoid robot 100 stands upright, in body bending unit C2, the torsion axis (the backbone, the Z-axis) and other two rotation axes (the X-axis and the Y-axis) in three rotatable axes can be rotated in both directions. Chest center link attaching unit J5, chest right link attaching unit J6, chest left link attaching unit J7, waist center link attaching unit J10, waist right link attaching unit J8, and waist left link attaching unit J9 are arranged such that the maximum value of three angles formed by three links and the torsion axis is greater than or equal to an angle δ0 (for example, about 3 degrees).

In all three-rotational-degree-of-freedom connection mechanisms included in humanoid robot 100, at least one axis of the torsion axis and the other two rotation axes is determined to be rotatable in both directions in the reference state. That is, in the reference state of each three-rotational-degree-of-freedom connection mechanism, rotation can be performed in both directions on at least two rotation axes including the torsion axis.

In body bending unit C2, for example, the upper half body above thoracolumbar joint 18 can be tilted forward by about 20 degrees, tilted backward by about 20 degrees, and tilted in the right and left direction by about 20 degrees. Chest 5 can be rotated (twisted) with respect to waist 6 around backbone 56 by about 20 degrees in both directions. For example, chest upper portion 5U can be tilted forward by about 15 degrees with respect to chest lower portion 5D, and tilted backward by about 20 degrees with respect to chest lower portion 5D by the intrathoracic joint 16. For this reason, for example, when chest lower portion 5D is tilted in the front-back direction, chest upper portion 5U can be kept vertical. The posture that makes both hands easy to work can be taken. The movable range is an example, and the movable range can be widened or narrowed.

Figure 28:
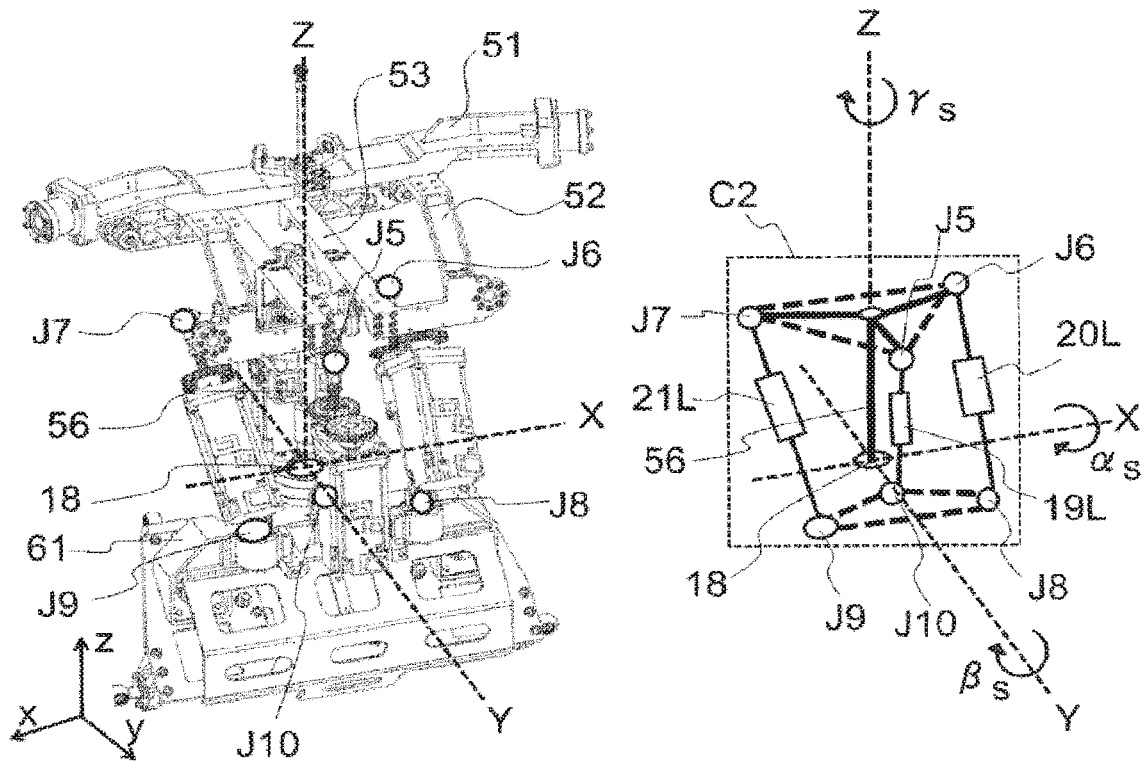
FIG. 28 is a perspective view illustrating the arrangement of the variable length links in a body bending unit included in the humanoid robot of the first embodiment viewing from the oblique rear on the left hand side.

FIG. 28 is a perspective view illustrating the arrangement of the variable length links in body bending unit C2 in the reference state in which humanoid robot 100 stands upright viewing from the oblique rear on the left hand side. Body bending unit C2 includes three variable length links 19L, 20L, 21L, which connect three second-member-side link attaching units J5, J6, J7 provided in chest lower portion 5D to three first-member-side link attaching unit J10, J8, J9 provided in waist 6, respectively. The positions of three second-member-side link attaching units J5, J6, J7 provided in chest lower portion 5D are fixed with respect to thoracolumbar joint 18. The positions of three first-member-side link attaching units J10, J8, J9 provided in waist 6 are fixed with respect to thoracolumbar joint 18. A connection angle of chest lower portion 5D with respect to waist 6 can be changed with three rotational degrees of freedom by changing the lengths of three variable length links 19L, 20L, 21L. It is assumed that as is the rotation angle around the X-axis of thoracolumbar joint 18, that βs is the rotation angle around the Y-axis, and that γs is the rotation angle around the Z-axis. Chest upper portion 5U can be rotated around the X-axis with respect to the chest lower portion 5D by intrathoracic joint 16. It is assumed that ψ is the rotation angle around the X axis at intrathoracic joint 16.

A range of the direction, in which the torsion axis is directed and is changed by the rotation of the joint such as thoracolumbar joint 18, is referred to as a movable range of the joint. The example illustrated above as the angle range rotatable around the front-back direction and the right and left direction of thoracolumbar joint 18 and backbone 56 indicates the maximum angle range that can be taken on the rotation axis. The angle range that can be taken by a rotation axis is influenced by the angle taken by another rotation axis. For this reason, all the regions obtained by arbitrarily combining the angular ranges of the rotation axes do not become the movable range. The same holds true for other joints.

Figure 29:
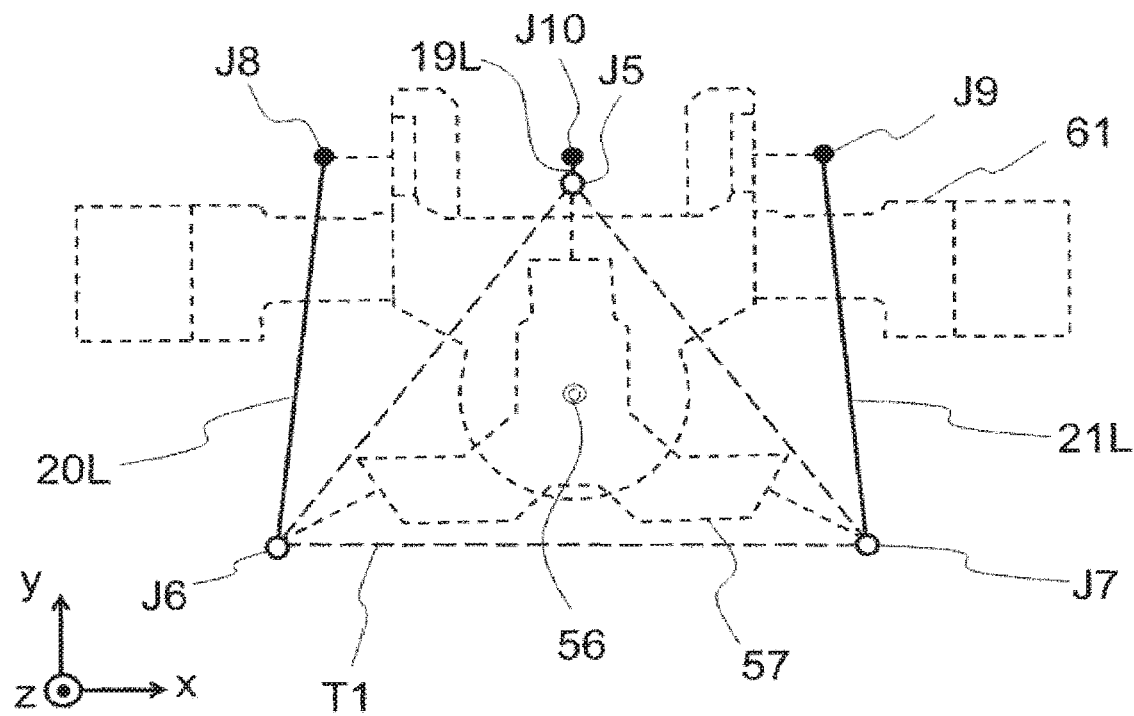
FIG. 29 is a view illustrating the arrangement of the variable length links in a reference state of the body bending unit included in the humanoid robot of the first embodiment viewing from the direction in which a backbone extends.

FIG. 29 is a view illustrating the arrangement of the variable length links in body bending unit C2 viewing from the direction in which the backbone extends. In FIG. 29, backbone 56 being the torsion axis is represented by a double circle. Chest center link attaching unit J5, chest right link attaching unit J6, and chest left link attaching unit J7, being the second-member-side link attaching unit, are represented by a white circle. Waist center link attaching unit J10, waist right link attaching unit J8, and waist left link attaching unit J9, being the first-member-side link attaching unit, are represented by a black circle. Thoracolumbar center link 19L, thoracolumbar right link 20L, and thoracolumbar left link 21L, being the variable length links, are represented by a bold line. The similar expression is made in other similar drawings. A triangle formed by connecting three second-member-side link attaching units is referred to as a second-member-side triangle T1.

The following facts can be understood from FIGS. 28 and 29. Variable length links 20L, 21L are long, are located at a twisted position with respect to torsion axis 56, and are largely inclined with respect to the horizontal plane. Viewing from the direction of torsion axis 56, variable length links 20L, 21L are substantially parallel to each other such that torsion axis 56 is sandwiched therebetween. The rotation direction around torsion axis 56 for shortening the variable length link 20L and the rotation direction around torsion axis 56 for shortening the variable length link 21L are opposite to each other. For this reason, when second member 6 is rotated, one of variable length links 20L, 21L is lengthened, and the other is shortened. Consequently, in the rotation around torsion axis 56, both the force pushed by the extending link and the force drawn by the shortening link are generated, the rotation is performed around torsion axis 56 easily. In body bending unit C2, in each state within the movable range, the rotation around the torsion axis causes both of lengthening and shortening of the variable length links.

Torsion axis 56 represented by a double circle is located inside of second-member-side triangle T1, and exists on a bisector of a base side of second-member-side triangle T1. The bisector of the base side of the second-member-side triangle is referred to as a symmetrical axis line, and the base side is referred to as a symmetrical axis perpendicular line. When variable length links 20L, 21L are similarly expanded while variable length link 19L is contracted, the tilt of second member 6 can be changed in the direction of the symmetrical axis line. When variable length links 20L, 21L are similarly contracted while variable length link 19L is expanded, the tilt of second member 6 can be changed to the opposite direction in the direction of the symmetrical axis line. While the length of variable length link 19L is kept unchanged, when variable length link 20L is lengthened, and variable length link 21L is shortened, or when variable length link 20L is shortened, and variable length link 21L is lengthened, the tilt of second member 6 can be changed in the direction of the symmetrical axis perpendicular line.

Figure 30:
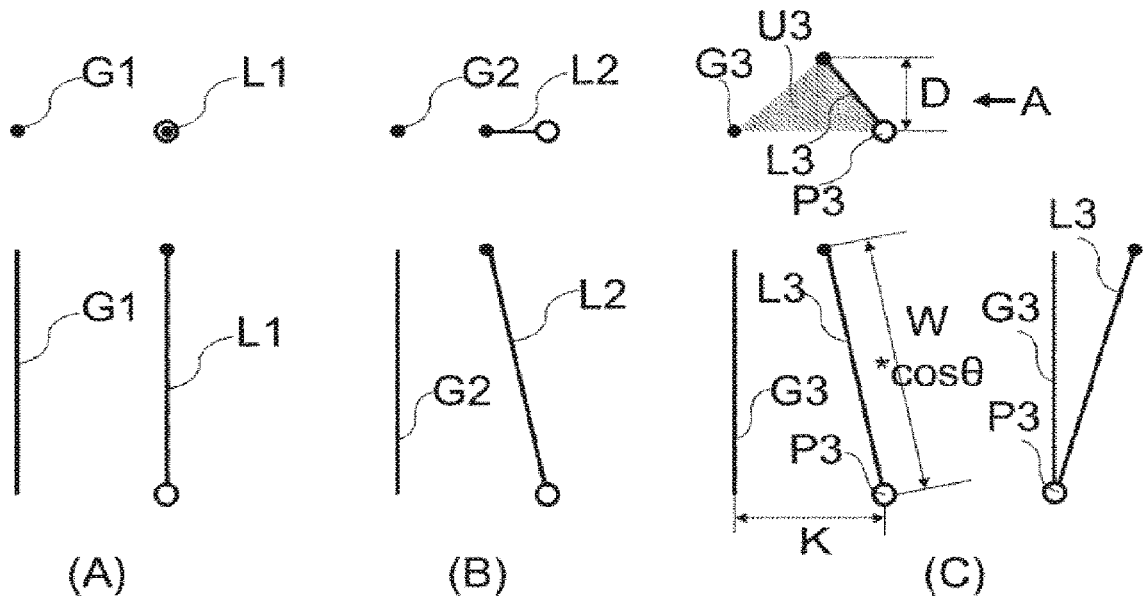
FIG. 30 is a view illustrating whether a torque rotating around a torsion axis is generated by expansion and contraction of the variable length link depending on a positional relationship between the torsion axis and the variable length link in the three-rotational-degree-of-freedom connection mechanism included in the humanoid robot of the first embodiment.

It is examined about the condition on the arrangement of the links that allows the second member to be rotated around the torsion axis by the expansion and contraction of the variable length link. FIG. 30 is a view illustrating whether a torque rotating around the torsion axis is generated by the expansion and contraction of the variable length link depending on the positional relationship between the torsion axis and the variable length link. In FIG. 30, it is assumed that the lower end (indicated by the white circle) of variable length link L3 has the fixed positional relationship with the torsion axis. FIG. 30(*a*) illustrates the case that a torsion axis G1 and variable length link L1 are parallel with each other. FIG. 30(*b*) illustrates the case that a torsion axis G2 and variable length link L2 are located on the same plane and are not parallel with each other. FIG. 30(*c*) illustrates the case that a torsion axis G3 and variable length link L3 have a twisted relationship. In each of FIGS. 30(*a*) to 30(*c*), the view viewed from the direction of the torsion axis is illustrated on the upper side, and the view viewed from the direction perpendicular to the torsion axis is illustrated on the lower side. FIG. 30(*c*) also illustrates the view viewed from the direction being perpendicular to the torsion axis and being able to view a lower end P3 of variable length link L3 on torsion axis G3 (illustrated by an arrow A).

In the case that torsion axis G1 and variable length link L1 are parallel with each other, as illustrated in FIG. 30(*a*), torsion axis G1 and variable length link L1 are points viewing from the direction of torsion axis G1. Thus, a component of the force in the direction perpendicular to torsion axis G1 and the torque rotating around torsion axis G1 are not generated by the expansion and contraction of variable length link L1. In the case that torsion axis G2 and variable length link L2 are located on the same plane and are not parallel with each other, as illustrated in FIG. 30(*b*), variable length link L2 is directed in the direction of torsion axis G2. For this reason, although the component of the force applying in the direction perpendicular to torsion axis G2 is generated by the expansion and contraction of variable length link L2, the torque rotating around torsion axis G1 is zero because the component is directed in the direction of torsion axis G2. In the case that torsion axis G3 and variable length link L3 have the twisted relationship, as illustrated in FIG. 30(*c*), the torque around torsion axis G3 is generated in proportion to an area of a triangle U3 by the expansion and contraction of variable length link L3.

Because a distance K between one end P3 of variable length link L3 and torsion axis G3 is fixed, the torque is determined by a distance D between the other end Q3 of variable length link L3 and a plane (referred to as a link reference plane) determined by torsion axis G3 and one end P3. A ratio (D/W) of distance D to a length (represented by W) of the variable length link L3 represents a change amount of distance D in the case that the length of variable length link L3 is changed by a unit amount. Assuming that θ is an angle (referred to as the tilt angle) formed by the link reference plane and variable length link L3, the following equation holds.

$$\sin \theta = D/W$$

In FIGS. 30(*a*) and 30(*b*), the tilt angle θ is determined to be θ=0. In order to generate the necessary torque around the torsion axis by the expansion and contraction of the variable length link, tilt angle θ is required to be greater than or equal to a predetermined angle δ0 (for example, about 3 degrees). Here, the case of one variable length link is examined. However, in the case of at least two variable length links, the maximum value among the tilt angles of the variable length links may be greater than or equal to δ0. The link reference plane is a plane that is determined in each variable length link. Specifically, when the direction of the torsion axis is fixed with respect to the first member, the link reference plane is a plane including the torsion axis and the first-member-side link attaching unit of the variable length link. When the direction of the torsion axis is fixed with respect to the second member, the link reference plane is a plane including the torsion axis and the second-member-side link attaching unit of the variable length link.

In the case of tilt angle θ, a torque TA by the variable length link L3 is given as follows.

$$TA \propto K^*W^*\sin \theta = K^*D = 2^*\text{area of triangle } U3$$

The torque required to rotate the second member around the torsion axis also relates to inertia moment of the second member. The threshold value δ0 with respect to tilt angle θ may be set to the same value in all three-rotational-degree-of-freedom connection mechanisms, or set in each three-rotational-degree-of-freedom connection mechanism. In determining tilt angle θ, the change amount of the length of the variable length link may be not the unit amount but a change amount in consideration of a width of the variable range of the length of the variable length link.

In the reference state, variable length link 19L and torsion axis 56 are located on the same plane, and a tilt angle θs1 formed by variable length link 19L and the link reference plane is 0 degree. Variable length link 20L and variable length link 21L have the twisted relationship with torsion axis 56. Tilt angles θs2 and θs3 of variable length link 20L and variable length link 21L are about 41 degrees. A maximum value θsmax of the tilt angles between three variable length links 19L, 20L, 21L and the link reference plane is greater than or equal to δ0. Thus, the torque around torsion axis 56 can be generated when any one of variable length links 20L, 21L expands or contracts.

Because tilt angles θs2 and θs3 are about 41 degrees, at least one of tilt angles θs2 and θs3 is greater than or equal to δ0 when chest 5 is tilted largely. That is, in each state within the movable range of thoracolumbar joint 18, at least one of three variable length links 19L, 20L, 21L has a twisted relationship with torsion axis 56. Furthermore, the tilt angle formed by the link reference plane and variable length link 20L is greater than or equal to δ0. Because the direction of torsion axis 56 is fixed to second member 5, the link reference plane is a plane including chest right link attaching unit J6 or chest left link attaching unit J7, which is the second-member-side link attaching unit, and torsion axis 56.

Figure 31:
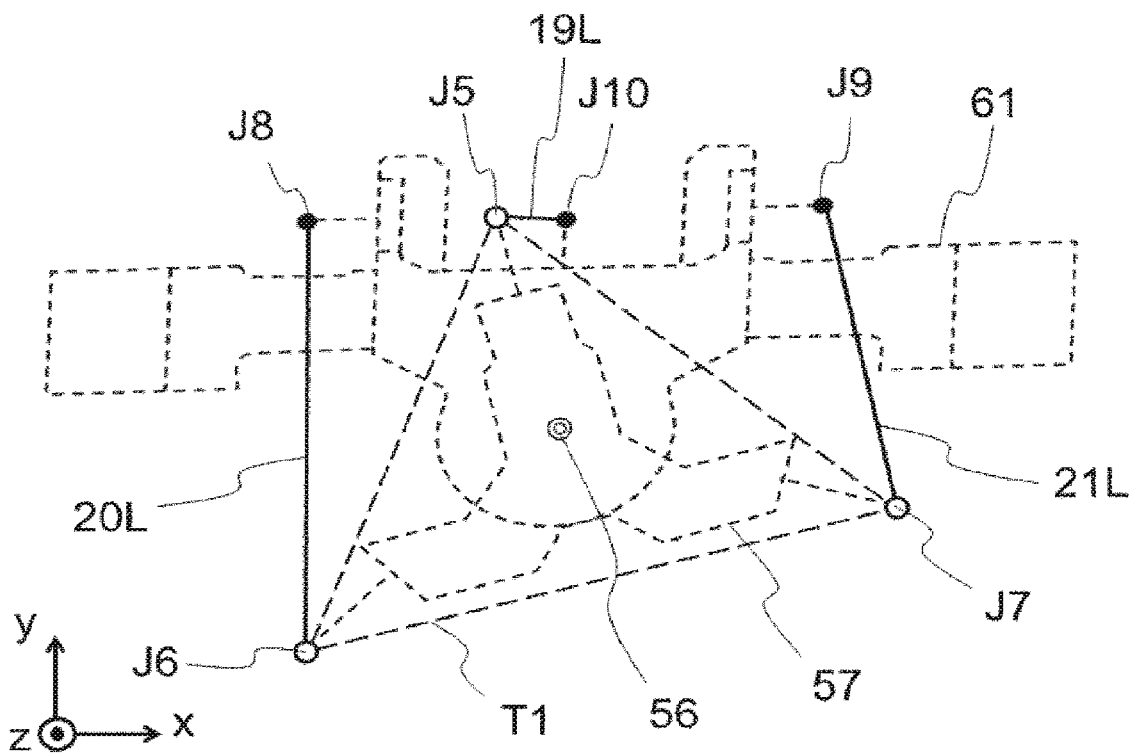
FIG. 31 is a view illustrating the arrangement of the variable length link when the chest of the body bending unit included in the humanoid robot of the first embodiment is rotated and tilted forward viewing from the direction in which the backbone extends.

FIG. 31 is a view illustrating the arrangement of the variable length links in body bending unit C2 when chest 5 is rotated and tilted forward viewing from the direction in which the backbone extends. In FIG. 31, chest 5 (second member) is twisted to the left by 15 degrees, and tilted forward by 30 degrees in the direction of 15 degrees to the left. Because the direction of torsion axis 56 is fixed with respect to chest 5, when torsion axis 56 is tilted, waist 6 (first member) is viewed to be expanded or contracted in the direction in which waist 6 is tilted when viewed from the direction of torsion axis 56 depending on the tilted angle. In FIG. 31, waist 6 is contracted to cos(30 degrees)=about 0.87 times. Because of the rotation around torsion axis 56, variable length link 20L is lengthened and variable length link 21L is shortened. In the case other than the rotation around torsion axis 56, the following result is obtained. In the case that torsion axis 56 is tilted forward, both tilt angles θs2, θs3 of variable length links 20L, 21L are decreased. In the case that torsion axis 56 is tilted to the right, tilt angle θs2 of variable length link 20L is increased and tilt angle θs3 of variable length link 21L is decreased. In body bending unit C2, maximum value θsmax of the tilt angle is greater than or equal to about 30 degrees even if body bending unit C2 is tilted in what way within the movable range. In the case that the movable range of the joint is determined such that rotation around the torsion axis is not required in the vicinity of the boundary within the movable range, maximum value θsmax of the tilt angle may not be greater than or equal to determined angle δ0 in the vicinity of the boundary within the movable range.

The description is returned to the structure of waist 6. Lower limb connecting frame 62 has a substantially rectangular plate member. Lower limb connecting frame 62 is fixed to the right and left in the lower portion of waist main frame 61 such that the front side of lower limb connecting frame 62 is higher than the rear side. A protrusion 64 protrudes inside (the side closer to the center of the body) perpendicularly from lower limb connecting frame 62. At a tip of protrusion 64, a hip joint 22 is provided to connect thigh 10 to waist 6 outward and obliquely upward. Hip joint 22 includes a spherical bearing in which a spherical surface provided on waist 6 is surrounded by a recess provided on thigh 10. Hip joint 22 includes a spherical member and a spherical receiving member provided at the end of thigh 10 that holds the spherical surface of the spherical member rotatably with three rotational degrees of freedom. The spherical member includes a spherical surface protruding obliquely outward and upward from protrusion 64 that is a part of waist 6. Consequently, the movable range of thigh 10 can be widened.

Protrusion 65 protrudes from the front side of lower limb connecting frame 62, and a crotch front link attaching unit J11 is provided on the front side at the tip of protrusion 65. A thigh front link 23L (illustrated in FIG. 57) that rotates hip joint 22 is attached to crotch front link attaching unit J11. Protrusion 65 is bent, and has the surface of the portion on which crotch front link attaching unit J11 is provided and that is substantially vertical in the reference state. In crotch front link attaching unit J11, the rotation member and the cylinder rotated by the rotation member are provided on protrusion 65, and the yoke and the shaft member are provided at one end of thigh front link 23L. Crotch front link attaching unit J11 is a biaxial gimbal having a structure in which the shaft member provided rotatably at one end of thigh front link 23L is inserted into the cylinder provided on protrusion 65.

Protrusion 66 protrudes from the vicinity of the corner on the rear side outside lower limb connecting frame 62, and a crotch outside link attaching unit J12 is provided on an outside surface of the tip of protrusion 66. A thigh outside link 24L is attached to crotch outside link attaching unit J12. Protrusion 67 protrudes vertically from the vicinity of the corner existing on the rear side and inside of lower limb connecting frame 62, and a crotch inside link attaching unit J13 is provided on an inside surface of the tip of protrusion 67. A thigh inside link 25L is attached to crotch inside link attaching unit J13. Protrusion 67 is bent, and crotch inside link attaching unit J13 is provided obliquely below on the inside. Crotch outside link attaching unit J12 and crotch inside link attaching unit J13 are a biaxial gimbal having the same structure as that of crotch front link attaching unit J11.

Figure 32:
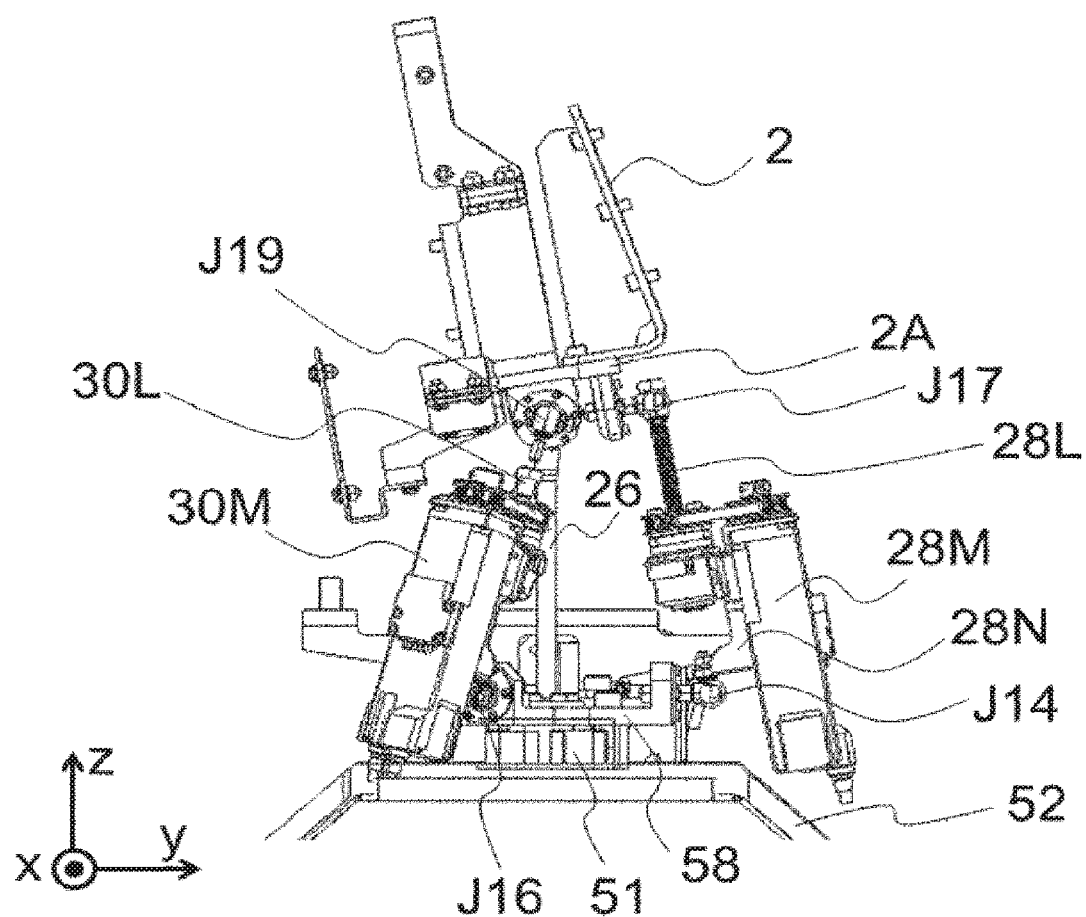
FIG. 32 is an enlarged side view illustrating a head of the humanoid robot of the first embodiment.
Figure 33:
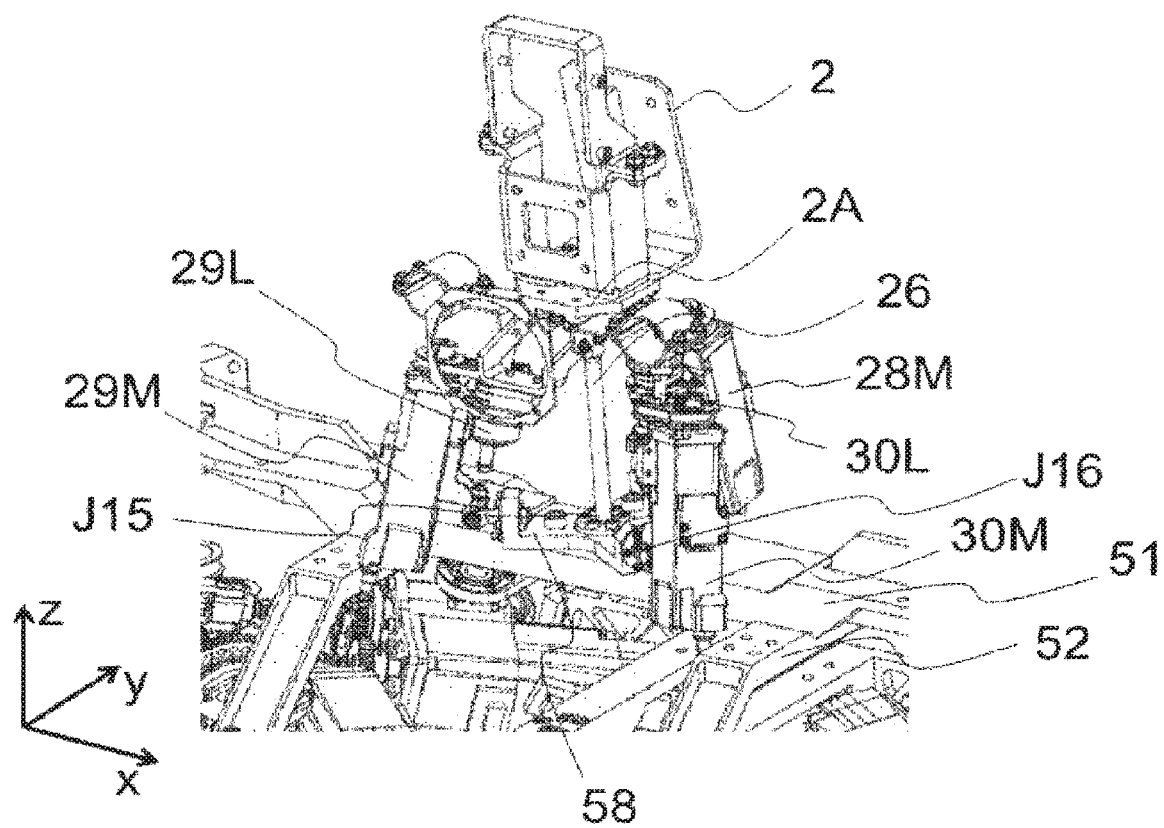
FIG. 33 is an enlarged perspective view illustrating the head of the humanoid robot of the first embodiment.

Referring to FIGS. 5, 10, 12, 13, 32, and 33, the structure of head 2 is described. FIG. 32 is an enlarged side view of head 2. FIG. 33 is an enlarged perspective view of head 2. A neck center rod 26 extends upward from the center of the upper surface of shoulder frame 51. Head 2 is connected to a neck joint 27 provided at the tip of neck center rod 26. A spherical bearing in which a spherical surface is provided at the tip of neck center rod 26 is used in neck joint 27. Neck joint 27 connects head 2 and chest 5 rotatably with three rotational degrees of freedom. Head 2 includes an octagonal plate-shaped head base plate 2A in which four corners of a square are cut. A device that implements functions such as an eye, an ear, and a mouth is attached to head base plate 2A.

Head 2 can be rotated around neck joint 27 with three rotational degrees of freedom by a neck rear actuator 28, a neck right-side actuator 29, and a neck left-side actuator 30. That is, head 2 can be tilted by, for example, about 20 degrees in the front-back direction and the right and left direction. Head 2 can be rotated around neck center rod 26 in both directions by, for example, about 60 degrees.

A neck lower frame 58 is provided on the upper surface of the shoulder frame 51. One ends of the variable length links included in the three actuators that move head 2 are attached to neck lower frame 58. Neck lower frame 58 includes three plate-like portions extending from the center at intervals of 120 degrees on a horizontal plane. Tips of the three plate-shaped portions are bent by 90 degrees, and a neck rear link attaching unit J14, a neck right-side link attaching unit J15, and a neck left-side link attaching unit J16 are provided on the bent portion. Neck rear link attaching unit J14 is located at the center of the rear side of shoulder frame 51. Neck right-side link attaching unit J15 is located to the slight right of the front center of shoulder frame 51. Neck left-side link attaching unit J16 is located to the slight left of the front center of shoulder frame 51.

Neck rear link attaching unit J14 is a biaxial gimbal in which the shaft member provided at the other end of a neck rear link 28L is held rotatably by the yoke that is rotated by the rotation member protruding rearward from neck lower frame 58. Neck right-side link attaching unit J15 and neck left-side link attaching unit J16 are also a biaxial gimbal having the same structure.

A head rear link attaching unit J17 is provided in the center on the rear side in the lower portion of head 2. A head right-side link attaching unit J18 is provided on the right side in the lower portion of head 2. A head left-side link attaching unit J19 is provided on the left side in the lower portion of head 2.

One ends of neck rear link 28L, a neck right-side link 29L, and a neck left-side link 30L are attached rotatably to head rear link attaching unit J17, head right-side link attaching unit J18, and head left-side link attaching unit J19 with two rotational degrees of freedom, respectively. The other ends of neck rear link 28L, neck right-side link 29L, and neck left-side link 30L are attached to neck rear link attaching unit J14, neck right-side link attaching unit J15, and neck right-side link attaching unit J16 with two rotational degrees of freedom, respectively.

Neck rear link 28L is attached to head rear link attaching unit J17 with a link attachment 28N interposed therebetween. The length of neck rear link 28L is shorter than a distance between head rear link attaching unit J17 and neck rear link attaching unit J14. Link attachment 28N extends along motor 28M from between the cylinder of neck rear link 28L and motor 28M. Link attachment 28N is a member that is bent in an L-shape when viewed from the side. The tip of L-shaped link attachment 28N is attached to head rear link attaching unit 17 at the position where neck rear link 28L is extended. The lower end of motor 28M exists below an attachment position of link attachment 28N. A neck right-side link 29L and a neck left-side link 30L have the same structure. This allows use of a motor that is longer than the length of the variable length link included in the actuator.

A neck C3 is a three-rotational-degree-of-freedom connection mechanism that connects head 2 being the second member rotatably to chest 5 being the first member with three rotational degrees of freedom. Neck C3 includes neck joint 27 being the joint, neck rear links 28L, neck right-side link 29L, and neck left-side link 30L, being the three variable length links, neck rear link attaching unit J14, neck right-side link attaching unit J15, and neck left-side link attaching unit J16, being the three first-member-side link attaching units, and head rear link attaching unit J17, head right-side link attaching unit J18, and head left-side link attaching unit J19, being the three second-member-side link attaching units.

The direction of neck center rod 26, being the torsion axis, is fixed with respect to chest 5. The angle of neck center rod 26 can be changed with respect to head 2. Each of relative positional relations with respect to neck center rod 26 and neck joint 27 is fixed in each of neck rear link attaching unit J14, neck right-side link attaching unit J15, and neck left-side link attaching unit J16. Each of the relative positional relationships with neck joint 27 is also fixed in each of head rear link attaching unit J17, head right-side link attaching unit J18, and head left-side link attaching unit J19.

Figure 34:
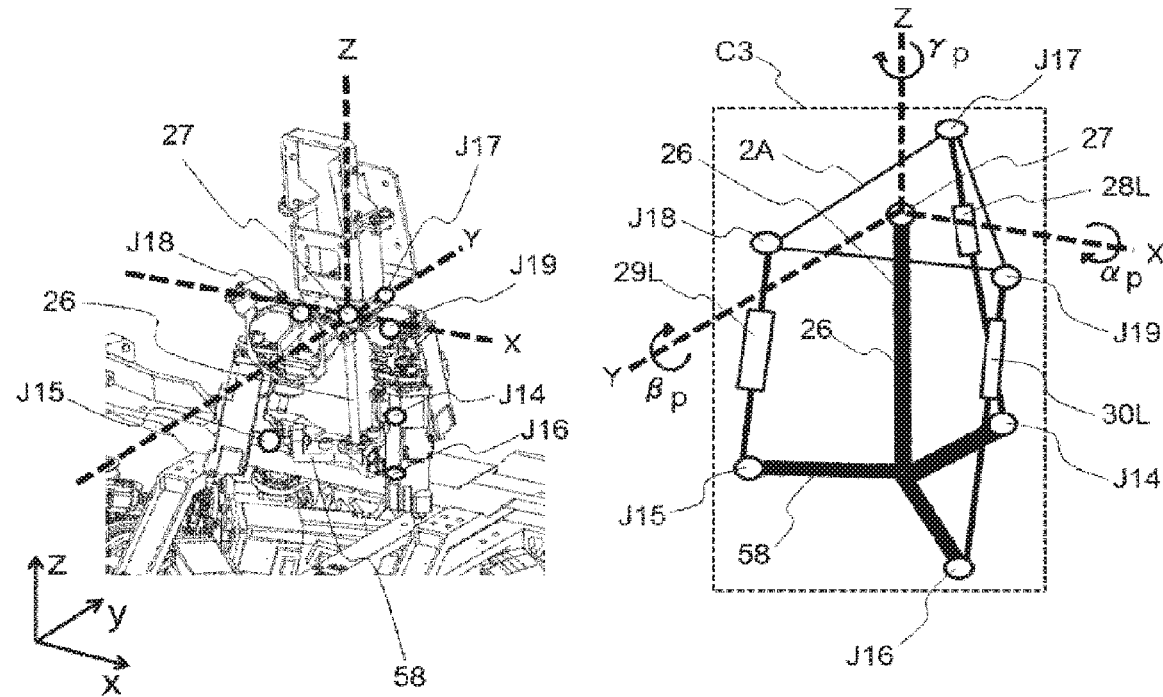
FIG. 34 is a perspective view illustrating the arrangement of the variable length links at a neck included in the humanoid robot of the first embodiment.

The arrangement of the variable length links in neck C3 is described. FIG. 34 is a perspective view illustrating the arrangement of the variable length links in neck C3. Neck C3 includes three variable length links 28L, 29L, 30L that connect three second-member-side link attaching units J17, J18, J19 and three first-member-side link attaching units J14, J15, J16, respectively. For this reason, the connection angle of head 2 with respect to chest 5 can be changed with three rotational degrees of freedom by changing the lengths of three variable length links 28L, 29L, 30L. It is assumed that $\alpha p$ is the rotation angle around the X-axis of neck joint 27, that $\beta p$ is the rotation angle around the Y-axis, and that $\gamma p$ is the rotation angle around the Z axis.

Neck joint 27 exists on a line segment connecting the second-member-side link attaching units J18, J19. A second-member-side triangle T2 is an isosceles triangle, and neck joint 27 is located at a midpoint of the base side. For this reason, in the case that second member 2 is tilted in the front-rear direction, it is only necessary to change the length of variable length link 28L. In the case that second member 2 is tilted in the right and left direction, one of variable length links 29L, 30L is lengthened while the other is shortened.

The similar effect is also obtained in the case that the first-member-side link attaching units are arranged in other joints such that the joint exists on the line segment connecting the two first-member-side link attaching units provided in the first member having a changeable angle with respect to the torsion axis. Alternatively, the similar effect is also obtained in the case that the second-member-side link attaching units are arranged such that the joint exists on the line segment connecting the two second-member-side link attaching units provided in the second member having a changeable angle with respect to the torsion axis.

Figure 35:
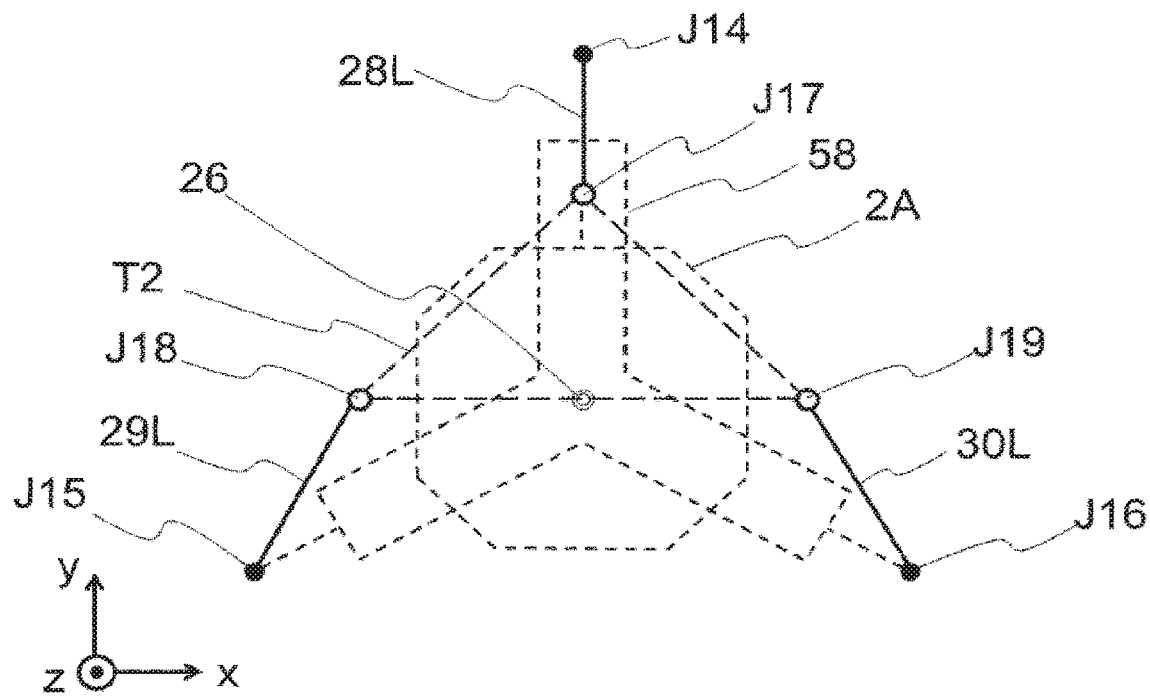
FIG. 35 is a view illustrating the arrangement of the variable length links in a reference state of the neck included in the humanoid robot of the first embodiment viewing from a direction in which a neck center rod extends.

FIG. 35 is a view illustrating the arrangement of the variable length links of neck C3 in the reference state viewing from the direction in which neck center rod 26 extends. In the reference state, variable length links 29L, 30L and torsion axis 26 have the twisted relationship. A tilt angle $\theta p1$ formed between variable length link 28L and the link reference plane including first-member-side link attaching unit J14 of variable length link 28L and torsion axis 26 is zero degree. Tilt angles $\theta p2$, $\theta p3$ of variable length links 29L, 30L are about 16 degrees. A maximum value $\theta pmax$ of the angle formed between each of three variable length links 28L, 29L, 30L and torsion axis 26 is about 16 degrees, and is greater than or equal to $\delta 0$ (for example, about 3 degrees). The torque rotating around torsion axis 26 is generated in the case that the lengths of variable length links 28L, 29L, 30L are changed.

Figure 36:
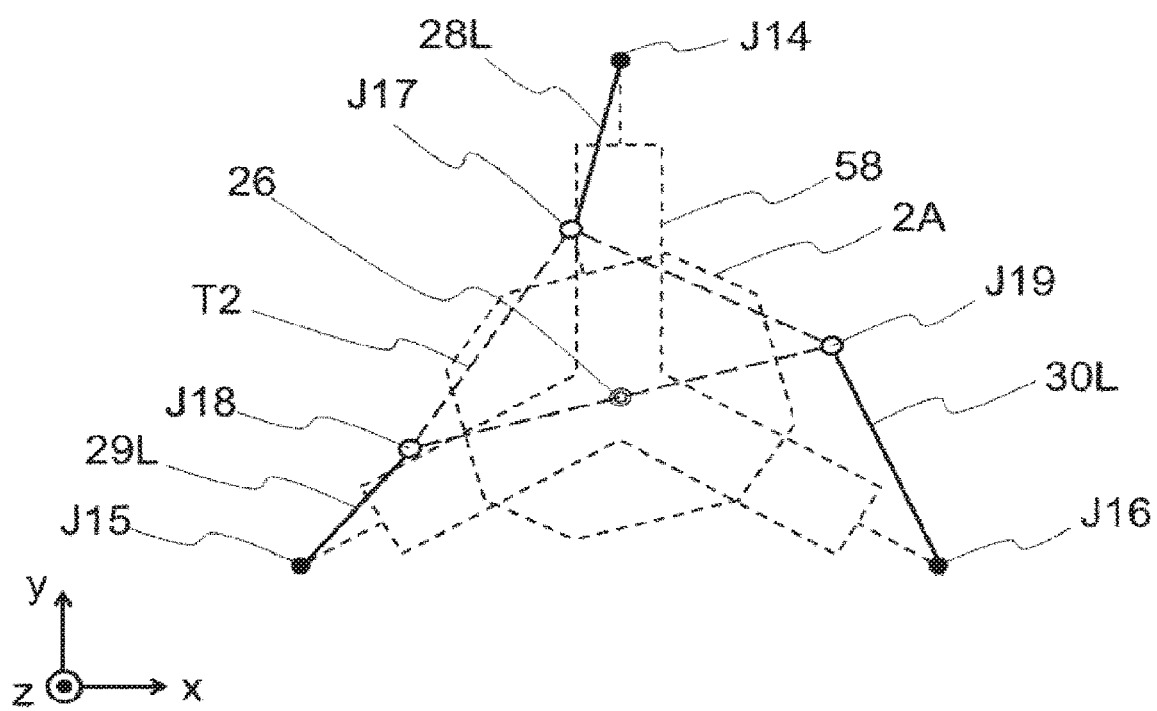
FIG. 36 is a view illustrating the arrangement of the variable length links when the head of the neck included in the humanoid robot of the first embodiment is rotated and tilted forward viewing from the direction in which the neck center rod extends.

When head 2 is tilted, maximum value $\theta pmax$ of the three tilt angles is greater than or equal to $\delta 0$. FIG. 36 is a view illustrating the arrangement of the variable length links in neck C3 while head 2 is rotated and tilted forward viewing from the direction in which neck center rod 26 extends. FIG. 36 illustrates the arrangement of the variable length links while head 2 is twisted to the left by 15 degrees and tilted forward by 30 degrees in the direction of 15 degrees to the left. Tilt angles $\theta p1$, $\theta p3$ of variable length links 28L, 30L are increased, and tilt angle $\theta p2$ of variable length link 29L is decreased. In the case that the rotation around torsion axis 26 is not performed, tilt angles $\theta p2$, $\theta p3$ of variable length links 29L, 30L are kept unchanged at about 16 degrees when second member (head) 2 is tilted back and forth. When second member 2 is tilted in the right and left direction, one of tilt angles $\theta p2$, $\theta p3$ of variable length links 29L, 30L is increased while the other is decreased. Thus, in each case that the length of each of variable length links 28L, 29L, 30L varies within a possible range, any one of the variable length links has the twisted relationship with respect to torsion axis 26, and maximum value $\theta pmax$ in the tilt angles of the three variable length links is greater than or equal to about 16 degrees.

A plane determined by three first-member-side link attaching units, or a plane determined by three second-member-side link attaching units is referred to as a link attaching plane. The intersection point of neck center rod 26 being the torsion axis and the link attaching plane is referred to as a torsion center. First-member-side link attaching units J14, J15, J16 existing on chest 5 being the first member are arranged at three points where a center angle becomes 120 degrees on a circumference of a circle having a predetermined distance from the torsion center on the link attaching plane. Second-member-side link attaching units J17, J18, J19 existing on head 2 being the second member are arranged at positions, being equidistant from neck joint 27 and has center angles of 90 degrees, 90 degrees, and 180 degrees with respect to the neck joint 27, on the link attaching plane. Consequently, all of variable length links 28L, 29L, 30L cannot be located on the same plane including torsion axis 26 at the same time even if neck joint 27 is rotated in what way. That is, at least one of variable length links 28L, 29L, 30L has the twisted relationship with torsion axis 26.

In other three-rotational-degree-of-freedom connection mechanisms, three center angles formed by the three first-member-side link attaching units and the torsion center in the link attaching plane on the first member side are different from three central angles formed by the three second-member-side link attaching units and the torsion center in the link attaching plane on the second member side. For this reason, the situation in that the plane including each one of the three variable length links also includes the torsion axis is not simultaneously generated in all the three variable length links. Maintaining a situation in that one variable length link (referred to as a link A) is disposed on the same plane as the torsion axis, the joint is rotated within the movable range around a rotation axis that is perpendicular to the plane. In the rotation of the joint within the movable range, one of the following states occurs. (A) At least one of the remaining two variable length links is not disposed on the same plane as the torsion axis. (B) The remaining two variable length links are disposed on the same plane as the torsion axis at different rotation angles. Consequently, even if the joint is rotated in what way, the fact that the plane including the variable length link includes the torsion axis is not simultaneously generated in all the three variable length links. That is, at least one of the three variable length links has the twisted relationship with the torsion axis.

In the rotation around neck center rod 26 (torsion axis), one of neck right-side link 29L and neck left-side link 30L is lengthened and the other is shortened. Consequently, in the rotation around the torsion axis, both the force pushed by the extending link and the force drawn by the shortening link are generated, the rotation is performed around torsion axis easily.

Figure 37:
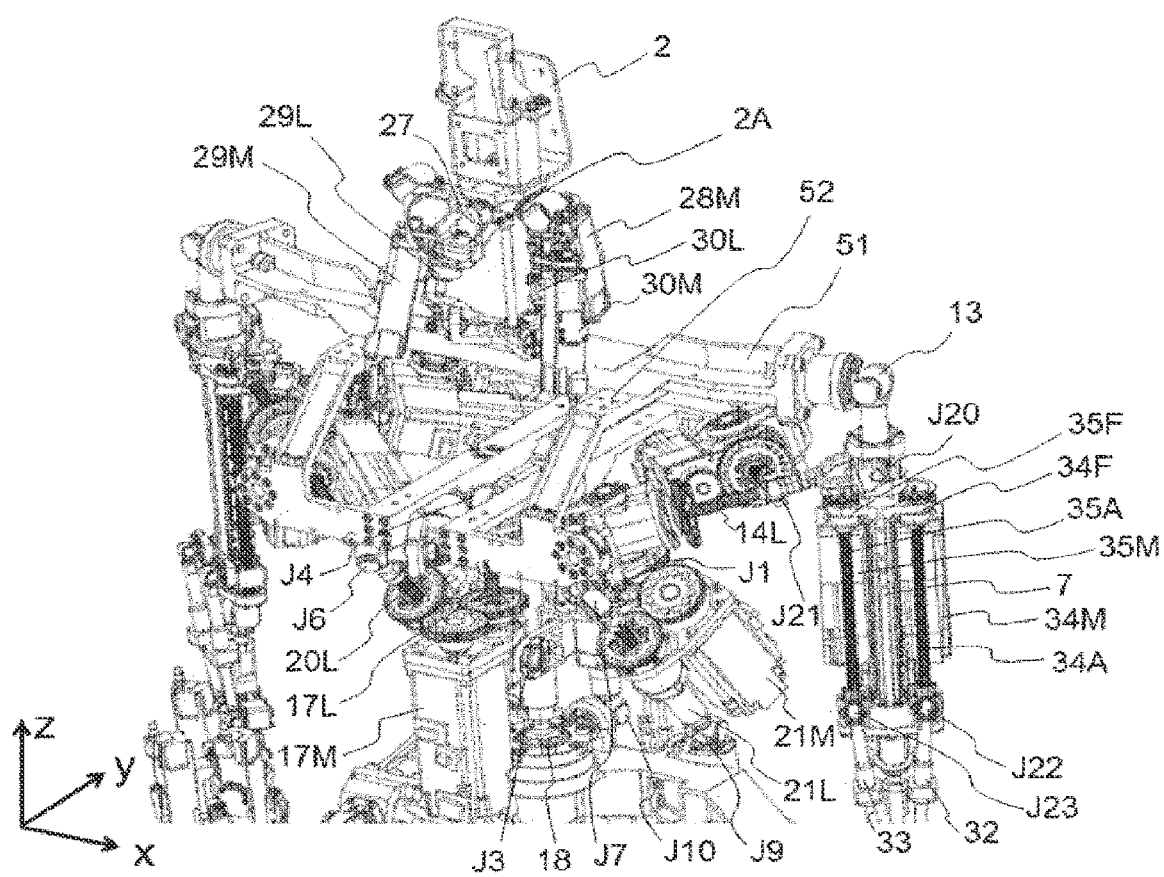
FIG. 37 is a perspective view illustrating the upper half body of the humanoid robot according to first embodiment.

Referring to FIGS. 10 to 16 and 37, a structure of a shoulder C4 is described below. FIG. 37 is a perspective view illustrating the upper half body of humanoid robot 100. Upper arm 7 is connected rotatably to chest 5 by shoulder joint 13 with two rotational degrees of freedom. Upper arm 7 and forearm 8 have a straight rod shape. The rod-shaped portion of upper arm 7 is referred to as a humerus 7B. The rod-shaped portion of forearm 8 is referred to as a forearm bone 8B. An upper arm main link attaching unit J20 to which upper arm drive main link 14L is attached rotatably with two rotational degrees of freedom is provided in the humerus 7B at a position having a predetermined distance from shoulder joint 13. Upper arm main link attaching unit J20 is a biaxial gimbal having a structure in which a rotation member provided in humerus 7B is sandwiched by a semicircular yoke provided at one end of upper arm drive main link 14L. The rotation member is provided in humerus 7B to be rotated around the axis in a direction in which humerus 7B extends. The rotation member is sandwiched by the yoke such that the angle formed with humerus 7B can be changed. The protrusions protruding from both sides of the rotation member are sandwiched rotatably by the yoke provided on upper arm drive main link 14L. The protrusion has a cylindrical shape. The two protrusions exist on the same straight line perpendicular to the rotation member. Upper arm main link attaching unit J20 has two rotational degrees of freedom including one rotational degree of freedom around the axis of humerus 7B.

An upper arm drive main-link-side auxiliary link attaching unit J21 is provided on upper arm drive main link 14L at the position having the predetermined distance from upper arm main link attaching unit J20. One end of upper arm drive auxiliary link 15L is attached rotatably to upper arm drive main-link-side auxiliary link attaching unit J21 with one rotational degree of freedom. The center lines of upper arm drive main link 14L and upper arm drive auxiliary link 15L exist on the same plane. The plane on which the center lines of upper arm drive main link 14L and upper arm drive auxiliary link 15L exist is referred to as a link moving plane. In upper arm drive main-link-side auxiliary link attaching unit J21, upper arm drive auxiliary link 15L is attached rotatably to upper arm drive main link 14L with one rotational degree of freedom at which the angle formed by upper arm drive main link 14L and upper arm drive auxiliary link 15L can be changed on the link moving plane. Upper arm drive main-link-side auxiliary link attaching unit J21 has the structure in which the protrusion (shaft member) provided on upper arm drive main link 14L is sandwiched by the yoke provided at one end of upper arm drive auxiliary link 15L. The protrusion provided on upper arm drive main link 14L is provided perpendicular to the link moving plane.

The link moving plane is a plane determined by chest-side main link attaching unit J1, chest-side auxiliary link attaching unit J2, and upper arm drive main-link-side auxiliary link attaching unit J21. When the lengths of upper arm drive main link 14L and upper arm drive auxiliary link 15L change, upper arm drive main link 14L and upper arm drive auxiliary link 15L are moved on the link moving plane. Furthermore, the link moving plane is rotated around a straight line (referred to as a link moving plane rotation axis) passing chest-side main link attaching unit J1 and chest-side auxiliary link attaching unit J2. In a case where the lengths of upper arm drive main link 14L and upper arm drive auxiliary link 15L are changed while a certain condition is satisfied, the link moving plane does not rotate. In another case where the lengths of upper arm drive main link 14L and upper arm drive auxiliary link 15L are changed while another condition is satisfied, only the link moving plane is rotated and upper arm drive main link 14L and upper arm drive auxiliary link 15L are not moved within the link moving plane. The link moving plane rotation axis is also a rotation axis around which the rotation member of chest-side main link attaching unit J1 is rotated and a rotating axis around which the rotation member of chest-side auxiliary link attaching unit J2 is rotated.

Upper arm drive main link 14L and upper arm drive auxiliary link 15L exist on the link moving plane. In the link moving plane, only the angle formed by upper arm drive main link 14L and upper arm drive auxiliary link 15L is changed at upper arm drive main-link-side auxiliary link attaching unit J21 in a relative positional relationship between upper arm drive main link 14L and upper arm drive auxiliary link 15L. Thus, upper arm drive main-link-side auxiliary link attaching unit J21 may have one rotational degree of freedom at which only the rotation can be performed in the link moving plane. Upper arm drive main-link-side auxiliary link attaching unit J21 may have two rotational degrees of freedom.

Figure 38:
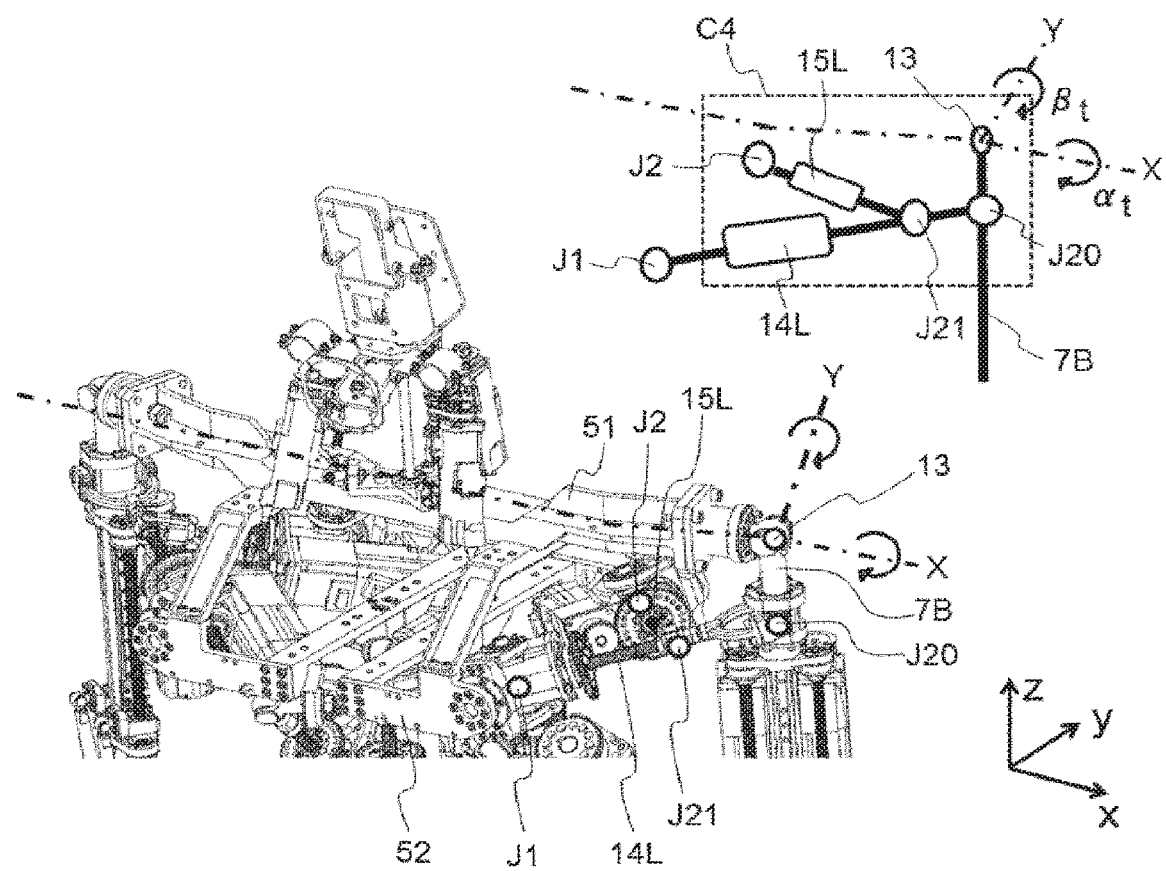
FIG. 38 is a perspective view illustrating the arrangement of the variable length links at a left shoulder joint included in the humanoid robot of the first embodiment.

FIG. 38 is a perspective view illustrating the arrangement of the variable length links in left shoulder joint 13. Shoulder joint 13, chest-side main link attaching unit J1, and chest-side auxiliary link attaching unit J2 are fixed to chest 5, and the relative positional relationships among shoulder joint 13, chest-side main link attaching unit J1, and chest-side auxiliary link attaching unit J2 are fixed. In upper arm main link attaching unit J20, the distance from shoulder joint 13 is predetermined. Upper arm drive main-link-side auxiliary link attaching unit J21 exists on upper arm drive main link 14L at the position having the predetermined distance from upper arm main link attaching unit J20. When the position of upper arm main link attaching unit J20 is determined in a three-dimensional space, humerus 7B is directed in the direction from shoulder joint 13 toward upper arm main link attaching unit J20. Upper arm 7 including humerus 7B can be moved with respect to chest 5 by changing the position of upper arm main link attaching unit J20. Upper arm drive main link 14L and upper arm drive auxiliary link 15L constitute a truss structure.

When the lengths of upper arm drive main link 14L and upper arm drive auxiliary link 15L are determined, the distance to upper arm main link attaching unit J20 from each of shoulder joint 13, chest-side main link attaching unit J1, and chest-side auxiliary link attaching unit J2 is determined. Because the distance from the three points to upper arm main link attaching unit J20 is determined, the position of upper arm main link attaching unit J20 is determined.

Humerus 7B is raised by lengthening upper arm drive main link 14L, and humerus 7B is lowered by shortening upper arm drive main link 14L. Humerus 7B is moved forward by lengthening upper arm drive auxiliary link 15L, and humerus 7B is moved rearward by shortening upper arm drive auxiliary link 15L. Humerus 7B can be moved freely within a determined movable range in which shoulder joint 13 is set to the center of the rotation. For example, regarding the vertical direction and the front-back direction, when the downward direction is set to 0 degrees and the forward direction is set to 90 degrees, humerus 7B can be rotated from about −30 degrees to about 95 degrees. In the right and left direction, humerus 7B can be rotated outward by about 95 degrees, and rotated inward by about 5 degrees (−5 degrees) beyond the front direction.

In the biaxial gimbal of the type used in shoulder joint 13, in the case where humerus 7B is directed in the direction of a rotation axis Rx1 (illustrated in FIG. 5) of the rotation member of the biaxial gimbal (referred to as a singular point), humerus 7B cannot be tilted in the direction orthogonal to the yoke of the biaxial gimbal. The direction of rotation axis Rx1 is set to a direction forming an angle of $\xi 1$ on the rear side with respect to the right and left direction (X-axis direction) of humanoid robot 100 in the horizontal plane. Consequently, the singular point exists behind shoulder joint 13. This enables humerus 7B to be moved freely within the movable range on the front side with respect to the right and left direction. In the conventional humanoid robot, sometimes the humanoid robot performs unnatural motion caused by avoiding the singular point of the biaxial gimbal of the shoulder joint. In humanoid robot 100, it is not necessary to perform the unnatural motion within the movable range in order to avoid the singular point. That is, the motion of humanoid robot 100 can be brought closer to the natural motion of a person than before.

Shoulder joint 13 exists at an end of shoulder frame 51, which exists on the upper portion of chest 5 and extends in the right and left direction. Shoulder joint 13 allows the rotation around rotation axis Rx1 extending in a direction being directed to the side far from the center of chest 5 and onto the rear side. The rotation in which the angle formed by rotation axis Rx1 and humerus 7B is changed can be performed. Shoulder joint 13 connects humerus 7B rotatably to chest 5 with two rotational degrees of freedom. Chest-side main link attaching unit J1 is provided in chest 5 at the position lower than shoulder joint 13 and on the front side. Chest-side auxiliary link attaching unit J2 is provided in chest 5 at the position lower than shoulder joint 13 and on the rear side. Chest-side main link attaching unit J1 may be provided on the rear side of shoulder joint 13, and chest-side auxiliary link attaching unit J2 may be provided on the front side. Chest-side main link attaching unit J1 and chest-side auxiliary link attaching unit J2 may be provided at positions where shoulder joint 13 is sandwiched therebetween in the front-back direction.

Shoulder C4 is a rotation connecting mechanism that connects upper arm 7 being the second member rotatably to chest 5 being the first member by shoulder joint 13. Shoulder joint 13 is a joint that connects the upper arm 7 including humerus 7B rotatably to chest 5 with two rotational degrees of freedom. Shoulder C4 changes the angle of shoulder joint 13 to move upper arm 7 with respect to chest 5.

Upper arm drive main link 14L is a first link having four rotational degrees of freedom or five rotational degrees of freedom. Upper arm main link attaching unit J20 is a second-member first attaching unit that is provided in the upper arm 7 so that it has a fixed positional relationship with respect to shoulder joint 13. One end of upper arm drive main link 14L is attached rotatably to upper arm main link attaching unit J20 with at least two rotational degrees of freedom. Chest-side main link attaching unit J1 is a first-member first attaching unit to which the other end of upper arm drive main link 14L is attached rotatably with at least two rotational degrees of freedom. Chest-side main link attaching unit J1 is also a first reference point that is provided in chest 5 having a fixed relative positional relationship with respect to the shoulder joint 13. Upper arm drive main link 14L itself has one rotational degree of freedom. Upper arm drive main link 14L itself is not required to have one rotational degree of freedom. Motor 14M is a first power source that generates force changing the length of upper arm drive main link 14L. The length of upper arm drive main link 14L is a distance between upper arm main link attaching unit J20 and chest-side main link attaching unit J1. Upper arm drive main actuator 14 including upper arm drive main link 14L, upper arm main link attaching unit J20, chest-side main link attaching unit J1, and motor 14M is a first actuator.

Upper arm drive auxiliary link 15L is a second link having three rotational degrees of freedom, four rotational degrees of freedom, or five rotational degrees of freedom. Upper arm drive main-link-side auxiliary link attaching unit J21 is a first-link second attaching unit that is provided on upper arm driving main link 14L so that it has a fixed positional relationship with respect to upper arm main link attaching unit J20. One end of upper arm drive auxiliary link 15L is attached rotatably to upper arm drive main-link-side auxiliary link attaching unit J21 with at least one rotational degree of freedom. Chest-side auxiliary link attaching unit J2 is a second reference point that is provided in chest 5 so that it has a fixed positional relationship with respect to shoulder joint 13. Upper arm drive auxiliary link 15L itself has one rotational degree of freedom. Upper arm drive auxiliary link 15L itself is not required to have one rotational degree of freedom. Chest-side auxiliary link attaching unit J2 is a first-member second attaching unit to which the other end of the upper arm drive auxiliary link 15L is attached rotatably with at least two rotational degrees of freedom. Motor 15M is a second power source that generates the force changing the length of upper arm drive auxiliary link 15L. The length of upper arm drive auxiliary link 15L is a distance between upper arm drive main-link-side auxiliary link attaching unit J21 and chest-side auxiliary link attaching unit J2. Upper arm driving auxiliary actuator 15 including upper arm drive auxiliary link 15L, upper arm drive main-link-side auxiliary link attaching unit J21, chest-side auxiliary link attaching unit J2, and motor 15M is a second actuator.

When upper arm drive main link 14L and upper arm drive auxiliary link 15L expand or contract, upper arm drive main-link-side auxiliary link attaching unit J21 always exists on the link moving plane. Thus, upper arm drive main-link-side auxiliary link attaching unit J21 has one rotational degree of freedom around the rotation axis perpendicular to the link moving plane (referred to as a vertical rotation axis).

Chest-side main link attaching unit J1 and chest-side auxiliary link attaching unit J2 have two rotational degrees of freedom by the link moving plane rotation axis and the vertical rotation axis. Thus, no matter how upper arm drive main link 14L and upper arm drive auxiliary link 15L expand or contract, upper arm drive main link 14L and chest-side auxiliary link attaching unit J2 are not twisted. For this reason, upper arm drive main link 14L and upper arm drive auxiliary link 15L are not required to have one rotational degree of freedom around the axis. Upper arm drive main link 14L has four rotational degrees of freedom, and upper arm drive auxiliary link 15L has three rotational degrees of freedom. When upper arm drive main link 14L is rotated around the link moving plane rotation axis at chest-side main link attaching unit J1, the vertical rotation axis is also rotated around the link moving plane rotation axis. When upper arm drive auxiliary link 15L rotates around the link moving surface rotation axis at chest-side auxiliary link attaching unit J2, the vertical rotation axis is also rotated around the link moving surface rotation axis.

Upper arm main link attaching unit J20 has two rotational degrees of freedom including one rotational degree of freedom around the axis of humerus 7B. Consequently, upper arm main link attaching unit J20 can be used in cases in which the angle around the axis of humerus 7B is changed in upper arm main link attaching unit J20 or the angle between humerus 7B and upper arm drive main link 14L is changed.

Upper arm drive main link 14L twists when chest-side main link attaching unit J1 has two rotational degrees of freedom including the rotation axis in the direction from the link moving plane rotation axis and the vertical rotation axis. In order to absorb the twist, upper arm drive main link 14L has one rotational degree of freedom around the axis. Alternatively, upper arm drive main-link-side auxiliary link attaching unit J21 may have two rotational degrees of freedom. One rotational degree of freedom added to upper arm drive main-link-side auxiliary link attaching unit J21 is one rotational degree of freedom around the axis of upper arm drive main link 14L. When chest-side main link attaching unit J1 has three rotational degrees of freedom, the upper arm drive main link 14L is not required to have one rotational degree of freedom around the axis, and the rotational degree of freedom is not required to be added to upper arm drive main-link-side auxiliary link attaching unit J21.

Upper arm drive auxiliary link 15L twists when chest-side auxiliary link attaching unit J2 has two rotational degrees of freedom including the rotation axis in the direction different from the link moving plane rotation axis and the vertical rotation axis. In order to absorb the twist, upper arm drive auxiliary link 15L has one rotational degree of freedom around the axis. Alternatively, upper arm drive main-link-side auxiliary link attaching unit J21 may have two rotational degrees of freedom. One rotational degree of freedom added to upper arm drive main-link-side auxiliary link attaching unit J21 is one rotational degree of freedom around the axis of upper arm drive auxiliary link 15L. Upper arm drive main-link-side auxiliary link attaching unit J21 has three rotational degrees of freedom when upper arm drive main-link-side auxiliary link attaching unit J21 has two rotational degrees of freedom to prevent upper arm drive main link 14L from twisting. When chest-side auxiliary link attaching unit J2 has three rotational degrees of freedom, the upper arm drive auxiliary link 15L is not required to have one rotational degree of freedom around the axis, and the rotational degree of freedom is not required to be added to upper arm drive main-link-side auxiliary link attaching unit J21.

When one of chest-side main link attaching unit J1 and chest-side auxiliary link attaching unit J2 has two rotational degrees of freedom around the link moving plane rotation axis and the vertical rotation axis while the other has two rotational degrees of freedom including the rotation axis in the direction different from the link moving plane rotation axis and the vertical rotation axis, the total of the rotational degrees of freedom of chest-side main link attaching unit J1 and the rotational degrees of freedom of chest-side auxiliary link attaching unit J2 may be set to eight rotational degrees of freedom. That is, upper arm drive main link 14L or upper arm drive auxiliary link 15L may have one rotational degree of freedom around the axis, or upper arm drive main-link-side auxiliary link attaching unit J21 may have two rotational degrees of freedom. Chest-side main link attaching unit J1 or chest-side auxiliary link attaching unit J2 may have three rotational degrees of freedom.

When both chest-side main link attaching unit J1 and chest-side auxiliary link attaching unit J2 have two rotational degrees of freedom including the rotation axis in the direction different from the link moving plane rotation axis and the vertical rotation axis, the total of the rotational degree of freedom of chest-side main link attaching unit J1 and the rotational degree of freedom of chest-side auxiliary link attaching unit J2 may be set to nine rotational degrees of freedom.

Although the positions of chest-side main link attaching unit J1 and chest-side auxiliary link attaching unit J2 are fixed, the link moving plane is not always rotated around the link moving plane rotation axis when at least one of chest-side main link attaching unit J1 and chest-side auxiliary link attaching unit J2 is movable. For this reason, upper arm drive main-link-side auxiliary link attaching unit J21 is required to have at least two rotational degrees of freedom.

When the joint has three rotational degrees of freedom, the first link and the second link have five rotational degrees of freedom, and a third link having five rotational degrees of freedom is added between the second and first members. The same holds true for the rotation connecting mechanism that connects the second member rotatably to the first member with two rotational degrees of freedom or three rotational degrees of freedom.

Figure 39:
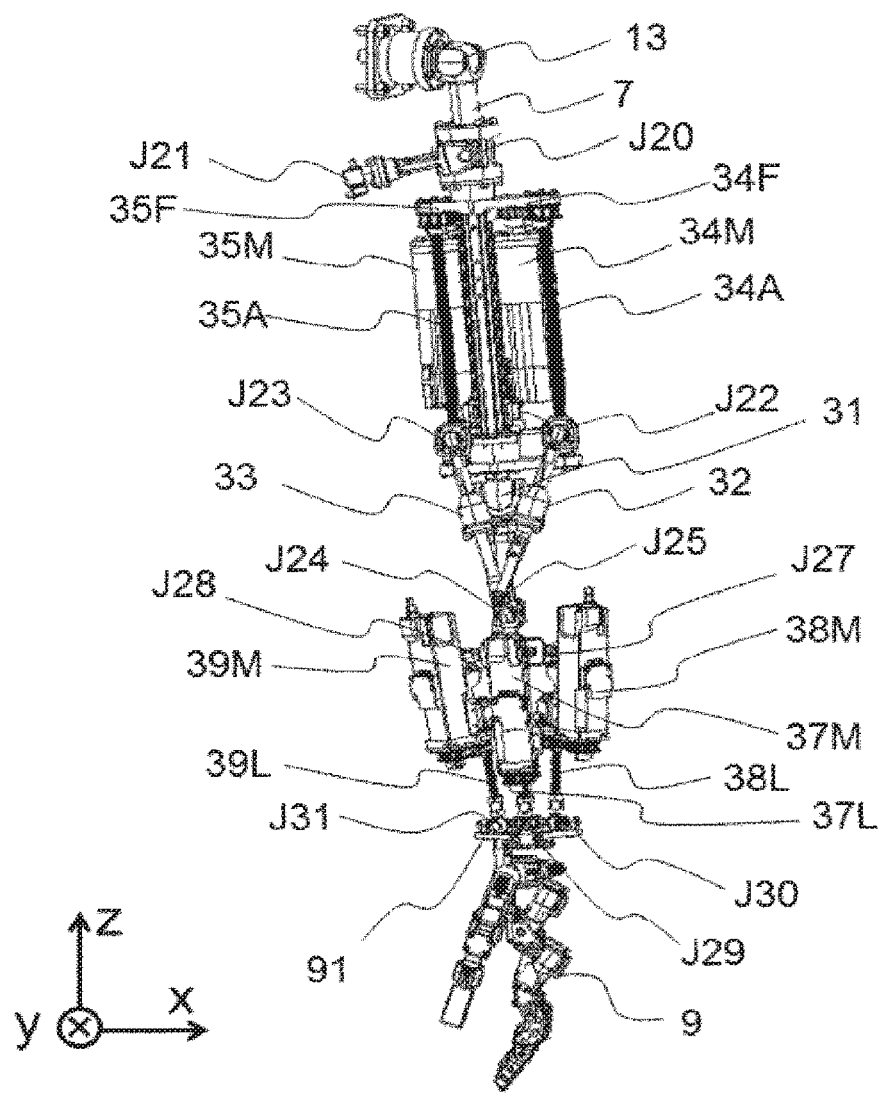
FIG. 39 is a front view illustrating a left upper limb of the humanoid robot of the first embodiment.
Figure 40:
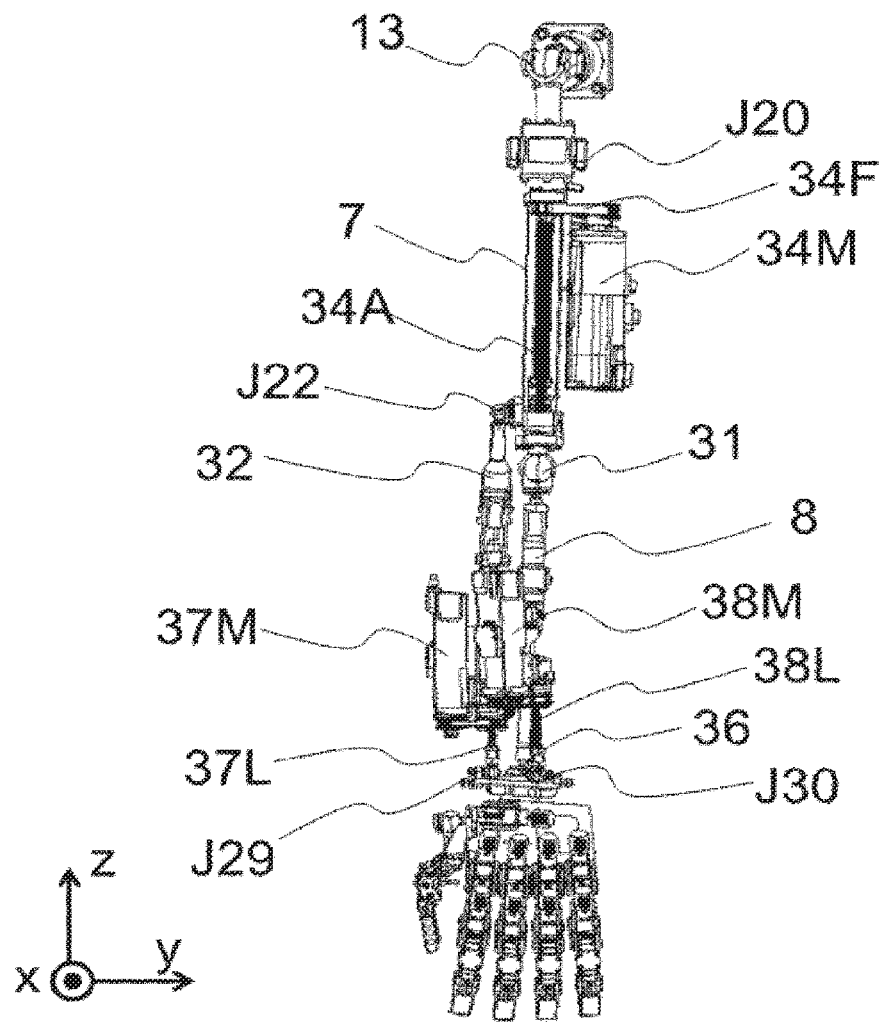
FIG. 40 is a side view illustrating the left upper limb of the humanoid robot of the first embodiment.
Figure 41:
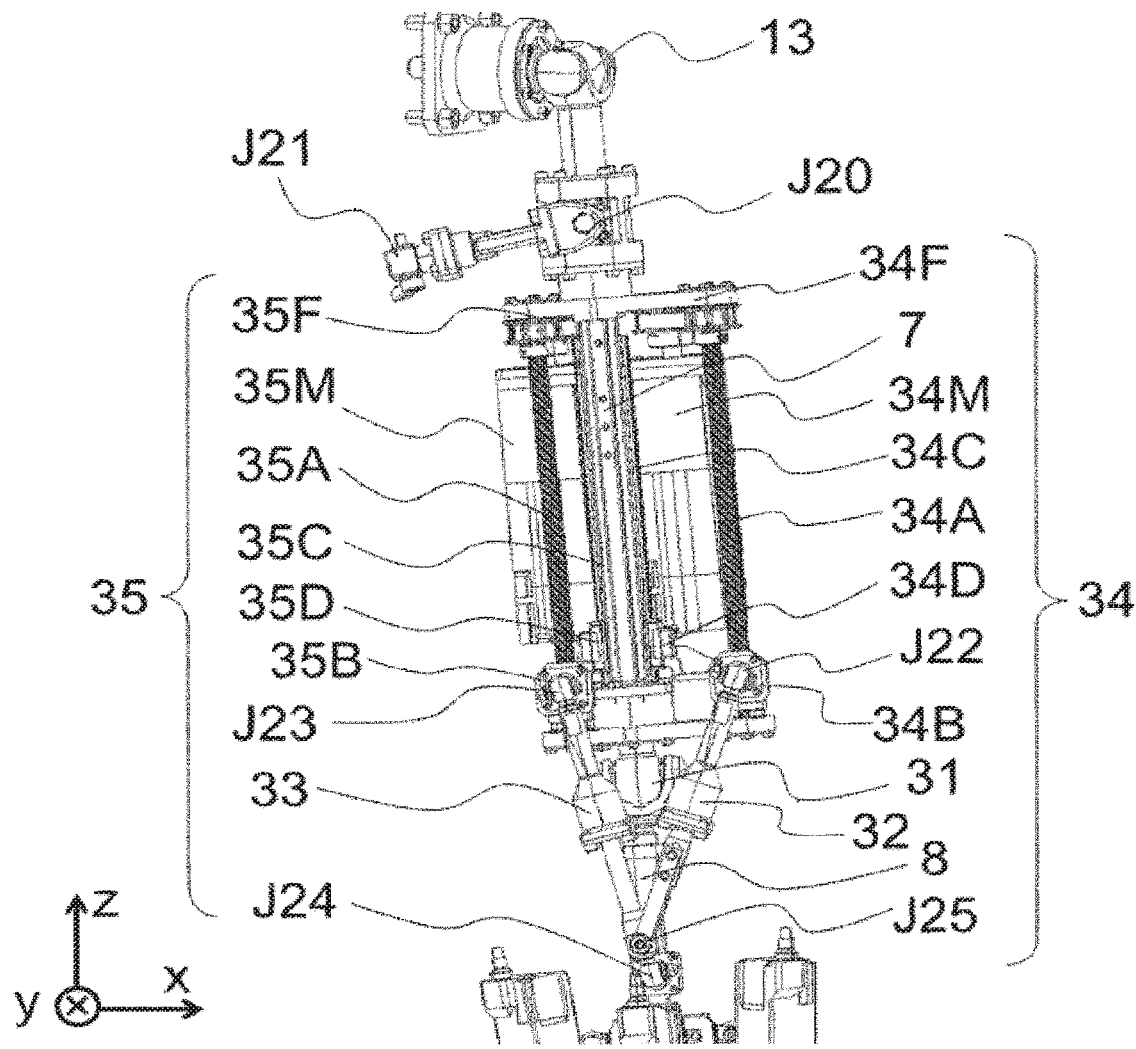
FIG. 41 is an enlarged front view illustrating a portion up to an elbow joint of the left upper limb of the humanoid robot of the first embodiment.
Figure 42:
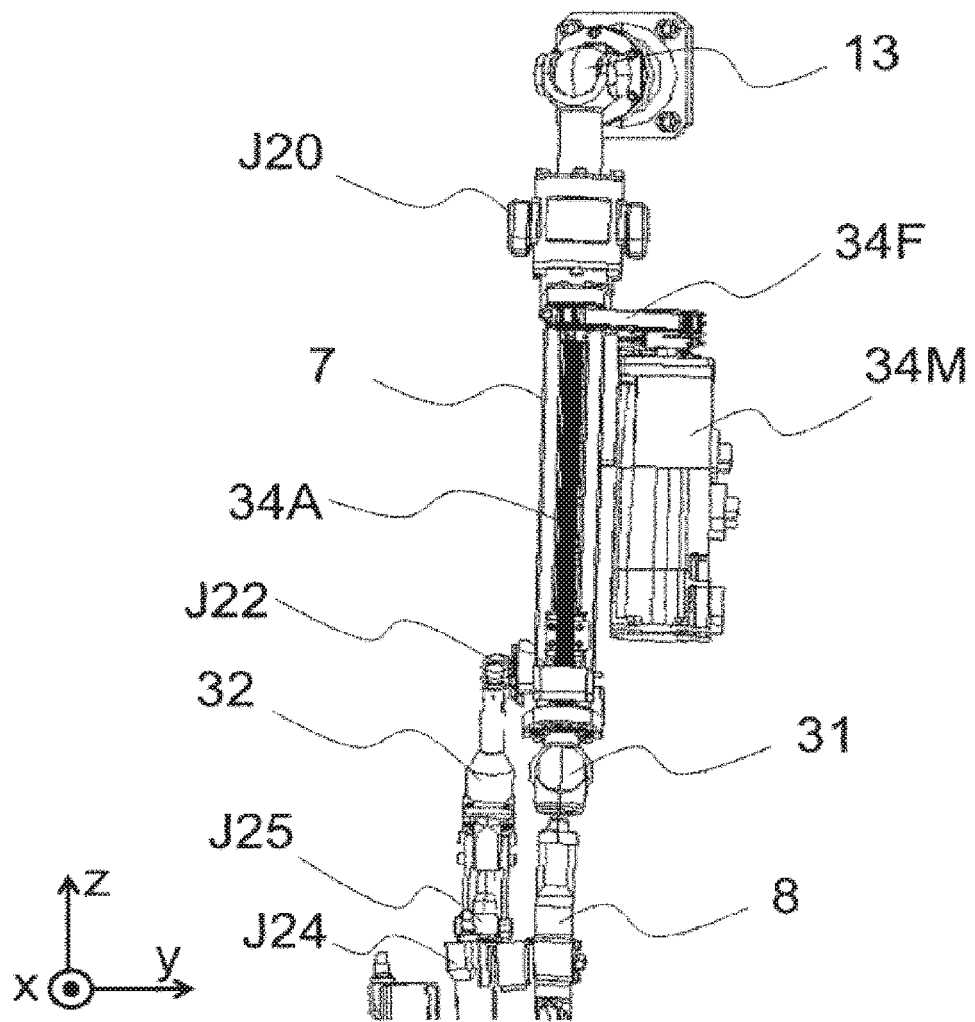
FIG. 42 is an enlarged side view illustrating the portion up to the elbow joint of the left upper limb of the humanoid robot of the first embodiment.
Figure 43:
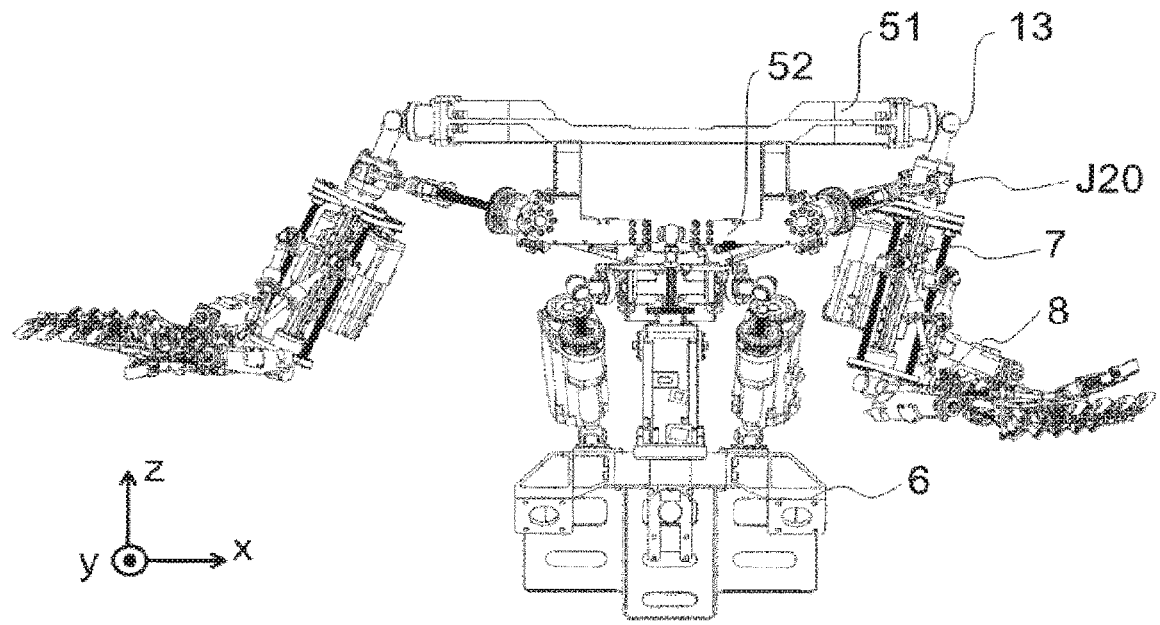
FIG. 43 is a front view illustrating a state in which right and left elbow joints are bent by 90 degrees in the trunk and upper limb included in the humanoid robot of the first embodiment.
Figure 44:
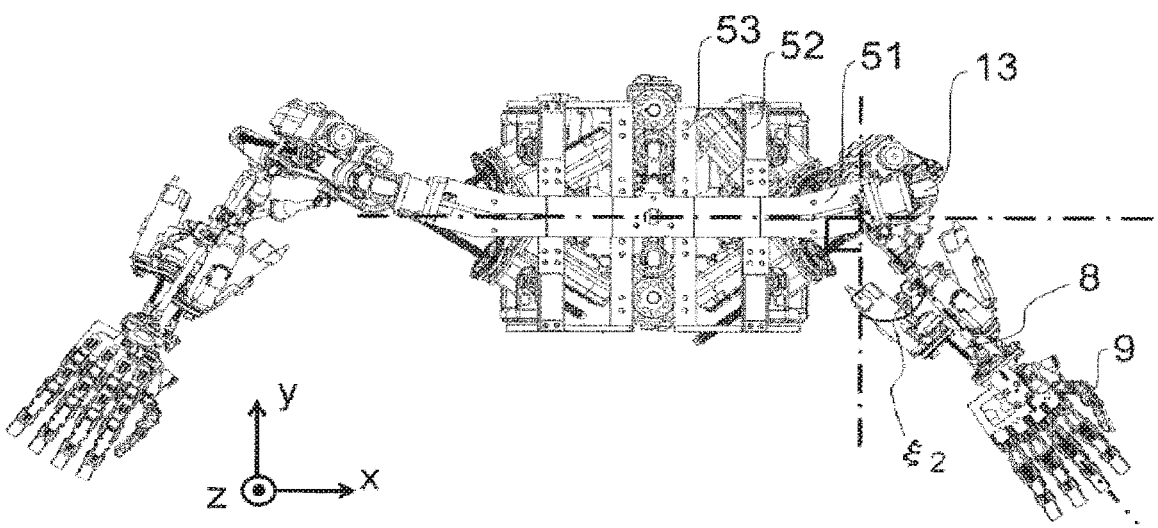
FIG. 44 is a plan view illustrating in the state in which the right and left elbow joints are bent by 90 degrees in the trunk and upper limb included in the humanoid robot of the first embodiment viewing from above.

Referring to FIGS. 11 to 15 and 39 to 44, the structure of an elbow C5 is described. FIGS. 39 and 40 are a front view and a side view of left upper limb 3. FIGS. 41 and 42 are an enlarged front view and an enlarged side view illustrating a portion up to elbow joint 31 of left upper limb 3. FIG. 43 is a front view illustrating humanoid robot 100 when right and left elbow joints 31 are bent by 90 degrees. FIG. 44 is a plan view illustrating humanoid robot 100 when right and left elbow joints 31 are bent by 90 degrees viewing from above. Only trunk 1 and right and left upper limbs 3 are illustrated in FIGS. 43 and 44. In FIGS. 43 and 44, right upper arm 7 has moved to be far from trunk 1, left upper arm 7 has moved to come close to trunk 1, and right and left elbow joints 31 are bent by 90 degrees. As can be seen from FIG. 44, each of right and left forearm bones 8B is directed in the direction open outward with respect to the front direction of trunk 1. That is, a main bending direction of elbow joint 31 is a direction forming an angle ξ2 with the front direction (Y-axis) of trunk 1.

The front direction of upper limb 3 is a direction in which forearm bone 8B is directed when elbow joint 31 is bent by 90 degrees only in the main bending direction. When humanoid robot 100 stands upright and upper limbs 3 are directed vertically downward, the front direction of upper limb 3 is directed outward by 2 from the front direction of humanoid robot 100. For this reason, the upper limb 3 is viewed obliquely in FIG. 2 that is the front view of humanoid robot 100. In the description of upper limb 3, the front direction of upper limb 3 is set to the Y-axis direction and the direction orthogonal to the front direction of upper limb 3 is set to the X-axis direction.

Forearm 8 is connected rotatably to upper arm 7 by elbow joint 31 with two rotational degrees of freedom. Elbow joint 31 is a biaxial gimbal having a rotation axis Rz2 in the same direction as upper arm 7. In the biaxial gimbal, forearm 8 is rotated around rotation axis Rz2. Furthermore, the angle of forearm 8 with respect to upper arm 7 can be changed. In elbow joint 31, the rotation member is provided in upper arm 7, and the yoke is provided in forearm bone 8B. An elbow drive outside link 32 and an elbow drive inside link 33 are attached to upper arm 7 and forearm 8. Elbow drive outside link 32 and elbow drive inside link 33 are links having a fixed length, and are two elbow drive links. Elbow drive outside link 32 and elbow drive inside link 33 have one rotational degree of freedom at which the link can be twisted.

The attachment positions of elbow drive outside link 32 and elbow drive inside link 33 to upper arm 7 are movable. For this reason, an upper arm outside linear guide 34G and an upper arm inside linear guide 35G, which are two linear guides, are provided on both sides of humerus 7B and are parallel to humerus 7B. As illustrated in FIG. 11 and the like, a motor holder 7A holding a motor 34M of upper arm outside linear guide 34G and a motor 35M of upper arm inside linear guide 35G is provided near shoulder joint 13 of upper arm 7.

An upper arm outside link attaching unit J22, being the attachment position of elbow drive outside link 32 to upper arm 7, is moved by upper arm outside actuator 34. An upper arm inside link attaching unit J23, being the attachment position of elbow drive inside link 33 to upper arm 7, is moved by upper arm inside actuator 35. Elbow drive outside link 32 and elbow drive inside link 33 are attached to upper arm outside link attaching unit J22 and upper arm inside link attaching unit J23 with two rotational degrees of freedom, respectively. Elbow drive outside link 32 and elbow drive inside link 33 constitute a truss structure.

Referring to FIG. 41, the structure of an upper arm outside actuator 34 is described. Upper arm outside actuator 34 includes upper arm outside linear guide 34G, elbow drive outside link 32, an elbow drive outside link attaching unit J25, upper arm outside link attaching unit J22, and motor 34M. Upper arm outside linear guide 34G includes a screw rod 34A, a nut 34B, a rail 34C, and a gripper 34D in an upper arm outside frame 34F that is a frame body.

Motor 34M is disposed behind upper arm outside linear guide 34G. Consequently, upper arm outside linear guide 34G and motor 34M can be made compact. Motor 34M transmits the force to screw rod 34A by the timing belt on the side closer to shoulder joint 13, which rotates screw rod 34A. The use of the timing belt can reduce weight as compared with the case where the force is transmitted using a gear. A nut 34B including a through-hole provided with female threads engaged with male threads of screw rod 34A is movable in the length direction of screw rod 34A. A mechanism that prevents nut 34B from being rotated around screw rod 34A is provided. For this reason, nut 34B is moved along screw rod 34A when screw rod 34A is rotated. Upper arm outside link attaching unit J22 is attached to nut 34B, and upper arm outside link attaching unit J22 is also moved when nut 34B moves. Nut 34B is a moving member that is moved by upper arm outside actuator 34.

The mechanism that prevents nut 34B from being rotated around screw rod 34A includes a rail 34C provided in parallel with screw rod 34A and a gripper 34D being connected to nut 34B and sandwiching rail 34C. Gripper 34D is provided so that it has low friction with rail 34C. Because gripper 34D sandwiches rail 34C, gripper 34D and nut 34B are not rotated around screw rod 34A. Another mechanism that prevents nut 34B from being rotated around screw rod 34A may be used.

Upper arm inside actuator 35 also has the same structure as upper arm outside actuator 34. Upper arm inside actuator 35 includes upper arm inside linear guide 35G, elbow drive inside link 33, an elbow drive inside link attaching unit J24, upper arm inside link attaching unit J23, and motor 35M. Upper arm inside linear guide 35G includes a screw rod 35A, a nut 35B, a rail 35C, and a gripper 35D in an upper arm inside frame 35F being a frame body. Upper arm inside link attaching unit J23 is attached to nut 35B. Nut 35B is a moving member that is moved by upper arm inside actuator 35.

Upper arm outside frame 34F and upper arm inside frame 35F are manufactured integrally. Upper arm outside frame 34F and upper arm inside frame 35F can be made compact and high in strength by manufacturing upper arm outside frame 34F and upper arm inside frame 35F integrally. Upper arm outside frame 34F and upper arm inside frame 35F may be manufactured separately.

Rail 34C and rail 35C are both sides of the rectangular plate material. Rail 34C, rail 35C, screw rod 34A, and rail 35C are required to be arranged in parallel with one another. Upper arm outside linear guide 34G and upper arm inside linear guide 35G are required to be disposed with predetermined accuracy. It takes a lot of time to perform that work.

Gripper 35D is provided in nut 35B. Gripper 35D engages with rail 35C. Gripper 35D and rail 35C are a first rotation preventing unit to prevent nut 35B, which is the first moving member, from rotating around screw rod 35A.

Gripper 34D is provided in nut 34B. Gripper 34D engages with rail 34C. Gripper 34D and rail 34C are a second rotation preventing unit to prevent nut 34B, which is the second moving member, from rotating around screw rod 34A.

Upper arm outside link attaching unit J22 is the biaxial gimbal having the following structure. The rotation member, the yoke rotated by the rotation member, and the shaft member sandwiched rotatably by the yoke are provided in nut 34B being the moving member moved by upper arm outside actuator 34. The through-hole in which the shaft member is inserted is made at the end of elbow drive outside link 32. Upper arm inside link attaching unit J23 is also the biaxial gimbal having the same structure.

Elbow drive inside link attaching unit J24 is provided at a position having a predetermined distance from elbow joint 31 of forearm bone 8B. One end of elbow drive inside link 33 is attached rotatably to elbow drive inside link attaching unit J24 with two rotational degrees of freedom. Elbow drive inside link attaching unit J24 is the biaxial gimbal having the same structure as upper arm outside link attaching unit J22. Elbow drive outside link attaching unit J25 is provided at a position having a predetermined distance from elbow drive inside link attaching unit J24 of elbow drive inside link 33. The other end of elbow drive outside link 32 is attached rotatably to elbow drive outside link attaching unit J25 with two rotational degrees of freedom. Elbow drive outside link attaching unit J25 has a structure in which the protrusion provided on elbow drive inside link 33 are sandwiched by the yoke extending from one end of elbow drive outside link 32. The yoke of elbow drive outside link attaching unit J25 has a length enough to sandwich the protrusions when the angle formed by elbow drive outside link 32 and elbow drive inside link 33 is small. The portion in which the protrusions of elbow drive inside link 33 are provided can be rotated around elbow drive inside link 33. The yoke extending from one end of elbow drive outside link 32 sandwiches the protrusions such that the angle formed by elbow drive inside link 33 and the yoke can be changed. Elbow drive outside link attaching unit J25 has two rotational degrees of freedom including one rotational degree of freedom around the axis of elbow drive inside link 33.

At least one of upper arm outside link attaching unit J22 and elbow drive outside link attaching unit J25 may have three rotational degrees of freedom. At least one of upper arm inside link attaching unit J23 and elbow drive inside link attaching unit J24 may have three rotational degrees of freedom.

Figure 45:
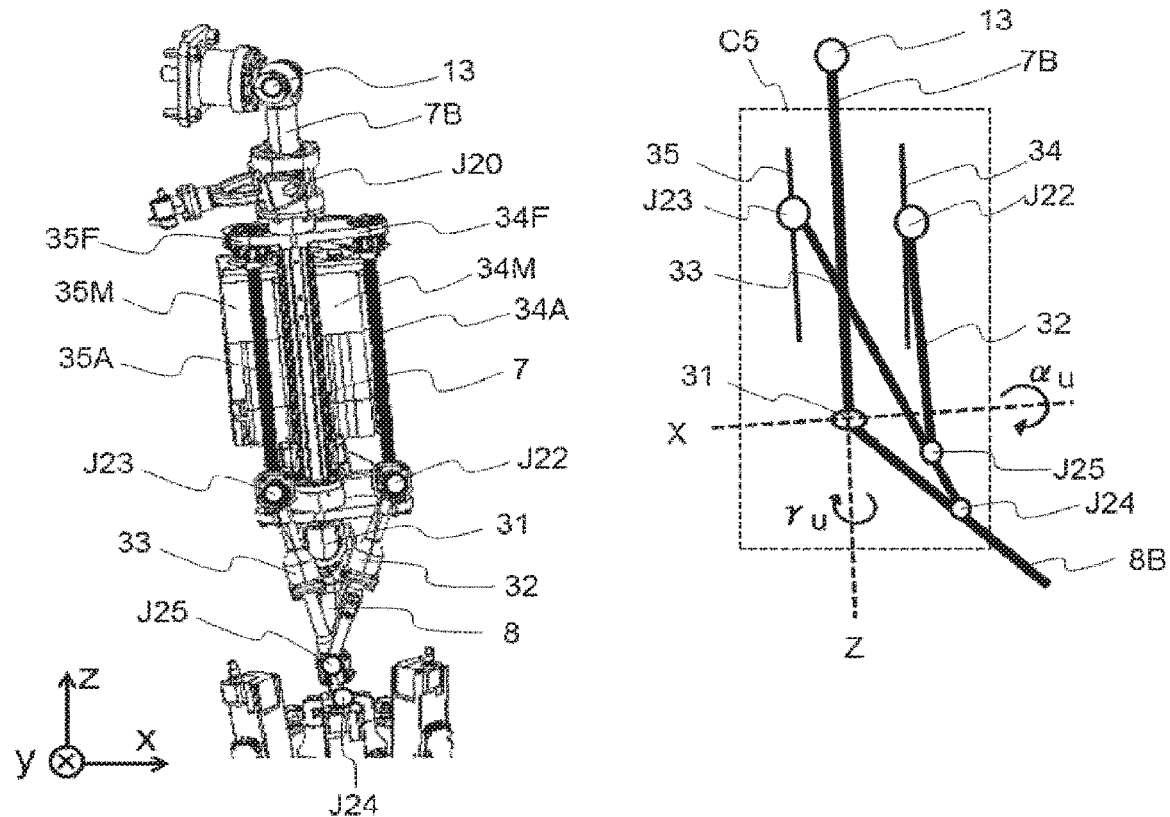
FIG. 45 is a perspective view illustrating the arrangement of links of a left elbow joint included in the humanoid robot of the first embodiment.
Figure 46:
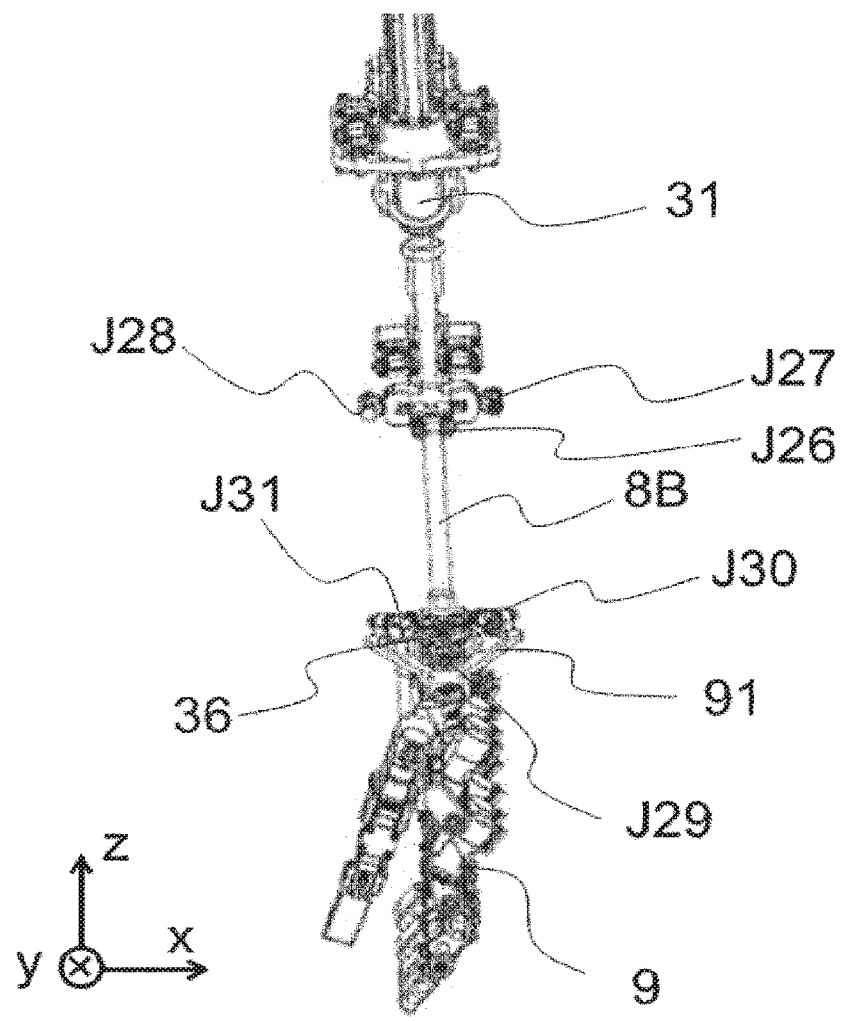
FIG. 46 is an enlarged perspective view illustrating a portion of an arm from the left elbow joint in the skeletal structure of the humanoid robot of the first embodiment.
Figure 47:
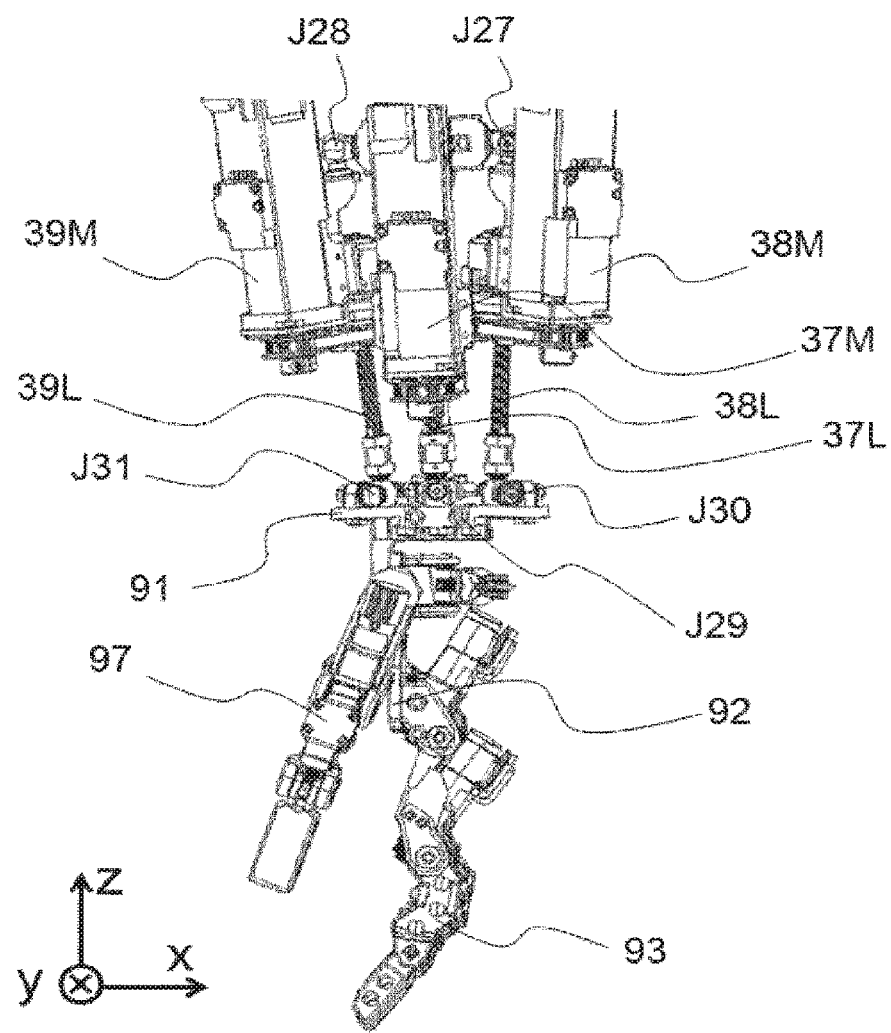
FIG. 47 is an enlarged front view illustrating the portion of the arm from the left elbow joint of the humanoid robot of the first embodiment.
Figure 48:
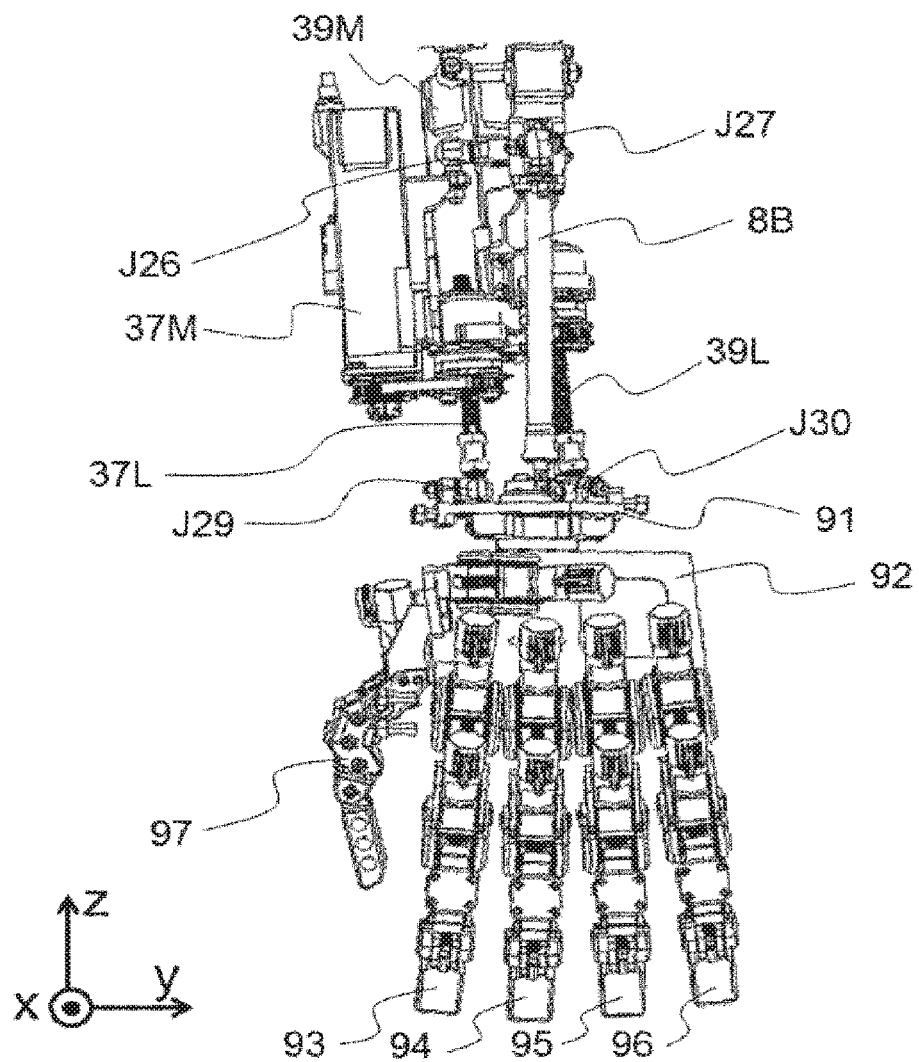
FIG. 48 is an enlarged left side view illustrating the portion of the arm from the left elbow joint of the humanoid robot of the first embodiment when an outside actuator is excluded.
Figure 49:
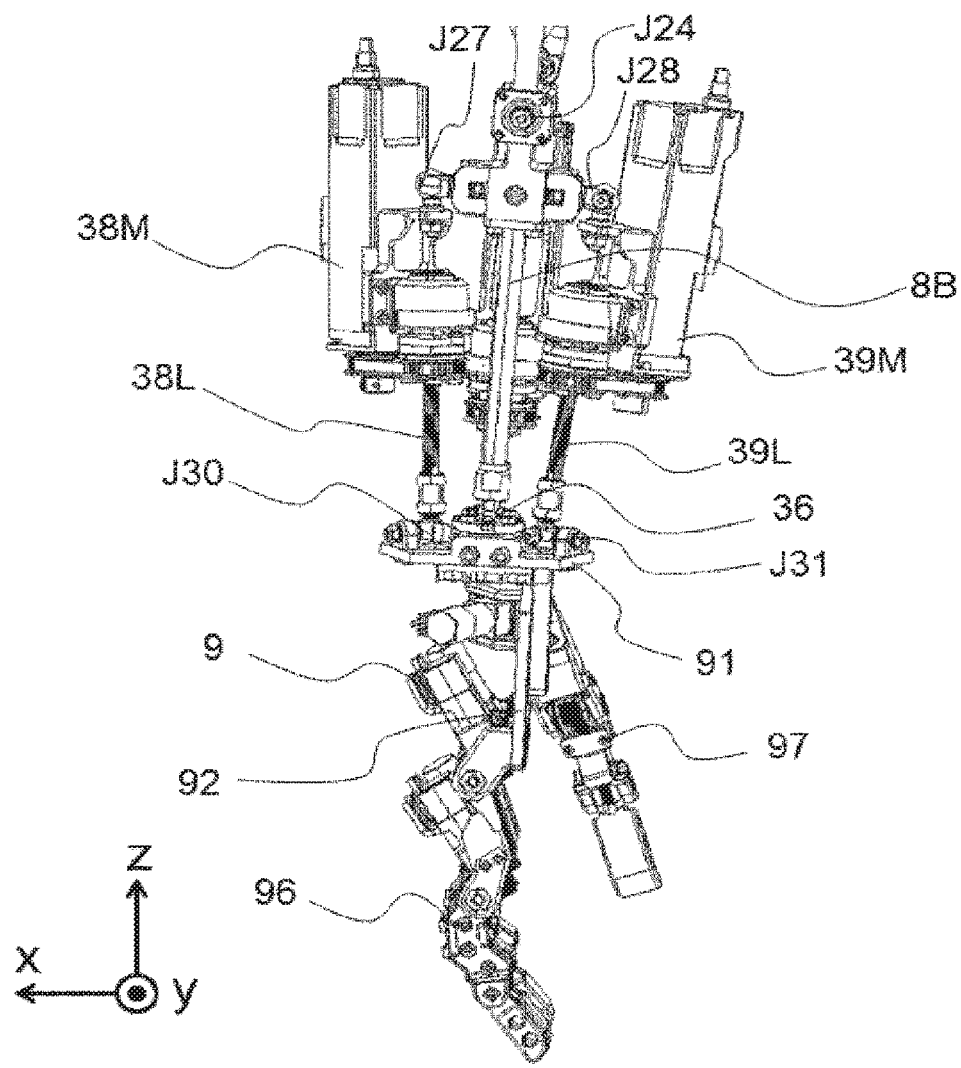
FIG. 49 is an enlarged rear view illustrating the portion of the arm from the left elbow joint of the humanoid robot of the first embodiment.

FIG. 45 is a perspective view illustrating the arrangement of the links in left elbow C5. Elbow joint 31, upper arm outside actuator 34, and upper arm inside actuator 35 are fixed to upper arm 7. Upper arm outside link attaching unit J22 is moved along humerus 7B by upper arm outside actuator 34. Upper arm inside link attaching unit J23 is moved along upper arm inside actuator 35. Elbow drive inside link attaching unit J24 provided in forearm 8 exists at a position having a predetermined distance $K_{1u}$ from elbow joint 31. Elbow drive outside link attaching unit J25 provided on elbow drive inside link 33 exists at a position having a predetermined distance $K_{2u}$ from elbow drive inside link attaching unit J24 (strictly, its rotation center). Forearm 8 is directed in the direction of elbow drive inside link attaching unit J24 located at distance $K_{1u}$ from elbow joint 31 (strictly, its rotation center). Forearm 8 can be moved with respect to upper arm 7 by changing the position of elbow drive inside link attaching unit J24.

The lengths of elbow drive inside link 33 and elbow drive outside link 32 are fixed. Upper arm outside link attaching unit J22 and upper arm inside link attaching unit J23 are moved along humerus 7B, thus the position of elbow drive inside link attaching unit J24 is moved.

Elbow C5 includes elbow joint 31, elbow drive inside link 33, elbow drive outside link 32, elbow drive inside link attaching unit J24 being the forearm-side main link attaching unit, elbow drive outside link attaching unit J25 being the elbow drive main-link-side auxiliary link attaching unit provided on elbow drive inside link 33, upper arm inside link attaching unit J23 and upper arm outside link attaching unit J22 that are two upper-arm-side link attaching units, and upper arm outside linear guide 34G and upper arm inside linear guide 35G that are two linear guides.

When both upper arm outside link attaching unit J22 and upper arm inside link attaching unit J23 are moved to come close to shoulder joint 13, elbow joint 31 is bent and the forearm 8 comes close to upper arm 7. When upper arm outside link attaching unit J22 and upper arm inside link attaching unit J23 are moved to be far from shoulder joint 13, elbow joint 31 extends and forearm 8 is moved to be far from upper arm 7. When upper arm outside link attaching unit J22 is moved to come close to shoulder joint 13, and upper arm inside link attaching unit J23 is moved to be far from shoulder joint 13, forearm 8 is directed outside. When upper arm inside link attaching unit J23 is moved to come close to shoulder joint 13, and upper arm outside link attaching unit J22 is moved to be far from shoulder joint 13, forearm 8 is directed inside.

In elbow joint 31, the angle in the plane (elbow main drive plane) including the front direction of upper limb 3 and humerus 7B can be changed from a state in which humerus 7B and forearm bone 8B become one straight line to a state in which the angle formed by humerus 7B and forearm bone 8B becomes, for example, about 70 degrees. In the plane (elbow auxiliary drive plane) perpendicular to humerus 7B, elbow joint 31 can be rotated inside and outside by, for example, about 70 degrees when elbow joint 31 is bent at right angles. When the rotation angle of elbow joint 31 in the elbow main drive plane is not the right angles (90 degrees), the rotation angle in the elbow auxiliary drive plane becomes smaller than the case of the right angles. When the rotation angle of elbow joint 31 is 180 degrees, that is, when the elbow joint 31 extends, forearm 8 cannot be rotated in the elbow auxiliary drive plane.

The mechanism that drives elbow joint 31 can be made compact by adopting a system, in which the position of the link attaching unit is moved in the upper arm while the two links having a fixed length drive elbow joint 31. When the elbow joint is driven by two variable length links, in order to rotate the elbow joint in the elbow auxiliary drive plane, the angle formed by the two links at the attaching position of the forearm is required to be greater than or equal to a predetermined angle. In order to do that, an interval between the attaching positions of the two variable length links is required to be wider than an interval between the two linear guides used in the first embodiment.

Elbow drive inside link 33 is the elbow drive main link having the fixed length. Elbow drive outside link 32 is the elbow drive auxiliary link having the fixed length. Elbow drive inside link attaching unit J24 is the forearm-side main link attaching unit being attached rotatably with one end of elbow drive inside link 33 with at least two rotational degrees of freedom. Elbow drive outside link attaching unit J25 is an elbow drive main-link-side auxiliary link attaching unit to which one end of elbow drive outside link 32 is attached rotatably with at least two rotational degrees of freedom. Upper arm inside link attaching unit J23 and upper arm outside link attaching unit J22 are two upper-arm-side link attaching units, the other ends of elbow drive inside link 33 and elbow drive outside link 32 being attached rotatably to the two upper-arm-side link attaching units with at least two rotational degrees of freedom, the two upper-arm-side link attaching units being provided in upper arm 7 to be movable along humerus 7B.

One end of elbow driving outside link 32 on the side where forearm 8 exists may be attached to forearm 8 instead of elbow drive inside link 33. In this case, two forearm-side link attaching units are provided on forearm 8. One ends of elbow drive outside link 32 and elbow drive inside link 33, which are the two elbow drive links, are attached rotatably to the two forearm-side link attaching units with at least two rotational degrees of freedom.

Nut 34B included in upper arm outside actuator 34 is a moving member that moves elbow drive outside link 32. Nut 35B included in upper arm inside actuator 35 is a moving member that moves elbow drive inside link 33. Screw rod 34A and screw rod 35A are guides that guide nut 34B and nut 35B to be moved along humerus 7B, respectively. Motor 34M is a power source that generates force changing the position of nut 34B with respect to screw rod 34A. Motor 35M is a power source that generates force changing the position of nut 35B with respect to screw rod 35A. Upper arm outside linear guide 34G is a linear guide including nut 34B, screw rod 34A, and motor 34M. Upper arm inside linear guide 35G is a linear guide including nut 35B, screw rod 35A, and motor 35M.

Elbow C5 is a rotation connecting mechanism that connects forearm 8 being the second member rotatably to upper arm 7 being the first member by the elbow joint 31. Elbow joint 31 is a joint that connects forearm 8 rotatably to upper arm 7 with two rotational degrees of freedom. Elbow C5 changes the angle of elbow joint 31 to move forearm 8 with respect to upper arm 7.

Elbow drive inside link 33 is a first link having a fixed length with five rotational degrees of freedom. Elbow drive inside link attaching unit J24 is the second-member first attaching unit provided in forearm 8 so that it has a fixed positional relationship with respect to elbow joint 31. One end of elbow drive inside link 33 is attached rotatably to elbow drive inside link attaching unit J24 with at least two rotational degrees of freedom. Upper arm inside link attaching unit J23 is the first-member first attaching unit to which the other end of elbow drive inside link 33 is attached rotatably with at least two rotational degrees of freedom. Nut 35B is the first moving member in which upper arm inside link attaching unit J23 is provided. Screw rod 35A is a first moving shaft along which nut 35B is moved. Upper arm inside linear guide 35G includes screw rod 35A of which both ends are held by upper arm inside frame 35F. Upper arm inside linear guide 35G constitutes a first guide that guides nut 35B to be moved along screw rod 35A.

Motor 35M is a power source that generates force changing the position of nut 35B with respect to screw rod 35A. A point $P_{1N}$ (illustrated in FIG. 82) is a point where a straight line passing through the center of screw rod 35A intersects with an upper end of upper arm inside frame 35F. Point $P_{1N}$ is a first reference point provided in upper arm 7 so that it has a fixed positional relationship with respect to elbow joint 31. Motor 35M rotates and screw rod 35A is rotated, which moves nut 35B along screw rod 35A. The distance between point $P_{1N}$ and elbow drive inside link attaching unit J24 is changed when nut 35B is moved. Motor 35M is a power source that generates force changing the distance between point $P_{1N}$ and elbow drive inside link attaching unit J24. Upper arm inside actuator 35 including elbow drive inside link 33, upper arm inside linear guide 35G, elbow drive inside link attaching unit J24, upper arm inside link attaching unit J23, and motor 35M is the first actuator.

Elbow drive outside link 32 is the second link having a fixed length with five rotational degrees of freedom. Elbow drive outside link attaching unit J25 is a first-link second attaching unit provided on elbow drive inside link 33 so that it has a fixed positional relationship with respect to elbow drive inside link attaching unit J24. One end of elbow drive outside link 32 is attached rotatably to elbow drive outside link attaching unit J25 with at least two rotational degrees of freedom. The rotational degree of freedom of elbow drive outside link attaching unit J25 includes one rotational degree of freedom around the axis of elbow drive inside link 33.

Upper arm outside link attaching unit J22 is the first-member second attaching unit to which the other end of elbow drive outside link 32 is attached rotatably with at least two rotational degrees of freedom. Nut 34B is the second moving member in which upper arm outside link attaching unit J22 is provided. Screw rod 34A is a second moving shaft along which nut 34B is moved. Upper arm inside linear guide 34G includes screw rod 34A of which both ends are held by upper arm inside frame 34F. Upper arm inside linear guide 34G constitutes a second guide that guides nut 34B to be moved along screw rod 34A.

Motor 34M is a power source that generates force changing the position of nut [4] 34B with respect to screw rod 34A. A point $P_{2N}$ (illustrated in FIG. 82) is a point where a straight line passing through the center of screw rod 34A intersects with the upper end of upper arm outside frame 34F. Point $P_{2N}$ is a second reference point provided in upper arm 7 having a fixed positional relationship with respect to elbow joint 31. Motor 34M rotates to rotate screw rod 34A, which moves nut 34B along screw rod 35A. The distance between point $P_{2N}$ and elbow drive outside link attaching unit J25 is changed when nut 34B is moved. Motor 34M is a power source that generates force changing the distance between point $P_{2N}$ and elbow drive outside link attaching unit J25. Upper arm outside actuator 34 including elbow drive outside link 32, upper arm outside linear guide 34G, elbow drive outside link attaching unit J25, upper arm outside link attaching unit J22, and motor 34M is the second actuator.

Referring to FIGS. 46 to 49, the structure of a wrist C6 is described. FIGS. 46, 47, 48, and 49 are an enlarged perspective view, an enlarged front view, an enlarged left side view, and an enlarged rear view illustrating a portion of the arm from left elbow joint 31 in the skeleton structure.

Hand 9 similar to a human hand is connected rotatably to forearm 8 by a wrist joint 36 with three rotational degrees of freedom. A spherical bearing holding a spherical surface provided at one end of rod-shaped forearm bone 8B rotatably is used as wrist joint 36. A member that holds the spherical surface is provided in wrist plate 91. Hand 9 can be rotated around wrist joint 36 with three rotational degrees of freedom. The angle between hand 9 and forearm bone 8B is changed when the lengths of the three actuators, namely, a forearm front actuator 37, a forearm outside actuator 38, and a forearm inside actuator 39 change. For example, hand 9 can be tilted with respect to forearm bone 8B by about 20 degrees in the direction (front direction) on the palm side of the hand, tilted by about 20 degrees in the direction (rear direction) on the back side of the hand, and tilted by about 20 degrees onto both the sides in the direction of forearm bone 8B and the direction perpendicular to the direction directed from the front toward the rear. Hand 9 can be rotated by about 70 degrees in both directions around forearm bone 8B.

Although the angle of the movable range of wrist C6 in the front direction and the rear direction is small, wrist C6 can be bent by 90 degrees together with elbow C5. In pushing the palm against a wall or the like, for example, wrist C6 is bent by 20 degrees toward the backside of the hand, and elbow C5 is bent by about 70 degrees. As a result, the palm being parallel to a vertical axis of the body is formed, and the palm being parallel to a chest surface is pushed out.

A forearm front link attaching unit J26, a forearm outside link attaching unit J27, and a forearm inside link attaching unit J28 are provided at positions having distances predetermined from wrist joint 36 of forearm 8 in order to attach one ends of a forearm front link 37L, a forearm outside link 38L, and a forearm inside link 39L to forearm 8. Forearm front link attaching unit J26 is provided on the front side of forearm 8. Forearm outside link attaching unit J27 is provided at the position forming the angle of 90 degrees with respect to forearm front link attaching unit J26 in the plane perpendicular to forearm 8. Forearm inside link attaching unit J28 is provided at the position where the angle between forearm inside link attaching unit J27 and forearm outside link attaching unit J27 becomes 180 degrees. A middle point of the line segment connecting forearm outside link attaching unit J27 and forearm inside link attaching unit J28 is matched with the center of the cross section of forearm 8.

Hand 9 includes a wrist plate 91, a plate-shaped palm plate 92, a hand 98 that connects palm plate 92 vertically to wrist plate 91, a first finger 93, a second finger 94, a third finger 95, and a fourth finger 96, which are four ordinary fingers, and an opposable finger 97. The wrist plate 91 has a hexagonal plate shape in which a long side and a short side are alternately arranged. The four ordinary fingers are connected to an opposite side to wrist plate 91 of palm plate 92. Opposable finger 97 is connected to palm plate 92 in the direction different from that of the four ordinary fingers, and can be moved to the position opposed to the ordinary fingers. Wrist plate 91 is connected to forearm bone 8B with wrist joint 36 interposed therebetween. The four ordinary fingers are aligned in almost the same direction.

Hand 9 resembles a human hand. Opposable finger 97 corresponds to a thumb, and first finger 93, second finger 94, third finger 95, and fourth finger 96 correspond to an index finger, a middle finger, a ring finger, and a little finger, respectively.

In palm plate 92, the surface existing on the side where the finger is bent is referred to as the palm side, and the opposite surface is referred to as the backside of the hand. In the hand, the palm side is referred to as the front, the backside of the hand is referred to as the rear. In the plane parallel to palm plate 92, the direction in which the ordinary finger extends is referred to as a fingertip direction. The fingertip direction is a direction from the wrist toward a fingertip. The direction orthogonal to the fingertip direction is referred to as a hand breadth direction.

Forearm front link attaching unit J26 is the biaxial gimbal in which the shaft member provided at one end of forearm front link 37L is held rotatably by the yoke that is rotated by the rotation member protruding on the front side of forearm 8. Forearm outside link attaching unit J27 and forearm inside link attaching unit J28 are also the biaxial gimbal having the same structure. The direction from the front to the rear of forearm 8 is substantially parallel to the direction in which first finger 93 to fourth finger 96 are arranged in hand 9.

In forearm front link 37L, the force generated by a motor 37M is transmitted to a nut 37B by a timing belt provided on the side where hand 9 exists. Forearm front link 37L is attached to forearm front link attachment J26 using a link attachment 37N extending in L-shape from between the cylinder of the variable length link and the motor. One end of the motor exists at a position closer to elbow joint 31 than the attachment position on one side. Forearm outside link 38L and forearm inside link 39L have the same structure.

The state in which wrist plate 91 is perpendicular to forearm bone 8B while opposable finger 97 exists in the front direction of upper limb 3 is the reference state of hand 9. A hand-side front link attaching unit J29, a hand-side outside link attaching unit J30, and a hand-side inside link attaching unit J31 are provided on the surface on the side where forearm 8 of wrist plate 91 exists in order to attach the other ends of forearm front link 37L, forearm outside link 38L, and forearm inside link 39L to wrist plate 91.

Hand-side front link attaching unit J29, hand-side outside link attaching unit J30, hand-side inside link attaching unit J31, and wrist joint 36 exist on a same plane. Hand-side front link attaching unit J29, hand-side outside link attaching unit J30, and hand-side inside link attaching unit J31 are arranged at positions constituting an equilateral triangle. Wrist joint 36 is located at a center of gravity of the equilateral triangle. Consequently, wrist joint 36 exists on a bisector of the line segment connecting the hand-side outside link attaching unit J30 and the hand-side inside link attaching unit J31. Hand-side front link attaching unit J29 exists in the reference state on the plane determined by forearm bone 8B and forearm front link attaching unit J26.

Hand-side front link attaching unit J29 is the biaxial gimbal in which the shaft member provided at one end of forearm front link 37L is held rotatably by the yoke that is rotated by the rotation member protruding in the direction of the wrist joint 36 from the protrusion provided on the surface of the wrist plate 91 on the side of forearm 8. Hand-side outside link attaching unit J30 and hand-side inside link attaching unit J31 are also the biaxial gimbal having the same structure.

One ends of forearm front link 37L, forearm outside link 38L, and forearm inside link 39L are attached rotatably to hand-side front link attaching unit J29, hand-side outside link attaching unit J30, and hand-side inside link attaching unit J31 with two rotational degrees of freedom, respectively. The other ends of forearm front link 37L, forearm outside link 38L, and forearm inside link 39L are attached rotatably to forearm-side front link attaching unit J26, forearm-side outside link attaching unit J27, and forearm-side inside link attaching unit J28 with two rotational degrees of freedom, respectively.

Wrist C6 is a three-rotational-degree-of-freedom connection mechanism that connects hand 9 being the second member rotatably to forearm 8 being the first member with three rotational degrees of freedom. Wrist C6 includes wrist joint portion 36 being the joint, forearm front link 37L, forearm outside link 38L, and forearm inside link 39L, being three variable length links, forearm front link attaching unit J26, forearm outside link attaching unit J27, and forearm inside link attaching unit J28, being three first-member-side link attaching units, and hand-side front link attaching units J29, hand-side outside link attaching unit J30, and hand-side inside link attaching unit J31, being three second-member-side link attaching units.

Forearm bone 8B is a torsion axis in which the direction is fixed with respect to forearm 8 being the first member. In forearm bone 8B, the angle with respect to hand 9 can be changed. The relative positional relationships with wrist joint 36 are fixed in forearm front link attaching unit J26, forearm outside link attaching unit J27, and forearm inside link attaching unit J28. The relative positional relationships with wrist joint 36 are also fixed by wrist plate 91 in hand-side front link attaching unit J29, hand-side outside link attaching unit J30, and hand-side inside link attaching unit J31, being the link attaching units provided in hand 9 being the second member.

Figure 50:
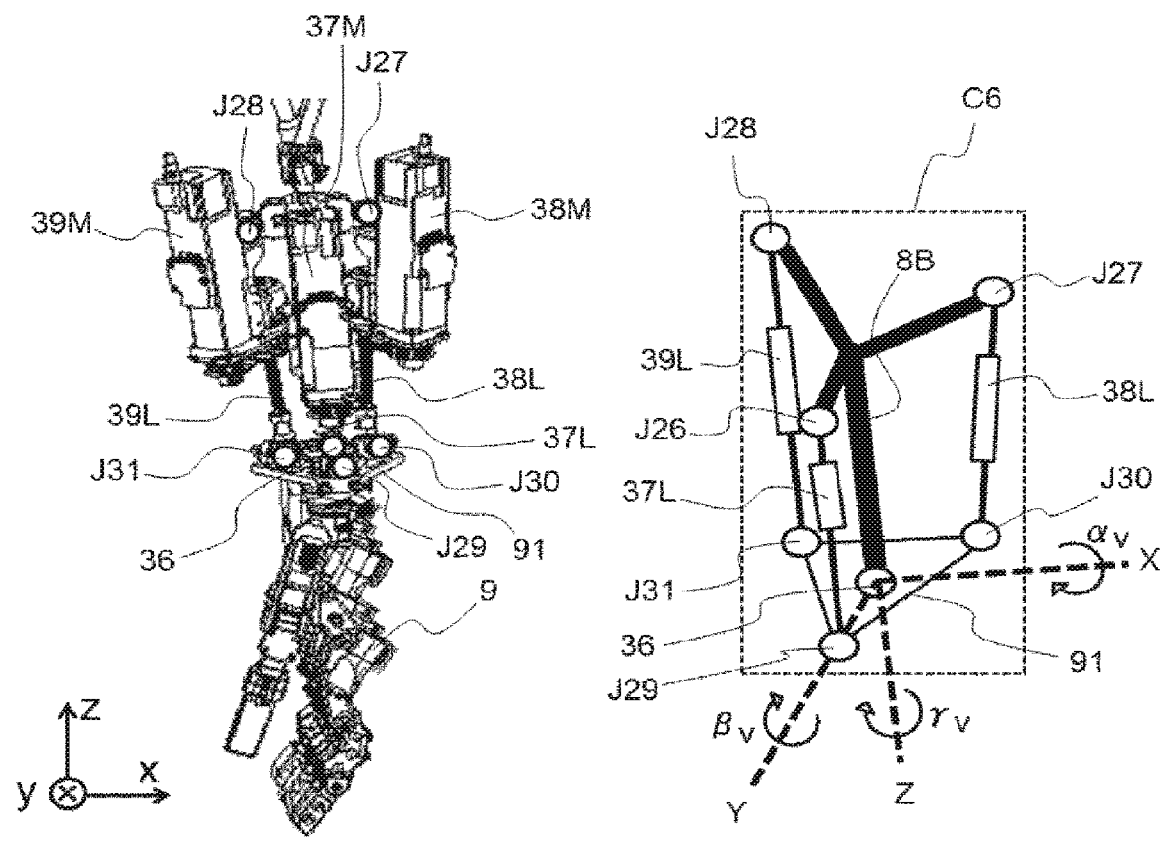
FIG. 50 is a perspective view illustrating the arrangement of the variable length links in a left wrist included in the humanoid robot of the first embodiment.

The arrangement of the variable length links in wrist C6 is described. FIG. 50 is a perspective view illustrating the arrangement of the variable length links in left wrist C6. Wrist C6 includes three variable length links 37L, 38L, 39L connecting three first-member-side link attaching units J26, J27, J28 and three second-member-side link attaching units J29, J30, J31, respectively. Consequently, the connection angle of hand 9 to forearm bone 8B can be changed with three rotational degrees of freedom by changing the lengths of three variable length links 37L, 38L, 39L. It is assumed that αv is the rotation angle of wrist joint 36 around the X-axis, that βv is the rotation angle around the Y-axis, and that γv is the rotation angle around the Z-axis.

Wrist joint 36 is located on the link attaching plane determined by second-member-side link attaching units J29, J30, and J31. Consequently, wrist joint 36 is also the torsion center being the intersection point of the link attachment plane and torsion axis 8. A second-member triangle T3 is an equilateral triangle. Wrist joint 36 exists at the position of the center of gravity of second-member triangle T3. Second-member-side link attaching units J30, J31 are symmetrically arranged with respect to the straight line passing second-member-side link attaching unit J29 and the torsion center.

Figure 51:
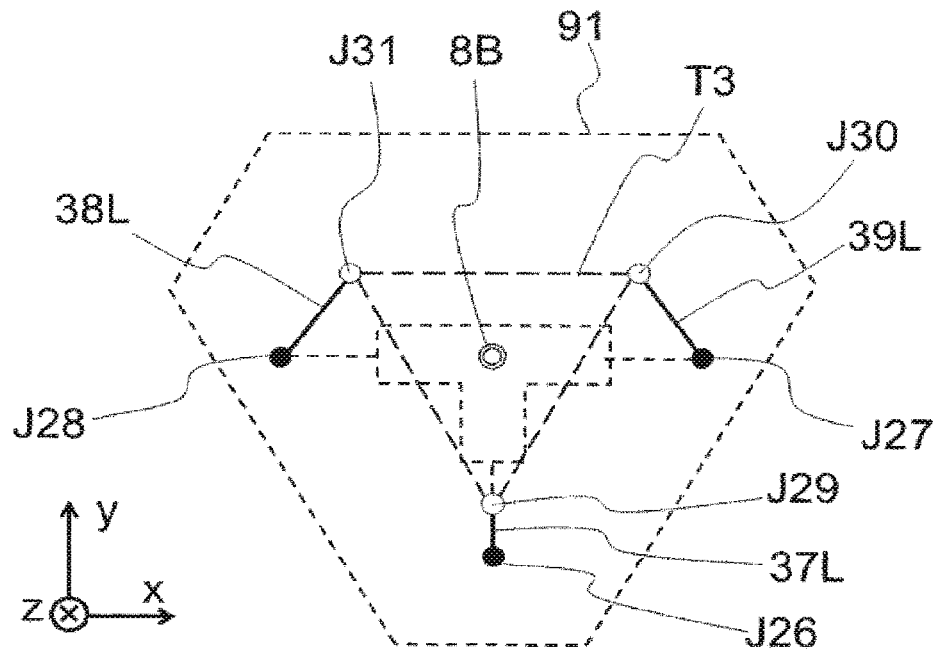
FIG. 51 is a view illustrating the arrangement of the variable length links in the reference state of the left wrist included in the humanoid robot of the first embodiment viewing from the direction in which a forearm extends.

FIG. 51 is a view illustrating the arrangement of the variable length links in left wrist C6 in the reference state viewing from the direction in which the forearm extends. In the reference state, variable length links 38L, 39L have the twisted relationship with torsion axis 8. A tilt angle θv1 formed between the link reference plane including first-member-side link attaching unit J26 of variable length link 37L and torsion axis 8 and variable length link 37L is zero degree. Tilt angles θv2, θv3 of variable length links 38L, 39L are about 8.1 degrees. In the reference state, a maximum value θvmax of the tilt angles of three variable length links 37L, 38L, 39L is about 8.1 degrees, and is greater than or equal to δ0 (for example, about 3 degrees). The torque rotating around torsion axis 8 is generated in the case that the lengths of variable length links 38L, 39L are changed.

Figure 52:
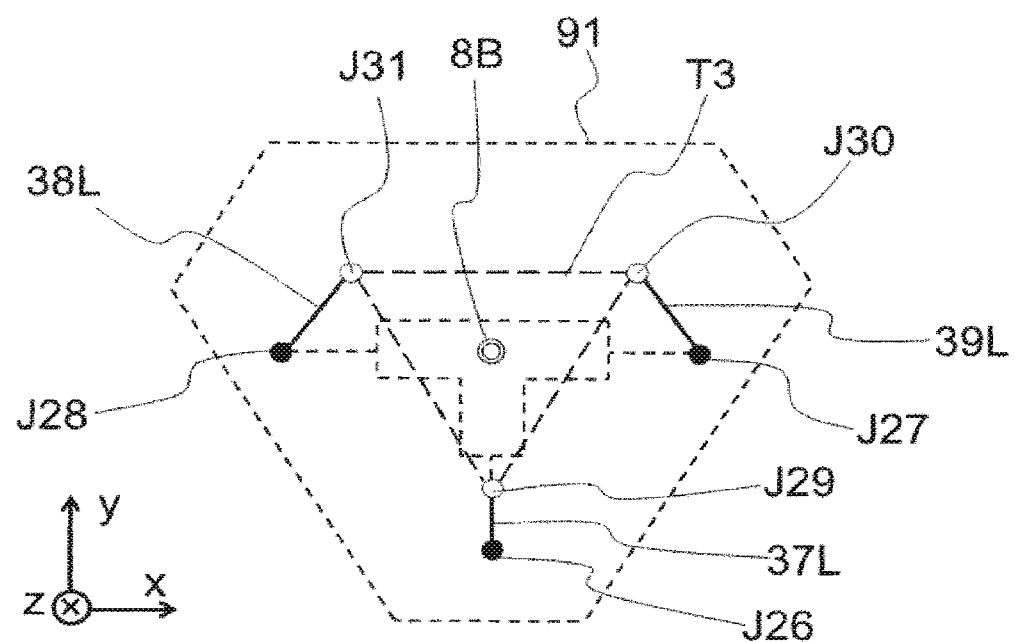
FIG. 52 is a view illustrating the arrangement of the variable length links when the left wrist included in the humanoid robot of the first embodiment is tilted toward a fourth finger side viewing from the direction in which the forearm extends.

When hand 9 is tilted or twisted within the movable range with respect to forearm bone 8B, at least one of three variable length links 37L, 38L, 39L has the twisted relationship with torsion axis 8, and maximum value θvmax of the tilt angle is greater than or equal to δ0. In the reference state, variable length link 37L is located on the same plane as torsion axis 8, and variable length links 38L, 39L has the twisted relationship with torsion axis 8. To decrease both tilt angles θv2, θv3 of variable-length links 38L, 39L, hand 9 is tilted toward the side of fourth finger 96. When hand 9 is tilted toward the side of fourth finger 96, variable length link 37L exists on the same plane as torsion axis 8. FIG. 52 is a view illustrating the arrangement of the variable length links with left wrist C6 tilted toward the side of fourth finger 96 when the arrangement of the variable length links is viewed from the direction in which forearm bone 8B extends. In FIG. 52, hand 9 is tilted by 20 degrees toward the side of fourth finger 96. Tilt angles θv2, θv3 of variable length links 38L, 39L are about 7.4 degrees. In the case in that wrist C6 is tilted in the direction to the palm or the backside of the hand, and in the case in that wrist C6 is rotated around torsion axis 8, one of tilt angles θv2, θv3 of variable length links 38L, 39L is increased, and the other is decreased.

Figure 53:
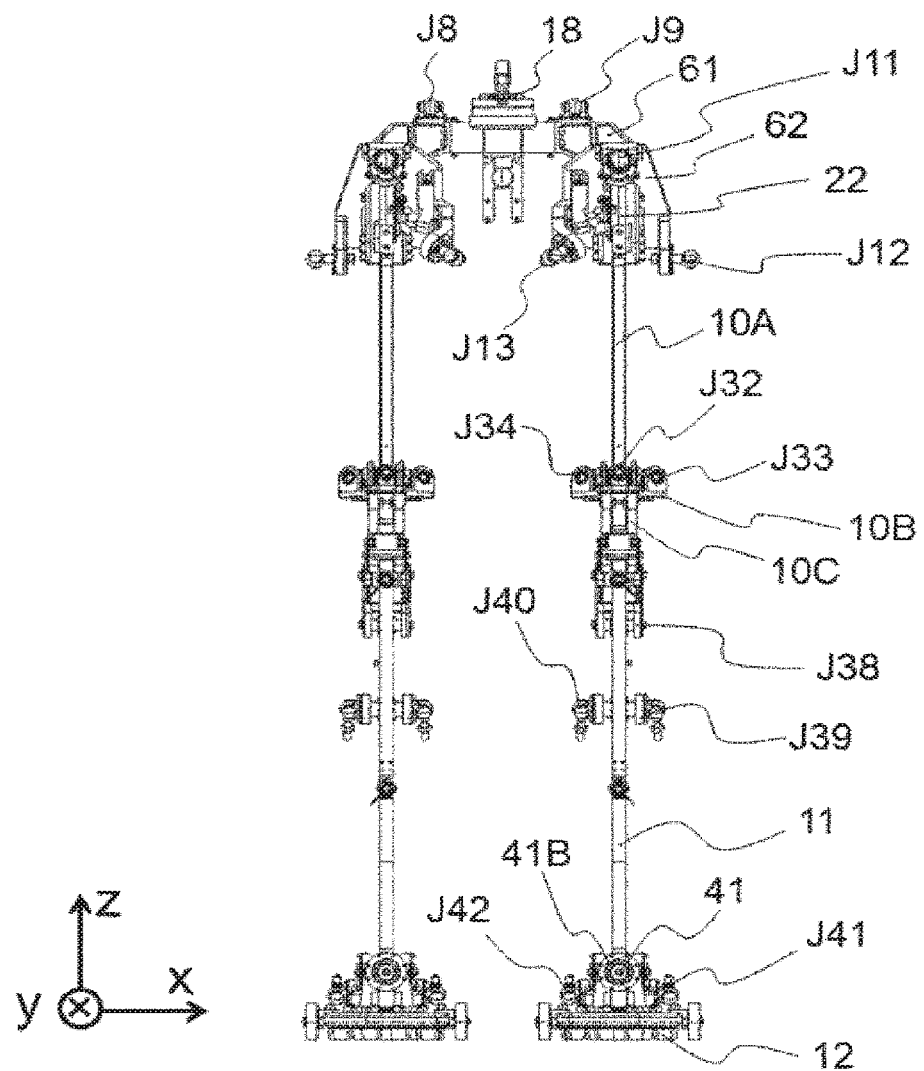
FIG. 53 is a front view illustrating a portion below a waist in the skeleton structure of the humanoid robot of the first embodiment.
Figure 54:
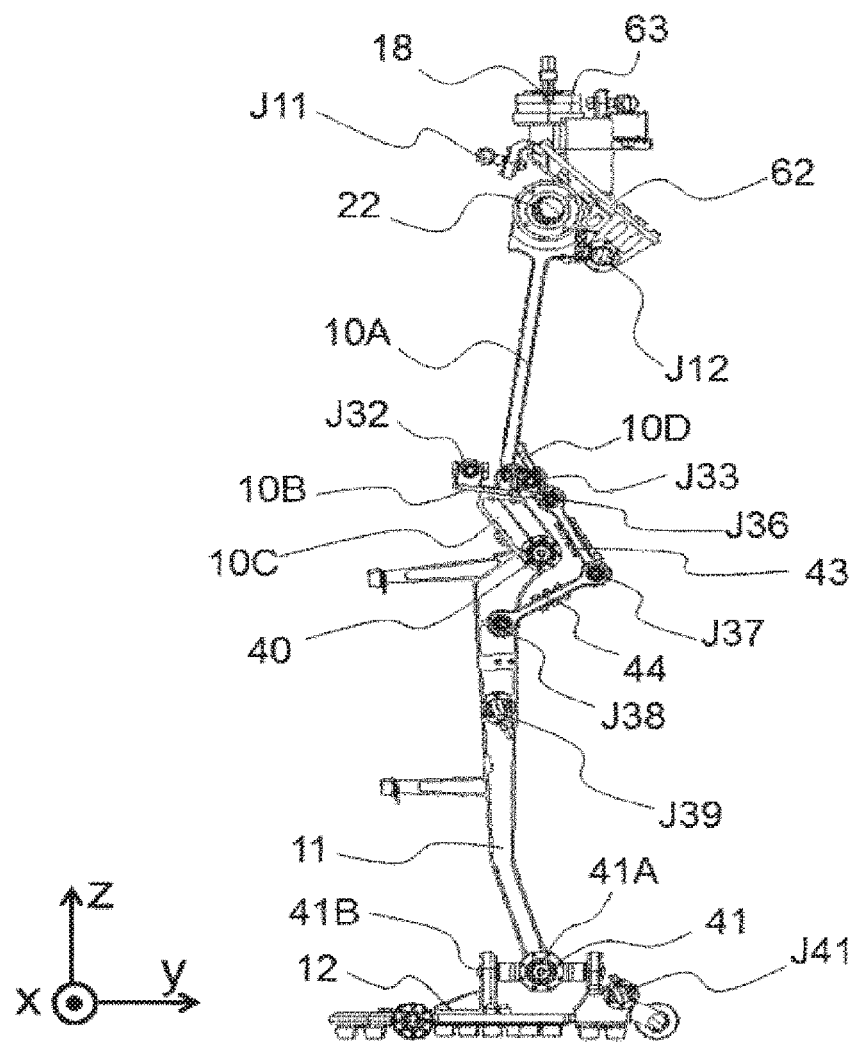
FIG. 54 is a left side view illustrating the portion below the waist in the skeleton structure of the humanoid robot of the first embodiment.
Figure 55:
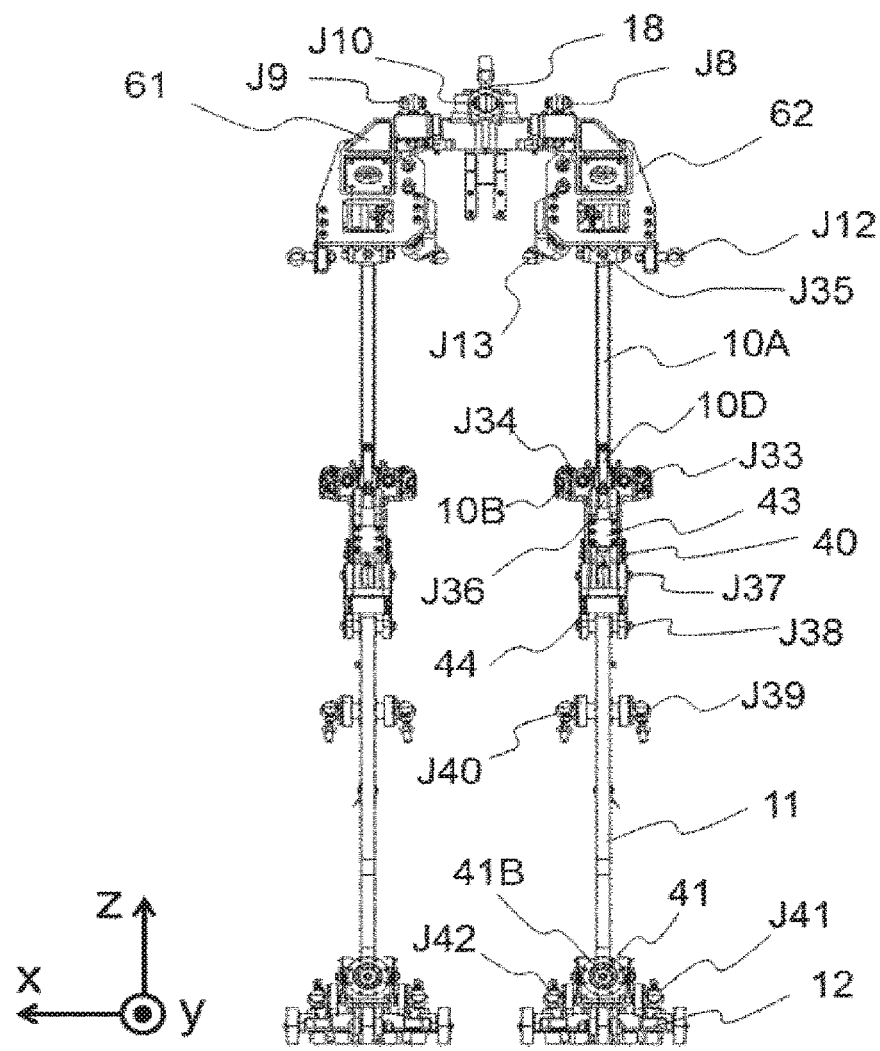
FIG. 55 is a rear view illustrating the portion below the waist in the skeleton structure of the humanoid robot of the first embodiment.
Figure 56:
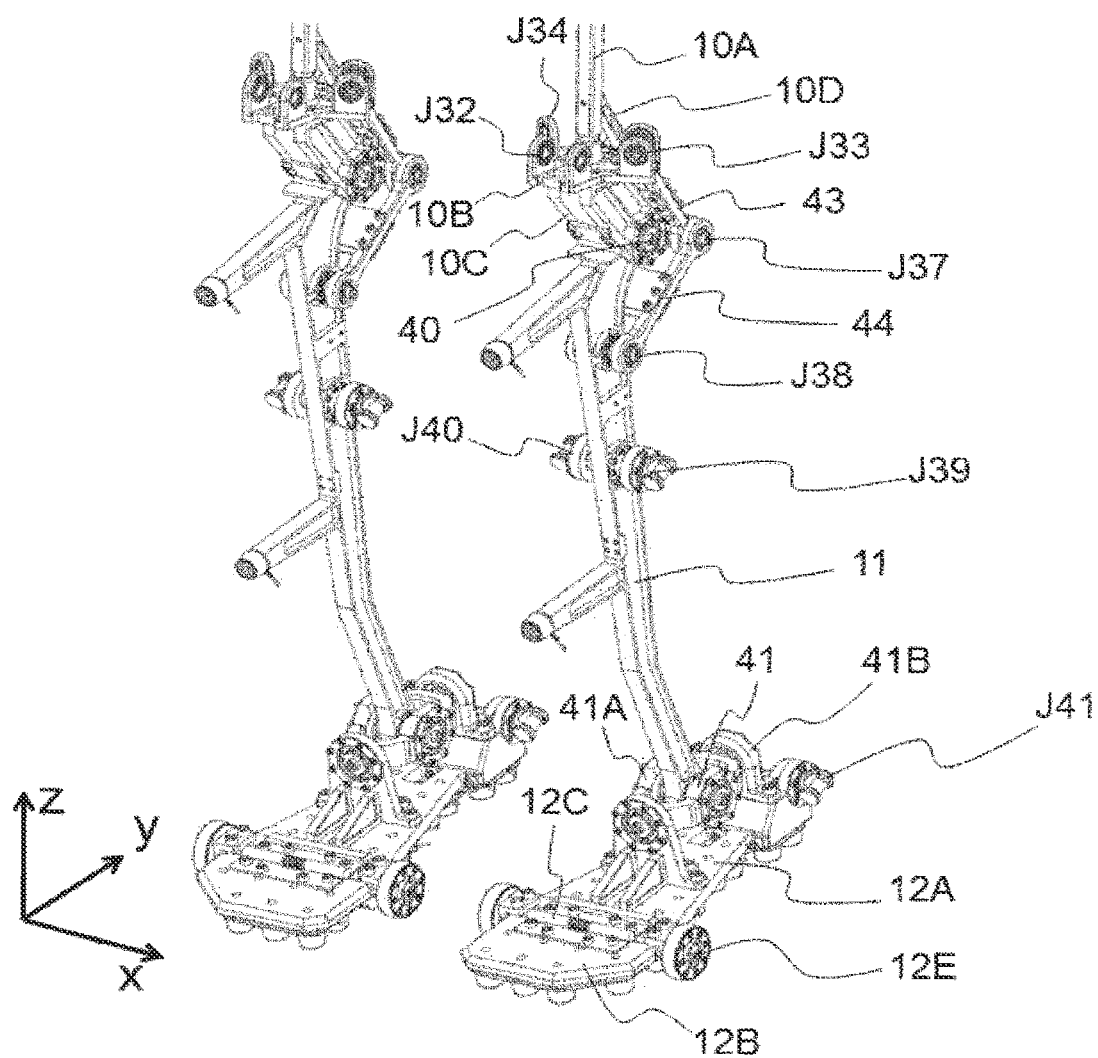
FIG. 56 is a perspective view illustrating the portion below the knee joint in the skeleton structure of the humanoid robot of the first embodiment.
Figure 57:
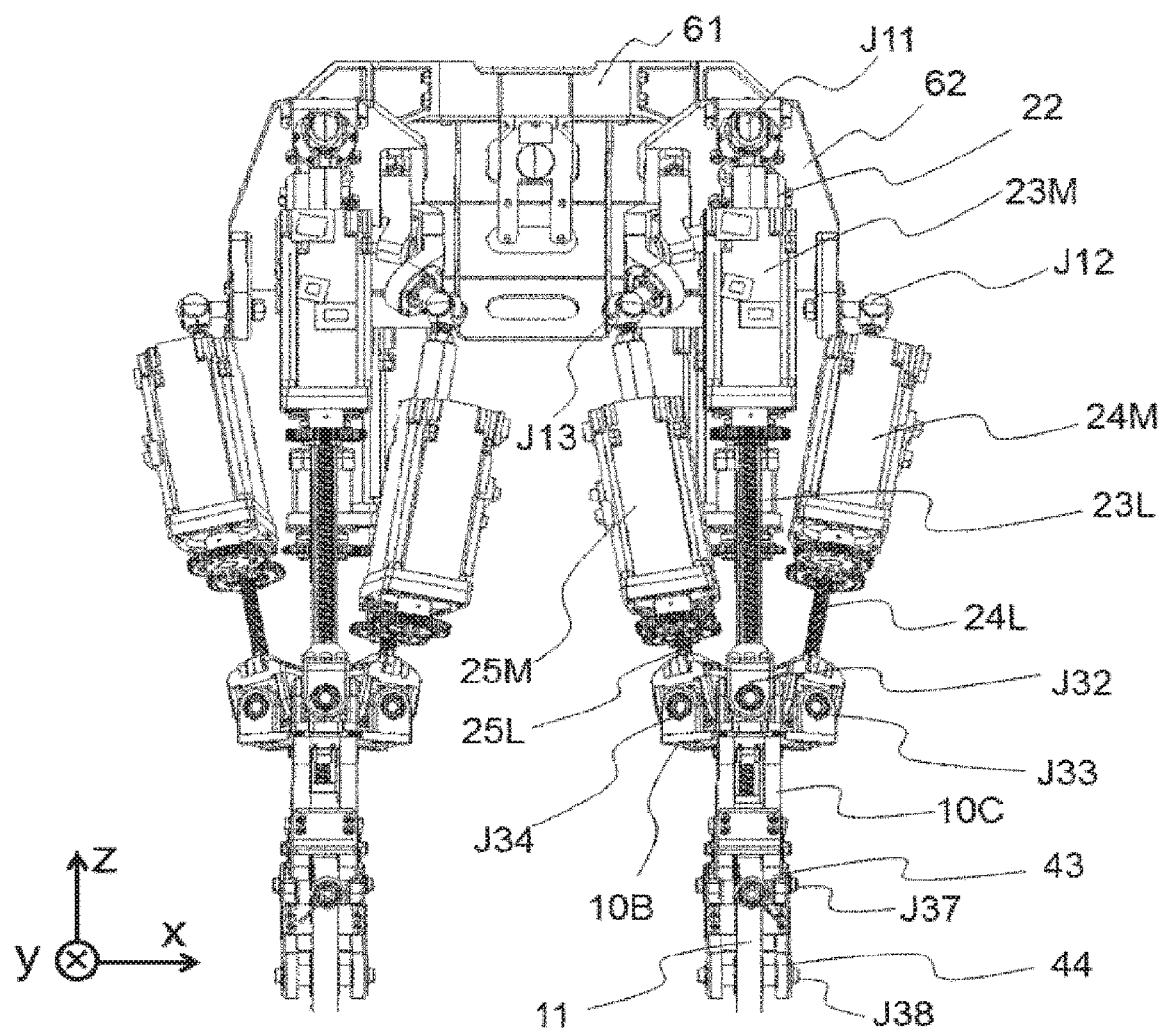
FIG. 57 is an enlarged front view illustrating a thigh of the humanoid robot of the first embodiment.
Figure 58:
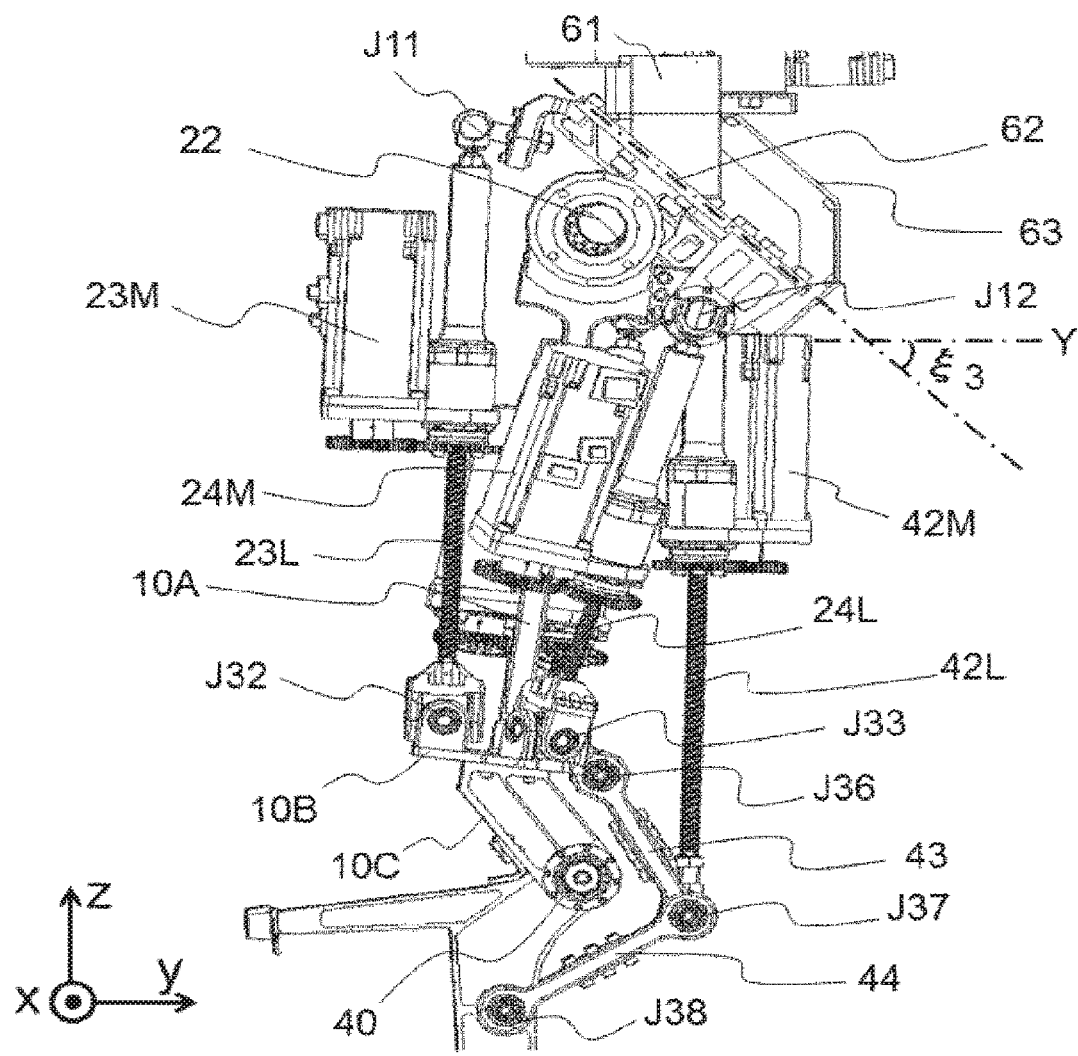
FIG. 58 is an enlarged left side view illustrating the thigh of the humanoid robot of the first embodiment.
Figure 59:
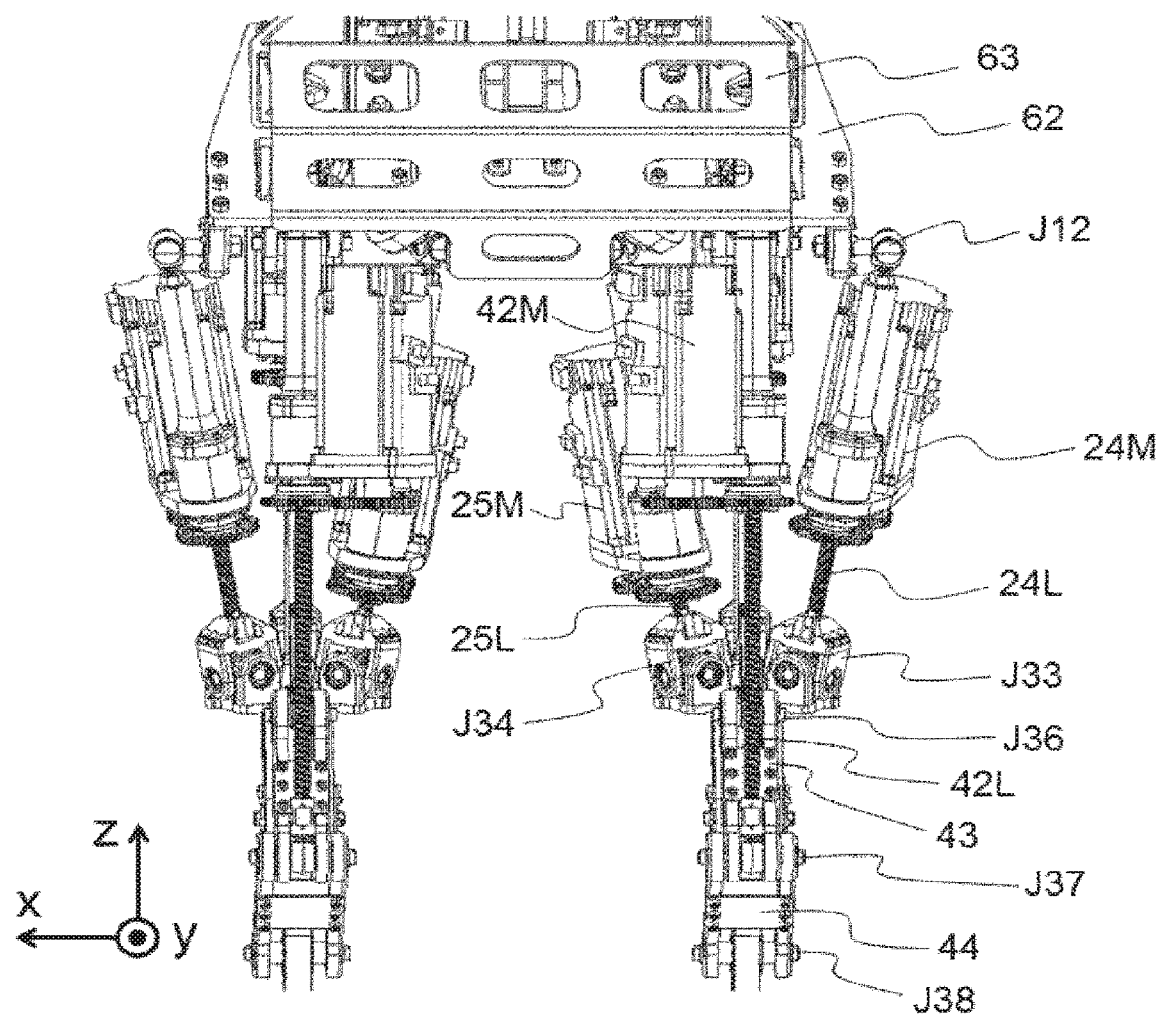
FIG. 59 is an enlarged rear view illustrating the thigh of the humanoid robot of the first embodiment.
Figure 60:
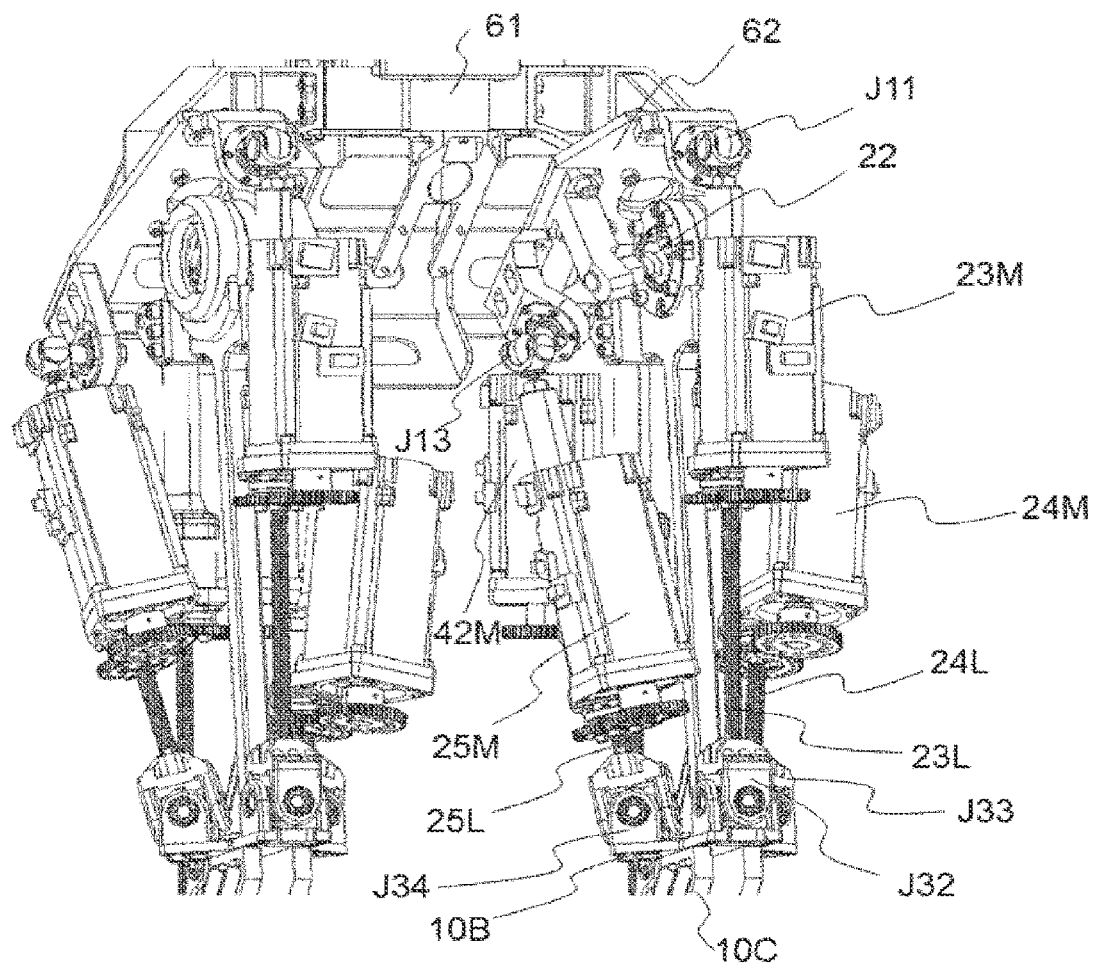
FIG. 60 is a perspective view illustrating the thigh of the humanoid robot of the first embodiment viewing from a front oblique right.
Figure 61:
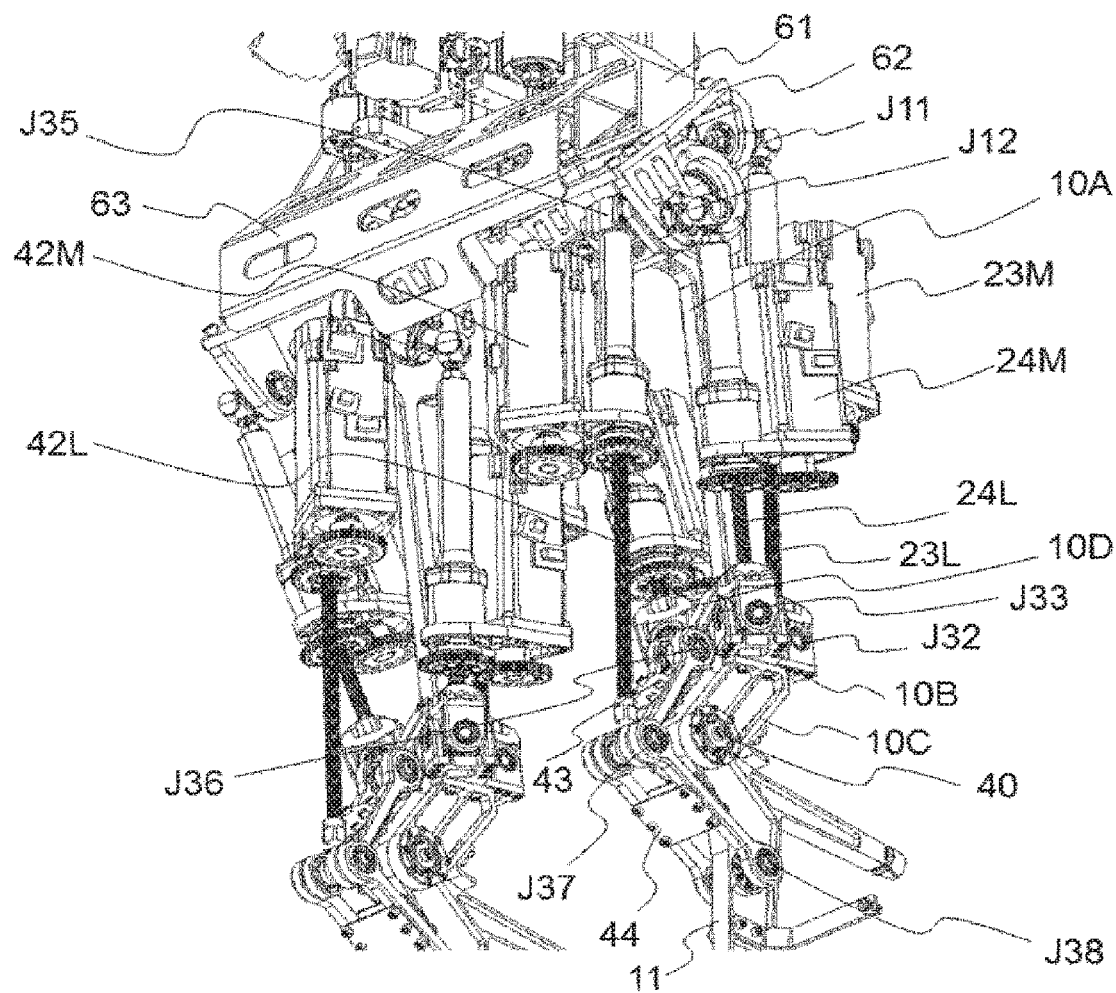
FIG. 61 is a perspective view illustrating the thigh of the humanoid robot of the first embodiment viewing from a rear oblique right.

Referring to FIGS. 11, 21, 22, and 53 to 61, the structure of a crotch C7 that moves thigh 10 with respect to waist 6 is described. FIGS. 53, 54, and 55 are a front view, a left side view, and a rear view of a portion below the waist in the skeleton structure. FIG. 56 is a perspective view illustrating a portion below a knee joint 40 in the skeleton structure. FIGS. 57, 58, and 59 are an enlarged front view, an enlarged left side view, and an enlarged rear view of the thigh. FIG. 60 is a perspective view illustrating the thigh viewing from the front oblique right. FIG. 61 is a perspective view illustrating the thigh viewing from the rear oblique right.

As illustrated in FIG. 53, in the reference state, crotch front link attaching unit J11 exists on the straight line being viewed from the front, passing through thigh 10, and being extended to the upper side than hip joint 22. Crotch outside link attaching unit J12 protrudes horizontally outward. Crotch inside link attaching unit J13 protrudes obliquely forward and downward on the inside. In the reference state, hip joint 22, knee joint 40, and an ankle joint 41 exist on the same straight line viewed from the front. As illustrated in FIG. 58, lower limb connecting frame 62 on the flat plate is tilted at an angle ξ3 (about 45 degrees) with respect to the horizontal plane (XY-plane), and the front side is high. For this reason, the plane determined by crotch front link attaching unit J11, crotch outside link attaching unit J12, and crotch inside link attaching unit J13 faces obliquely forward and downward.

Thigh 10 includes a rod-shaped thighbone 10A, a knee-side link attaching plate 10B provided perpendicular to thighbone 10A, and a knee connecting frame 10C being two frames connecting knee-side link attaching plate 10B and knee joint 40. Knee connecting frame 10C is tilted with respect to thighbone 10A and connected to knee-side link attaching plate 10B such that knee joint 40 is located behind thighbone 10A. One ends of the three variable length links that rotate hip joint 22 with three rotational degrees of freedom are attached to the three link attaching units provided on knee-side link attaching plate 10B. Knee joint 40 exists behind thighbone 10A, which allows hip joint 22, knee joint 40, and ankle joint 41 to exist easily on the vertical line viewing from the front.

Thigh front link 23L, thigh outside link 24L, and thigh inside link 25L are attached to a knee front link attaching unit J32, a knee outside link attaching unit J33, and a knee inside link attaching unit J34, being provided on knee-side link attaching plate 10B that is perpendicular to thigh 10. Knee-side link attaching plate 10B has a shape in which three rectangles connected on the center side extend in the directions each of which has an angle of 120 degrees. The rectangle provided with the knee front link attaching unit J32 exists on the front side of thigh 10.

Knee front link attaching unit J32 has a structure that allows rotation with two rotational degrees of freedom using a cross member in which two cylinders are joined into a cross shape. The yoke that holds rotatably one of the cylinders of the cross member is provided on knee-side link attaching plate 10B. The yoke that holds rotatably the other cylinder of the cross member is provided at one end of thigh front link 23L.

Knee outside link attaching unit J33 and knee inside link attaching unit J34 have the same structure as knee front link attaching unit J32.

Crotch C7 is a three-degree-of-freedom connection mechanism that connects thigh 10 being the second member rotatably to waist 6 being the first member with three rotational degrees of freedom. Crotch C7 includes hip joint 22 being the joint, thigh front links 23L, thigh outside link 24L, and thigh inside link 25L that are three variable length links, crotch front link attaching unit J11, crotch outside link attaching unit J12, and crotch inside link attaching unit J13 that are three first-member-side link attaching unit, and knee front link attaching units J32, knee outside link attaching unit J33, and knee inside link attaching unit J34 that are three second-member-side link attaching units.

The direction of thighbone 10A being the torsion axis is fixed with respect to thigh 10. The angle between thighbone 10A and waist 6 can be changed. In crotch front link attaching unit J11, crotch outside link attaching unit J12, and crotch inside link attaching unit J13, the positional relationships with respect to hip joint 22 are fixed by lower limb connecting frame 62. The relative positional relationships with hip joint 22 are also fixed by thighbone 10A and knee-side link attaching plate 10B in knee front link attaching unit J32, knee outside link attaching unit J33, and knee inside link attaching unit J34.

Figure 62:
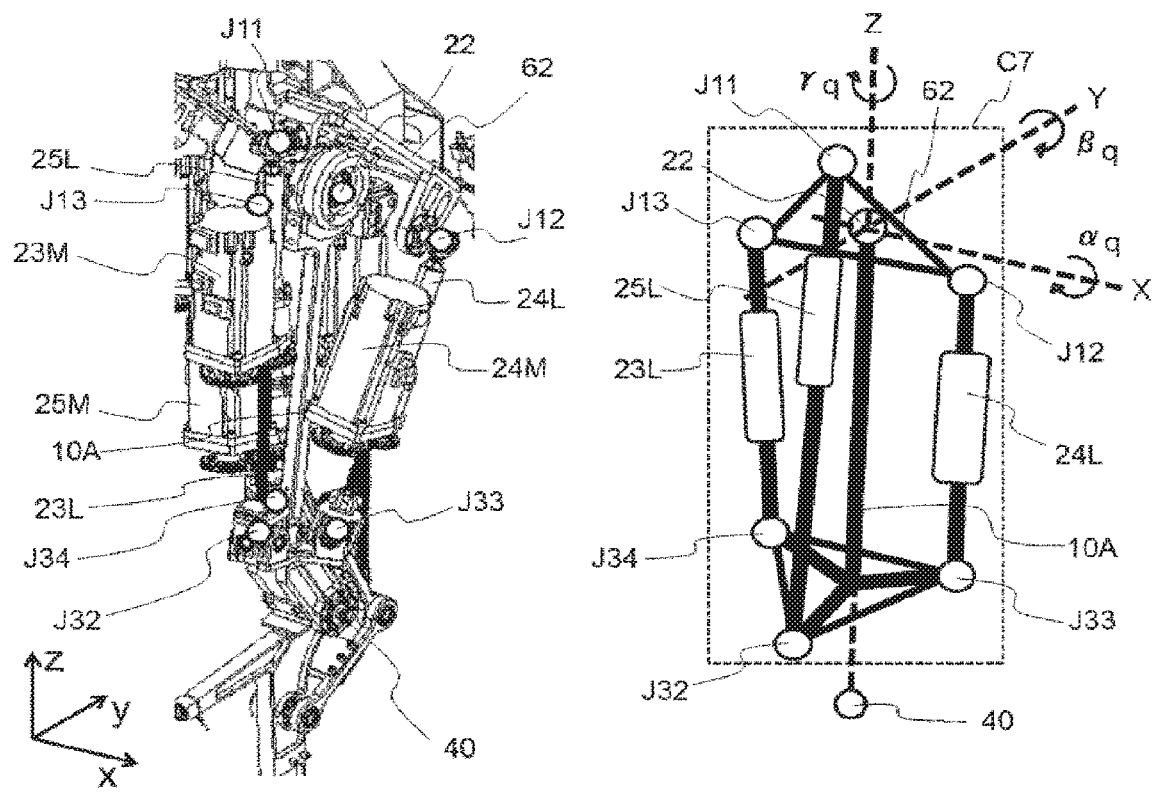
FIG. 62 is a perspective view illustrating the arrangement of the variable length links in a left crotch of the humanoid robot of the first embodiment.

The arrangement of the variable length links that move hip joint 22 is described. FIG. 62 is a perspective view illustrating the arrangement of the variable length links in crotch C7. Crotch C7 includes three variable length links 23L, 24L, 25L connecting three first-member-side link attaching units J11, J12, J13 and three second-member-side link attaching units J32, J33, J34, respectively. For this reason, the connection angle of thigh 10 to waist 6 can be changed with three rotational degrees of freedom by changing the lengths of three variable length links 23L, 24L, 25L. It is assumed that $αq$ is the rotation angle around the X-axis of hip joint 22, that $βq$ is the rotation angle around the Y-axis, and that $γq$ is the rotation angle around the Z axis.

In crotch C7, thigh 10 can be raised forward by, for example, about 90 degrees, and raised rearward by, for example, 10 degrees. In the right and left direction, thigh 10 can be moved inside by, for example, about 10 degrees, and moved outside by, for example, about 30 degrees. Further, around thighbone 10A, thigh 10 can be twisted and rotated outside (crotch opening direction) by, for example, about 20 degrees, and twisted and rotated inside by, for example, about 10 degrees.

Figure 63:
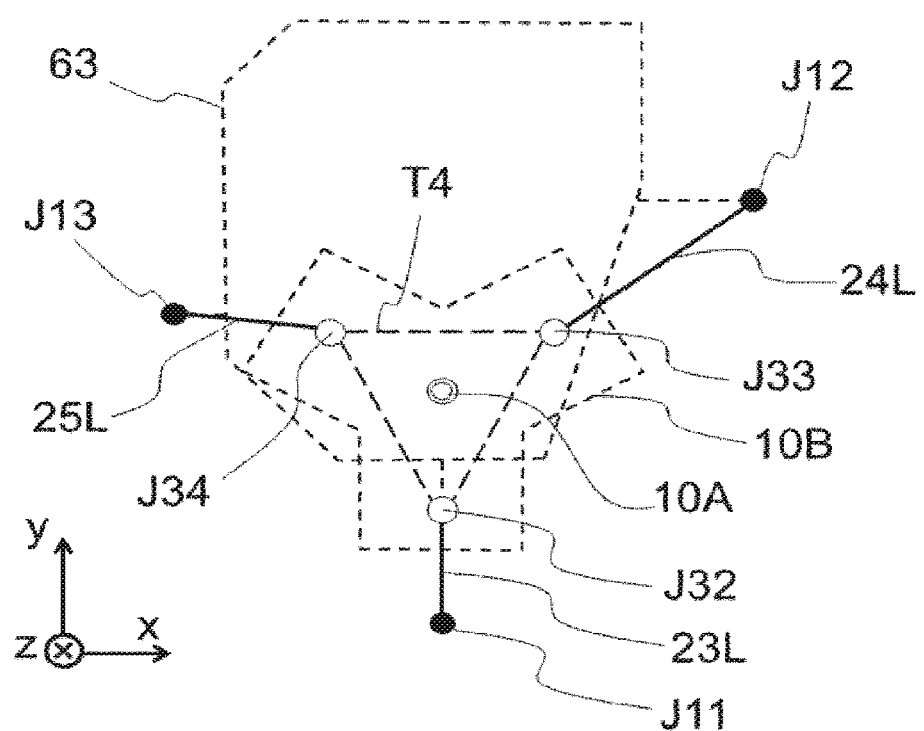
FIG. 63 is a view illustrating the arrangement of the variable length links in the reference state of the left crotch of the humanoid robot of the first embodiment viewing from the direction in which a thighbone extends.

FIG. 63 is a view illustrating the arrangement of the variable length links in left crotch C7 viewing from the direction in which the thighbone extends. In the reference state, variable length links 24L, 25L and torsion axis 10A have the twisted relationship. A tilt angle $θq1$ formed between the link reference plane including second-member-side link attaching unit J32 of variable length link 23L and torsion axis 10A and variable length link 23L is zero degree. A tilt angle $θq2$ of variable length link 24L is about 1.9 degrees. A tilt angle $θq3$ of variable length link 25L is about 3.9 degrees. A maximum value $θqmax$ of the tilt angles of three variable length links 23L, 24L, 25L is greater than or equal to $δ0$ (for example, about 3 degrees). The torque rotating around torsion axis 10A is generated in the case that the lengths of variable length links 24L, 25L are changed.

Figure 64:
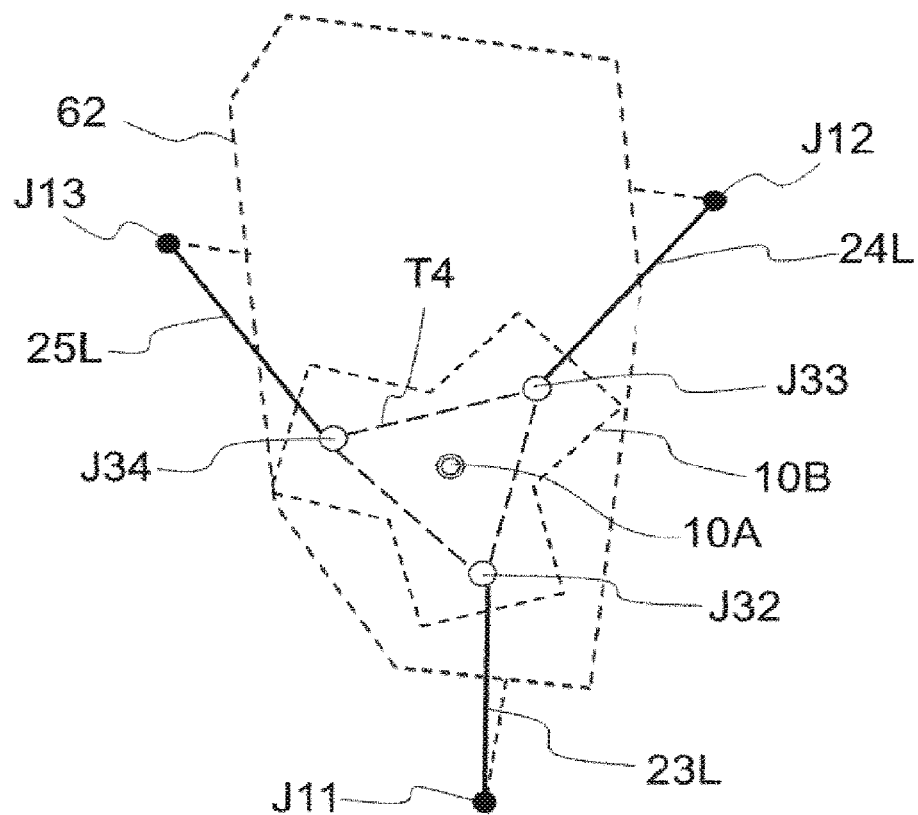
FIG. 64 is a view illustrating the arrangement of the variable length links when the thigh of the left crotch included in the humanoid robot of the first embodiment is raised to a left front viewing from the direction in which the thighbone extends.

FIG. 64 is a view illustrating the arrangement of the variable length links when thigh 10 of left crotch C7 is raised to the left front viewing from the direction in which thighbone 10A extends. FIG. 64 illustrates the state in which thigh 10 is raised by 30 degrees in the direction of the left front of 15 degrees. As can be seen from FIG. 64, when thigh 10 is raised, lower limb connecting frame 62 is lengthened in the vertical direction of the drawing, and tilt angle $θq3$ of variable length link 25L is larger than that in the case of FIG. 63. Tilt angle $θq1$ of variable length link 23L is also increased. In moving thigh 10 within the movable range, namely, in each state within the movable range of hip joint 22, at least one of variable length links 23L, 24L, 25L has the twisted relationship with torsion axis 10A. In each state within the movable range of hip joint 22, maximum value $θqmax$ of the tilt angles of three variable length links 23L, 24L, 25L is greater than or equal to $δ0$ (for example, about 3 degrees).

The fact that hip joint 22 is rotatable around thighbone 10A is necessary when humanoid robot 100 changes the direction and walks. In the case that hip joint 22 cannot be rotated around thighbone 10A, humanoid robot 100 walks in the oblique direction while facing the front. In changing the orientation of the entire body by moving lower limb 3, it is necessary to be able to change a direction in which a leg is opened at hip joint 22.

Figure 65:
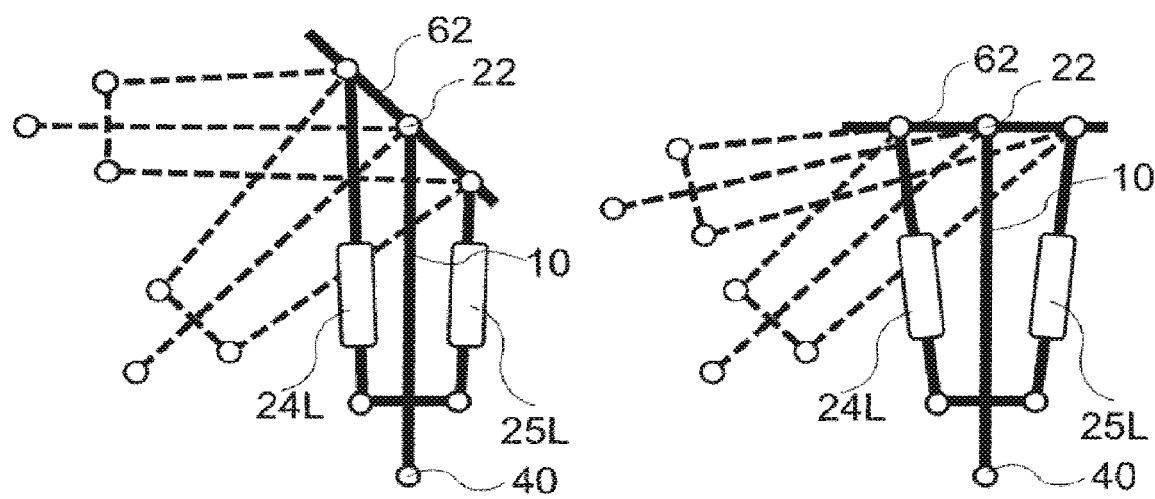
FIG. 65 is a view illustrating an effect obtained by attaching the variable length link that moves a hip joint included in the humanoid robot of the first embodiment high on a front side and by attaching the variable length link low on a rear side.

Referring to FIG. 65, the effect obtained by attaching the variable length link that moves hip joint 22 high on the front side and attaching the variable length link low on the rear side is described. In FIG. 65, only variable length links 23L, 24L are illustrated for convenience. The left side in FIG. 65 is a side view illustrating the case that variable length links 23L, 24L, 25L that move hip joint 22 are attached high on the front side and attached low in the rear side as in the first embodiment. The right side in FIG. 65 is a side view illustrating the case that variable length links 23L, 24L, 25L that move hip joint 22 are attached at the same height. The upright state is indicated by a solid line, and the state in which the thigh is raised forward by 45 degrees and to a limit of the movable range is indicated by a broken line.

When variable length links 23L, 24L, 25L that move hip joint 22 are attached at the same height, the movable range on the front side of the hip joint 22 becomes smaller than that of the case that variable length links 23L, 24L, 25L are attached high on the front side. This is because variable length link 23L and lower limb connecting frame 62 interfere with each other when hip joint 22 is rotated in the direction in which thigh 10 and knee joint 40 are located forward. When variable length link 23L on the front side is set to the higher position, the interference between variable length link 23L and lower limb connecting frame 62 is hardly generated, hip joint 22 can largely be rotated forward, and thigh 10 can further be raised.

In the case that all variable length links 23L, 24L, 25L are attached at the same height, despite the movable range is narrow, it is necessary to lengthen variable length link 24L longer in moving hip joint 22 to the limit of the movable range as compared with the case that the front side is set higher. On the other hand, it is necessary to shorten variable length link 23L shorter.

Referring to FIGS. 53 to 62, the structure of a knee C8 that moves lower leg 11 with respect to thigh 10 is described. As illustrated in FIG. 56, knee joint 40 has the structure in which plate-shaped lower leg 11 is sandwiched between two knee connecting frames 10C and the rotation axis is passed through lower leg 11 and two knee connecting frames 10C. In the reference state, the rotation axis is parallel to the X-axis. Two knee connecting frames 10C are coupled together on the front side by a coupling plate 10D in order to increase strength. Coupling plate 10D also has a function of preventing knee joint 40 from being bent in the reverse direction. As illustrated in FIG. 58 and other figures, the angle of knee joint 40 can be changed by changing the length of a knee drive link 42L included in one knee drive actuator 42 provided on the rear side of thigh 10. Lower leg 11 is a plate-shaped member, which is bent near knee joint 40 and bent at the position predetermined from ankle joint 41. Lower leg 11 is located on the front side of the straight line connecting knee joint 40 and ankle joint 41.

Knee drive actuator 42 has the structure in which force from a motor 42M being the power source is transmitted to knee drive link 42L by a gear provided on the side where knee joint 40 exists.

A knee drive link attaching unit J35 to which one end of knee drive link 42L is attached rotatably with one rotational degree of freedom is provided on the back side of thighbone 10A close to hip joint 22.

Knee drive link attaching unit J35 has the structure in which the yoke is provided on thighbone 10A and the columnar shaft member is provided at one end of knee drive link 42L.

Knee drive link 42L is connected to both thigh 10 and the lower leg 11 using two auxiliary tools on the side where knee joint 40 exists. The two auxiliary tools are a thigh-side auxiliary tool 43 and a lower leg-side auxiliary tool 44. One end of thigh-side auxiliary tool 43 is attached rotatably to one end of knee drive link 42L. A place to which one end of thigh-side auxiliary tool 43 and one end of knee drive link 42L are attached is referred to as a knee drive link auxiliary tool connecting unit J37. The other end of thigh-side auxiliary tool 43 is attached rotatably to a thigh-side auxiliary tool attaching unit J36 provided on the rear side of thigh 10. One end of lower leg-side auxiliary tool 44 is also attached rotatably to knee drive link auxiliary tool connecting unit J37. The other end of lower leg-side auxiliary tool 44 is attached rotatably to a lower leg-side auxiliary tool attaching unit J38 provided on the rear side of lower leg 11.

A rod-shaped thigh-side auxiliary tool attaching unit 10D extends backward from the position slightly upper than a knee-side link attaching plate 10B of thighbone 10A. Thigh-side auxiliary tool attaching unit J36 is provided at the tip of thigh-side auxiliary tool attaching unit 10D. Thigh-side auxiliary tool attaching unit J36 exists near knee-side link attaching plate 10B. Thigh-side auxiliary tool 43 has a structure in which the side faces of the two frames are connected to each other. The through-hole is made at the tip of thigh-side auxiliary tool attaching unit 10D. The through-holes are also made at both ends of thigh-side auxiliary tool 43. Thigh-side auxiliary tool attaching unit J36 has the structure, in which thigh-side auxiliary tool attaching unit 10D is sandwiched by thigh-side auxiliary tool 43 such that the positions of the through-holes are aligned with each other and the rotation shaft passes through the through-holes.

The end on the opposite side to thigh-side auxiliary tool 43 is connected to lower leg-side auxiliary tool 44 and knee drive link 42L with one rotational degree of freedom by knee drive link auxiliary tool connecting unit J37. Lower leg-side auxiliary tool 44 has a structure in which the side faces of the two frames are connected to each other. In knee drive link auxiliary tool connecting unit J37, thigh-side auxiliary tool 43 sandwiches knee drive link 42L. Lower leg-side auxiliary tool 44 sandwiches thigh-side auxiliary tool 43 and knee drive link 42E At the place where lower leg-side auxiliary tool 44 sandwiches thigh-side auxiliary tool 43 and knee drive link 42L, the through-holes are made in lower leg-side auxiliary tool 44, thigh-side auxiliary tool 43, and knee drive link 42L. Each of thigh-side auxiliary tool 43, lower-leg-side auxiliary tool 44, and knee drive link 42L can be rotated with one rotational degree of freedom by the shaft member passing through these through-holes.

Lower leg-side auxiliary tool attaching unit J38 is provided near the place where lower leg 11 is bent on the side where knee joint 40 exists. One end of lower-leg-side auxiliary tool 44 is attached rotatably to lower-leg-side auxiliary tool attaching unit J38 with one rotational degree of freedom. Lower leg-side auxiliary tool attaching unit J38 has the structure in which the rotation shaft is inserted in the through-holes provided in lower leg 11 and lower leg-side auxiliary tool 44. Lower-leg-side auxiliary tool 44 is attached rotatably to lower leg 11 with one rotational degree of freedom by lower-leg-side auxiliary tool attaching unit J38.

Figure 66:
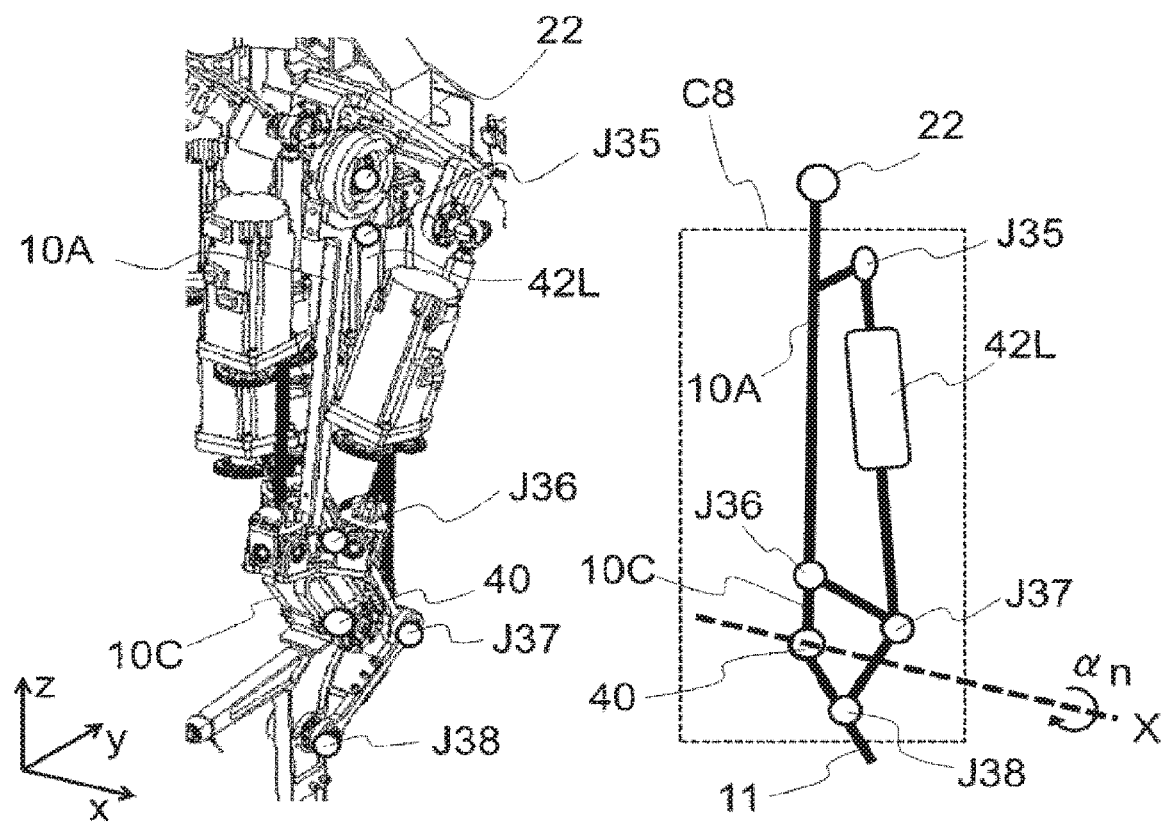
FIG. 66 is a perspective view illustrating the arrangement of the variable length links for moving the left knee joint included in the humanoid robot of the first embodiment.
Figure 67:
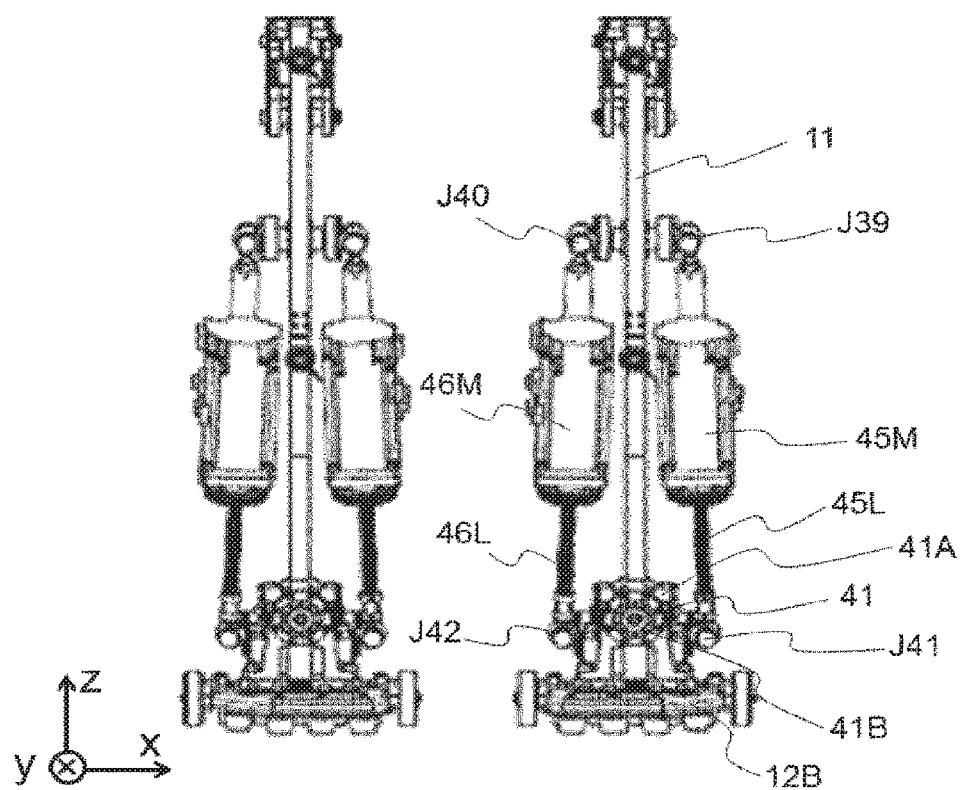
FIG. 67 is an enlarged front view illustrating the portion below the knee joint of the humanoid robot of the first embodiment.
Figure 68:
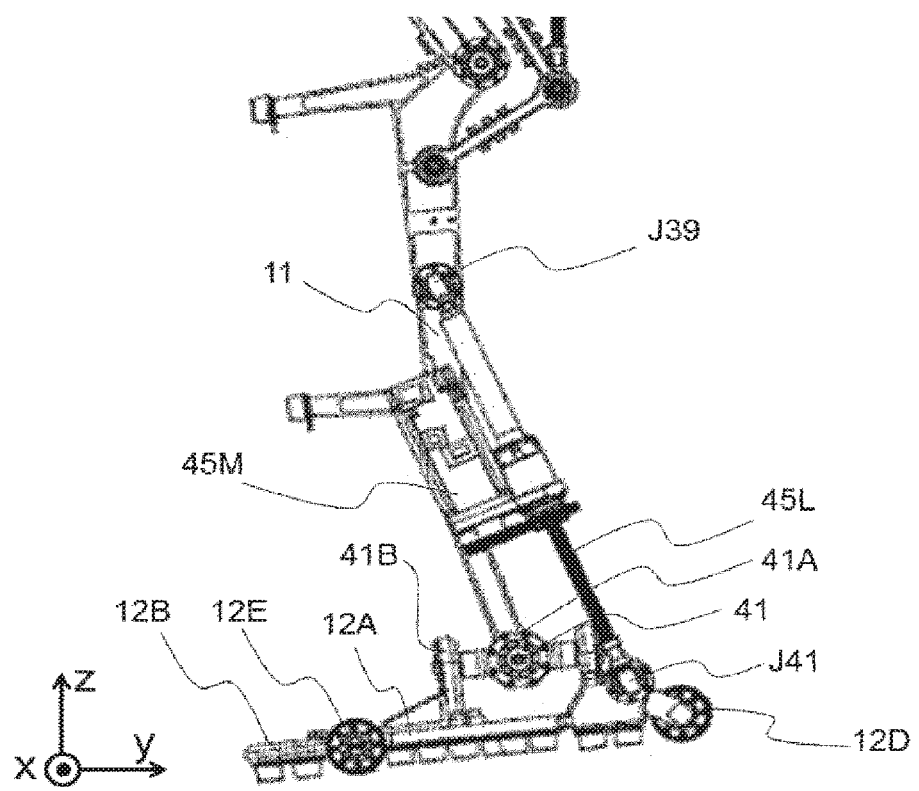
FIG. 68 is an enlarged left side view illustrating the portion below the knee joint of the humanoid robot of the first embodiment.
Figure 69:
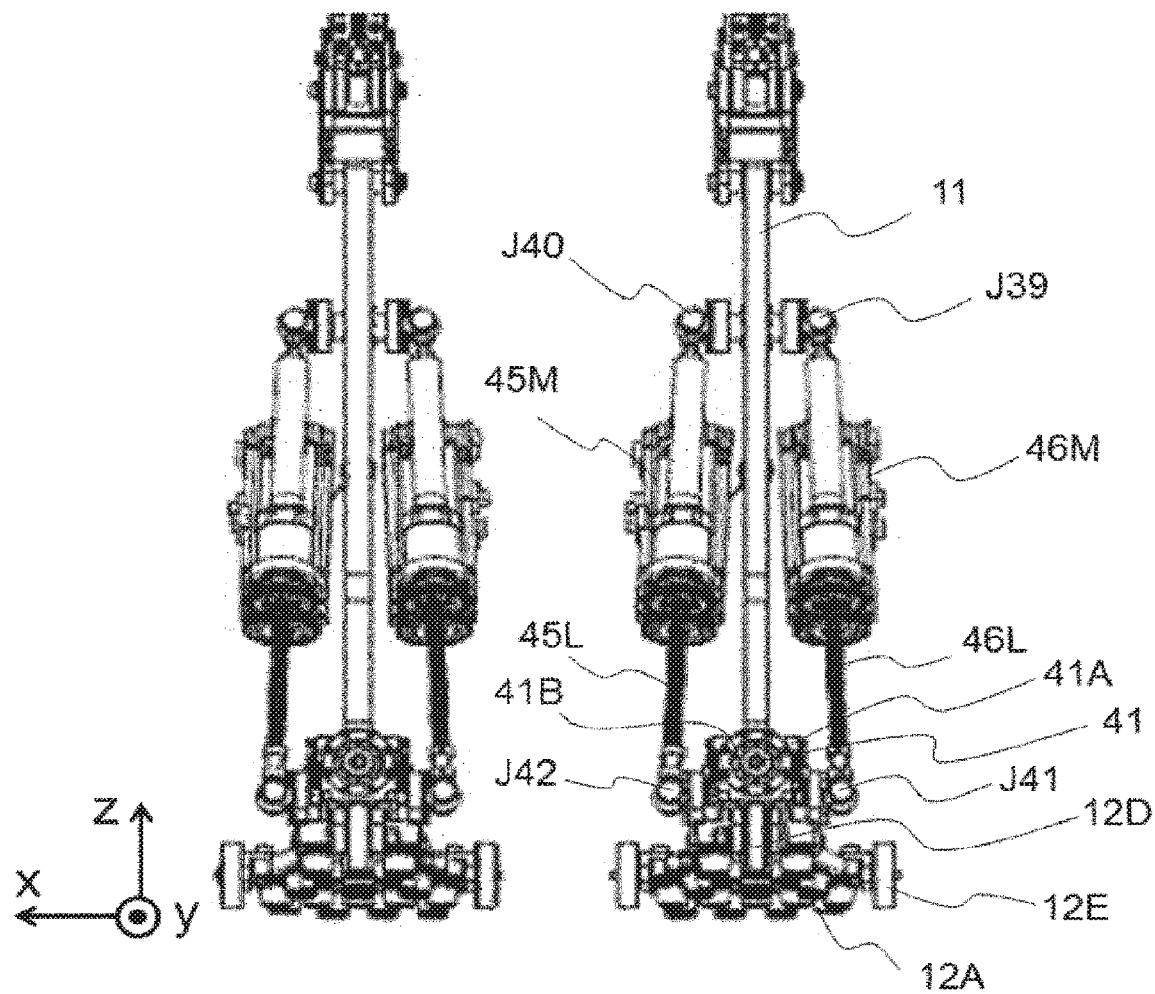
FIG. 69 is an enlarged rear view illustrating the portion below the knee joint of the humanoid robot of the first embodiment.
Figure 70:
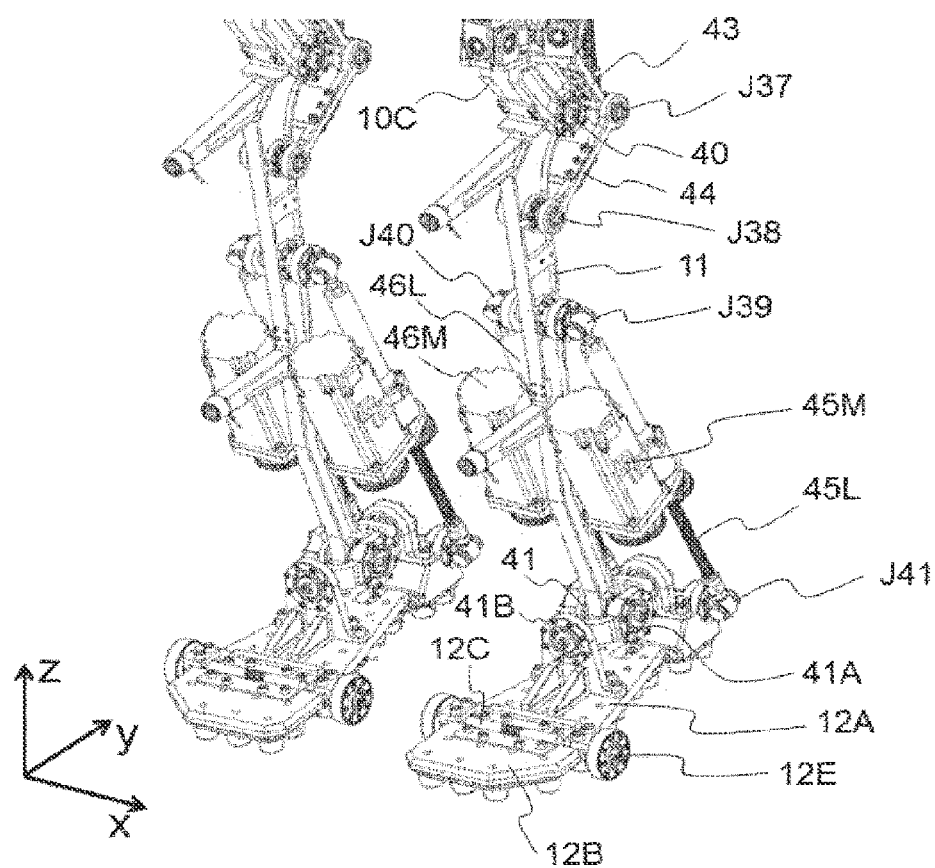
FIG. 70 is a perspective view illustrating a portion below a lower leg of the humanoid robot of the first embodiment.

FIG. 66 is a perspective view illustrating the arrangement of the variable length link that moves left knee joint 40. Knee joint 40, knee drive link attaching unit J35, and thigh-side auxiliary tool attaching unit J36 are fixed to thigh 10, and the relative positional relationships among knee joint 40, knee drive link attaching unit J35, and thigh-side auxiliary tool attaching unit J36 are fixed. Lower leg-side auxiliary tool attaching unit J38 is fixed to lower leg 11. Lower leg-side auxiliary tool attaching unit J38 has a predetermined distance from knee joint 40. Knee drive link auxiliary tool connecting unit J37 has predetermined distances from thigh-side auxiliary tool attaching unit J36 and lower leg-side auxiliary tool attaching unit J38. Therefore, when the rotation angle of knee joint 40 is determined, thigh-side auxiliary tool 43 and lower leg-side auxiliary tool 44 are moved like a pantograph, and the position of knee drive link auxiliary tool connecting unit J37 is determined. On the other hand, when the position of knee drive link auxiliary tool connecting unit J37 is determined, the rotation angle of knee joint 40 is determined.

The length of knee drive link 42L is the distance between knee drive link attaching unit J35 and knee drive link auxiliary tool connecting unit J37. Thus, the rotation angle of knee joint 40 can be changed by changing the length of knee drive link 42L.

Knee C8 includes knee joint 40, knee drive actuator 42, knee drive link attaching unit J35 provided on the rear side of thigh 10, thigh-side auxiliary tool 43, thigh-side auxiliary tool attaching unit J36 provided on the rear side of thigh 10, lower leg-side auxiliary tool 44, and lower leg-side auxiliary tool attaching unit J38 provided on the rear side of the lower leg. Knee joint 40 connects thigh 10 and lower leg 11 rotatably with one rotational degree of freedom. Knee drive actuator 42 includes knee drive link 42L having a variable length and motor 42M. One end of knee drive link 42 is attached rotatably to knee drive link attaching unit J35. One end of thigh-side auxiliary tool 43 is attached rotatably to the other end of knee drive link 42L. The other end of thigh-side auxiliary tool 43 is attached rotatably to thigh-side auxiliary tool attaching unit J36. One end of lower leg-side auxiliary tool 44 is attached rotatably to the other end of knee drive link 42L. The other end of lower leg-side auxiliary tool 44 is attached rotatably to lower leg-side auxiliary tool attaching unit J38.

Knee C8 can be bent from the state in which hip joint 22, knee joint 40, and ankle joint 41 are arranged on the same straight line to the state in which the angle between thigh 10 and lower leg 11 is about 40 degrees.

Knee C8 includes thigh-side auxiliary tool 43 and lower leg-side auxiliary tool 44, so that the force caused by the expansion and contraction of knee drive link 42L can be transmitted to thigh-side auxiliary tool attaching unit J36 and lower leg-side auxiliary tool attaching unit J38 like the pantograph. Consequently, the force rotating knee joint 40 is transmitted easily even in the case that knee joint 40 is largely bent as thigh 10 and lower leg 11 become closer to a parallel position. As a result, with small force generated by knee drive actuator 42, the bending and stretching motion of knee joint 40 can be performed more smoothly.

Referring to FIGS. 53 to 56, and 67 to 70, the structure of an ankle C9 that moves foot 12 with respect to lower leg 11 is described. FIGS. 67, 68, 69, and 70 are a front view, a left side view, a rear view, and a perspective view of a portion below lower leg 11.

Ankle joint 41 is the biaxial gimbal that rotatably connects foot 12 to lower leg 11 with two rotational degrees of freedom in the front-back direction and in the right and left direction. A columnar portion in the right and left direction is provided at a lower end of lower leg 11 such that lower leg 11 can be rotated in the front-back direction. The columnar portion of lower leg 11 is held and sandwiched rotatably by a front-back rotation yoke 41A, and lower leg 11 can be rotated in the front-back direction with respect to front-back rotation yoke 41A. Columnar portions (shaft member) are provided on the surfaces in the front-rear direction of front-back rotation yoke 41A. A right and left rotation yoke 41B provided on foot 10 holds rotatably the shaft member of front-back rotation yoke 41A by sandwiching the shaft member from the front-back direction, and lower leg 11 and front-back rotation yoke 41A are moved in the right and left direction with respect to foot 12.

Foot 12 can be rotated around ankle joint 41 with two rotational degrees of freedom in the front-back direction and the right and left direction by a lower leg outside actuator 45 and a lower leg inside actuator 46. A lower leg outside link attaching unit J39 and a lower leg inside link attaching unit J40, which attach one ends of a lower leg outside link 45L and a lower leg inside link 46L rotatably with two rotational degrees of freedom, are provided on the right and left surfaces of plate-shaped lower leg 11. Lower leg outside link attaching unit J39 has the structure, in which the rotation member, the yoke, and the shaft member are provided on lower leg 11 and the shaft member is inserted into the cylinder provided at one end of lower leg outside link 45L. Lower leg inside link attaching unit J40 also has the same structure.

Lower leg outside actuator 45 has the structure in which the force from a motor 45M is transmitted to lower leg outside link 45L by the gear provided on the side where foot 12 exists. Lower leg inside actuator 46 also has the same structure.

A foot outside link attaching unit J41 and a foot inside link attaching unit J42, which are attached rotatably to the other ends of lower leg outside link 45L and lower leg inside link 46L with two rotational degrees of freedom, are provided at the right and left positions in the back of foot 12. Foot outside link attaching unit J41 and foot inside link attaching unit J42 are the biaxial gimbal having the same structure as lower leg outside link attaching unit J39 and lower leg inside link attaching unit J40.

The interval between foot outside link attaching unit J41 and foot inside link attaching unit J42 is larger than the interval between lower leg outside link attaching unit J39 and lower leg inside link attaching unit J40. Consequently, ankle joint 41 can be rotated in the right and left direction easily.

Foot 12 includes ankle joint 41, a foot main body 12A, and a toe 12B provided on the front side of foot main body 12A. Foot outside link attaching unit J41 and foot inside link attaching unit J42 are provided in foot main body 12A. A toe joint 12C is provided between foot main body 12A and toe 12B. The vertical angle of toe 12B with respect to foot main body 12A is changed by toe joint 12C. A spring (not illustrated) is provided between toe 12B and foot main body 12A, and toe 12B is appropriately bent according to the force when the force bending toe 12B is applied.

A heel wheel 12D is provided in the center at the rear end of foot main body 12A. Heel wheel 12D is a wheel having proper rolling friction. Foot 12 includes heel wheel 12D, which allows a heel on the rear side of foot 12 to be landed smoothly when humanoid robot 100 walks. Heel wheel 12D acts as a touch sensor that reports the landing of the heel while rotating. Foot side-surface wheels 12E having proper rolling friction are provided on the side where foot 12 exists in the vicinity of toe joint 12C. Foot side-surface wheel 12E acts as a touch sensor that reports the landing of not only the heel but also entire foot 12. When foot 12 is moved, foot side-surface wheel 12E can detect that toe 12B is in contact with a floor or a ground while rotating, and then detect that the toe 12B is separated from the floor or the ground.

Figure 71:
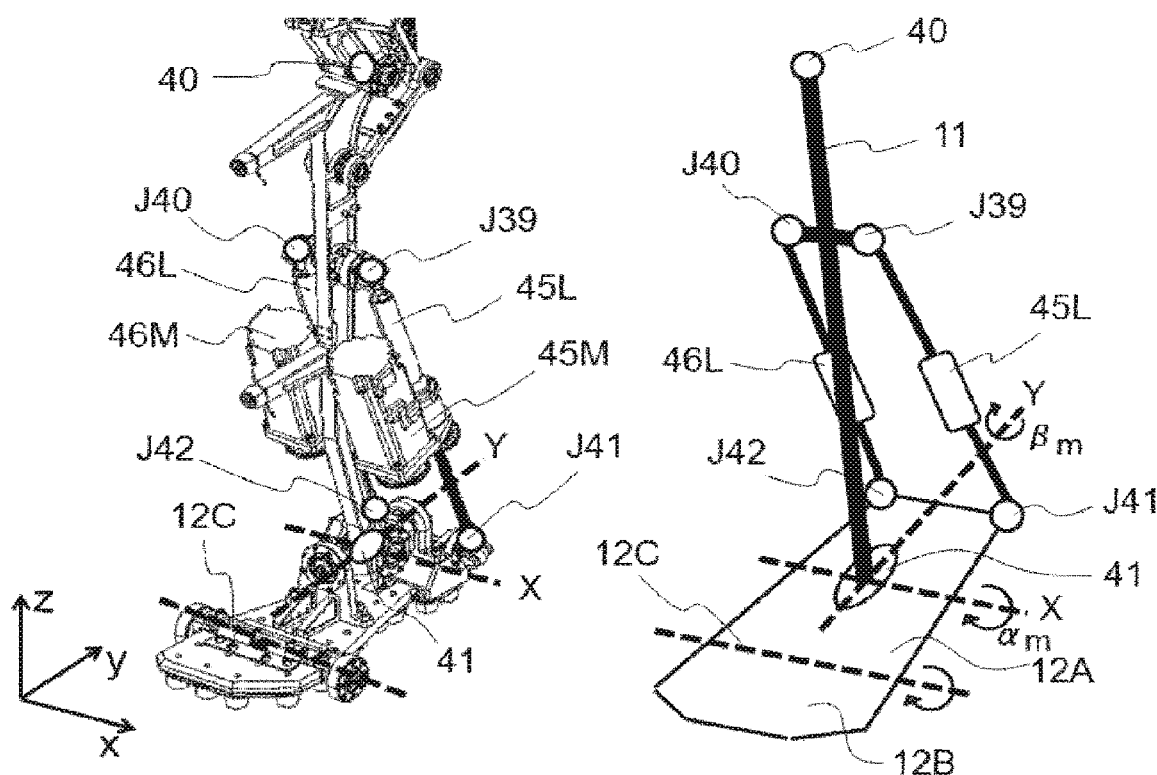
FIG. 71 is a perspective view illustrating the arrangement of the variable length links for moving a left ankle joint included in the humanoid robot of the first embodiment.

FIG. 71 is a perspective view illustrating the arrangement of the variable length links that move ankle joint 41.

Ankle joint 41, foot outside link attaching unit J41, and foot inside link attaching unit J42 are fixed to foot main body 12A, and the relative positional relationships among ankle joint 41, foot outside link attaching unit J41, and foot inside link attaching unit J42 are fixed. Lower leg outside link attaching unit J39 and lower leg inside link attaching unit J40 are fixed to lower leg 11. The relative positional relationships among ankle joint 41, lower leg outside link attaching unit J39, and lower leg inside link attaching unit J40 are fixed. Lower leg outside link 45L and lower leg inside link 46L are the variable length link having the variable length. Lower leg outside link 45L connects lower leg outside link attaching unit J39 and foot outside link attaching unit J41. Lower leg inside link 46L connects lower leg inside link attaching unit J40 and foot inside link attaching unit J42. By changing the lengths of lower leg outside link 45L and lower leg inside link 46L, the connection angle of lower leg 41 to leg main body 12A can be changed around the X-axis and the Y-axis. It is assumed that am is the rotation angle around the X-axis of ankle joint 41, and that βm is the rotation angle around the Y-axis.

Ankle C9 includes ankle joint 41, lower leg outside actuator 45, and lower leg inside actuator 46. Ankle joint 41 connects the lower portion of lower leg 11 and foot 12 rotatably with at least two rotational degrees of freedom. Lower leg outside actuator 45 and lower leg inside actuator 46 are two ankle actuators including lower leg outside link 45L and lower leg inside link 46L and motor 45M and a motor 46M, respectively.

Ankle C9 also includes lower leg outside link attaching unit J39 and lower leg inside link attaching unit J40, foot outside link attaching unit J41, and foot inside link attaching unit J42. Lower leg outside link attaching unit J39 and lower leg inside link attaching unit J40 are two lower leg-side link attaching units that are provided in lower leg 11 being attached rotatably with one ends of lower leg outside link 45L and lower leg inside link 46L, respectively. Foot outside link attaching unit J41 and foot inside link attaching unit J42 are two foot-side link attaching units being attached rotatably with one ends of lower leg outside link 45L and lower leg inside link 46L, respectively. Foot outside link attaching unit J41 and foot inside link attaching unit J42 are provided in foot main body 12A at positions behind ankle joint 41.

In ankle C9, ankle joint 41 can be rotated in the range where the straight line connecting ankle joint 41 and knee joint 40 forms the angle from, for example, about 60 degrees forward to, for example, about 30 degrees backward with respect to foot 12, and ankle joint 41 can be tilted by, for example, about 15 degrees in the right and left direction.

When both lower leg outside link 45L and lower leg inside link 46L are lengthened, lower leg 41 can be tilted forward. When both lower leg outside link 45L and lower leg inside link 46L are shortened, lower leg 41 can be tilted backward. When lower leg outside link 45L is lengthened while lower leg inside link 46L is shortened, lower leg 41 can be inclined inside. When lower leg outside link 45L is shortened while lower leg inside link 46L is lengthened, lower leg 41 can be inclined outside.

Figure 72:
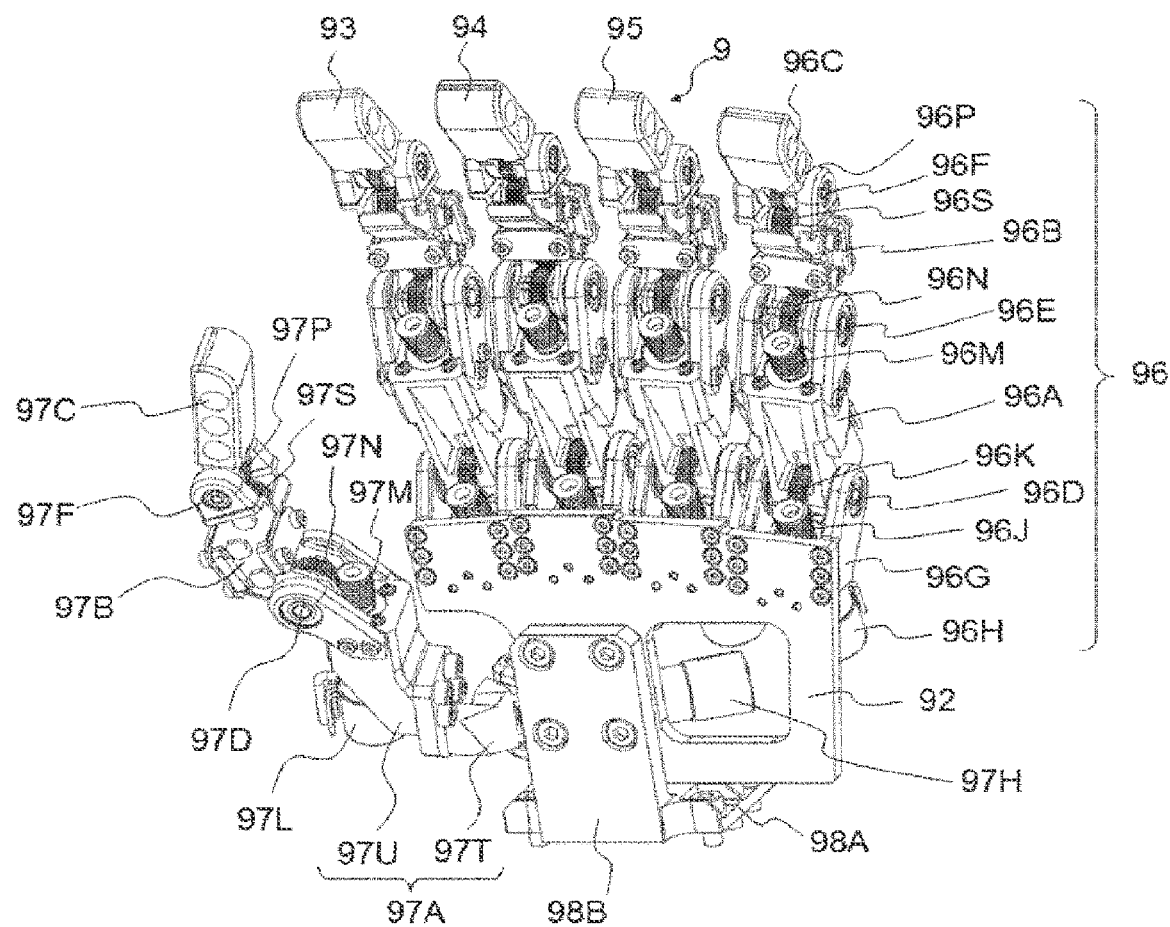
FIG. 72 is a perspective view illustrating a left hand included in the humanoid robot of the first embodiment viewing from a palm side.
Figure 73:
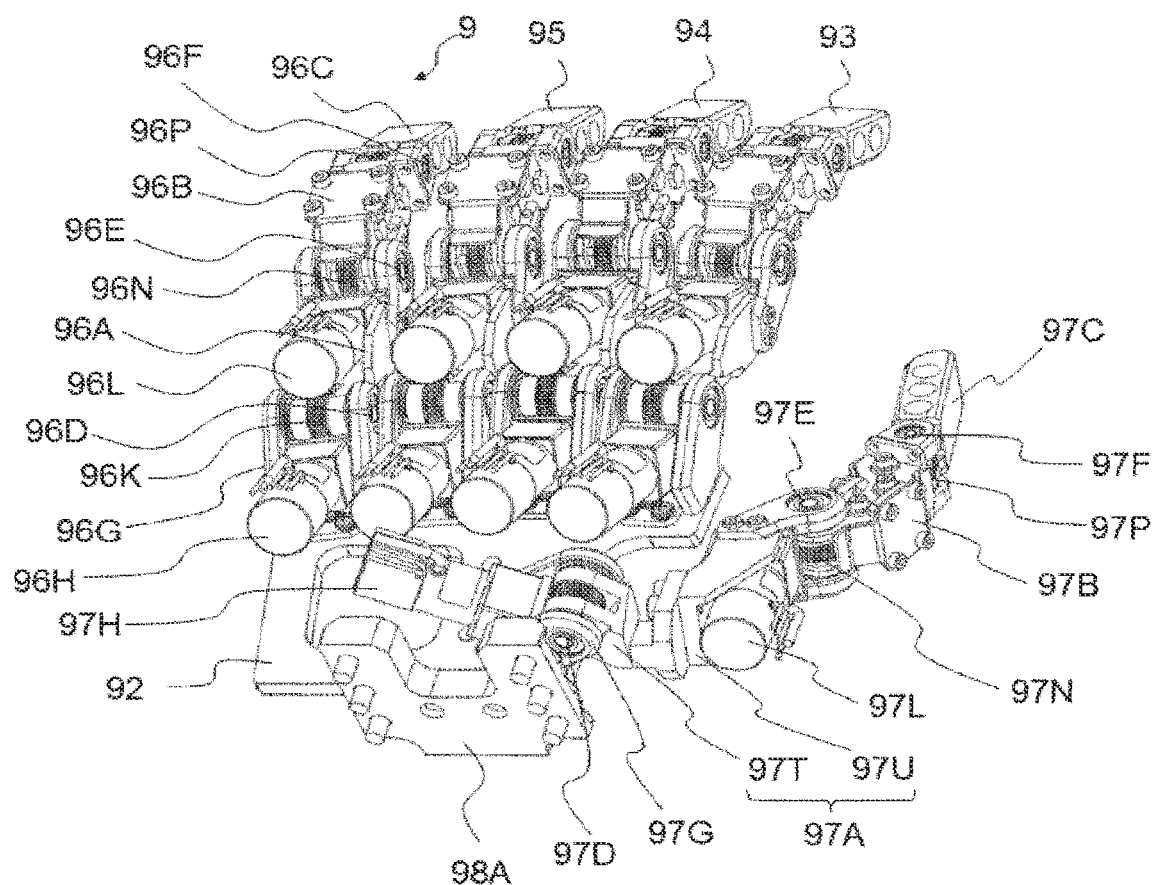
FIG. 73 is a perspective view illustrating the left hand included in the humanoid robot of the first embodiment viewing from the backside of the hand.
Figure 76:
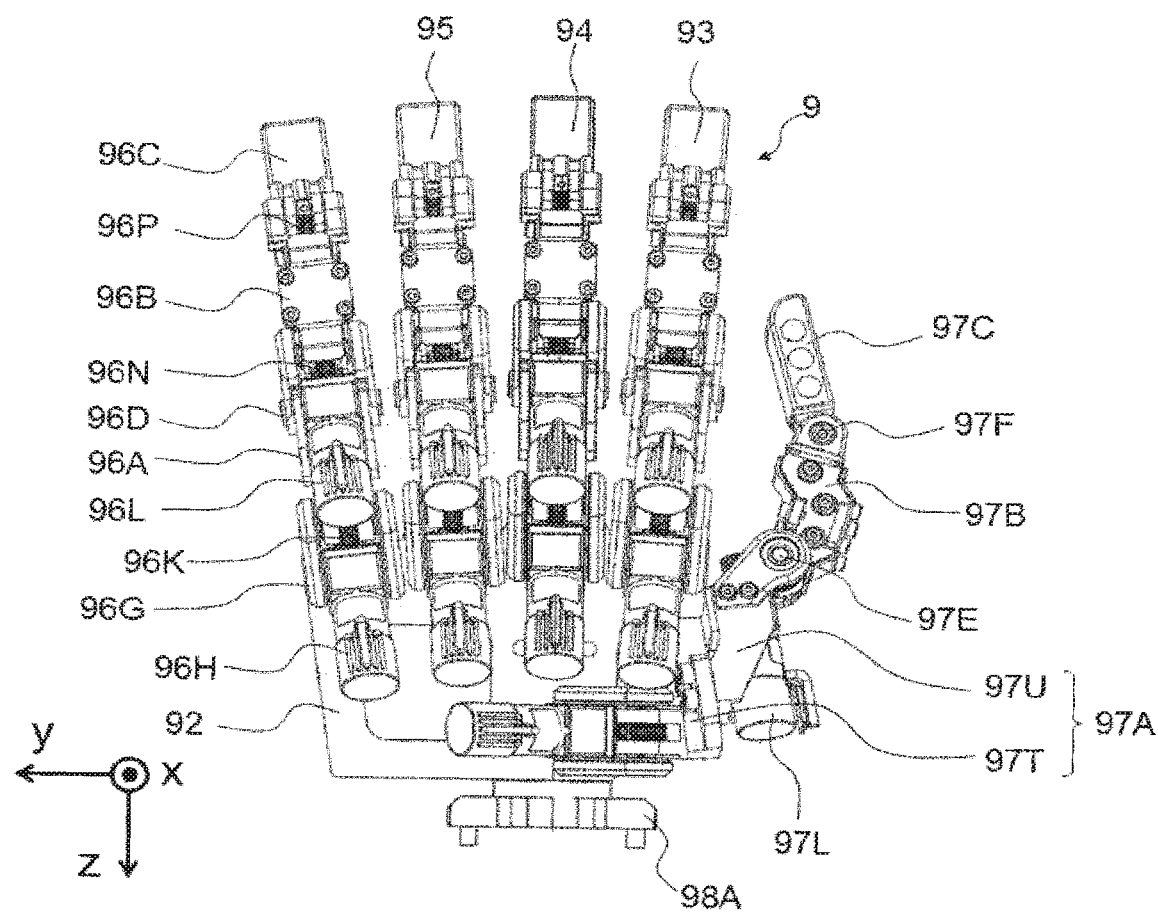
FIG. 76 is a rear view illustrating the left hand included in the humanoid robot of the first embodiment.
Figure 77:
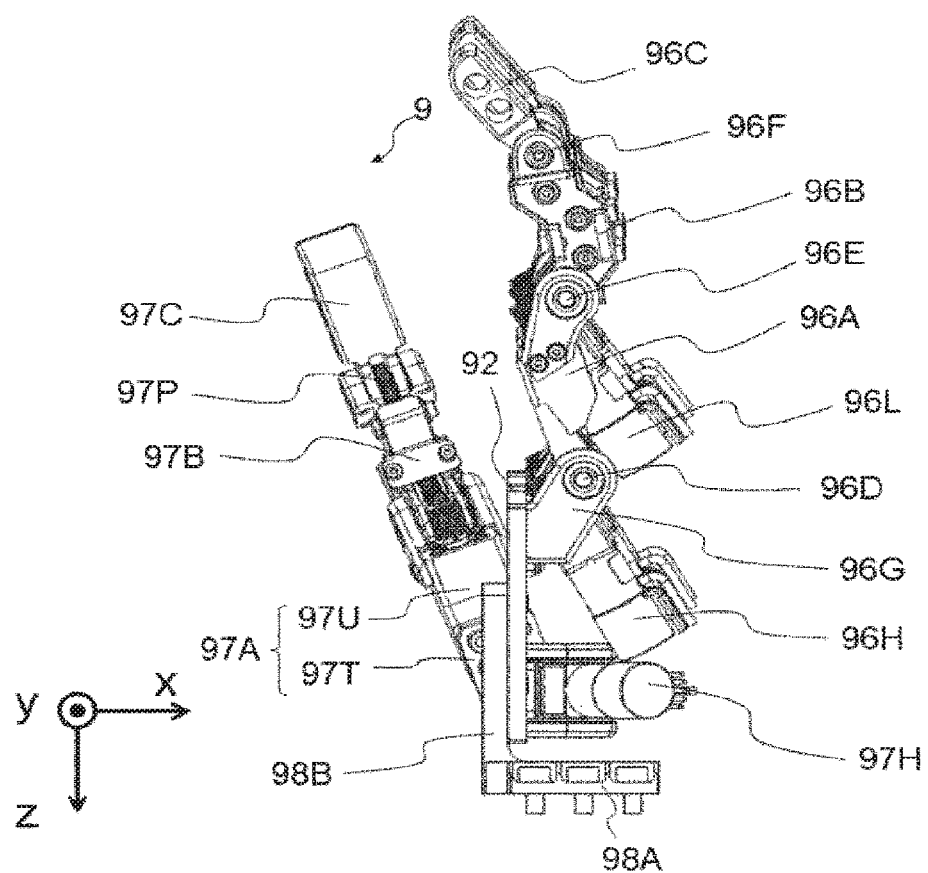
FIG. 77 is a side view illustrating the left hand included in the humanoid robot of the first embodiment viewing from the side where the opposable finger does not exist.
Figure 78:
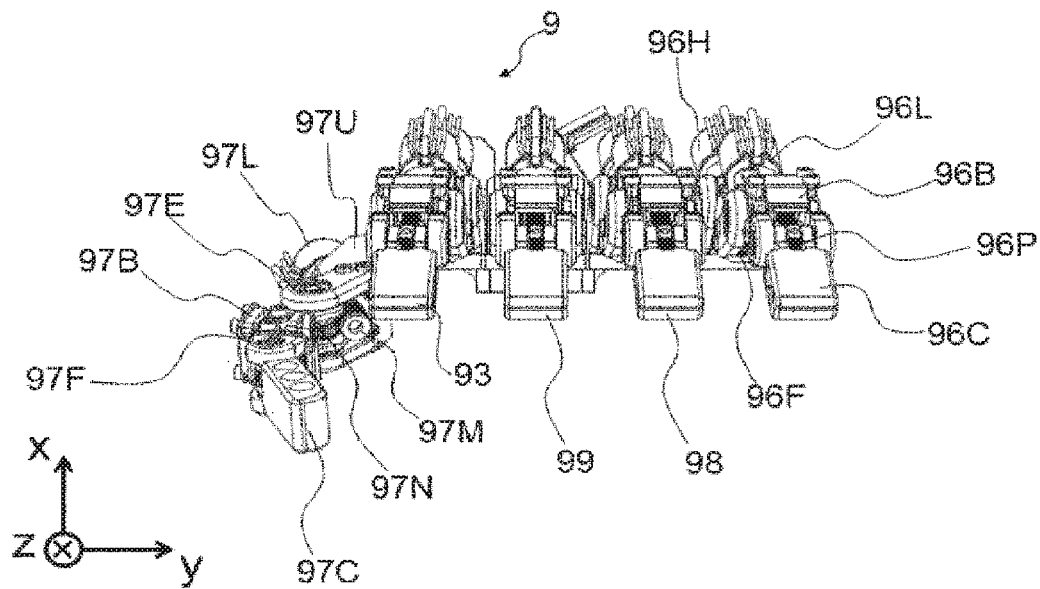
FIG. 78 is a view illustrating the left hand included in the humanoid robot of the first embodiment viewing from a fingertip side.
Figure 79:
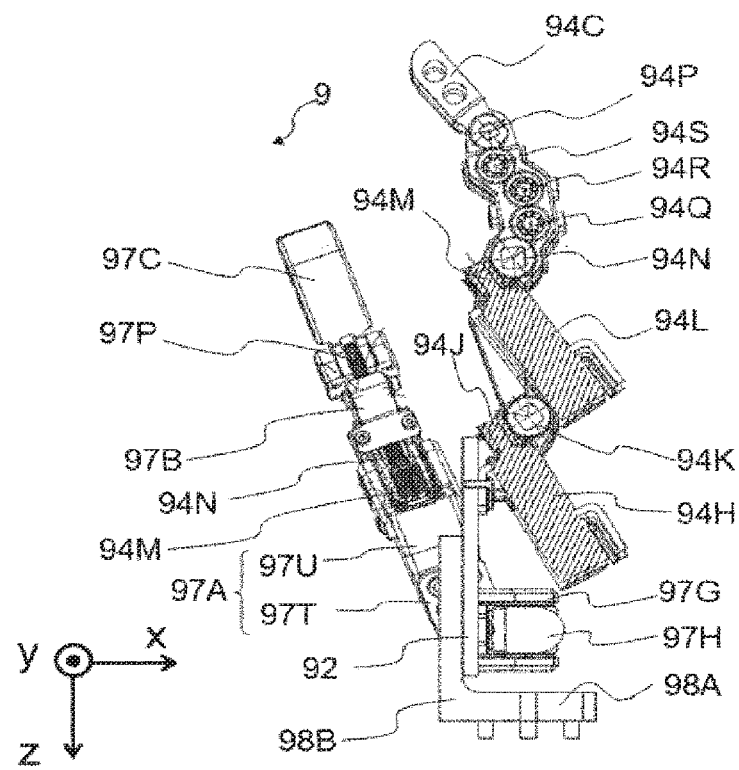
FIG. 79 is a view illustrating a cross section of a second finger of the left hand included in the humanoid robot of the first embodiment.

Referring to FIGS. 72 to 79, the structure of hand 9 is described. FIG. 72 is a perspective view illustrating left hand 9 viewing from the palm side. FIG. 73 is a perspective view illustrating left hand 9 viewing from the backside of the hand. FIGS. 74, 75, 76, and 77 are a front view of left hand 9, a side view of left hand 9 viewing from the side where opposable finger 97 exists, a rear view of left hand 9, and a side view of left hand 9 viewing from the side where opposable finger 97 does not exist. FIG. 78 is a view illustrating left hand 9 viewing from the fingertip side. FIG. 79 is a view illustrating second finger 94 of left hand 9 in cross section.

Figure 74:
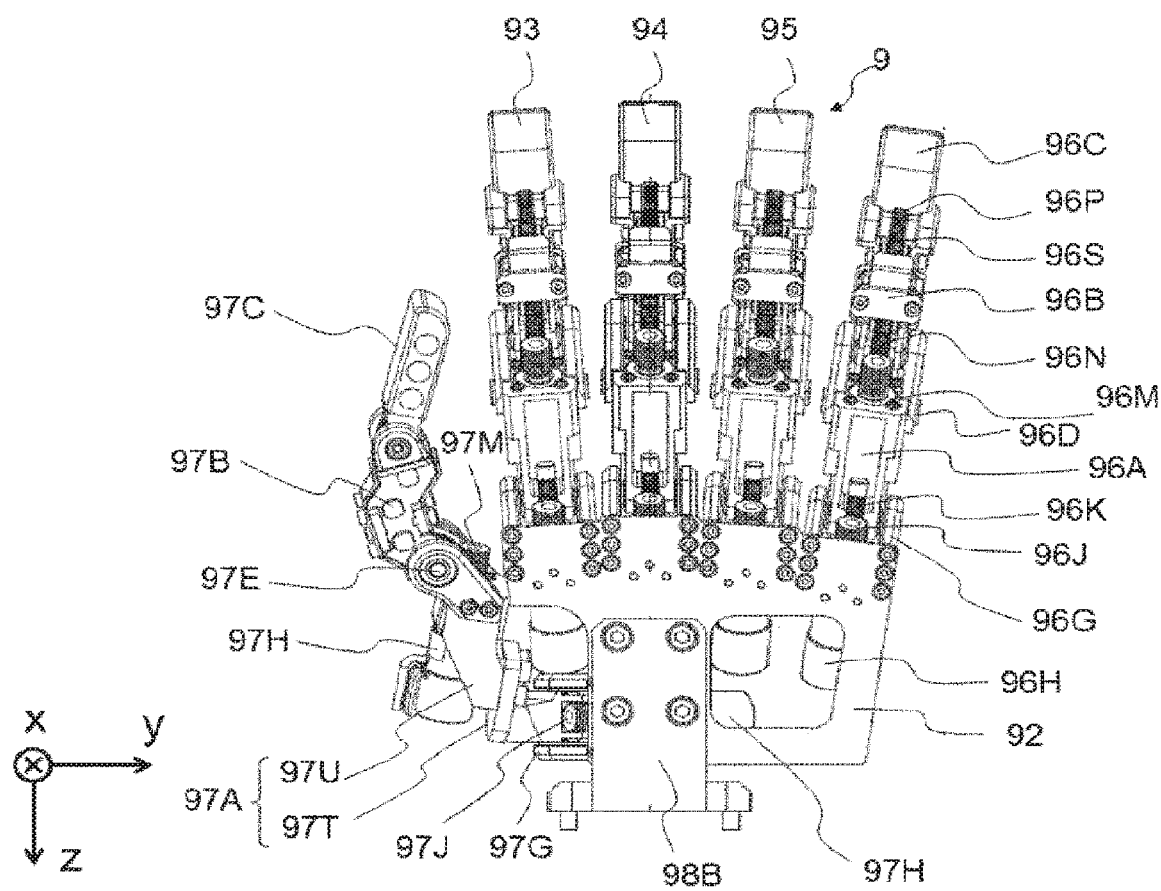
FIG. 74 is a front view illustrating the left hand included in the humanoid robot of the first embodiment.
Figure 75:
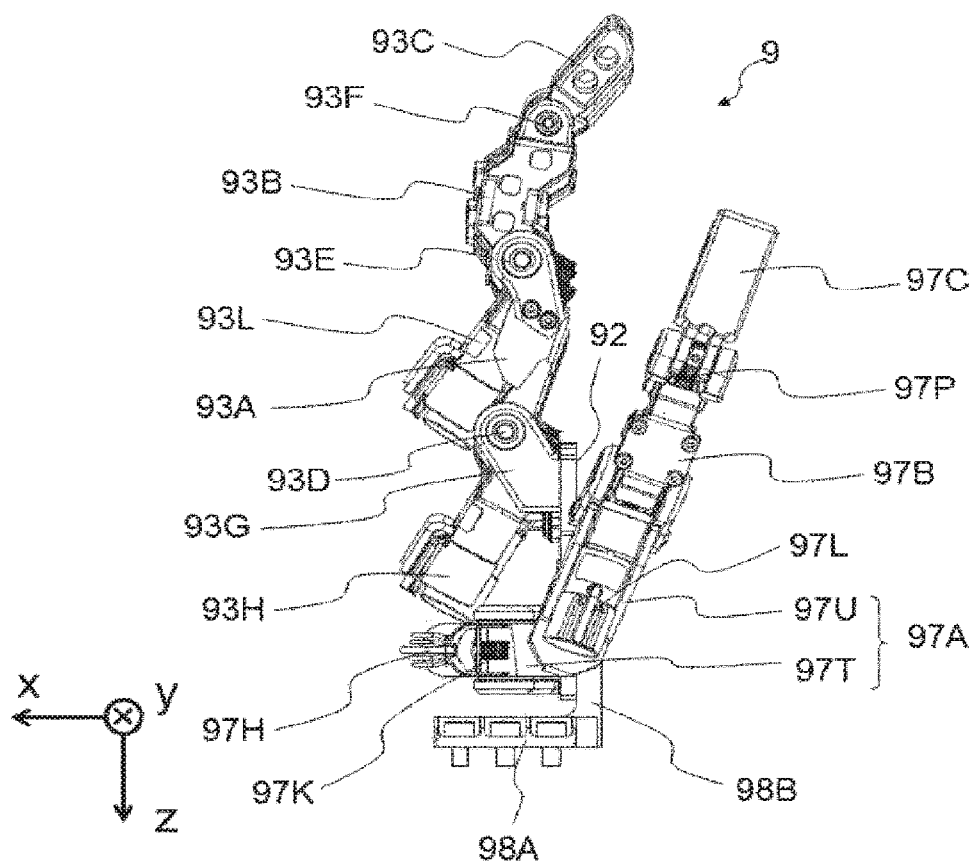
FIG. 75 is a side view illustrating the left hand included in the humanoid robot of the first embodiment viewing from the side where an opposable finger exists.

As can be seen from FIGS. 74 and 79, hand attaching tool 98 that attaches palm plate 92 to wrist plate 91 is a member in which an attaching plate 98A and a palm plate connecting part 98B are connected into an L-shape in the side view. Attaching plate 98A is connected to wrist plate 91. Palm plate 92 is connected to palm plate connecting part 98B. First finger 93, second finger 94, third finger 95, and fourth finger 96 are connected to the side of palm plate 92 opposed to attaching plate 98A. In the reference state, first finger 93, second finger 94, third finger 95, and fourth finger 96 extend in the direction substantially parallel to palm plate 92. Second finger 94 is located at the substantial center of wrist plate 91. First finger 93, second finger 94, third finger 95, and fourth finger 96 are provided such that the interval on the tip side is wider than the interval on the base side. As can be seen from FIG. 76, second finger 94 is perpendicular to attaching plate 98A, and the center of second finger 94 and the center of attaching plate 98A are matched with each other.

Opposable finger 97 is rotatable in the direction substantially orthogonal to first finger 93 and other fingers, and provided in a portion of palm plate 92, the portion exists on the side closer to attaching plate 98A than first finger 93 and other fingers and on the side where first finger 93 exists. Palm plate 92 is a base being connected with the fingers. In the reference state of hand 9, opposable finger 97 extends side by side with palm plate 92 viewing from the direction perpendicular to palm plate 92.

First finger 93, second finger 94, third finger 95, and fourth finger 96 have the same structure. First finger 93, second finger 94, third finger 95, and fourth finger 96 are referred to as ordinary fingers. The structure of the ordinary finger is described using fourth finger 96 to which the reference sign is added easily in the drawings.

In fourth finger 96, a first dactylus 96A, second dactylus 96B, and a third dactylus 96C are connected in series from the side closer to palm plate 92. A first finger joint 96D exists between palm plate 92 and first dactylus 96A. First finger joint 96D connects first dactylus 96A rotatably to palm plate 92. A second finger joint 96E exists between first dactylus 96A and second dactylus 96B. Second finger joint 96E connects second dactylus 96B rotatably to first dactylus 96A. A third finger joint 96F exists between second dactylus 96B and third dactylus 96C. Third finger joint 96F connects third dactylus 96C rotatably to second dactylus 96B. The rotation axes of first finger joint 96D, second finger joint 96E, and third finger joint 96F are parallel to one another.

Regarding adjacent two of palm plate 92, first dactylus 96A, second dactylus 96B, and third dactylus 96C, a member located on the side closer to palm plate 92 is referred to as a base-side member, and the other member located on the side where the base-side member does not exist is referred to as a tip-side member. First finger joint 96D, second finger joint 96E, and third finger joint 96F are three finger joints that connect the tip-side member being one of first dactylus 96A, second dactylus 96B, and third dactylus 96C rotatably to the base-side member.

In the reference state, first finger joint 96D exists on the rear side of palm plate 92. As illustrated in FIG. 77, when hand 9 in the reference state is viewed from the side, the rotation axes of first finger joint 96D, second finger joint 96E, and third finger joint 96F exist on one plane substantially perpendicular to attaching plate 98A. In the reference state, a line extending from forearm bone 8B toward hand 9 passes through or near this plane. In the reference state, forearm 7 is perpendicular to attaching plate 98A.

The rotation shaft of first finger joint 96D is held by a finger base yoke 96G provided on the rear side of palm plate 92. The rotation axis of first finger joint 96D is disposed at a predetermined position slightly outside from palm plate 92. A finger first motor 96H is disposed in finger base yoke 96G. A first worm 96J (screw gear) connected directly to the rotation shaft of finger first motor 96H meshes with a first worm wheel 96K (helical gear) that is rotated around the rotation axis of first finger joint 96D. First worm 96J meshes with first worm wheel 96K existing on the side of palm plate 92. Finger first motor 96H and first worm 96J are provided obliquely with respect to palm plate 92. First worm wheel 96K is attached to first dactylus 96A. When finger first motor 96H rotates, first worm 96J is rotated, and first worm wheel 96K is rotated together with first dactylus 96A.

In first finger joint 96D, a worm gear mechanism rotates first dactylus 96A with respect to palm plate 92. The worm gear mechanism includes finger first motor 96H disposed on palm plate 92, first worm 96J rotated by finger first motor 96H, and first worm wheel 96K that meshes with first worm 96J to be rotated around the rotation axis of first finger joint 96D together with first dactylus 96A.

First dactylus 96A has the structure in which the member rotating together with first worm wheel 96K and the yoke member holding the rotation axis of second finger joint 96E are coupled together in the direction toward the fingertip. A finger second motor 96L is attached to first dactylus 96A. A second worm 96M, which is connected directly to the rotation shaft of finger second motor 96L, meshes with a second worm wheel 96N that is rotated around the rotation axis of second finger joint 96E. Finger second motor 96L and second worm 96M are provided obliquely with respect to first dactylus 96A. Second worm wheel 96N is attached to second dactylus 96B. When finger second motor 96L rotates, second worm 96M is rotated, and second worm wheel 96N is rotated together with second dactylus 96B.

In second finger joint 96E, a worm gear mechanism rotates second dactylus 96B with respect to first dactylus 96A. The worm gear mechanism includes finger second motor 96L disposed on first dactylus 96A, second worm 96M rotated by finger second motor 96L, and second worm wheel 96N that meshes with second worm 96M to be rotated around the rotation axis of second finger joint 96E together with second dactylus 96B.

First finger joint 96D and second finger joint 96E are driven by different motors, so that the rotation angles of first finger joint 96D and second finger joint 96E can independently be determined.

In the reference state, the direction in which first finger joint 96D rotates first dactylus 96A, the direction in which second finger joint 96E rotates second dactylus 96B, the direction in which third finger joint 96F rotates third dactylus 96C are the direction toward the palm side.

Palm plate 92 can have small size by providing finger first motor 96H and first worm 96J obliquely with respect to palm plate 92. First dactylus 96A can be shortened by providing finger second motor 96L and second worm 96M obliquely with respect to first dactylus 96A. As a result, hand 9 can be made as large as a human hand.

First dactylus 96A is rotated with respect to palm plate 92 by first finger joint 96D having the worm gear mechanism, and connected rotatably to second dactylus 96B by second finger joint 96E having the worm gear mechanism. As described above, in hand 9, the worm gear mechanism is applied to the first finger joint and the second finger joint that are the two finger joints from the palm sides of the four ordinary fingers.

Referring to FIG. 79, the mechanism that rotates third finger joint 94F is described. A third dactylus drive gear 94P is provided in third finger joint 94F. Third dactylus drive gear 94P is rotated together with third dactylus 94C. Three idler gears 94Q, 94R, 94S are provided in second dactylus 94B. Three idler gears 94Q, 94R, 94S transmit the rotation of second worm wheel 94N to third dactylus drive gear 94P. Idler gear 94Q meshes with second worm wheel 94N, and idler gear 94Q is rotated in the opposite direction when second worm wheel 94N is rotated. Idler gear 94R meshes with idler gear 94Q, and idler gear 94R is rotated in the opposite direction when idler gear 94Q is rotated. Idler gear 94S meshes with idler gear 94R, and idler gear 94S is rotated in the opposite direction when idler gear 94R is rotated. Third dactylus drive gear 94P meshes with idler gear 94S, and third dactylus drive gear 94 is rotated in the opposite direction when idler gear 94S is rotated. Because three that is the number of idler gears 94Q, 94R, 94S is an odd number, third dactylus drive gear 94P is rotated in the same direction when second worm wheel 94N is rotated.

Idler gears 94Q, 94R, 94S are the gears that are rotated on the odd number of rotating shafts driven by second worm wheel 94N included in second finger joint 94E. Third dactylus drive gear 94P is the gear provided in third finger joint 94F driven by idler gears 94Q, 94R, 94S. Second worm wheel 94N is the gear that is rotated in conjunction with the rotation of second finger joint 94E.

A gear ratio of second worm wheel 94N, idler gear 94Q, 94R, 94S, and third dactylus drive gear 94P is determined such that a rotation angle $\varphi 2$ of second worm wheel 94N and a rotation angle $\varphi 3$ of third dactylus drive gear 94P are equal to each other. That is, a value $f=\varphi 3/\varphi 2$ being a ratio of $\varphi 3$ to $\varphi 2$ is set to $f=1$. Value $f=\varphi 3/\varphi 2$ of the ratio of third dactylus drive gear 94P, namely, rotation angle $\varphi 3$ of third dactylus 94C to second worm wheel 94N, namely, rotation angle $\varphi 2$ of second dactylus 94B may be a proper value close to 1.

The three dactyli can be rotated by two motors per one finger by rotating the third dactylus in conjunction with the second dactylus. Because there is almost no need to make the motion to bend only the third finger joint without bending the second finger joint, no problem arises in use of hand 9. The third finger joint may be rotated by the worm gear mechanism similarly to the first finger joint and the second finger joint. The third finger joint may be rotated in conjunction with the second finger joint in some finger, and the third finger joint may be rotated by the worm gear mechanism in another finger.

The structure of opposable finger 97 is described. As illustrated in FIG. 76, a finger base yoke 97G that holds the rotation axis of a first finger joint 97D of opposable finger 97 is provided at the position close to an attaching plate 98A on the rear side of palm plate 92 in a direction substantially orthogonal to second finger 94. A finger first motor 97H is disposed in finger base yoke 97G. A first worm 97J connected directly to the rotation shaft of finger first motor 97H meshes with a first worm wheel 97 that is rotated around the rotation axis of first finger joint 97D. First worm wheel 97 is attached to second dactylus 97B. When finger first motor 97H rotates, first worm wheel 97 is rotated together with first dactylus 97A. When first dactylus 97A is rotated, second dactylus 97B and third dactylus 97C are moved to positions opposed to first finger 93 and other fingers.

First dactylus 97A of opposable finger 97 includes a first dactylus base 97T that is rotated together with first worm wheel 97 and a first dactylus tip 97U that is directed in the direction having the angle of about 70 degrees with respect to the rotation direction of first dactylus base 97T. The direction in which first dactylus tip 97U is directed is substantially parallel to the direction in which first dactylus 93A and the like are directed. The end existing on the side opposite to the side connected to first finger joint 97D of first dactylus base 97T has a flat plate shape. First dactylus tip 97U is coupled to the flat-plate-shaped portion of first dactylus base 97T. Finger second motor 97H is disposed in first dactylus tip 97U, and the yoke member holding the rotation shaft of second finger joint 93E is provided in first dactylus tip 97U.

In opposable finger 97, the direction in which first finger joint 97D rotates first dactylus 97A is different from the direction in which second finger joint 97E rotates second dactylus 97B. The structure on the fingertip side from second finger joint 97E of opposable finger 97 is the same as first finger 93 and other fingers.

All the mechanisms that drive the finger joint are provided within hand 9. For this reason, maintenance, repair of trouble, and the like can be performed by removing only the hand 9 from humanoid robot 100.

The operation is described. The posture of humanoid robot 100 is determined by angles taken by intrathoracic joint 16, thoracolumbar joint 18, shoulder joint 13, elbow joint 31, wrist joint 36, hip joint 22, knee joint 40, ankle joint 41, and neck joint 27. The angles of these joints are determined by the lengths of the links that drive the joints. The link that drives each joint of humanoid robot 100 is set to a value determined from the designated angle that is the angle of each joint that can take the designated attitude, which allows humanoid robot 100 to take the designated posture. When humanoid robot 100 is moved, time series of the designated angles corresponding to a change in the posture are converted into time series of the link lengths, and the lengths of the links are changed according to the determined time series, which allow humanoid robot 100 to be moved as designated.

How to determine the length of the variable length link such that the joint can take a designated angle, and how to determine the position of the link attaching unit in the linear guide are described for each joint. The designated angle is required to be within the movable range of the joint. First, intrathoracic joint 16 and thoracolumbar joint 18 are described. Thoracolumbar joint 18 changes the connection direction of chest lower portion 5D with respect to waist 6. Intrathoracic joint 16 changes the connection direction of chest upper portion 5U with respect to chest lower portion 5D.

Figure 80:
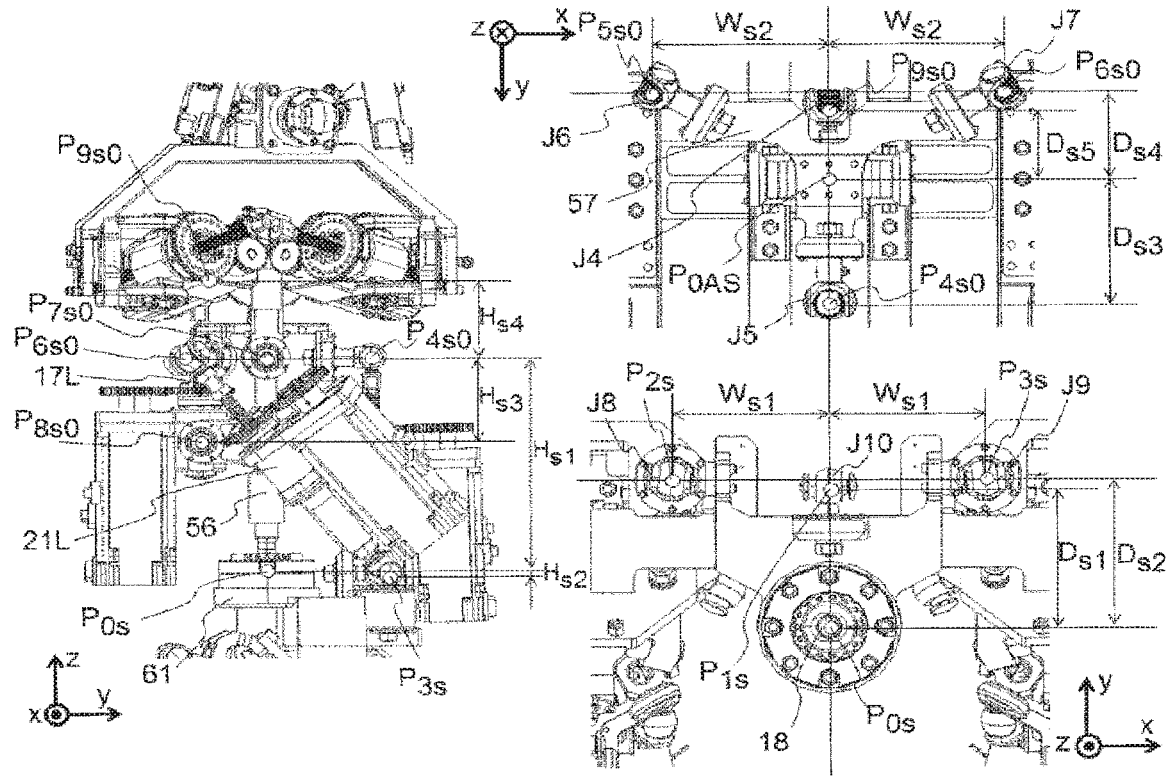
FIG. 80 is a view illustrating variables expressing distances between the joint and link attaching units in an intrathoracic joint and a thoracolumbar joint included in the humanoid robot of the first embodiment.

The distances between the joint and the link attaching units in intrathoracic joint 16 and thoracolumbar joint 18 are expressed by the following variables. FIG. 80 is a view illustrating the variables expressing distances between the joint and the link attaching units in the intrathoracic joint and the thoracolumbar joint.

The variable expressing the position of each point is defined as follows.

$P_{0s}$: position of thoracolumbar joint 18.
$P_{1s}$: position of waist-side center link attaching unit J10.
$P_{2s}$: position of waist-side right link attaching unit J8.
$P_{3s}$: position of waist-side left link attaching unit J9.
$P_{4s}$: position of chest-side center link attaching unit J5.
$P_{4s0}$: position of chest-side center link attaching unit J5 in reference state.
$P_{5s}$: position of chest-side right link attaching unit J6.
$P_{5s0}$: position of chest-side right link attaching unit J6 in reference state.
$P_{6s}$: position of chest-side left link attaching unit J7.
$P_{6s0}$: position of chest-side left link attaching unit J7 in reference state.
$P_{0As}$: position where position of thoracolumbar joint 18 is projected on plane determined by three points $P_{4s}$, $P_{5s}$, $P_{6s}$.
$P_{7s}$: position of intrathoracic joint 16.
$P_{7s0}$: position of intrathoracic joint 16 in reference state.
$P_{8s}$: position of lower intrathoracic link attaching unit J3.
$P_{8s0}$: position of lower intrathoracic link attaching unit J3 in reference state.
$P_{9s}$: position of upper intrathoracic link attaching unit J4.
$P_{9s0}$: position of upper intrathoracic link attaching unit J4 in reference state.

The intervals between points are expressed by the following variables.

Ws1: lengths of line segment $P_{0s}P_{1s}$, and line segment $P_{0s}P_{2s}$ projected on X-axis.
Ds1: length of the line segment $P_{0s}P_{1s}$ projected on Y-axis.
Ds2: lengths of line segment $P_{0s}P_{2s}$ and line segment $P_{02}P_{3s}$ projected on Y-axis.
Ws2: lengths of line segment $P_{0As0}P_{5s0}$ and line segment $P_{0As0}P_{6s0}$ projected on X-axis.
Ds3: length of line segment $P_{A0s}P_{4s0}$ projected on Y-axis.
Ds4: lengths of line segment $P_{A0s}P_{5s0}$ and line segment $P_{A0s}P_{6s0}$ projected on Y-axis.
Ds5: lengths of the line segment $P_{7s0}P_{8s0}$ and line segment $P_{7s0}P_{9s0}$ projected on Y-axis.
Hs1: length of line segment $P_{0s}P_{7s}$. The distance between plane determined by three points $P_{4s}$, $P_{5s}$, $P_{6s}$ and point $P_{0s}$.
Hs2: lengths of line segment $P_{0s}P_{1s}$, line segment $P_{0s}P_{2s}$, and line segment $P_{0s}P_{3s}$ projected on Z-axis.
Hs3: length of line segment $P_{7s0}P_{8s0}$ projected on Z-axis.
Hs4: length of line segment $P_{7s0}P_{9s0}$ projected on Z-axis.

Using the variables defined above, a coordinate of each point is expressed as follows. Position $P_{0s}$ of thoracolumbar joint 18 is set to an origin of the coordinate.

$P_{0s} = (0,0,0)$ $P_{1s} = (0, Ds1, -Hs2)$ $P_{2s} = (Ws1, Ds2, -Hs2)$ $P_{3s} = (-Ws1, Ds2, -Hs2)$ $P_{4s0} = (0, Ds3, Hs1)$ $P_{5s0} = (Ws2, -Ds4, Hs1)$ $P_{6s0} = (-Ws2, -Ds4, Hs1)$ $P_{7s0} = (0, 0, Hs1)$ $P_{8s0} = (0, -Ds5, Hs1 - Hs3)$ $P_{9s0} = (0, -Ds5, Hs1 + Hs3)$

The rotation angles of thoracolumbar joint 18 and intrathoracic joint 16 are expressed by the following variables.

$\alpha_s$: rotation angle around X-axis of thoracolumbar joint 18. $\alpha_s = 0$ in reference state
$\beta_s$: rotation angle around Y-axis of thoracolumbar joint 18. $\beta_s = 0$ in reference state
$\gamma_s$: rotation angle around Z-axis of thoracolumbar joint 18. $\gamma_s = 0$ in reference state
[Rs]: rotation matrix of thoracolumbar joint 18.
$\psi$: rotation angle around X-axis of intrathoracic joint 16. $\psi = 0$ in reference state
[Rs2]: rotation matrix of intrathoracic joint 16.

The rotation matrix [Rs] of thoracolumbar joint 18 is given as follows.

$$[Rs] = \begin{pmatrix} 1 & 0 & 0 \\ 0 & \cos\alpha s & \sin\alpha s \\ 0 & \sin\alpha s & \cos\alpha s \end{pmatrix}$$ [Mathematical Formula 1]

$$\begin{pmatrix} \cos\beta s & 0 & -\sin\beta s \\ 0 & 1 & 0 \\ \sin\beta s & 0 & \cos\beta s \end{pmatrix} \begin{pmatrix} \cos\gamma s & -\sin\gamma s & 0 \\ \sin\gamma s & \cos\gamma s & 0 \\ 0 & 0 & 1 \end{pmatrix}$$

The rotation matrix [Rs2] of intrathoracic joint 16 is given as follows.

$$[Rs2] = \begin{pmatrix} 1 & 0 & 0 \\ 0 & \cos\psi & -\sin\psi \\ 0 & \sin\psi & \cos\psi \end{pmatrix}$$ [Mathematical Formula 2]

Assuming that point $P_{D0}$ is the position in the reference state of any point $P_D$ existing in chest lower portion 5D, the position of point $P_D$ after rotation in thoracolumbar joint 18 can be given as follows.

$P_D = [Rs] * P_{D0}$

Assuming that a point $P_{U0}$ is the position in the reference state of any point $P_U$ existing in chest upper portion 5U, the position of point $P_U$ after rotation in intrathoracic joint 16 and thoracolumbar joint 18 can be given as follows.

$P_u = [Rs] * ([Rs2] * (P_{U0} - P_{7s0}) + P_{7s0})$

The lengths of the links are expressed by the following variables.

$L_{1s}$: length of thoracolumbar center link 19L. Length of line segment $P_{1s}P_{4s}$.
$L_{2s}$: length of thoracolumbar right link 20L. Length of line segment $P_{2s}P_{5s}$.
$L_{3s}$: length of thoracolumbar left link 21L. Length of line segment $P_{3s}P_{6s}$.
$L_{1s0}$: length of thoracolumbar center link 19L in reference state. Length of line segment $P_{1s}P_{4s0}$.
$L_{2s0}$: length of thoracolumbar right link 20L in reference state. Length of line segment $P_{2s}P_{5s0}$.
$L_{3s0}$: length of thoracolumbar left link 21L in reference state. Length of line segment $P_{3s}P_{6s0}$.
$L_{4s}$: length of intrathoracic link 17L. Length of line segment $P_{8s}P_{9s}$.

In the reference state, how to obtain length $L_{4s}$ of intrathoracic link 17L for setting the intrathoracic joint 16 to specified angle ψ is described. Position $P_{9s}$ of upper intrathoracic link attaching unit J4 existing in chest upper portion 5U is expressed as follows.

$$P_{9s} = (x9s, y9s, z9s)$$
$$= [Rs2]*(0, -Ds5, Hs4)^t + (0, 0, Hs1)$$

The expression for each variable is obtained as follows.

$x9s=0$ $y9s=-Ds5*\cos ψ-Hs4*\sin ψ$ $z9s=-Ds5*\sin ψ+Hs4*\cos ψ+Hs1$

Position $P_{8s}$ of lower intrathoracic link attaching unit J3 existing in chest lower portion 5D is not changed by the rotation in intrathoracic joint 16. For this reason, position $P_{8s}$ is equal to position $P_{8s0}$ in the reference state. Length $L_{4s}$ of intrathoracic link 17L can be calculated as follows.

$L_{4s}=\sqrt{((Ds5*(1-\cos ψ)-Hs4*\sin ψ)^2+(-Ds5*\sin ψ+Hs4*\cos ψ+Hs3)^2)}$

Positions $P_{4s}$, $P_{5s}$, $P_{8s}$ of the three points existing in chest lower portion 5D are given by the rotation in thoracolumbar joint 18.

$$P_{4s} = (x4s, y4s, z4s)$$
$$= [Rs]*P_{4s0} = [Rs]*(0, Ds3, Hs1)^t$$

$$P_{5s} = (x5s, y5s, z5s)$$
$$= [Rs]*P_{5s0} = [Rs]*(Ws2, -Ds4, Hs1)^t$$

$$P_{6s} = (x6s, y6s, z6s)$$
$$= [Rs]*P_{6s0} = [Rs]*(-Ws2, -Ds4, Hs1)^t$$

Because $P_{4s}$, $P_{5s}$, $P_{6s}$ are obtained, lengths $L_{1s}$, $L_{2s}$, $L_{3s}$ of the links can be calculated by the following equations.

$L_{1s}=\sqrt{(x4s^2+(y4s-Ds1)^2+(z4s+Hs2)^2)}$ $L_{2s}=\sqrt{((x5s-Ws1)^2+(y5s-Ds2)^2+(z5s+Hs2)^2)}$ $L_{3s}=\sqrt{(x6s+Ws1)^2+(y6s-Ds2)^2+(z5s+Hs2)^2)}$ $L_{1s0}=\sqrt{((Ds3-Ds1)^2+(Hs1+Hs2)^2)}$ $L_{2s0}=\sqrt{((Ws2-Ws1)^2+(Ds2+Ds4)^2+(Hs1+Hs2)^2)}$ $L_{3s0}=\sqrt{((Ws2-Ws1)^2+(Ds2+Ds4)^2+(Hs1+Hs2)^2)}$ In the case that the rotation is performed slightly around the Z-axis from the reference state, how the length of each link is changed is examined. $P_{4s}$, $P_{5s}$, $P_{6s}$ are given as follows. Here, assuming that γs is small, approximation is performed using $\sin γs≈γs$ and $\cos γs≈1$.

$$P_{4s} = (x4s, y4s, z4s)$$
$$= (-Ds3*\sin γs, Ds3*\cos γs, Hs1) ≈ (-Ds3*γs, Ds3, Hs1)$$

$$P_{5s} = (x5s, y5s, z5s)$$
$$= \frac{(Ws2*\cos γs+Ds4*\sin γs, Ws2*\sin γs-Ds4*\cos γs,}{Hs1)} ≈ (Ws2+Ds4*γs, Ws2*γs-Ds3, Hs1)$$

$$P_{6s} = (x6s, y6s, z6s)$$
$$= \frac{(-Ws2*\cos γs+Ds4*\sin γs, -Ws2*\sin γs-Ds4*\cos γs,}{Hs1)} ≈ (-Ws2+Ds4*γs, -Ws2*γs-Ds4, Hs1)$$

The lengths of the links are calculated as follows.

$L_{1s}=\sqrt{((Ds3*γs)^2+(Ds3-Ds1)^2+(Hs1+Hs2)^2)}$ $L_{2s}=\sqrt{((Ws2-Ws1-Ds4*γs)^2+(Ds2+Ds4-Ws2*γs)^2+(Hs1+Hs2)^2)}$ $L_{3s}=\sqrt{((Ws2-Ws1+Ds4*γs)^2+(Ds2+Ds4+Ws2*γs)^2+(Hs1+Hs2)^2)}$ Differences from the lengths of the links in the reference state are determined as follows. Here, γs>0 is assumed.

$L_{1s}^2-L_{1s0}^2=(Ds2*γs)^2>0$ $L_{2s}^2-L_{2s0}^2=(Ws2-Ws1-Ds4*γs)^2-(Ws2-Ws1)^2+(Ds2+Ds4+Ws2*γs)^2-(Ds2+Ds4)^2<0$ $L_{3s}^2-L_{3s0}^2=(Ws2-Ws1+Ds4*γs)^2-(Ws2-Ws1)^2+(Ds2+Ds4+Ws2*γs)^2-(Ds2+Ds4)^2>0$

In the reference state, it is found that one of length $L_{2s}$ of thoracolumbar right link 20L and length $L_{3s}$ of thoracolumbar left link 21L is lengthened while the other is shortened. Thus, in the rotation around the torsion axis, both the force pushed by the extending link and the force drawn by the shortening link are generated, the rotation is performed around torsion axis easily.

Figure 81:
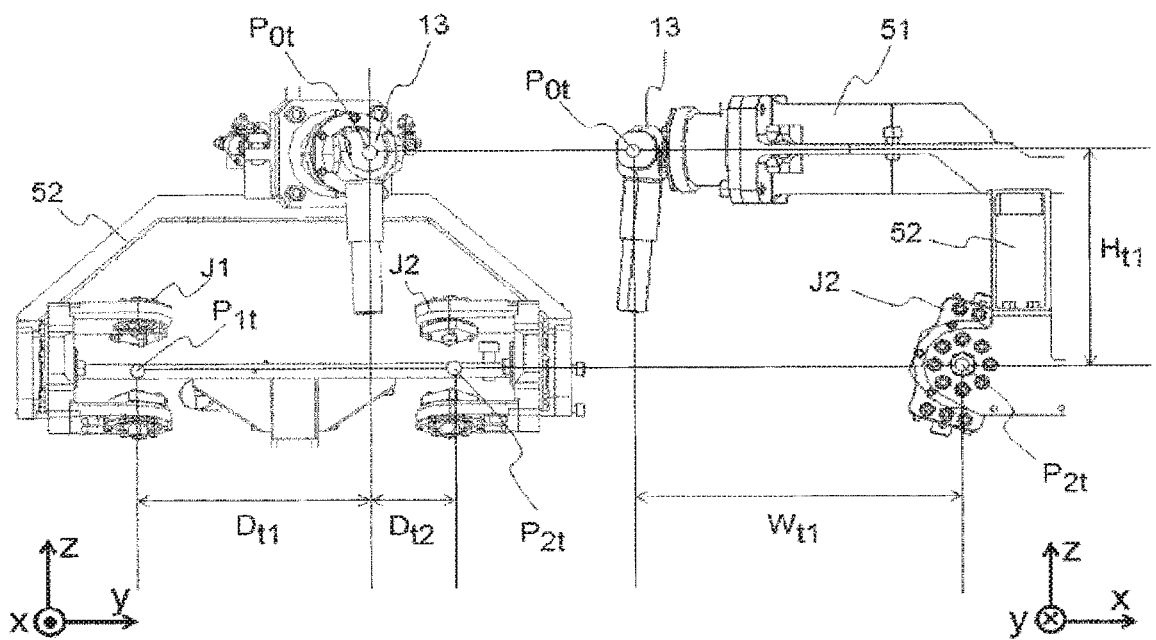
FIG. 81 is a view illustrating variables expressing distances between the joint and the link attaching units in the shoulder joint included in the humanoid robot of the first embodiment.
Figure 82:
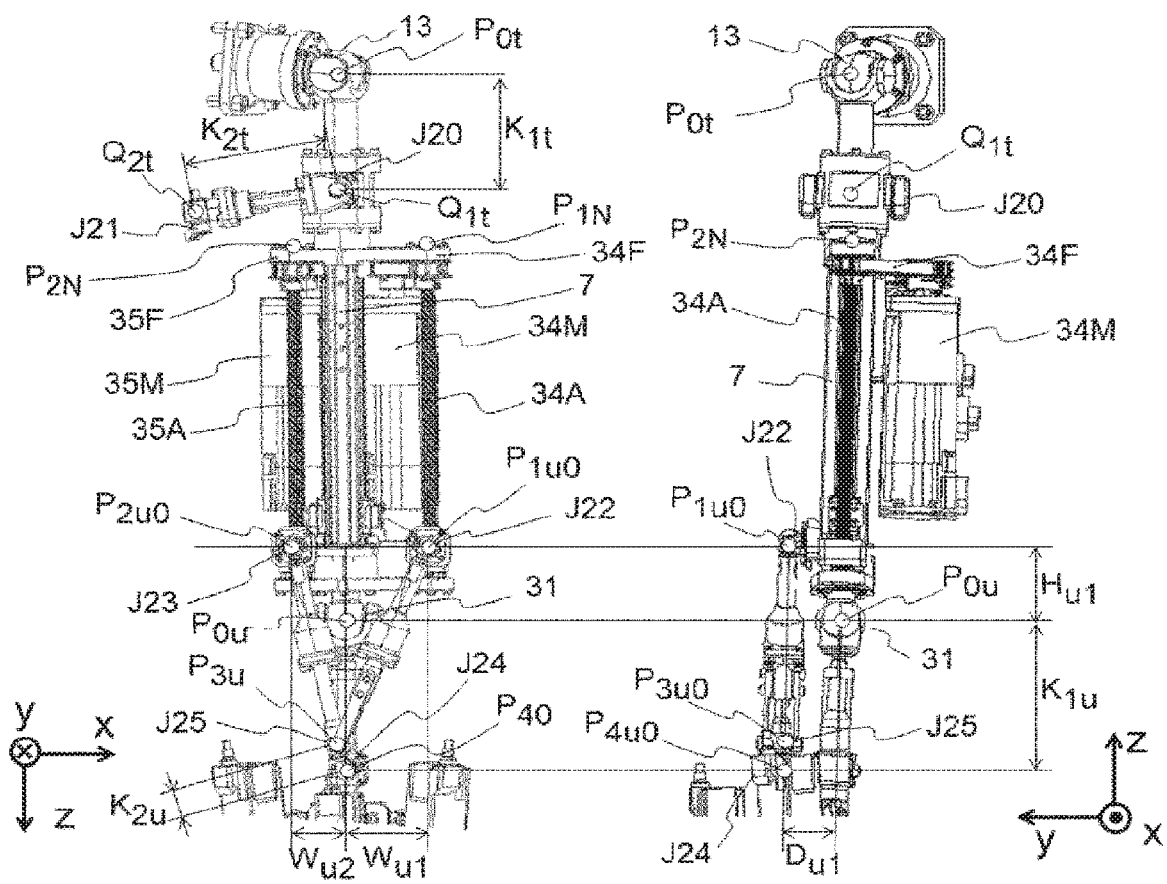
FIG. 82 is a view illustrating variables expressing the distances between the joint and the link attaching units in the elbow joint included in the humanoid robot of the first embodiment.

How to determine the lengths of the variable length links such that the designated angle can be taken with respect to shoulder joint 13 is described. The distances between the joint and the link attaching units in shoulder joint 13 are defined by the following variables. FIG. 81 is a view illustrating the variables expressing the distances between the joint and the link attaching units in shoulder joint 13. $Q_{1t}$ and $Q_{2t}$ are illustrated in FIG. 82.

The variable expressing the position of each point is defined as follows.

$P_{0t}$: position of shoulder joint 13.
$P_{1t}$: position of the chest-side main link attaching unit J1.
$P_{2t}$: position of chest-side auxiliary link attaching unit J2.
$Q_{1t}$: position of upper arm main link attaching unit J20.
 $Q_{1t}$=(x1t, y1t, z1t)
$Q_{1t0}$: position of upper arm main link attaching unit J20 in reference state.
$Q_{2t}$: position of upper arm drive main-link-side auxiliary link attaching unit J21. $Q_{2t}$=(x2t, y2t, z2t)
$Q_{2t0}$: position of upper arm drive main-link-side auxiliary link attaching unit J21 in reference state.

The intervals between points are expressed by the following variables. $K_{1t}$ and $K_{2t}$ are illustrated in FIG. 82.

Wt1: lengths of line segment $P_{0t}P_{1t}$ and line segment $P_{0t}P_{2t}$ projected on X-axis.
Dt1: length of line segment $P_{0t}P_{1t}$ projected on Y-axis.
Dt2: length of the line segment $P_{0t}P_{2t}$ projected on Y-axis.
Ht1: lengths of line segment $P_{0t}P_{1t}$ and line segment $P_{0t}P_{2t}$ projected on Z-axis.
$K_{1t}$: length of line segment $P_{0t}Q_{1t}$.
$K_{2t}$: length of line segment $Q_{1t}Q_{2t}$.

Using the variables defined above, a coordinate of each point is expressed as follows. The position $P_{0t}$ of shoulder joint 13 is set to the origin of coordinate.

$P_{0t}$=(0,0,0)

$P_{1t}=(-Wt1,-Dt1,-Ht1)$ $P_{2t}=(-Wt1,Dt2,-Ht1)$ $Q_{1t0}=(0,0,-K_{1t})$

The rotation angles of shoulder joint 13 are expressed by the following variables.

$\alpha_t$: rotation angle of shoulder joint 13 around X-axis. $\alpha_t=0$ in reference state $\beta_t$: rotation angle of shoulder joint 13 around Y-axis. $\beta_t=0$ in reference state

[Rt]: rotation matrix of shoulder joint 13.

The rotation matrix [Rt] is given as follows.

$$[Rt] = \begin{pmatrix} 1 & 0 & 0 \\ 0 & \cos\alpha t & -\sin\alpha t \\ 0 & \sin\alpha t & \cos\alpha t \end{pmatrix} \begin{pmatrix} \cos\beta t & 0 & -\sin\beta t \\ 0 & 1 & 0 \\ \sin\beta t & 0 & \cos\beta t \end{pmatrix}$$ [Mathematical Formula 3]

The lengths of the links are expressed by the following variables.

$L_{1t}$: length of upper arm drive main link 14L. Length of line segment $P_{1t}Q_{1t}$.

$L_{2t}$: length of upper arm drive auxiliary link 15L. Length of line segment $P_{2t}Q_{2t}$.

In shoulder joint 13, because upper arm drive main-link-side auxiliary link attaching unit J21 is located on upper arm drive main link 14L, a position $Q_{2t}$ of upper arm drive main-link-side auxiliary link attaching unit J21 is required to satisfy the following condition.

$Q_{2t}=(K_{2t}/L_{1t})*P_{1t}+(1-K_{2t}/L_{1t})*Q_{1t}$

The following constraint condition is required to hold with respect to an interval of the link attaching unit.

$\sqrt{(x1t^2+y1t^2+z1t^2)}=K_{1t}$

Using the angle matrix [Rt] of the shoulder joint 13, position $Q_{1t}$ of the upper-arm-side main link attaching unit J20 is determined as follows.

$Q_{1t}=[Rt]*Q_{1t0}$

The expression for each variable is obtained as follows.

$x1t=K_{1t}*\cos\alpha_t*\sin\beta_t$ $y1t=K_{1t}*\sin\alpha_t$ $z1t=-K_{1t}*\cos\alpha_t*\cos\beta_t$ When position $Q_{1t}$ is determined, $L_{1t}$ can be calculated by the following equation.

$L_{1t}=\sqrt{((x1t+Wt1)^2+(y1t+Dt1)^2+(z1t+Ht1)^2)}$

The following constraint equation relating to position $Q_{2t}$ is expressed for each variable.

$x2t=x1t-(x1t+Wt1)*(K_{1t}/L_{1t})$ $y2t=y1t-(y1t+Dt1)*(K_{1t}/L_{1t})$ $z2t=z1t-(z1t+Ht1)*(K_{1t}/L_{1t})$

When position $Q_{2t}$ is determined, $L_{2t}$ can be calculated by the following equation.

$L_{2t}=\sqrt{((x2t+Wt1)^2+(y2t-Dt2)^2+(z2t+Ht1)^2)}$

How to determine the link attaching unit in the upper arm such that the designated angle can be taken with respect to elbow joint 31 is described. The distances between the joint and the link attaching units in elbow joint 31 are defined by the following variables. FIG. 82 is a view illustrating the variables expressing the distances between the joint and the link attaching units in elbow joint 31.

The variable expressing the position of each point is defined as follows.

$P_{0u}$: position of elbow joint 31.

$P_{1u}$: position of upper arm outside link attaching unit J22.

$P_{1u0}$: position of upper arm outside link attaching unit J22 in reference state.

$P_{2u}$: position of upper arm inside link attaching unit J23.

$P_{2u0}$: position of upper arm inside link attaching unit J23 in reference state.

$P_{3u}$: position of elbow drive outside link attaching unit J25. $P_{3u}=(x3u, y3u, z3u)$ $P_{3u0}$: position of elbow drive outside link attaching unit J25 in reference state.

$P_{4u}$: position of elbow drive inside link attaching unit J24. $P_{4u}=(x4u, y4u, z4u)$ $P_{4u0}$: position of elbow drive inside link attaching unit J24 in reference state.

The intervals between points are expressed by the following variables.

Wu1: length of the line segment $P_{0u}P_{1u}$ projected on X-axis.

Wu2: length of line segment $P_{0u}P_{2u}$ projected on X-axis.

Du1: lengths of line segment $P_{0u}P_{1u}$ and line segment $P_{0u}P_{2u}$ projected on Y-axis.

Hu1: lengths of line segment $P_{0u}P_{1u0}$ and line segment $P_{0u}P_{2u0}$ projected on Z-axis.

$K_{1u}$: length of line segment $P_{0u}P_{4u0}$ projected on Z-axis.

$L_{1u0}$: length of line segment $P_{1u}P_{3u}$. Length of the elbow drive outside link 32.

$L_{2u0}$: length of line segment $P_{2u}P_{4u}$. Length of elbow drive inside link 33.

$K_{2u}$: length of line segment $P_{3u}P_{4u}$.

Using the variables defined above, a coordinate of each point is expressed as follows. Position $P_{0u}$ of elbow joint 31 is set to the origin of the coordinate.

$P_{0u}=(0,0,0)$ $P_{1u0}=(Wu1,Du1,Hu1)$ $P_{2u0}=(-Wu2,Du1,Hu1)$ $P_{4u0}=(0,Du1,-K_{1u})$

Upper arm outside actuator 34 and upper arm inside actuator 35 are provided in parallel with upper arm 9 (Z-axis). Positions $P_{1u}$, $P_{2u}$ of upper arm outside link attaching unit J22 and upper arm inside link attaching unit J23, which are moved by upper arm outside actuator 34 and upper arm inside actuator 35, are moved in the direction parallel to Z-axis. That is, $P_{1u}$ and $P_{2u}$ can be expressed as follows.

$P_{1u}=(Wu1,Du1,z1u)$ $P_{2u}=(-Wu2,Du1,z2u)$

Because elbow drive outside link 32 is attached to elbow drive inside link 33, $P_{2u}$, $P_{3u}$, $P_{4u}$ exist on the same straight line. Thus, the following equation holds.

$P_{3u}=(K_{2u}/L_{2u0})*P_{2u}+(1-K_{2u}/L_{2u0})*P_{4u}$

By applying this equation in the reference state, $P_{3u0}$ is determined as follows.

$P_{3u0}=(-(K_{2u}/L_{2u0})*Wu1,Du1,-(K_{2u}/L_{2u0})*(Hu1+K_{1u})-K_{1u})$

The lengths, which are constant, of elbow drive outside link 32 and elbow drive inside link 33 are given as follows.

$$L_{2u0} = \sqrt{(Wu2^2 + (Hu1 + K_{1u})^2)}$$

$$L_{1u0} = \sqrt{(Wu1^2 + (Hu1 + K_{1u})^2 + K_{2u} * (K_{2u} - Hu1 - K_{1u} + Wu1)/(Wu1^2 + (Hu1 + K_{1u})^2))}$$

The rotation angles of elbow joint 31 are expressed by the following variables.
- $\alpha_u$: rotation angle of elbow joint 31 around X-axis. $\alpha_u=0$ in reference state
- $\gamma_u$: rotation angle of elbow joint 31 around Z-axis. $\gamma_u=0$ in reference state
- [Ru]: rotation matrix of elbow joint 31.

The rotation matrix [Ru] is given as follows.

[Mathematical Formula 4]
$$[Ru] = \begin{pmatrix} 1 & 0 & 0 \\ 0 & \cos\alpha u & -\sin\alpha u \\ 0 & \sin\alpha u & \cos\alpha u \end{pmatrix} \begin{pmatrix} \cos\gamma u & -\sin\gamma u & 0 \\ \sin\gamma u & \cos\gamma u & 0 \\ 0 & 0 & 1 \end{pmatrix}$$

When [Ru] is given, $P_{4u}$ is determined by the following equation.

$$P_{4u} = (x4u, y4u, z4u) = [Ru] * P_{4u0} = [Ru] * (0, Du1, -K_{1u})^t$$

Because $L_{2u0}$ is constant, z2u is determined from $P_{4u}$ by the following equation.

$$L_{2u}^2 = (x4u + Wu2)^2 + (y4u - Du1)^2 + (z4u - z2u)^2 = L_{2u0}^2$$

$$z2u = z4u + \sqrt{(L_{2u0}^2 - (x4u + Wu2)^2 - (y4u - Du1)^2)}$$

$P_{3u}$ is determined from $P_{2u}$ and $P_{4u}$ by applying the constraint equation expressing that $P_{2u}$, $P_{3u}$, $P_{4u}$ exist on the same straight line. The expression for each variable is obtained as follows.

$$x3u = x4u - (Wu1 + x4u) * (K_{2u}/L_{2u0})$$

$$y3u = y4u + (Du1 - y4u) * (K_{2u}/L_{2u0})$$

$$z3u = z4u + (z2u - z4u) * (K_{2u}/L_{2u0})$$

Because $L_{1u0}$ is constant, z1u is determined from $P_{3u}$ by the following equation.

$$L_{1u}^2 = (x3u - Wu1)^2 + (y3u - Du1)^2 + (z3u - z1u)^2 = L_{1u0}^2$$

$$z1u = z3u + \sqrt{(L_{1u0}^2 - (x3u - Wu1)^2 - (y3u - Du1)^2)}$$

Figure 83:
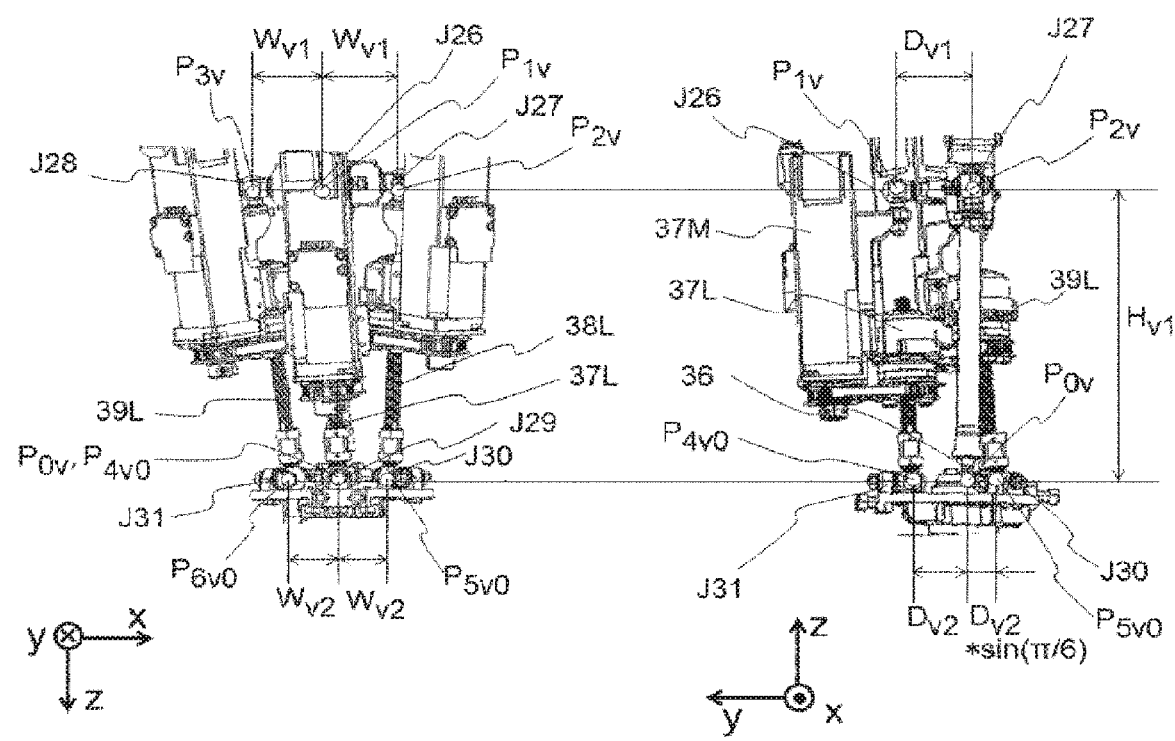
FIG. 83 is a view illustrating variables expressing the distances between the joint and the link attaching units in the wrist joint included in the humanoid robot of the first embodiment.

How to determine the lengths of the variable length links such that the designated angle can be taken with respect to wrist joint 36 is described. The distances between the joint and the link attaching units in wrist joint 36 are defined by the following variables. FIG. 83 is a view illustrating the variables expressing the distances between the joint and the link attaching units in wrist joint 36.

The variable expressing the position of each point is defined as follows.
- $P_{0v}$: position of wrist joint 36.
- $P_{1v}$: position of forearm front link attaching unit J26.
- $P_{2v}$: position of forearm outside link attaching unit J27.
- $P_{3v}$: position of forearm inside link attaching unit J28.
- $P_{4v}$: position of hand-side front link attaching unit J29.
- $P_{4v0}$: position of hand-side front link attaching unit J29 in reference state.
- $P_{5v}$: position of hand-side outside link attaching unit J30.
- $P_{5v0}$: position of hand-side outside link attaching unit J30 in reference state.
- $P_{6v}$: position of the hand-side inside link attaching unit J31.
- $P_{6v0}$: position of hand-side inside link attaching unit J31 in reference state.
- $P_{0v}$, $P_{4v}$, $P_{5v}$, $P_{6v}$ exist on the same plane.

The intervals between points are expressed by the following variables.
- Wv1: lengths of line segment $P_{0v}P_{1v}$ and line segment $P_{0v}P_{2v}$ projected on X-axis.
- Dv1: length of line segment $P_{0v}P_{1v}$ projected on Y-axis.
- Hv1: length of line segment $P_{0v}P_{4v}$.
- Dv2: length of line segment $P_{0v}P_{4v}$.

Using the variables defined above, a coordinate of each point is expressed as follows. At this point, position $P_{0v}$ of wrist joint 36 is set to the origin of the coordinate.

$$P_{0v} = (0,0,0)$$

$$P_{1v} = (0, Dv1, -Hv1)$$

$$P_{2v} = (Wv1, 0, -Hv1)$$

$$P_{3v} = (-Wv1, 0, -Hv1)$$

$$P_{4v0} = (0, Dv2, 0)$$

$$P_{5v0} = (Dv2*\cos(\pi/6), -Dv2*\sin(\pi/6), 0)$$

$$P_{6v0} = (-Dv2*\cos(\pi/6), -Dv2*\sin(\pi/6), 0)$$

The rotation angles of wrist joint 36 are expressed by the following variables.
- $\alpha_v$: rotation angle of wrist joint 36 around X-axis. $\alpha_v=0$ in reference state
- $\beta_v$: rotation angle of wrist joint 36 around Y-axis. $\beta_v=0$ in reference state
- $\gamma_v$: rotation angle of wrist joint 36 around Z-axis. $\gamma_v=0$ in reference state
- [Rv]: rotation matrix of wrist joint 36.

The rotation matrix [Rv] is given as follows.

[Mathematical Formula 5]
$$[Rv] = \begin{pmatrix} 1 & 0 & 0 \\ 0 & \cos\alpha v & -\sin\alpha v \\ 0 & \sin\alpha v & \cos\alpha v \end{pmatrix}$$
$$\begin{pmatrix} \cos\beta v & 0 & -\sin\beta v \\ 0 & 1 & 0 \\ \sin\beta v & 0 & \cos\beta v \end{pmatrix} \begin{pmatrix} \cos\gamma v & -\sin\gamma v & 0 \\ \sin\gamma v & \cos\gamma v & 0 \\ 0 & 0 & 1 \end{pmatrix}$$

The lengths of the links are expressed by the following variables.
- $L_{1v}$: length of forearm front link 37L. Length of line segment $P_{1v}P_{4v}$.
- $L_{2v}$: length of forearm outside link 38L. Length of line segment $P_{2v}P_{4v}$.
- $L_{3v}$: length of forearm inside link 39L. Length of line $P_{3v}P_{6v}$.
- $L_{1v0}$: length of forearm front link 37L in reference state. Length of line segment $P_{1v}P_{4v0}$.
- $L_{2v0}$: length of forearm outside link 38L in reference state. Length of line segment $P_{2v}P_{5v0}$.
- $L_{3v0}$: length of forearm inside link 39L in reference state. Length of line segment $P_{3v}P_{6v0}$.

[Rv] is given, and $P_{4v}$, $P_{5v}$, $P_{6v}$ are obtained by the following expressions.

$$P_{4v} = (x4v, y4v, z4v)$$
$$= [Rv]*(0, Dv2, 0)^t$$

$$P_{5v} = (x5v, y5v, z5v)$$
$$= [Rv]*(Dv2*\cos(\pi/6), -Dv2*\sin(\pi/6), 0)^t$$

$$P_{6v} = (x6v, y6v, z6v)$$
$$= [Rv]*(-Dv2*\cos(\pi/6), -Dv2*\sin(\pi/6), 0)^t$$

Because $P_{4v}$, $P_{5v}$, $P_{6v}$ are obtained, the lengths $L_{1v}$, $L_{2v}$, $L_{3v}$ of the links can be calculated by the following equations.

$$L_{1v}=\sqrt{(x4v^2+(Dv1-y4v)^2+(Hv1+z4v)^2)}$$

$$L_{2v}=\sqrt{((Wv1-x5v)^2+y5v^2+(Hv1+z5v)^2)}$$

$$L_{3v}=\sqrt{((Wv1+x6v)^2+y6v^2+(Hv1+z6v)^2)}$$

$$L_{1v0}=\sqrt{((Dv1-Dv2)^2+Hv1^2)}$$

$$L_{2v0}=\sqrt{((Wv1-Dv2*\cos(\pi/6))^2+(Dv2*\sin(\pi/6))^2+Hv1^2)}$$

$$L_{3v0}=\sqrt{((Wv1-Dv2*\cos(\pi/6))^2+(Dv2*\sin(\pi/6))^2+Hv1^2)}$$

In the case that the rotation is performed slightly around the Z-axis from the reference state, how the length of each link is changed is examined. $P_{4v}$, $P_{5v}$, $P_{6v}$ are given as follows. Here, assuming that $\gamma v$ is small, approximation is performed using $\sin \gamma v \approx \gamma v$ and $\cos \gamma v \approx 1$.

$$P_{4v} = (x4v, y4v, z4v)$$
$$= (-Dv2*\sin\gamma s, Dv2*\cos\gamma s, 0) \approx (-Dv2*\gamma v, Dv2, 0)$$

$$P_{5v} = (x5v, y5v, z5v)$$
$$(Dv2*\cos(\pi/6-\gamma v), Dv2*\sin(\pi/6-\gamma v), 0) \approx$$
$$= (Dv2*\cos(\pi/6)+Dv2*\sin(\pi/6)*\gamma v,$$
$$Dv2*\cos(\pi/6)*\gamma v - Dv2*\sin(\pi/6), 0)$$

$$P_{6v} = (x6v, y6v, z6v)$$
$$(-Dv2*\cos(\pi/6+\gamma v), -Dv2*\sin(\pi/6+\gamma v), 0) \approx$$
$$= (-Dv2*\cos(\pi/6)+Dv2*\sin(\pi/6)*\gamma v,$$
$$-Dv2*\cos(\pi/6)*\gamma v - Dv2*\sin(\pi/6), 0)$$

The lengths of the links are calculated as follows.

$$L_{1v}=\sqrt{((Dv2*\gamma v)^2+(Dv1-Dv2)^2+Hv1^2)}$$

$$L_{2v}=\sqrt{((Wv1-Dv2*\cos(\pi/6)-Dv2*\sin(\pi/6)*\gamma v)^2+(Dv2*\cos(\pi/6)*\gamma v-Dv2*\sin(\pi/6))^2+Hv1^2)}$$

$$L_{3v}=\sqrt{((Wv1-Dv2*\cos(\pi/6)+\sin(\pi/6)*\gamma v)^2+(Dv2*\cos(\pi/6)*\gamma v+Dv2*\sin(\pi/6))^2+Hv1^2)}$$

Differences from the lengths of the links in the reference state are determined as follows. Here, $\gamma v > 0$ is assumed.

$$L_{1v}^2-L_{1v0}^2=(Dv2*\gamma v)^2>0$$

$$L_{2v}^2-L_{2v0}^2=(Wv1-Dv2*\cos(\pi/6)-Dv2*\sin(\pi/6)*\gamma v)^2-(Wv1-Dv2*\cos(\pi/6))^2+(Dv2*\sin(\pi/6)-Dv2*\cos(\pi/6)*\gamma v)^2-(Dv2*\sin(\pi/6))^2<0$$

$$L_{3v}^2-L_{3v0}^2=(Wv1-Dv2*\cos(\pi/6)+Dv2*\sin(\pi/6)*\gamma v)^2-(Wv1-Dv2*\cos(\pi/6))^2+(Dv2*\sin(\pi/6)+Dv2*\cos(\pi/6)*\gamma v)^2-(Dv2*\sin(\pi/6))^2>0$$

In the reference state, it is found that one of length $L_{2v}$ of the forearm outside link 38L and length $L_{3v}$ of the forearm inside link 39L is lengthened while the other is shortened. Thus, while rotating around forearm bone 8B being the torsion axis, both the force pushed by the extending link and the force drawn by the shortening link are generated, the rotation around torsion axis is performed easily.

Similarly to wrist joint 36, neck joint 27 changes the connection angle with three rotational degrees of freedom by changing the lengths of the three variable length links. Even in neck joint 27, the lengths of the three variable length links can be determined to have the determined connection angle in the same manner as wrist joint 36.

Figure 84:
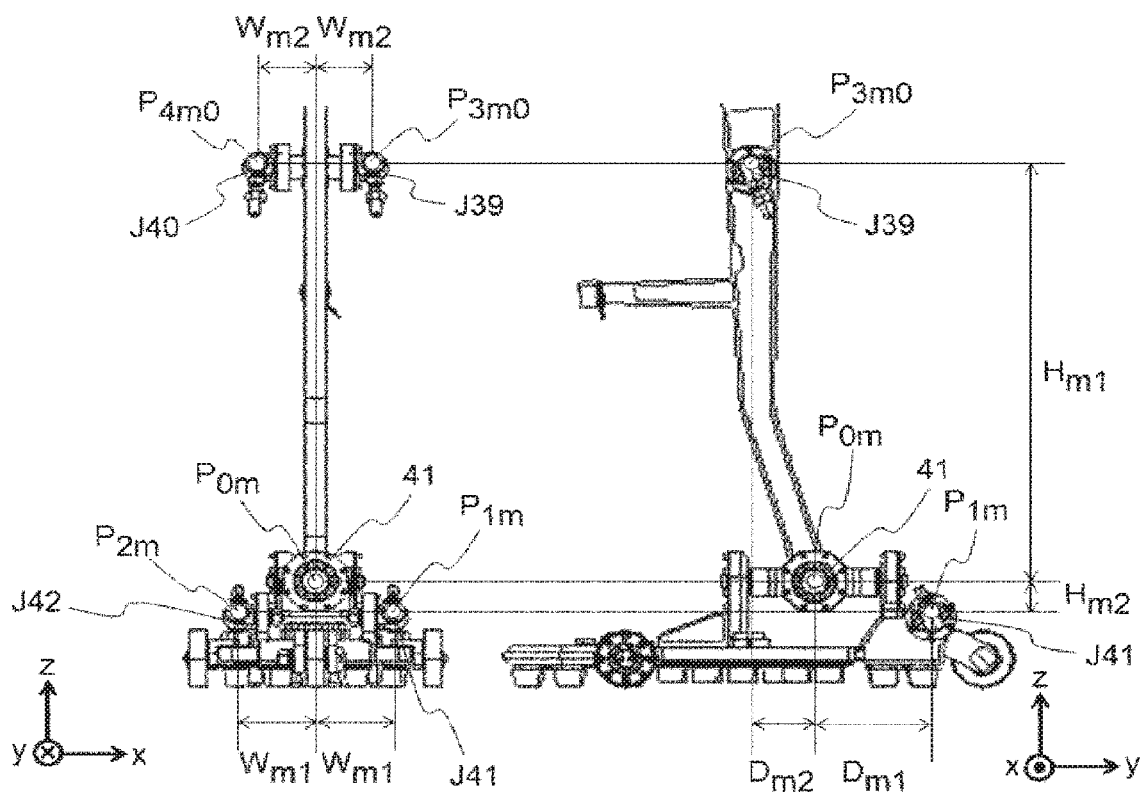
FIG. 84 is a view illustrating variables expressing the distances between the joint and the link attaching units in the ankle joint included in the humanoid robot according to the first embodiment.

How to determine the lengths of the links such that the designated angle can be taken with respect to ankle joint 41 is described. The distances between the joint and the link attaching units in ankle joint 41 are defined by the following variables. FIG. 84 is a view illustrating the variables expressing the distances between the joint and the link attaching units in ankle joint 41.

The variable expressing the position of each point is defined as follows.

$P_{0m}$: position of ankle joint 41.
$P_{1m}$: position of foot outside link attaching unit J41.
$P_{2m}$: position of foot inside link attaching unit J42.
$P_{3m}$: position of lower leg outside link attaching unit J39.
$P_{3m0}$: position of lower leg outside link attaching unit J39 in reference state.
$P_{4m}$: position of lower leg inside link attaching unit J40.
$P_{4m0}$: position of lower leg inside link attaching unit J40 in reference state.

The intervals between points are expressed by the following variables.

Wm1: lengths of line segment $P_{0m}P_{1m}$ and line segment $P_{0m}P_{2m}$ projected on X-axis.
Wm2: lengths of line segment $P_{0m}P_{3m0}$ and line segment $P_{0m}P_{4m0}$ projected on X-axis.
Dm1: lengths of line segment $P_{0m}P_{1m}$ and line segment $P_{0m}P_{2m}$ projected on Y-axis.
Dm2: lengths of line segment $P_{0m}P_{3m0}$ and line segment $P_{0m}P_{4m0}$ projected on Y-axis.
Hm1: lengths of line segment $P_{0m}P_{1m}$ and line segment $P_{0m}P_{2m}$ projected on Z-axis.
Hm2: lengths of line segment $P_{0m}P_{3m0}$ and line segment $P_{0m}P_{4m0}$ projected on Z-axis.
Dm1: length of the line segment $P_{0m}P_{1m}$ projected on Y-axis.

Using the variables defined above, a coordinate of each point is expressed as follows. Position $P_{0m}$ of ankle joint 41 is set to the origin of the coordinate.

$$P_{0m}=(0,0,0)$$

$$P_{1m}=(Wm1,Dm1,-Hm1)$$

$$P_{2m}=(-Wm1,Dm1,-Hm1)$$

$$P_{3m0}=(Wm2,-Dm2,Hm2)$$

$$P_{4m0}=(-Wm2,-Dm2,Hm2)$$

The rotation angles of ankle joint 41 are expressed by the following variables.

$\alpha_m$: rotation angle of ankle joint 41 around X-axis. $\alpha_m=0$ in reference state $\beta_m$: rotation angle of ankle joint 41 around Y-axis. $\beta_m=0$ in reference state

[Rm]: rotation matrix of ankle joint 41.

The rotation matrix [Rm] is given as follows.

$$[Rm] = \begin{pmatrix} 1 & 0 & 0 \\ 0 & \cos\alpha m & -\sin\alpha m \\ 0 & \sin\alpha m & \cos\alpha m \end{pmatrix} \begin{pmatrix} \cos\beta m & 0 & -\sin\beta m \\ 0 & 1 & 0 \\ \sin\beta m & 0 & \cos\beta m \end{pmatrix}$$ [Mathematical Formula 6]

The lengths of the links are expressed by the following variables.

$L_{1m}$: length of lower leg outside link 45L. Length of line segment $P_{1m}P_{3m}$.

$L_{2m}$: Length of lower leg inside link 46L. Length of line segment $P_{2m}P_{4m}$.

[Rm] is given, and $P_{3m}$, $P_{4m}$ are obtained by the following expressions.

$$P_{3m}=(x3m,y3m,z3m)=[Rm]*(Wm2,-Dm2,Hm2)^t$$

$$P_{4m}=(x4m,y4m,z4m)=[Rm]*(-Wm2,-Dm2,Hm2)^t$$

Because $P_{3m}$, $P_{4m}$ are obtained, lengths $L_{1m}$, $L_{2m}$ of the links can be calculated by the following expressions.

$$L_{1m}=\sqrt{((x3m-Wm1)^2+(y3m-Dm1)^2+(z3m+Hm1)^2)}$$

$$L_{2m}=\sqrt{((x4m+Wm1)^2+(y4m-Dm1)^2+(z4m+Hm2)^2)}$$

Figure 85:
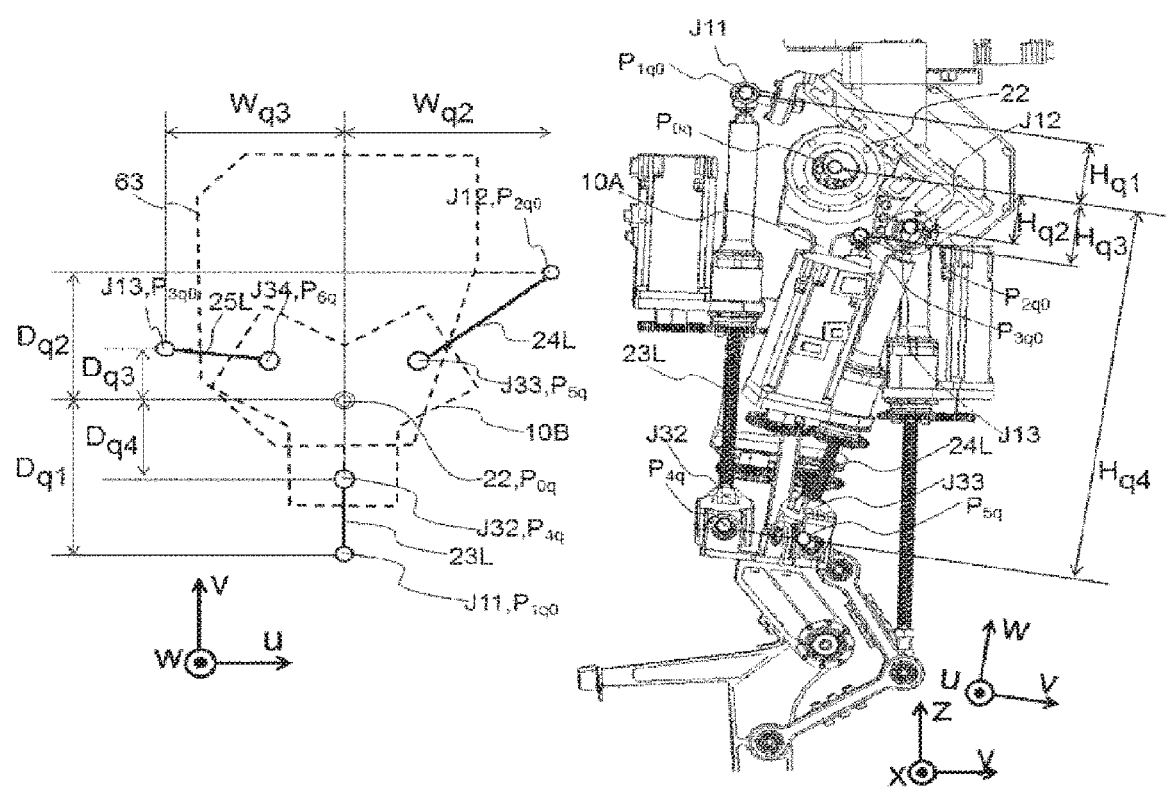
FIG. 85 is a view illustrating variables expressing the distances between the joint and the link attaching units in the hip joint included in the humanoid robot of the first embodiment.

How to determine the lengths of the links such that the designated angle can be taken with respect to hip joint 22 is described. The distances between the joint and the link attaching units in hip joint 22 are defined by the following variables. FIG. 85 is a view illustrating the variables expressing the distances between the joint and the link attaching units in hip joint 22.

The variable expressing the position of each point is defined as follows.

$P_{0q}$: position of hip joint 22.

$P_{1q}$: position of crotch front link attaching unit J11.

$P_{1q0}$: position of crotch front link attaching unit J11 in reference state.

$P_{2q}$: position of crotch outside link attaching unit J12.

$P_{2q0}$: position of crotch outside link attaching unit J12 in reference state.

$P_{3q}$: position of crotch inside link attaching unit J13.

$P_{3q0}$: position of crotch inside link attaching unit J13 in reference state.

$P_{4q}$: position of knee front link attaching unit J32.

$P_{5q}$: position of knee outside link attaching unit J33.

$P_{6q}$: position of knee inside link attaching unit J34.

The intervals between the points are defined by the following variables. A U-axis, a V-axis, and a W-axis, which are orthogonal to one another, are used as the coordinate system. The UVW-coordinate system is a coordinate system that moves along with thighbone 10A. The W-axis is set to a direction in which thighbone 10A extends. The U-axis is set to an axis that is matched with the X-axis in the reference state.

Wq2: length of line segment $P_{0q}P_{2q0}$ projected on U-axis.

Wq3: length of line segment $P_{0q}P_{3q0}$ projected on U-axis.

Dq1: length of line segment $P_{0q}P_{1q0}$ projected on V-axis.

Dq2: length of line segment $P_{0q}P_{2q0}$ projected on V-axis.

Dq3: length of line segment $P_{0q}P_{3q0}$ projected on V-axis.

Dq4: length obtained by projecting line segment $P_{0q}P_{4q}$ projected on V-axis.

Hq1: length of line segment $P_{0q}P_{1q0}$ projected on the W-axis.

Hq2: length of line segment $P_{0q}P_{2q0}$ projected on W-axis.

Hq3: length of line segment $P_{0q}P_{3q0}$ projected on W-axis.

Hq4: lengths of line segment $P_{0q}P_{4q0}$, line segment $P_{0q}P_{5q0}$, line segment $P_{0q}P_{6q0}$ projected on W-axis.

Using the variables defined above, the coordinate of each point in the reference state is expressed as follows in the UVW-coordinate system. The position of hip joint 22 is set to the origin of the coordinate.

$$P_{0q}=(0,0,0)$$

$$P_{1q0}=(0,-Dq1,Hq1)$$

$$P_{2q0}=(Wq2,Dq2,-Hq2)$$

$$P_{3q0}=(-Wq3,Dq3,-Hq3)$$

$$P_{4q}=(0,-Dq3,-Hq4)$$

$$P_{5q}=(Dq4*\cos(\pi/6),Dq4*\sin(\pi/6),-Hq4)$$

$$P_{6q}=(-Dq4*\cos(\pi/6),Dq4*\sin(\pi/6),-Hq4)$$

The lengths of the links are expressed by the following variables.

$L_{1q}$: length of thigh front link 23L. Length of line segment $P_{1q}P_{4q}$.

$L_{2q}$: length of thigh outside link 24L. Length of line segment $P_{2q}P_{5q}$.

$L_{3q}$: length of thigh inside link 25L. Length of line segment $P_{3q}P_{6q}$.

$L_{1q0}$: length of thigh front link 23L in reference state. Length of line segment $P_{1q0}P_{4q}$.

$L_{2q0}$: length of thigh outside link 24L in reference state. Length of line segment $P_{2q0}P_{5q}$.

$L_{3q0}$: length of thigh inside link 25L in reference state. Length of line segment $P_{3q0}P_{6q}$.

The rotation angles of hip joint 22 are defined by the following variables.

$\alpha q$: rotation angle of hip joint 22 around X-axis. $\alpha q=\alpha q0$ in reference state.

$\beta q$: rotation angle of hip joint 22 around Y-axis. $\beta q=0$ in reference state.

$\gamma q$: rotation angle of hip joint 22 around Y-axis. $\gamma q=0$ in reference state.

[Rq]: rotation matrix of hip joint 22 in UVW-coordinate system.

In the case that the direction in which thighbone 10A extends is rotated from the reference state ($\alpha q0$, 0, 0) to ($\alpha q$, $\beta q$, $\gamma q$) in the XYZ-coordinate system, the point fixed in the XYZ-coordinate system is rotated by ($\alpha q0-\alpha q$, $-\beta q$, $-\gamma q$) in the UVW-coordinate system. Thus, rotation matrix Rq is given as follows.

$$[Rq] = \begin{pmatrix} 1 & 0 & 0 \\ 0 & \cos(\alpha q\ \alpha q0) & \sin(\alpha q\ \alpha q0) \\ 0 & \sin(\alpha q\ \alpha q0) & \cos(\alpha q\ \alpha q0) \end{pmatrix}$$ [Mathematical Formula 7]

$$\begin{pmatrix} \cos\beta q & 0 & \sin\beta q \\ 0 & 1 & 0 \\ \sin\beta q & 0 & \cos\beta q \end{pmatrix} \begin{pmatrix} \cos\gamma q & \sin\gamma q & 0 \\ -\sin\gamma q & \cos\gamma q & 0 \\ 0 & 0 & 1 \end{pmatrix}$$

The coordinates of the points $P_{1q}$, $P_{2q}$, $P_{3q}$ fixed in the XYZ-coordinate system are obtained as follows in the UVW-coordinate system. The coordinates of points $P_{4q}$, $P_{5q}$, $P_{6q}$ moving together with thighbone 10A are not changed in the UVW-coordinate system.

$$P_{1q} = (u1q, v1q, w1q)$$
$$= [Rq]*(0, -Dq1, Hq1)^T$$

$$P_{2q} = (u2q, v2q, w2q)$$
$$= [Rq]*(Wq2, Dq2, -Hq2)^t$$

$$P_{3q} = (u3q, v3q, w3q)$$
$$= [Rq]*(-Wq3, Dq3, -Hq3)^t$$

Because the coordinates of points $P_{1q}$, $P_{2q}$, $P_{3q}$ are obtained in the UVW-coordinate system, the lengths of the links are expressed as follows.

$$L_{1q} = \sqrt{(u1q)^2 + (v1q+Dq4)^2 + (w1q+Hq4)^2}$$

$$L_{2q} = \sqrt{(u2q-Dq4*\cos(\pi/6))^2 + (v2q-Dq4*\sin(\pi/6))^2 + (w2q+Hq4)^2}$$

$$L_{3q} = \sqrt{(u3q+Dq4*\cos(\pi/6))^2 + (v3q-Dq4*\sin(\pi/6))^2 + (w3q+Hq4)^2}$$

In the case that the rotation is performed slightly around the W-axis from the reference state, how the length of each link is changed is examined. Points $P_{1q}$, $P_{2q}$, $P_{3q}$ are given as follows. Here, assuming that γq is small, approximation is performed using sin γq≈γq, cos γq≈1.

$$P_{1q} = (u1q, v1q, w1q)$$
$$= (-Dq1*\sin\gamma q, -Dq1*\cos\gamma q, Hq1) \approx$$
$$(-Dq1*\gamma q, -Dq1, Hq1)$$

$$P_{2q} = (u2q, v2q, w2q)$$
$$= (Wq2*\cos\gamma q + Dq2*\sin\gamma q, -Wq2*\sin\gamma q + Dq2*\cos\gamma q, -Hq2) \approx (Wq2 + Dq2*\gamma q, -Wq2*\gamma q + Dq2, Hq2)$$

$$P_{3q} = (u3q, v3q, w3q)$$
$$= (-Wq3*\cos\gamma q + Dq3*\sin\gamma q, Wq3*\sin\gamma q + Dq3*\cos\gamma q, -Hq3) \approx (-Wq3 + Dq3*\gamma q, Wq3*\gamma q + Dq3, -Hq3)$$

The lengths of the links are calculated as follows.

$$L_{1q} = \sqrt{(Dq1*\gamma q)^2 + (-Dq1+Dq4)^2 + (Hq1+Hq4)^2}$$

$$L_{2q} = \sqrt{((Wq2+Dq2*\gamma q-Dq4*\cos(\pi/6))^2 + (-Wq2*\gamma q + Dq2-Dq4*\sin(\pi/6))^2 + (-Hq2+Hq4)^2}$$

$$L_{3q} = \sqrt{((-Wq3+Dq3*\gamma q+Dq4*\cos(\pi/6))^2 + (Wq3*\gamma q + Dq3-Dq4*\sin(\pi/6))^2 + (-Hq3+Hq4)^2}$$

Differences from the lengths of the links in the reference state are determined as follows.

$$L_{1q}^2 - L_{1q0}^2 = (Dq1*\gamma q)^2 > 0$$

$$L_{2q}^2 - L_{2q0}^2 =$$
$$(Wq2 + Dq2*\gamma q - Dq4*\cos(\pi/6))^2 - (Wq2 - Dq4*\cos(\pi/6))^2 +$$
$$(-Wq2*\gamma q + Dq2 - Dq4*\sin(\pi/6))^2 -$$
$$(Dq2 - Dq4*\sin(\pi/6))^2 = \gamma q *$$
$$((Dq2^2 + Wq2^2)*\gamma q + 2*(Wq2*\sin(\pi/6) - Dq2*\cos(\pi/6))*Dq4)$$

$$L_{3q}^2 - L_{3q0}^2 = (-Wq3 + Dq3*\gamma q + Dq4*\cos(\pi/6))^2 -$$
$$(-Wq3 + Dq4*\cos(\pi/6))^2 +$$
$$(Wq3*\gamma q + Dq3 - Dq4*\sin(\pi/6))^2 - (Dq3 - Dq4*\sin(\pi/6))^2 =$$
$$\gamma q*((Dq3^2 + Wq3^2)*\gamma q - 2*(Wq3*\sin(\pi/6) - Dq3*\cos(\pi/6))*Dq4)$$

As can be seen from the above equations, in the case where Wq2*sin(π/6)−Dq2*cos(π/6)>0 and Wq3*sin(π/6)−Dq3*cos(π/6)>0 hold, or in the case where Wq2*sin(π/6)−Dq2*cos(π/6)<0 and Wq3*sin(π/6)−Dq3*cos(π/6)<0 hold, when the rotation is performed by a small angle around the W-axis from the reference state, one of length $L_{2q}$ of thigh outside link 24L and length $L_{3q}$ of thigh inside link 25L is lengthened and the other is shortened. As illustrated in FIG. 85, both the angle formed by line segment $P_{0q}P_{2q0}$ and the V-axis and the angle formed by the line segment $P_{0q}P_{3q0}$ and the V-axis are greater than π/6 (=60 degrees). That is, Wq2*sin(π/6)−Dq2*cos(π/6)>0 and Wq3*sin(π/6)−Dq3*cos(π/6)>0 hold. In hip joint 22, when the rotation is performed by a small angle around the W-axis from the reference state, one of length $L_{2q}$ of thigh outside link 24L and length $L_{3q}$ of thigh inside link 25L is lengthened, and the other is shortened.

How to determine the length of knee drive link 42L such that the designated angle can be taken with respect to knee joint 40 is described. The positions of knee joint 40, knee drive link attaching unit J35, and thigh-side auxiliary tool attaching unit J36 are determined with respect to thighbone 10A. When angle $\alpha_n$ of knee joint 40 is determined, the position of lower leg-side auxiliary tool attaching unit J38 is determined. Because the lengths of thigh-side auxiliary tool 43 and lower leg side auxiliary tool 44 are fixed, when the position of lower leg-side auxiliary tool attaching unit J38 is determined, the position of knee drive link auxiliary tool connecting unit J37 is determined. Knee joint 40 can be set to the designated angle $\alpha_n$ when the length of knee drive link 42L is set to the determined distance between knee drive link auxiliary tool connecting unit J37 and knee drive link attaching unit J35.

In hand 9, the motor is driven such that the first finger joint and the second finger joint of each finger are set to the designated angle, and such that the worm gear of each finger joint is located at the position corresponding to the designated angle. Opposable finger 97 can be opposed to the ordinary fingers, and only the first finger joint can be bent, so that the fingers can hold thin paper or the like by sandwiching the thin paper with extended fingers. The fingers may previously be disposed so that one finger is opposed to other fingers without including opposable finger 97. The number of fingers is not necessary to be five, but may be at least three. As in hand 9, when the hand includes the opposable finger and the four ordinary fingers, it is advantageous to make the same motion as a human such as grasp of an object, pressing of a button, and operation of a lever.

Humanoid robot 100 uses a driving method in which each joint is driven by the expansion and contraction of the actuator. For this reason, the gear is not required to be disposed in the joint, and the joint can be made compact. When the gear is disposed in the joint, a large space is required for the gear and the joint is enlarged. When the large force is exerted in the humanoid robot in which the gear is disposed in the joint, the joint is enlarged, the humanoid robot has the appearance far away from a human, and the appearance may become distorted. Humanoid robot 100 includes the compact joint, so that appearance of the humanoid robot can be brought close to a human more naturally. The joint has the rotational degrees of freedom of the same degrees as a human, so that humanoid robot 100 can make the motion similar to a human.

The already-developed humanoid robots are thought to have problems in that the joint has insufficient bending rigidity and that thrust or rigidity is insufficient for actual operation. The humanoid robot of the present disclosure is considered to be one of the solutions to these problems.

Because the actuator using the screw rod and the nut is used, reverse efficiency of the screw is high, and the large gripping force of the joint is obtained in a stationary state. When the force less than or equal to the force corresponding to frictional force at the screw acts from the outside on the member driven by the actuator, the joint does not move. When the force larger than the force corresponding to the frictional force acts from the outside, the joint is moved by the external force while the screw functions as a damper that weakens the motion. Because of damping action, robustness against the external force and disturbance is improved.

Hand 9 has opposable finger 97 corresponding to the thumb. Opposable finger 97 can be opposed to four ordinary fingers 93, 94, 95, 96, and the object can be gripped by opposable finger 97 and ordinary fingers 93, 94, 95, 96. Each finger joint is driven by the worm gear mechanism in which the worm and the worm wheel are used, so that large force to bend the finger can be obtained.

Each of the first finger joint and the second finger joint are driven by the worm gear mechanism, so that only one or both of the first finger joint and the second finger joint can be bent. For this reason, the object can be held in a more fitted state by appropriately bending each finger joint of each finger according to the shape of the object held by hand 9. When the electric power supply is interrupted, gripping force can be maintained by the worm gear mechanism.

The finger joint does is not rotated when the motor does not generate the drive force. The reason is that the worm gear mechanism has the large reverse efficiency and the frictional force in the worm gear mechanism is larger than the external force acting on the finger joint. Even if the force to move the member located on the side moved by the worm gear mechanism acts from the outside, when the force is less than or equal to the frictional force of the worm gear mechanism, the finger joint does not rotate. When the larger force acts on the finger joint, the finger joint is rotated while the worm gear mechanism acts as a damper that weakens the motion. For this reason, even if the robot performs such the motion that the upper arm is moved with the hand holding the object, the finger joint of the hand can generate reaction force of the force acting on the object by the motion of the upper arm, and the object can be held in the hand. The force that the finger joint is moved when the motor does not generate the drive force is the force that can be exerted by one or a plurality of humans. Consequently, the object held by, for example, the humanoid robot can be separated from the hand in the event of a disaster or the like in which power supply is cut off.

The humanoid robot according to the present disclosure has a structure enabling the motion close to a human. For this reason, the humanoid robot can substitute the work performed by an ordinary person. When artificial intelligence is installed in the humanoid robot, or when the humanoid robot is remotely operated by a person, it is considered that the humanoid robot can be used in industry, an aging society, and resolution of labor shortage. In particular, it is estimated that the humanoid robot can be used to resolve the labor shortage in simple work, dangerous work and work in a severe environment (such as a radiation environment, a high-temperature environment, a low-temperature environment, and a space environment) in which a person can hardly stay for a long time.

The three-rotational-degree-of-freedom connection mechanism may be used in chest bending unit C1, shoulder C4, elbow C5, knee C8, and ankle C9. The three-rotational-degree-of-freedom connection mechanism may be used in not all body bending unit C2, neck C3, wrist C6, crotch C7, but at least one of body bending unit C2, neck C3, wrist C6, crotch C7, chest bending unit C1, shoulder C4, elbow C5, knee C8, and ankle C9.

The humanoid robot may have only the chest, the head, and the upper limb. The humanoid robot may have only the waist, the chest, the head, and the upper limbs. The humanoid robot may have only the waist and lower limbs. The humanoid robot may not have the head. The three-rotational-degree-of-freedom connection mechanism may be used in at least one joint included in the humanoid robot. In the humanoid robot that includes no waist but the upper limb, the side far from the hand is set to the first member.

The three-rotational-degree-of-freedom connection mechanism of the present disclosure may be applied to not the humanoid robot but a robot arm including the hand and one or a plurality of arm section units connected in series from the hand. The three-rotational-degree-of-freedom connection mechanism may be used such that the second member being one of the hand and the arm section units is connected rotatably to the first member provided far from the hand with three rotational degrees of freedom. In the robot arm, the hand can be at a proper position and can be directed to a proper angle.

In the hand of the present disclosure, only the hand can be used as a robot hand. A hand different from that of the first embodiment may be used.

A biaxial gimbal having a structure different from that of the first embodiment may be used as the biaxial gimbal having two rotational degrees of freedom in the joint and the link attaching unit. The proper type of biaxial gimbal may be used according to the place to which the joint and link attachment are applied.

Each of features possessed by the body bending unit, the chest bending unit, the neck, the shoulder, the elbow, the wrist, the crotch, the knee, and the ankle of the first embodiment can be applied to the humanoid robot that does not include the three-rotational-degree-of-freedom connection mechanism.

A screw type actuator in which the screw rod is used or an actuator in which hydraulic pressure is used may be used as the actuator. The actuator may have any configuration as long as the distance between two points can be changed and maintained. In the actuator, a suitable mechanism such as a gear and a timing belt may be used as the mechanism for transmitting the rotation of the motor to the screw rod.

The opposable finger is movable from the position near the side of the palm plate to the position opposed to the ordinary finger across the palm plate, and may include three finger joints similarly to the ordinary finger. To that end, the opposable finger further includes a fourth dactylus and a fourth finger joint that connects the fourth dactylus rotatably to the third dactylus. The third finger joint rotates the third dactylus with respect to the second dactylus using the worm gear mechanism. The fourth finger joint may be rotated in conjunction with the third finger joint, or can be rotated independently of the third finger joint. The hand may include a finger that always exists at the position opposed to the ordinary finger. The hand may include a finger that is bent in the direction different from the ordinary finger.

The humanoid robot, the robot arm, and the robot hand are remotely controlled. The robot may have an automatically operating program, and be autonomously operated according to the program. The motion of the robot can be stopped from the outside even in the autonomous operation. The autonomous operation can be switched to the remote operation. When the robot comes into contact with a living thing such as a human or an unexpected object while the autonomous operation is performing, the robot has a function of automatically detecting the living thing or the unexpected object and stopping the motion.

The above is also applied to other embodiments.

Second Embodiment

Figure 86:
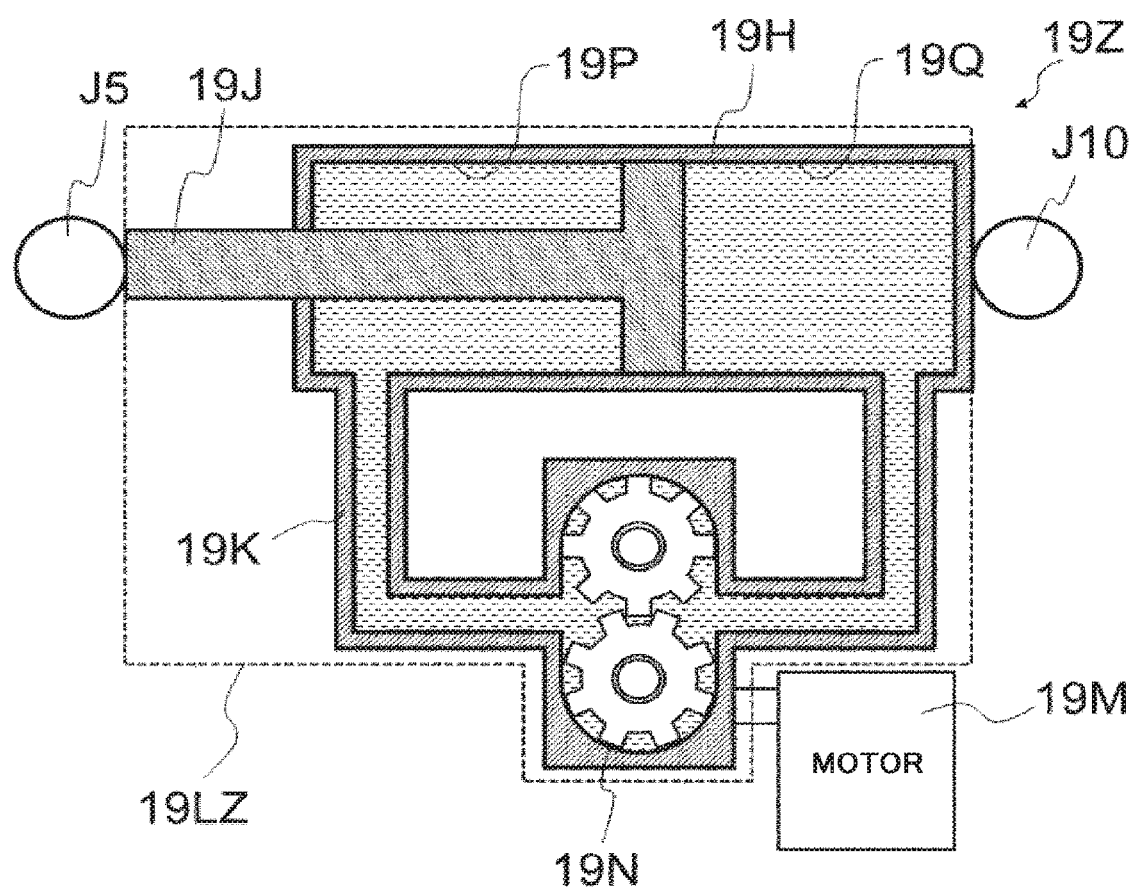
FIG. 86 is a cross-sectional view illustrating a structure of a variable length link of an actuator included in a humanoid robot according to a second embodiment of the present disclosure.

In a second embodiment, a hydraulic mechanism is used in the variable length link. A humanoid robot 100Z includes an actuator in which the hydraulic mechanism is used. An electric motor is used as a drive source of each actuator, a hydraulic pump is driven by the motor, and a piston is moved in the axial direction inside the hydraulic cylinder. A control method when the screw mechanism is driven by the electric motor can directly be adopted when the hydraulic mechanism is used. FIG. 86 is a cross-sectional view illustrating a structure of the variable length link of the actuator included in the humanoid robot according to the second embodiment.

The structure of the actuator in which the hydraulic mechanism is used is described with a thoracolumbar center actuator 19Z as an example. Thoracolumbar center actuator 19Z includes a variable length link 19LZ and a motor 19M. Variable length link 19LZ includes a cylinder 19H, a piston 19J that is moved in cylinder 19H, a pipe 19K, and a pump 19N. Cylinder 19H is filled with liquid such as mineral oil. Piston 19J divides the inside of cylinder 19H into a first chamber 19P and a second chamber 19Q. Piston 19J can be rotated around the axis in cylinder 19H. Pipe 19K connects first chamber 19P and second chamber 19Q. Pipe 19K is filled with the liquid. Pump 19N is provided in the middle of pipe 19K. Pump 19N is driven by motor 19M. Pump 19N is driven by motor 19M. Pump 19N can move the liquid from first chamber 19P to second chamber 19Q, and move the liquid from second chamber 19Q to first chamber 19P.

One end of piston 19J is attached to chest-side center link attaching unit J5. One end of cylinder 19H is attached to waist-side center link attaching unit J10.

When pump 19N moves the liquid from first chamber 19P to second chamber 19Q, piston 19J is moved in the direction approaching chest-side center link attaching unit J5. When pump 19N moves the liquid from second chamber 19Q to first chamber 19P, piston 19J is moved in the direction away from chest-side center link attaching unit J5. When no liquid is moved between first chamber 19P and second chamber 19Q, the position of piston 19J does not change. Thus, the length of variable length link 19LZ can be changed, and maintain any length of variable length link 19LZ within the movable range.

Instead of the screw type actuator in which the screw rod 19A or the like is used, the actuator in which the hydraulic mechanism having pump 19N driven by motor 19M is used can be used.

A valve that switches whether the liquid flows in pipe 19K may be provided. The valve is open in the case that the length of variable length link 19LZ is to be changed. The valve is closed in the case that the length of variable length link 19LZ is to be fixed.

With the configuration of the second embodiment, the hydraulic mechanism driven by the motor moves the piston. A rotation coupling component that transmits the rotation of the motor to the screw rod is eliminated, the rotation coupling component being required when the screw rod is used. Reliability is improved by decreasing the number of components. In the control of each drive shaft, each actuator can be controlled in the same manner as the rotation control of each shaft of the electric driven motor, and the hydraulic mechanism can be replaced directly for the screw mechanism. As a result of the case where the hydraulic actuator is used, the larger thrust can be generated as compared with the case where the screw mechanism is driven with the electric motor, and the humanoid robot having high robustness and high gripping force that can be used at the time of disaster can be constructed.

With the configuration of the second embodiment, the actuator in consideration of damping characteristics due to hydraulic pressure can be constructed. The configuration of the second embodiment operates while exhibiting the damping characteristics against the disturbance, which improves the robustness against the disturbance. Furthermore, a future increase in size and an increase in gripping force of the robot can be dealt with.

Third Embodiment

Figure 87:
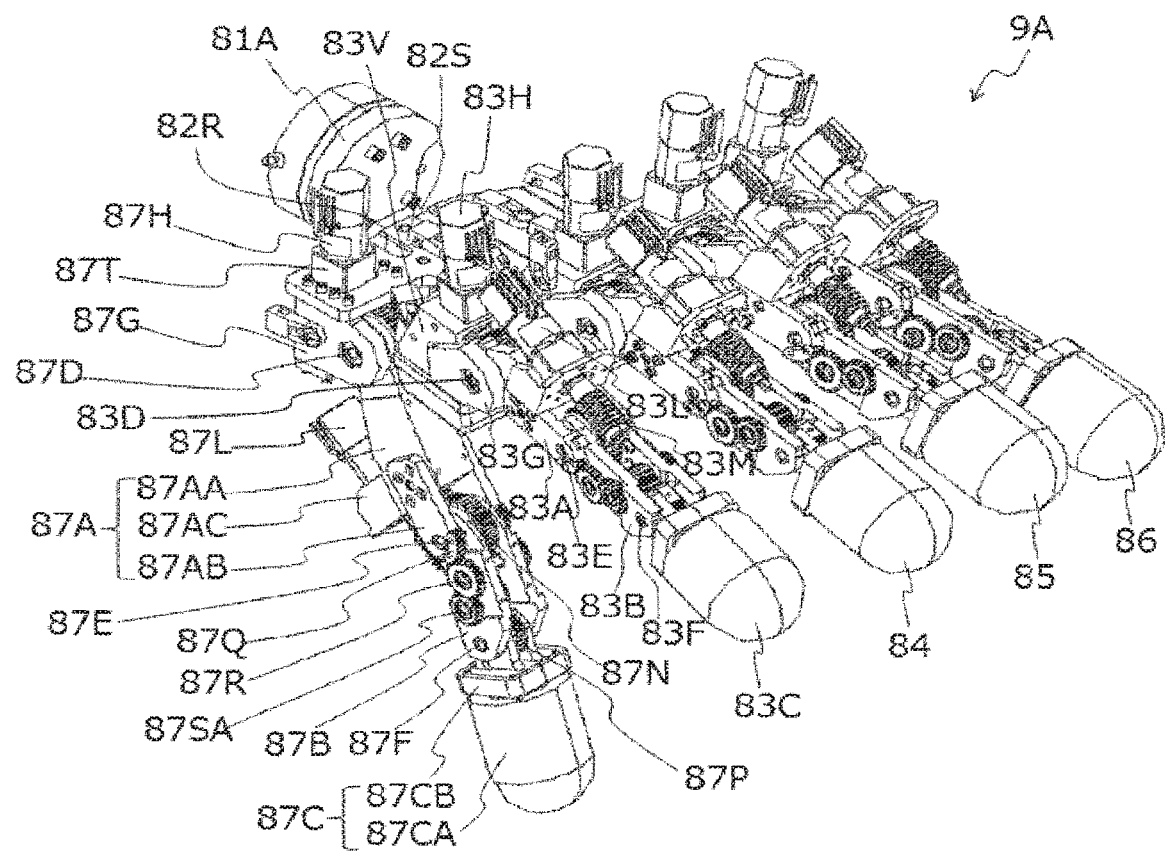
FIG. 87 is a perspective view illustrating a left hand included in a humanoid robot according to a third embodiment of the present disclosure viewing from the backside of the hand.
Figure 88:
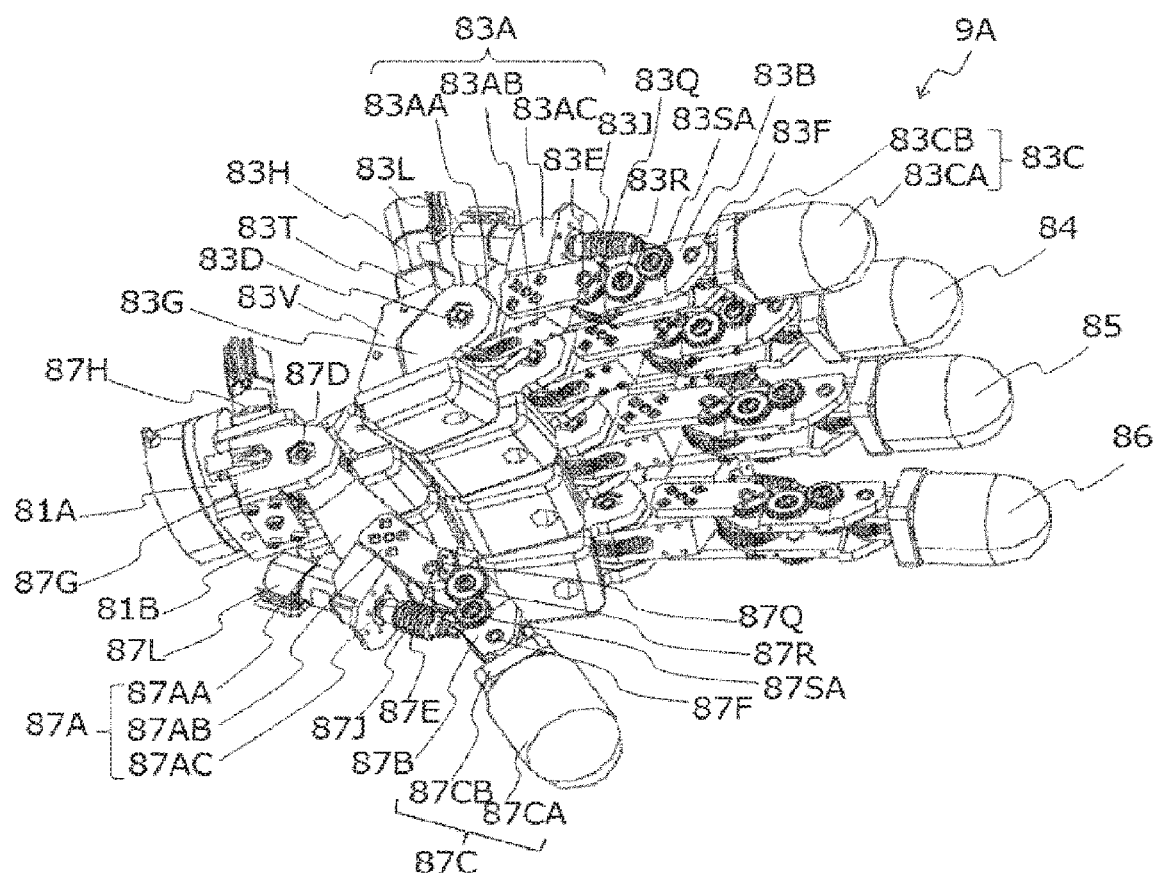
FIG. 88 is a perspective view illustrating the left hand included in the humanoid robot of the third embodiment viewing from a palm side.
Figure 89:
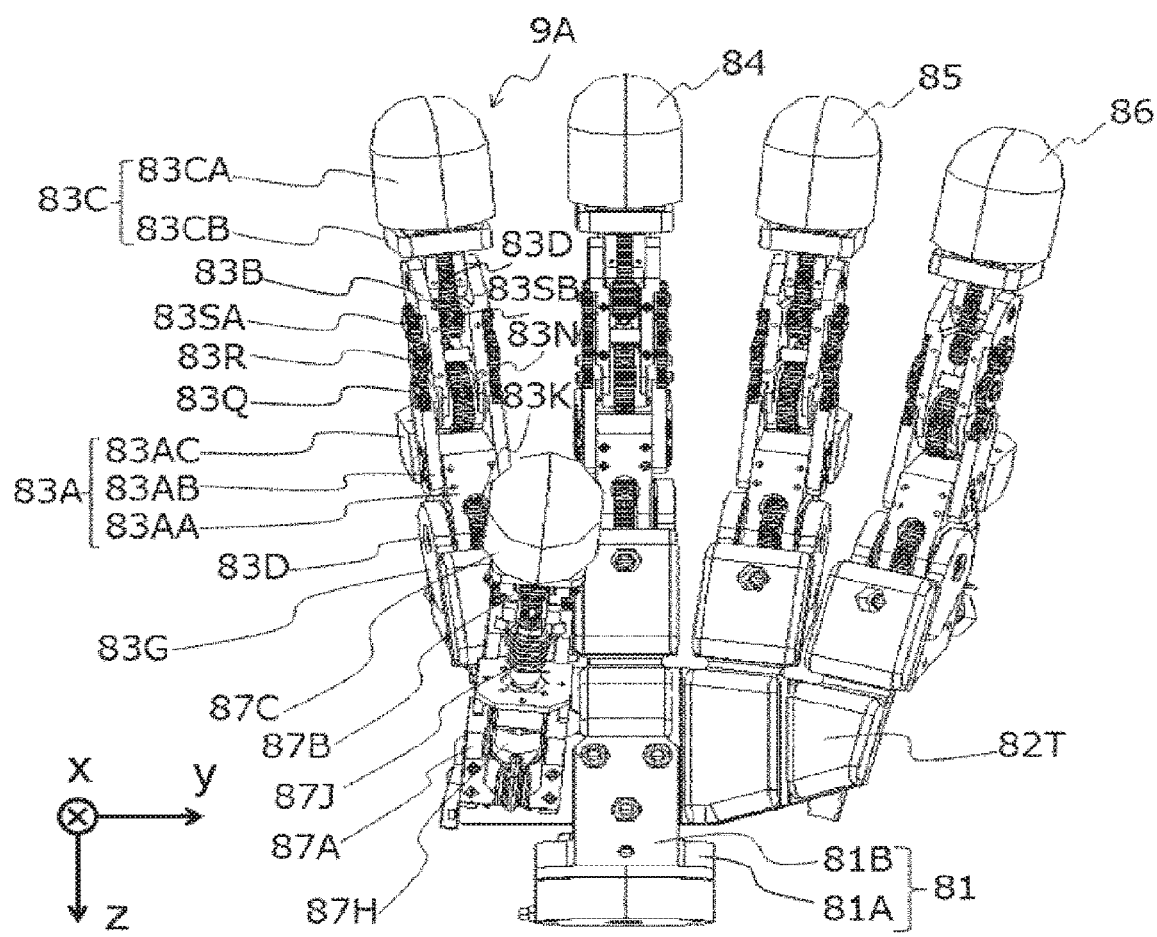
FIG. 89 is a front view illustrating the left hand included in the humanoid robot of the third embodiment.
Figure 90:
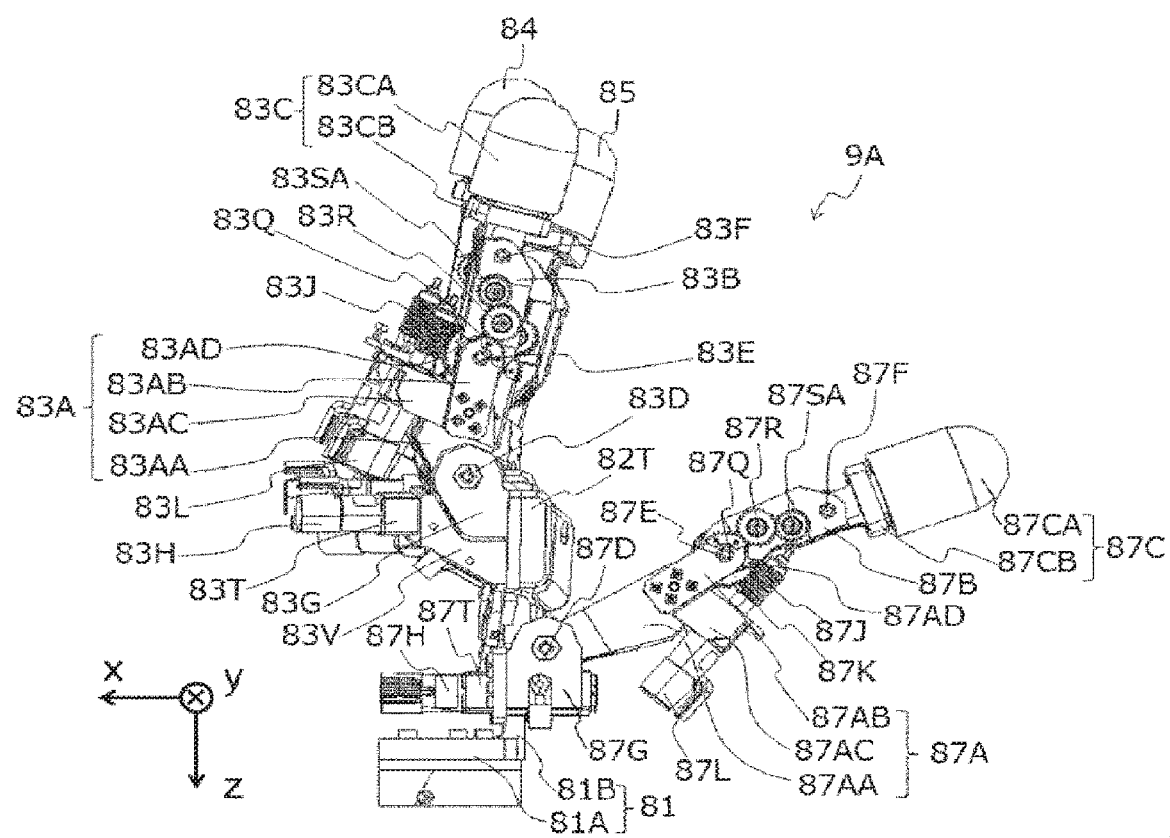
FIG. 90 is a side view illustrating the left hand included in the humanoid robot of the third embodiment viewing from the side on which a first finger exists.
Figure 91:
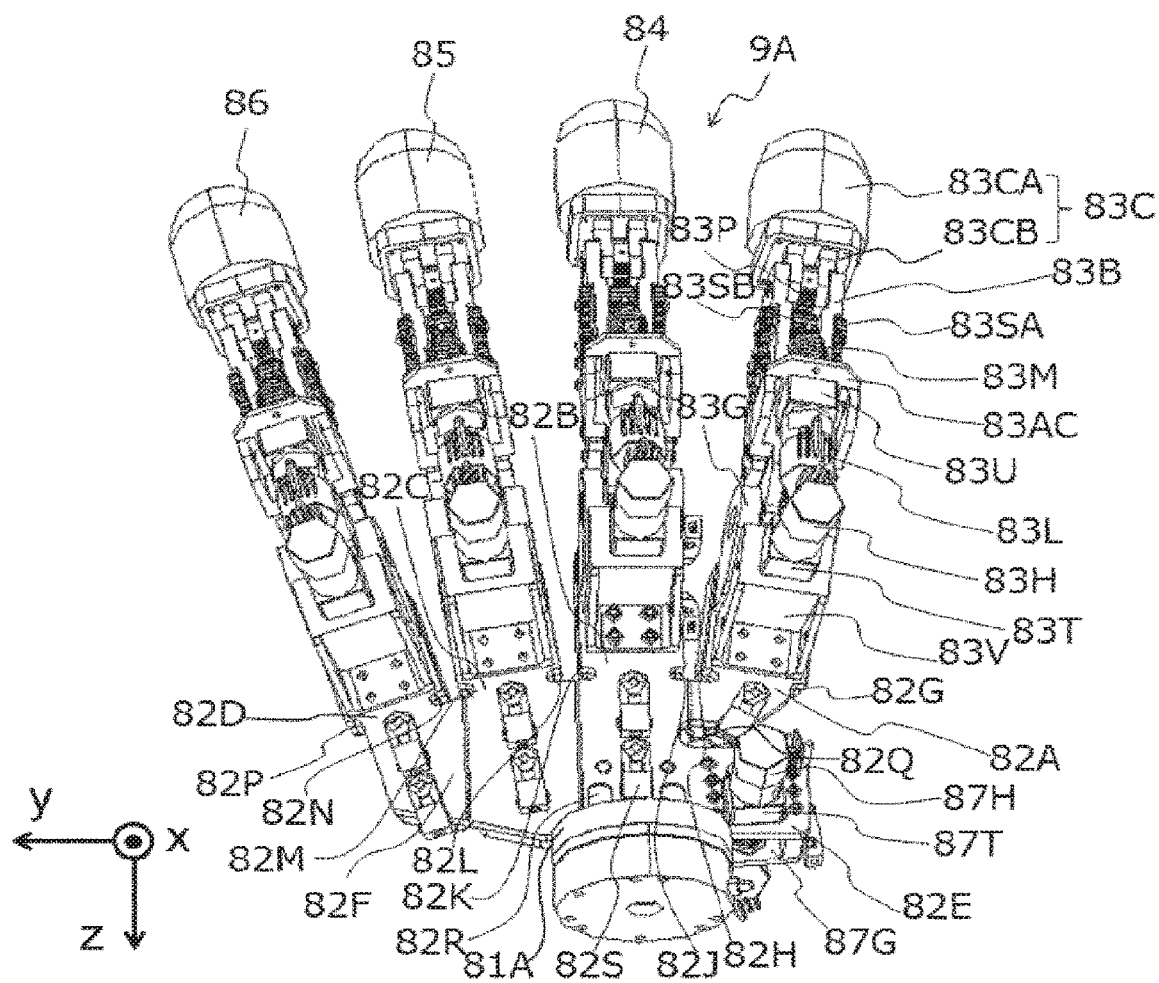
FIG. 91 is a rear view illustrating the left hand included in the humanoid robot of the third embodiment.
Figure 92:
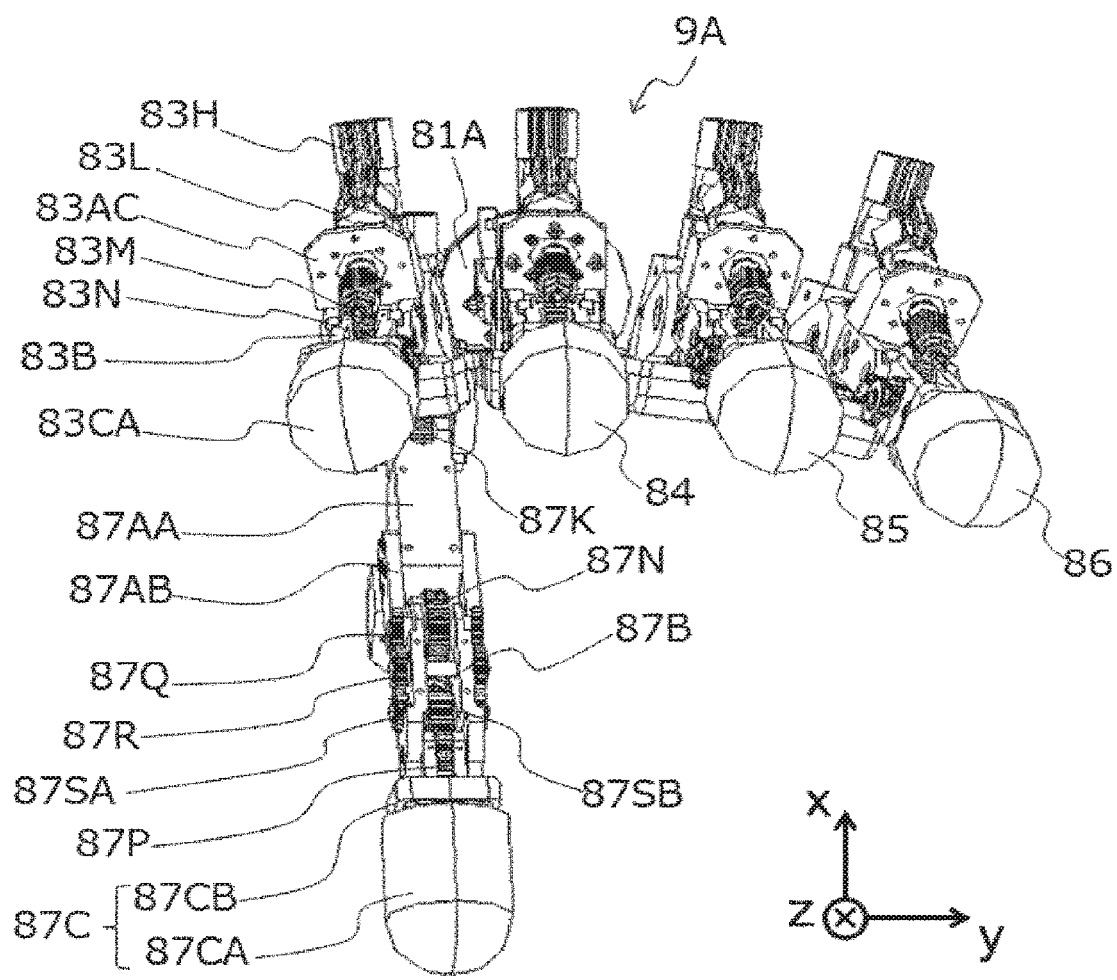
FIG. 92 is a side view illustrating the left hand included in the humanoid robot of the third embodiment viewing from a fingertip side.
Figure 93:
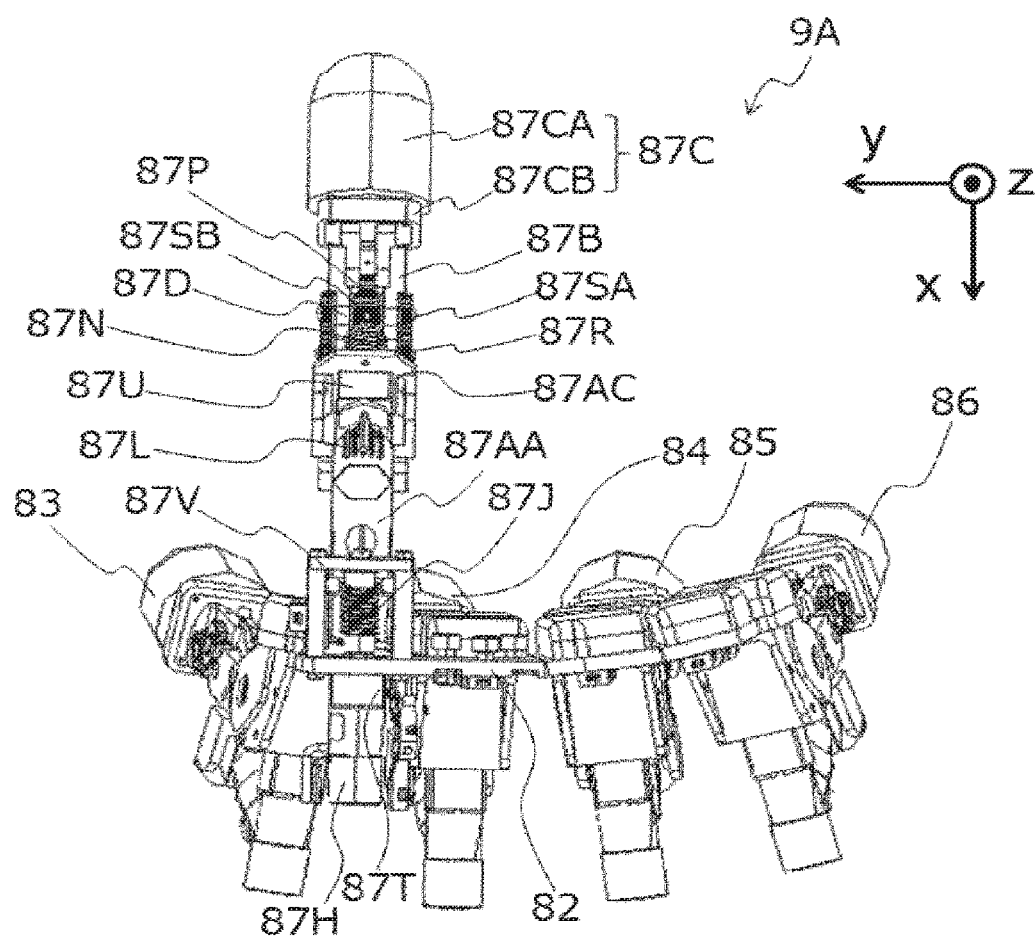
FIG. 93 is a side view illustrating the left hand included in the humanoid robot of the third embodiment viewing from a wrist side.
Figure 94:
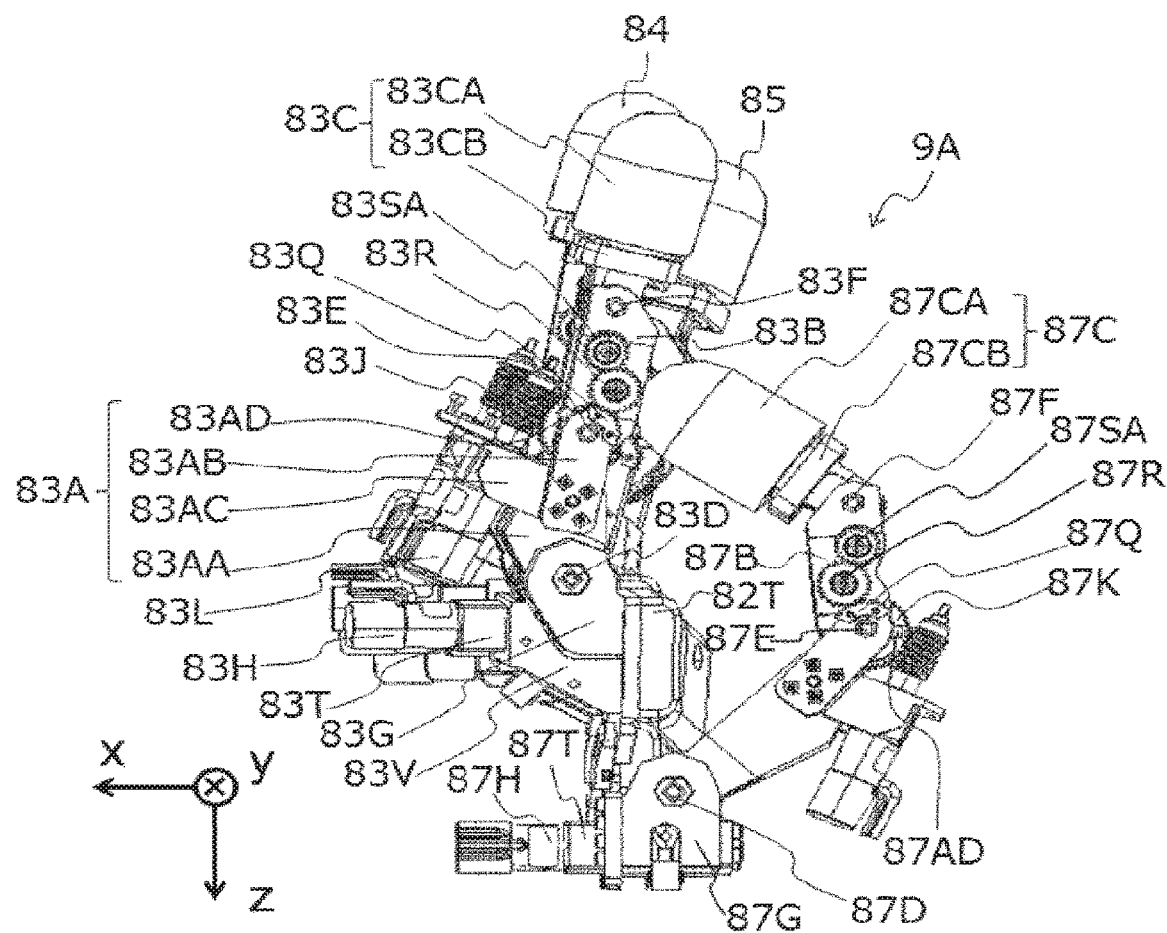
FIG. 94 is a side view illustrating the left hand included in the humanoid robot of the third embodiment when an opposed finger of the left hand is bent viewing from the side on which the first finger exists.

In a third embodiment, the humanoid robot includes the hand including an opposed finger that is always opposed to the ordinary fingers instead of the opposable finger. FIG. 87 is a perspective view illustrating a left hand 9A included in a humanoid robot according to the third embodiment viewing from the backside of the hand. FIG. 88 is a perspective view illustrating left hand 9A viewing from the palm side. FIGS. 89, 90, and 91 are a front view of left hand 9A, a side view of left hand 9A viewing from the side on which first finger 83 exists, and a rear view, respectively. A view of hand 9A viewed from the palm side is taken as a front view. Left hand 9A is illustrated in the state in which the palm faces the front and first finger 83 to fourth finger 86 are directed upward. FIG. 92 is a side view illustrating left hand 9A viewing from the fingertip side. FIG. 93 is a side view illustrating left hand 9A viewing from the wrist side. FIG. 94 is a side view illustrating left hand 9A viewing from the side on which the first finger exists while an opposed finger 87 is bent. In FIG. 93, for convenience, left hand 9A is illustrated while a hand attaching tool 81 is omitted.

The structure of hand 9A is described. Hand 9A is attached to wrist plate 91 by hand attaching tool 81. Hand attaching tool 81 is an L-shaped member in side view. Hand attaching tool 81 includes a circular attaching plate 81A attached to wrist plate 91 and a rectangular palm plate connecting part 81B connected to a palm plate 82. Attaching plate 81A and palm plate connecting part 81B are connected to each other at an angle of about 90 degrees. In this case, a cylindrical member is sandwiched between hand attaching tool 81 and wrist plate 91.

The cylindrical member may not be required to be sandwiched.

Figure 95:
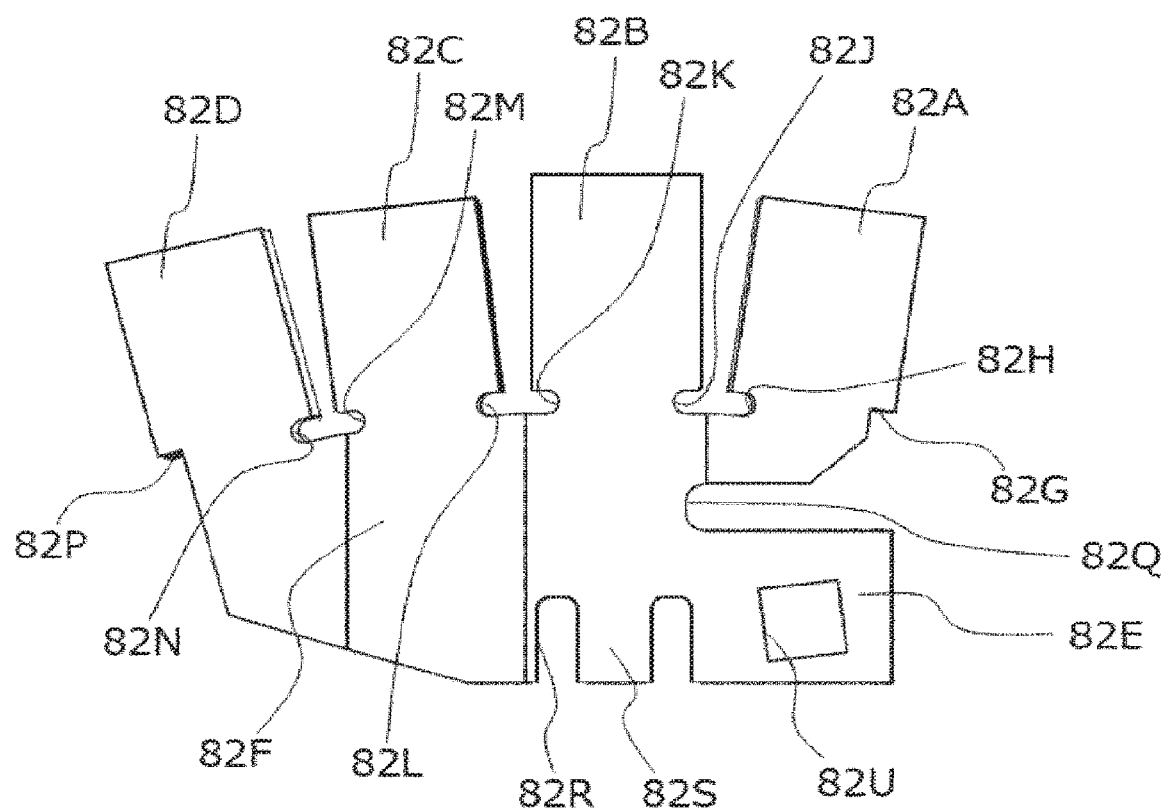
FIG. 95 is a plan view illustrating a palm plate of the left hand included in the humanoid robot of the third embodiment.

FIG. 95 is a plan view illustrating the palm plate of the left hand. As illustrated in FIG. 95, in palm plate 82, substantially rectangular portions to which first finger 83, second finger 84, third finger 85, fourth finger 86, and opposed finger 87 are attached are referred to as a first finger attaching part 82A, a second finger attaching part 82B, a third finger attaching part 82C, a fourth finger attaching part 82D, and an opposed finger attaching part 82E. Other portions of the palm plate 82 are referred to as a palm plate main body 82F. First finger attaching part 82A, second finger attaching part 82B, third finger attaching part 82C, and fourth finger attaching part 82D are connected to the fingertip side in the fingertip direction of palm plate main body 82F. Opposed finger attaching part 82E exists at a corner of the palm plate 82, the corner exists on the wrist side in the fingertip direction and on the side where first finger attaching part 82A exists in the hand breadth direction.

First finger attaching part 82A, second finger attaching part 82B, third finger attaching part 82C, fourth finger attaching part 82D, and opposed finger attaching part 82E are a finger attaching part that is separated in each finger to which the first dactylus of the finger is connected. Palm plate main body 82F is a main body to which the finger attaching part is connected.

First finger attaching part 82A and second finger attaching part 82B are not connected directly to each other, but are connected to each other through palm plate main body 82F interposed therebetween. Second finger attaching part 82B and third finger attaching part 82C are also connected to each other through palm plate main body 82F interposed therebetween. Third finger attaching part 82C and fourth finger attaching part 82D are also connected to each other through palm plate main body 82F interposed therebetween. First finger attaching part 82A, second finger attaching part 82B, third finger attaching part 82C, and fourth finger attaching part 82D are connected to palm plate main body 82F having spaces between adjacent ones. First finger 83, second finger 84, third finger 85, and fourth finger 86 are attached to the palm plate 82 such that there exists wider space at the fingertip side. For this reason, first finger attaching part 82A, second finger attaching part 82B, third finger attaching part 82C, and fourth finger attaching part 82D are connected to palm plate main body 82F to be oriented toward the same directions as first finger 83, second finger 84, third finger 85, and fourth finger 86, respectively.

Each of first finger attaching part 82A, second finger attaching part 82B, third finger attaching part 82C, and fourth finger attaching part 82D is connected to palm plate main body 82F while a width decreasing portion in which a width in the hand breadth direction orthogonal to the fingertip direction is narrowed is interposed therebetween. For this reason, a notch or a difference in width is provided in places where first finger attaching part 82A, second finger attaching part 82B, third finger attaching part 82C, and fourth finger attaching part 82D are connected to palm plate main body 82F. A difference in width 82G that narrows the width of first finger attaching part 82A is provided in first finger attaching part 82A on the side where second finger attaching part 82B does not exist. And a semicircular notch 82H is provided in first finger attaching part 82A on the side near second finger attaching part 82B. Semicircular notches 827, 82K are provided on both sides of second finger attaching part 82B. Semicircular notches 82L, 82M are provided on both sides of third finger attaching part 82C. In fourth finger attaching part 82D, a notch 82N is provided on the side near third finger attaching part 82C, and a difference in width 82P is provided on the side where third finger attaching part 82C does not exist.

Notches 82H, 82J, 82K, 82L, 82M, 82N have the same shape. A straight line connects notches 82H, 82J. A straight line connects notches 82M, 82N. A straight line connects notches 82K, 82L. Notches 82H, 82J and the straight line connecting notches 82H, 82J may collectively be regarded as a notch provided in palm plate main body 82F. Notches 82K, 82L may be regarded as one notch provided in palm plate main body 82F, and notches 82M, 82N may be regarded as one notch provided in palm plate main body 82F.

First finger attaching part 82A, second finger attaching part 82B, third finger attaching part 82C, and fourth finger attaching part 82D have the same width in the hand breadth direction and the same width of the width decreasing portion. The width decreasing portion is a place where the notch or the difference in width is provided to decrease the width.

When the object is gripped by hand 9A, first finger 83, second finger 84, third finger 85, fourth finger 86, and the opposed finger attaching part 82E are appropriately bent. This is because that first finger attaching part 82A, second finger attaching part 82B, third finger attaching part 82C, fourth finger attaching part 82D, and opposed finger attaching part 82E are provided separately from one another. This is also because first finger attaching part 82A, second finger attaching part 82B, third finger attaching part 82C, and fourth finger attaching part 82D are connected to palm plate main body 82F with the width decreasing portion interposed therebetween.

A notch 82Q that separates opposed finger attaching part 82E and first finger attaching part 82A is provided in palm plate 82 on the side of first finger 83. Notch 82Q is formed to have a side parallel to a wrist-side outline on the side of opposed finger attaching part 82E. However, on the side of first finger attaching part 82A, notch 82Q is formed to have a straight portion in which the interval is narrowed toward the inside and a portion parallel to opposed finger attaching part 82E on the side of first finger attaching part 82A. Notch 82K has a semicircular shape in the portion farthest from the end in the hand breadth direction. A through-hole 82U to be inserted by first worm 87J is provided in opposed finger attaching part 82E. In FIG. 95, a hole or the like used to attach the member to palm plate 82 is omitted.

Two notches 82R are provided in a place of palm plate main body 82F to which palm plate connecting part 81B is attached. Palm plate main body 82F sandwiched between two notches 82R is referred to as a wrist attaching part 82S. Palm plate connecting part 81B is screwed to wrist attaching part 82S by a single screw, and screwed to palm plate main body 82F on the fingertip side of two notches 82R by a single screw. Wrist attaching part 82S is narrow because wrist attaching part 82S is sandwiched between notches 82R. Hand 9A is attached to wrist plate 91 with wrist attaching part 82S interposed therebetween, so that hand 9A can appropriately be rotated around the axis directed toward the fingertip direction.

Palm plate main body 82F is bent, and three straight lines are formed on palm plate main body 82F by bending. One ordinary finger is connected to each bent portion. Consequently, the bent portions to which first finger attaching part 82A, second finger attaching part 82B, third finger attaching part 82C, and fourth finger attaching part 82D are connected have different angles. Each bent angle at a bending place is about 6 degrees. By bending palm plate 82, the object is gripped easily to be enfolded by palm plate 82 as compared with the case where palm plate 82 is not bent. The direction of the line generated at three bending places is the direction substantially parallel to the fingertip direction.

A plurality of palm fleshes 82T are provided on the palm side of palm plate 82. The shape of palm flesh 82T is a rectangular parallelepiped in which corners and edges on the side far from palm plate 82 are chamfered. Palm flesh 82T acts as a cushion that relieves a load applied from palm plate 82 to the object when the object is gripped. Palm flesh 82T is made of a material, such as rubber, which has moderate elasticity.

One palm flesh 82T is provided in each of first finger attaching part 82A, second finger attaching part 82B, third finger attaching part 82C, fourth finger attaching part 82D, and opposed finger attaching part 82E. Three palm fleshes 82T are provided for each bent portion in palm plate main body 82F. Palm flesh 82T is not provided in palm plate main body 82F in the portion in which the opposed finger 87 exists.

First finger 83, second finger 84, third finger 85, and fourth finger 86, which are the four ordinary fingers, are connected to palm plate 82 such that there exists wider space at the fingertip side as compared with the base side. As can be seen from FIG. 91, second finger 84 is perpendicular to attaching plate 81A, and the center of second finger 84 and the center of attaching plate 81A are matched with each other. First finger 83, second finger 84, third finger 85, and fourth finger 86 have the same structure.

A largely different point between hand 9A and hand 9 is opposed finger 87. The structure of opposed finger 87 is described. Opposed finger 87 is provided on the palm side of palm plate 82 such that the fingertip extends in the direction intersecting with palm plate 82. Opposed finger 87 is provided so that it faces first finger 83 to fourth finger 86. Opposed finger 87 is provided at a position on the wrist side and close to the corner on the side where first finger 83 of palm plate 82 exists. The direction in which opposed finger 87 is rotated is the direction intersecting first finger 83 and second finger 83. As illustrated in FIG. 89, when the angle between opposed finger 87, being extended, and palm plate 82 is decreased, the fingertip is moved in the direction in which the fingertip approaches second finger 84.

Similarly to first finger 83 and other fingers, in opposed finger 87, a first dactylus 87A, a second dactylus 87B, and a third dactylus 87C are connected in series from the side closer to palm plate 82. A first finger joint 87D exists between palm plate 82 and first dactylus 87A. First finger joint 87D connects first dactylus 87A rotatably to palm plate 82. A second finger joint 87E exists between first dactylus 87A and second dactylus 87B. Second finger joint 87E connects second dactylus 87B rotatably to first dactylus 87A. A third finger joint 87F exists between second dactylus 87B and third dactylus 87C. Third finger joint 87F connects third dactylus 87C rotatably to second dactylus 87B. The rotation axes of first finger joint 87D, second finger joint 87E, and third finger joint 87F are parallel to one another. That is, in the opposed finger 87, the direction in which first finger joint 87D is rotated first dactylus 87A, the direction in which second finger joint 87E is rotated second dactylus 87B, and the direction in which third finger joint 87F rotate third dactylus 8CB are identical to one another. Opposed finger 87 is always located at the position opposed to first finger 83 to fourth finger 86, and opposed finger 87 includes three finger joints, so that hand 9A can grip the object more adequately as compared with hand 9.

Regarding adjacent two of palm plate 82, first dactylus 87A, second dactylus 87B, and third dactylus 87C, one member located on the side closer to palm plate 82 is referred to as a base-side member, and the other member located on the side on which the base-side member does not exist is referred to as a tip-side member. First finger joint 87D, second finger joint 87E, and third finger joint 87F are three finger joints that connect the tip-side member being any one of first dactylus 87A, second dactylus 87B, and third dactylus 87C rotatably to the base-side member. The same holds true for first finger 83, second finger 84, third finger 85, and fourth finger 86.

Opposed finger 87 cannot be moved in the hand breadth direction. That is, unlike hand 9 in FIGS. 72 to 78, opposed finger 87 cannot be moved to the position near the side of palm plate 82 and cannot orient the fingertip toward the substantially same direction as first finger 83 to fourth finger 86. When one finger joint and one motor are further added to opposed finger 87, opposed finger 87 can also be moved in the hand breadth direction. In hand 9A, the number of finger joints and the number of motors are the same as those of hand 9.

A finger first motor 87H being a power source for rotating first finger joint 87D of opposed finger 87 is perpendicularly fixed to the backside of palm plate 82. A first gear head 87T for converting a rotation speed is provided on the rotation shaft side of finger first motor 87H. An outer shape of first gear head 87T is a quadrangular prism shape. First gear head 87T and finger first motor 87H are fixed so as not to be moved with respect to each other. First gear head 87T is perpendicularly fixed to palm plate 82. Finger first motor 87H and first gear head 87T can be fixed to palm plate 82 with high rigidity by perpendicularly fixing first gear head 87T.

A second gear head 87U is also fixed to a finger second motor 87L. The outer shape of second gear head 87U is also the quadrangular prism shape. The first gear head or the second gear head of other fingers is also fixed to the finger first motor or the finger second motor.

Portion of opposed finger 87 on the fingertip side from a finger base yoke 87G exists on the palm side of palm plate 82. At a position corresponding to first worm 87J, through-hole 82U is provided in palm plate 82. First worm 87J connected directly to the rotation shaft of finger first motor 87H meshes with and rotates first worm wheel 87K supported rotatably by finger base yoke 87G on the palm side.

In first finger joint 87D, a worm gear mechanism rotates first dactylus 87A with respect to palm plate 82. The worm gear mechanism includes finger first motor 87H disposed in palm plate 82, first worm 87J rotated by finger first motor 87H, and first worm wheel 87K meshing with first worm 87J and rotating around the rotation axis of first finger joint 87D.

When opposed finger 87 grips the object with large force, the force rotating first worm wheel 87K also becomes large as reaction. Finger first motor 87H generates force to prevent first worm wheel 87K from rotating. Unless the finger first motor 87H is firmly fixed to palm plate 82, finger first motor 87H and first gear head 87T are peeled off from palm plate 82 due to the force rotating first worm wheel 87K. Making finger first motor 87H and first gear head 87T perpendicular to palm plate 82 causes to generate force easily against force separating finger first motor 87H from palm plate 82.

First dactylus 87A includes a first wheel linked part 87AA, a first yoke 87AB, and a second motor installation part 87AC. First wheel linked part 87AA is a box-shaped member that sandwiches first worm wheel 87K and is rotated together with first worm wheel 87K. First yoke 87AB is a member that sandwiches and holds the rotation shaft of second finger joint 87E. The length of first wheel linked part 87AA is set to an extent that opposed finger 87 can sandwich the object with the fingertip of the ordinary finger.

Finger second motor 87L is installed in second motor installation part 87AC. Second motor installation part 87AC is a member existing on the wrist side and contacting with first yoke 87AB. First wheel linked part 87AA and second motor installation part 87AC are manufactured integrally. First wheel linked part 87AA is a polygon in which the side where second finger joint 87E exists is wider viewing from the side where opposed finger 87 exists. First yoke 87AB being two plate materials are screwed to first wheel linked part 87AA on the side where second finger joint 87E exists. Protrusions 87AD are provided at the tip of first yoke 87AB. Protrusions 87AD are stoppers that restrict the rotation of second finger joint 87E toward the backside of the hand to an allowable rotation angle.

Second motor installation part 87AC includes a motor installation surface perpendicular to first yoke 87AB, sides having a distance wider than first yoke 87AB and being parallel to first yoke 87AB, and a bottom connected to first wheel linked part 87AA. The sides are lower than the motor installation surface, and the corners of the sides on the finger base side are largely chamfered. The upper corners of the motor installation surface are also chamfered. Finger second motor 87L and second gear head 87U are fixed vertically in the motor installation surface. A through-hole is made in the motor installation surface, and the rotation shaft of second gear head 87U is inserted in the through hole.

A second worm 87M is attached to the rotation shaft of finger second motor 87L. Second worm 87M meshes with a second worm wheel 87N held rotatably by first yoke 87AB. Since the worm gear mechanism including second worm 87M and second worm wheel 87N is used, second dactylus 87B is rotated around finger joint 87E, being the rotation axis, with respect to first dactylus 87A by rotation of finger second motor 87L.

Second dactylus 87B sandwiches and holds second worm wheel 87N, and is rotated together with second worm wheel 87N. Second dactylus 87B is two plate materials. The rotation shaft of third finger joint 87F is provided at the end of second dactylus 87B on the side where third dactylus 87C exists. Two plate materials included in second dactylus 87B have a constant thickness. Second dactylus 87B has a portion that sandwiches second worm wheel 87N and is sandwiched by first yoke 87AB, an intermediate portion, and a portion in which third finger joint 87F is provided. And second dactylus 87B is formed into a shape having different widths with a small difference. The distance between two plate materials included in second dactylus 87B is narrow on the side where second finger joint 87E exists, and is wide on the side where third finger joint 87F exists. The side surfaces of stoppers 87AD provided at the tip of first yoke 87AB contact with the portion sandwiched by first yoke 87AB. Stoppers 87AD abut on the difference in width of second dactylus 87B existing between the intermediate portion and the portion sandwiched by first yoke 87AB, thus the angle at which second finger joint 87E is rotated onto the side opposite to the palm is restricted.

In second finger joint 87E, a worm gear mechanism rotates second dactylus 87B with respect to first dactylus 87A. The worm gear mechanism includes finger second motor 87L disposed on first dactylus 87A, second worm 87M rotated by finger second motor 87L, and second worm wheel 87N that meshes with second worm 87M to be rotated around the rotation axis of second finger joint 87E together with second dactylus 87B.

Figure 96:
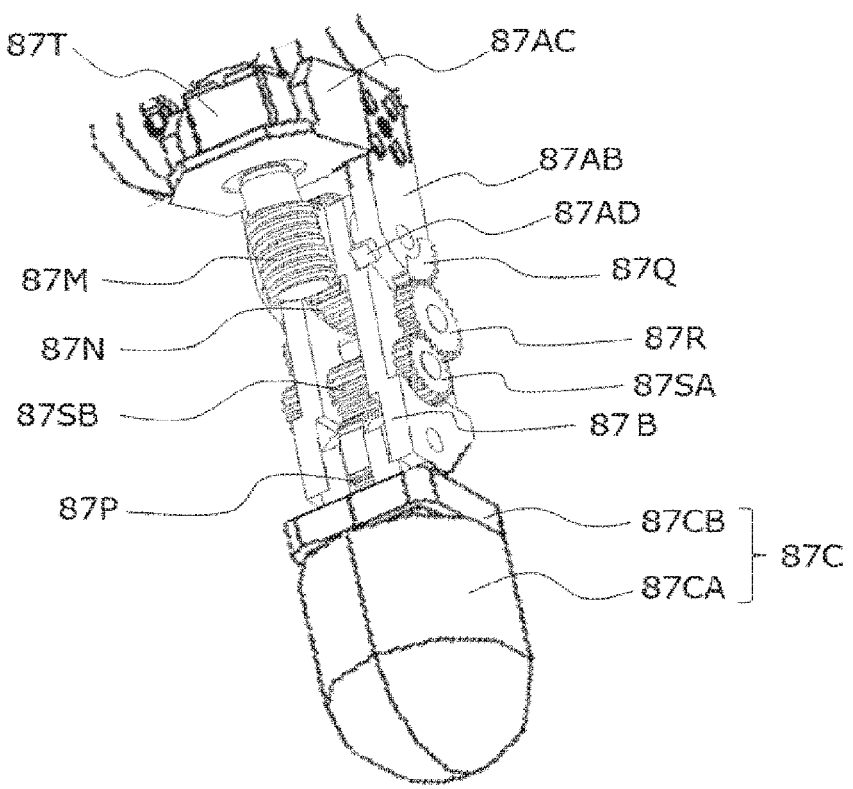
FIG. 96 is an enlarged perspective view illustrating a vicinity of a second dactylus of the opposed finger of the left hand included in the humanoid robot of the third embodiment.

Referring to FIG. 96, the gear that rotates third finger joint 87F in conjunction with second finger joint 87E is described. FIG. 96 is an enlarged perspective view illustrating a vicinity of second dactylus 87B of opposed finger 87. A plurality of gears that rotate third finger joint 87F in conjunction with the rotation of second finger joint 87E are provided in second dactylus 87B. An idler gear 87R existing outside second dactylus 87B meshes with a partial gear 87Q provided at the tip of first yoke 87AB. The pair of idler gear 87R and partial gear 87Q exists on both sides of second dactylus 87B. Idler gear 87R meshing with partial gear 87Q is rotated in the same rotation direction as second worm wheel 87N. Idler gear 87R meshes with an outer-idler gear 87SA on the fingertip side. On the rotation shaft of outer-idler gear 87SA, an inner-idler gear 87SB is fixed by being sandwiched by second dactylus 87B. Outer-idler gear 87SA and inner-idler gear 87SB are rotated in the opposite direction to idler gear 87R. Outer-idler gear 87SA and inner-idler gear 87SB are rotated around the same rotation axis. Inner-idler gear 87SB meshes with a third dactylus drive gear 87P that is rotated around the rotation axis of third finger joint 87F together with third dactylus 87AC. Third dactylus drive gear 87P is rotated in the opposite direction to inner-idler gear 87SB. Third dactylus drive gear 87P is rotated in the same direction as second worm wheel 87N.

A gear ratio between second worm wheel 87N and third dactylus drive gear 87P is adjusted so that it becomes an appropriate value close to 1.

Idler gear 87R is a gear that is rotated in conjunction with the rotation of second finger joint 87B. Outer-idler gear 87SA (including inner-idler gear 87SB) is one of a plurality of gears that is rotated on an odd-numbered rotation shafts driven by idler gear 87R. Third dactylus drive gear 87P is a gear provided in third finger joint 87F driven by inner-idler gear 87SB.

Third dactylus 87C includes a fingertip 87CA and a fingertip base 87CB. Fingertip 87CA has a shape in which a hemisphere is connected to the tip of the cylinder. Fingertip base 87CB is a member that is rotated together with third dactylus drive gear 87P. A rectangular-plate-shaped member having a rounded corner is provided on the fingertip side of fingertip base 87CB. Fingertip 87CA is attached to this plate-shaped member. Consequently, fingertip 87CA can be replaced easily with a fingertip having a shape that conforms to the application.

In first finger 83, all members, including a finger first motor 83H, exist on the backside of the hand.

Finger first motor 83H is attached to a first motor fixer 83V. First motor fixer 83V is a rectangular parallelepiped box. First motor fixer 83V is attached to first finger attaching part 82A. In first motor fixer 83V, the fingertip side and the side near first finger attaching part 82A are open. Ribs are provided on the finger base side for the purpose of reinforcement, and the side near the finger base side of first motor fixer 83V is seen obliquely when viewed from the side. First motor fixer 83V is perpendicular to palm plate 82B, and finger first motor 83H and a first gear head 83T are attached to the surface parallel to palm plate 82B. A first worm 83J attached to the rotation shaft of first gear head 83T is inserted between first motor fixer 83V and palm plate 82B.

Finger first motor 83H and first motor fixer 83V can be fixed with increased rigidity by fixing finger first motor 83H perpendicularly to first motor fixer 83V.

First worm 83J meshes with first worm wheel 83K that is rotated around the rotation axis held by finger base yoke 83G. First dactylus 83A is rotated around first finger joint 83D together with first worm wheel 83K.

The structure on the fingertip side from first dactylus 83A is the same as opposed finger 87. First wheel linked part 83AA is shorter than first wheel linked part 87AA of opposed finger 87.

The structures of second finger 84, third finger 85, and fourth finger 86 are the same as first finger 83.

The disposition of the worm gear mechanism is described by taking first finger 83 as an example. In first finger joint 83D, as illustrated in FIG. 90, in the direction in which palm plate 82 extends, the worm gear mechanism exists in an area in which the finger base yoke 83G exists or an area on the side of finger base yoke 83G on which palm plate 82 exists. At the same time, in the direction perpendicular to palm plate 82, the worm gear mechanism exists in an area on the side of palm plate 82 on which the rotation axis exists. The worm gear mechanism is similarly disposed in second finger 84 and the like. Because the worm gear mechanism of the first finger joint is disposed in such areas, the worm gear mechanism does not obstruct the object when the object is held by hand 9A. FIG. 90 is a view illustrating hand 9A viewed from the direction parallel to the rotation axes of first finger joint 83D and second finger joint 83E.

In second finger joint 83E, as illustrated in FIG. 90, the worm gear mechanism exists in an area in which first dactylus 83A exists or an area on the side of first dactylus 83A far from palm plate 82 in the direction orthogonal to the direction in which first dactylus 83A extends. The area on the side of first dactylus 83A far from palm plate 82 in the direction orthogonal to the direction in which first dactylus 83A extends is the back side of the hand. First finger 83 can be rotated onto the palm side from the state in which each finger joint is extended. When each finger joint is rotated onto the palm side, first finger 83 approaches palm plate 82. The back side of first finger 83 is the side far from palm plate 82 than first finger 83. Also in second finger 84 and the like, the worm gear mechanism is similarly disposed in the second finger joint. Because the worm gear mechanism of the second finger joint is disposed in such areas, the worm gear mechanism does not obstruct the object when the object is held by hand 9A.

The operation is described. In hand 9A, the motor is driven such that the first finger joint and the second finger joint of each finger are set to the designated angle, and such that the worm gear of each finger joint is located at the position corresponding to the designated angle.

Each finger joint is driven by the worm gear mechanism in which the worm and the worm wheel are used, so that large force to bend the finger can be generated. Each of the first finger joint and the second finger joint are driven by the worm gear mechanism, so that only one or both of the first finger joint and the second finger joint can be bent. When the electric power supply is interrupted, gripping force can be maintained by the worm gear mechanism.

Figure 102:
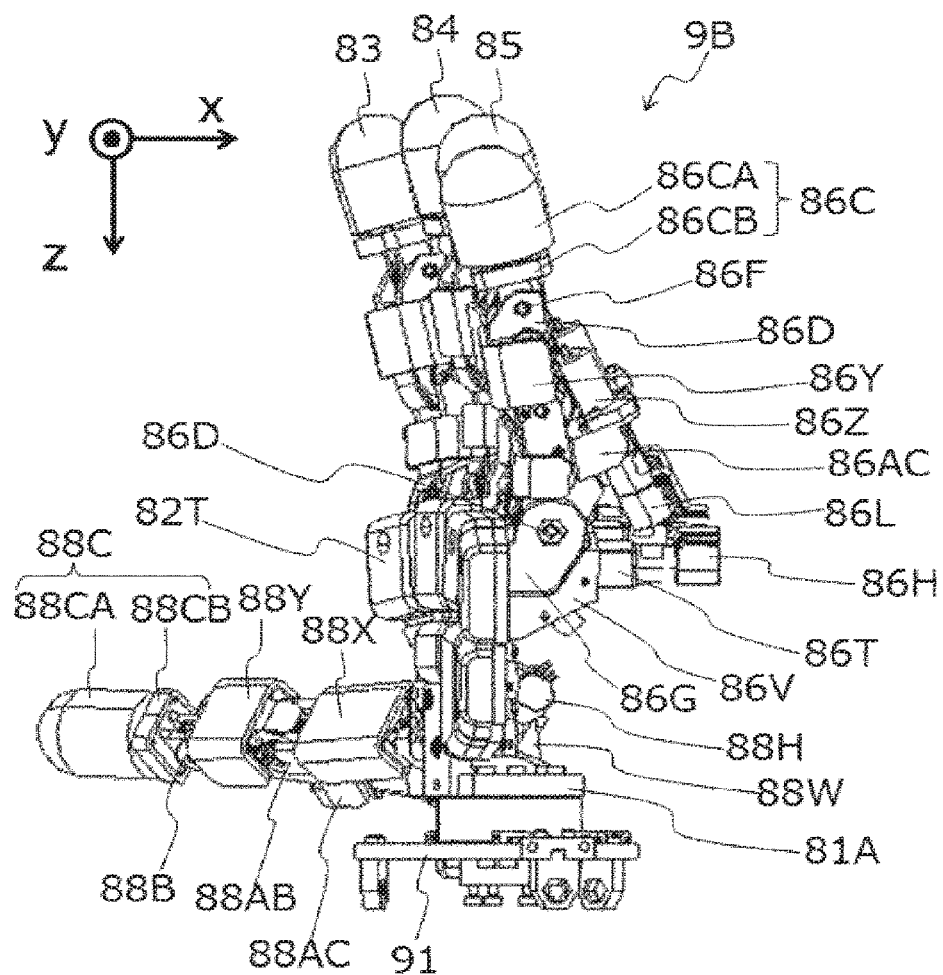
FIG. 102 is a side view illustrating the left hand included in the humanoid robot of the fourth embodiment when the hand breadth rotation finger extends viewing from the side on which the fourth finger exists.
Figure 103:
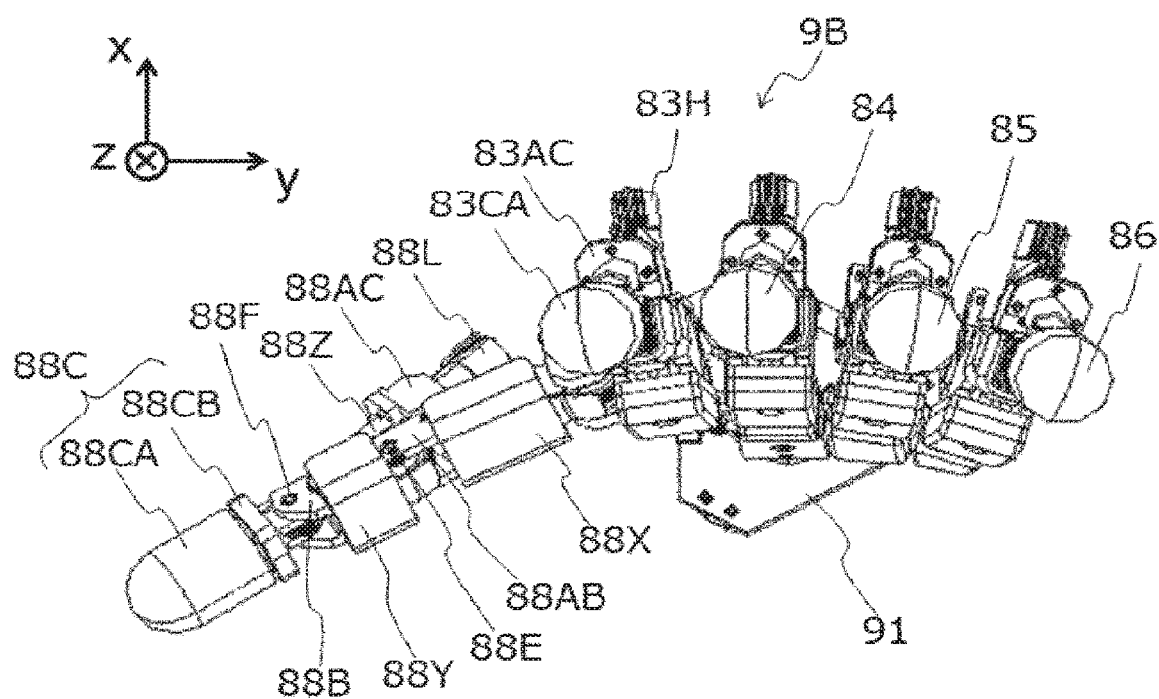
FIG. 103 is a side view illustrating the left hand included in the humanoid robot of the fourth embodiment when the hand breadth rotation finger extends viewing from the fingertip side
Figure 104:
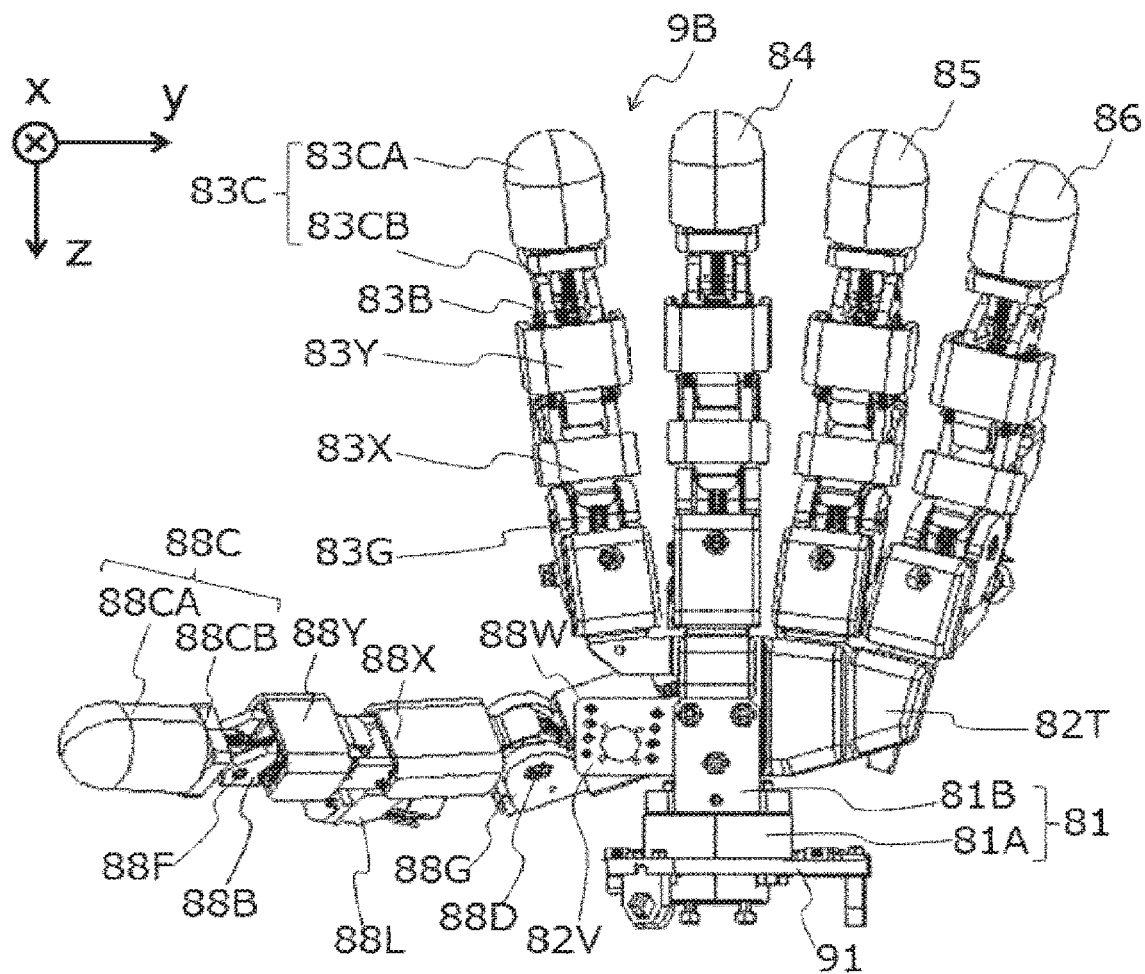
FIG. 104 is a front view illustrating the left hand included in the humanoid robot of the fourth embodiment when the hand breadth rotation finger is directed in the direction intersecting the palm plate.
Figure 105:
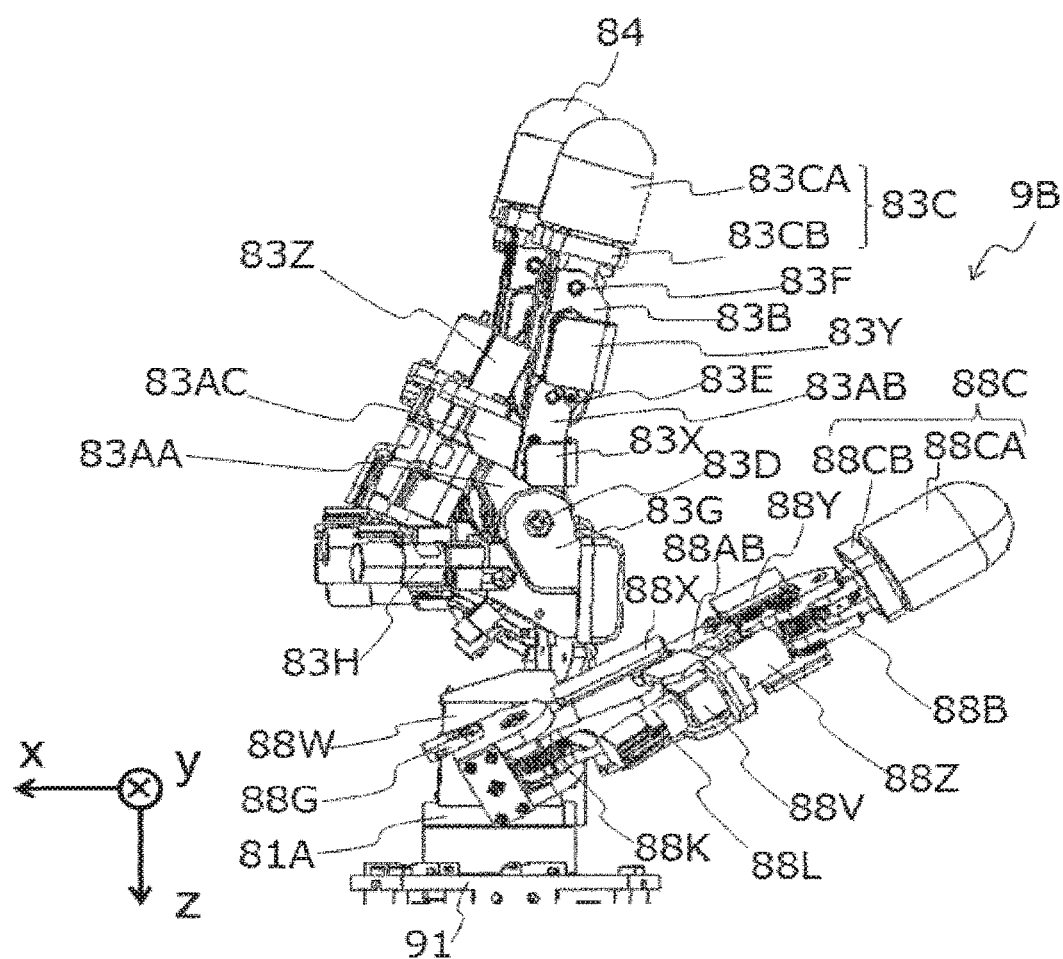
FIG. 105 is a side view illustrating the left hand included in the humanoid robot of the fourth embodiment when the hand breadth rotation finger is directed in the direction intersecting the palm plate viewing from the side on which the first finger exists.
Figure 106:
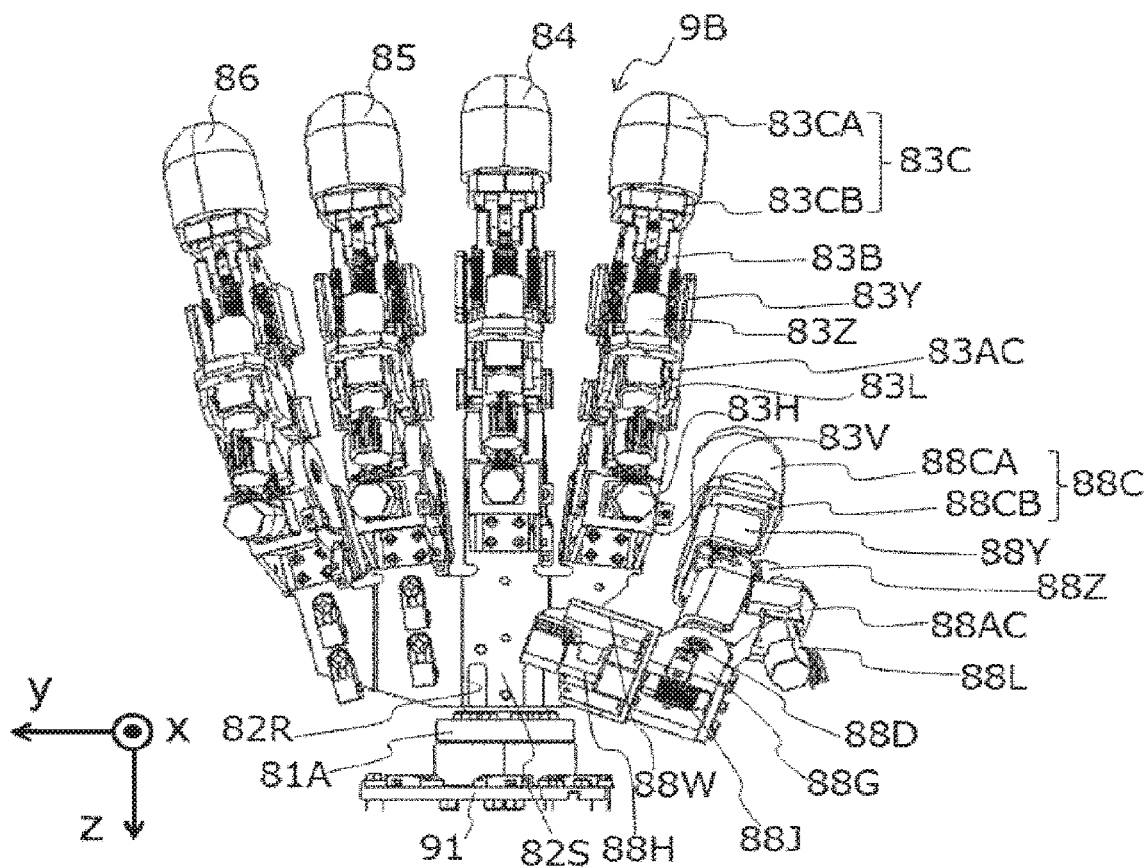
FIG. 106 is a rear view illustrating the left hand included in the humanoid robot of the fourth embodiment when the hand breadth rotation finger is directed in the direction intersecting the palm plate.
Figure 107:
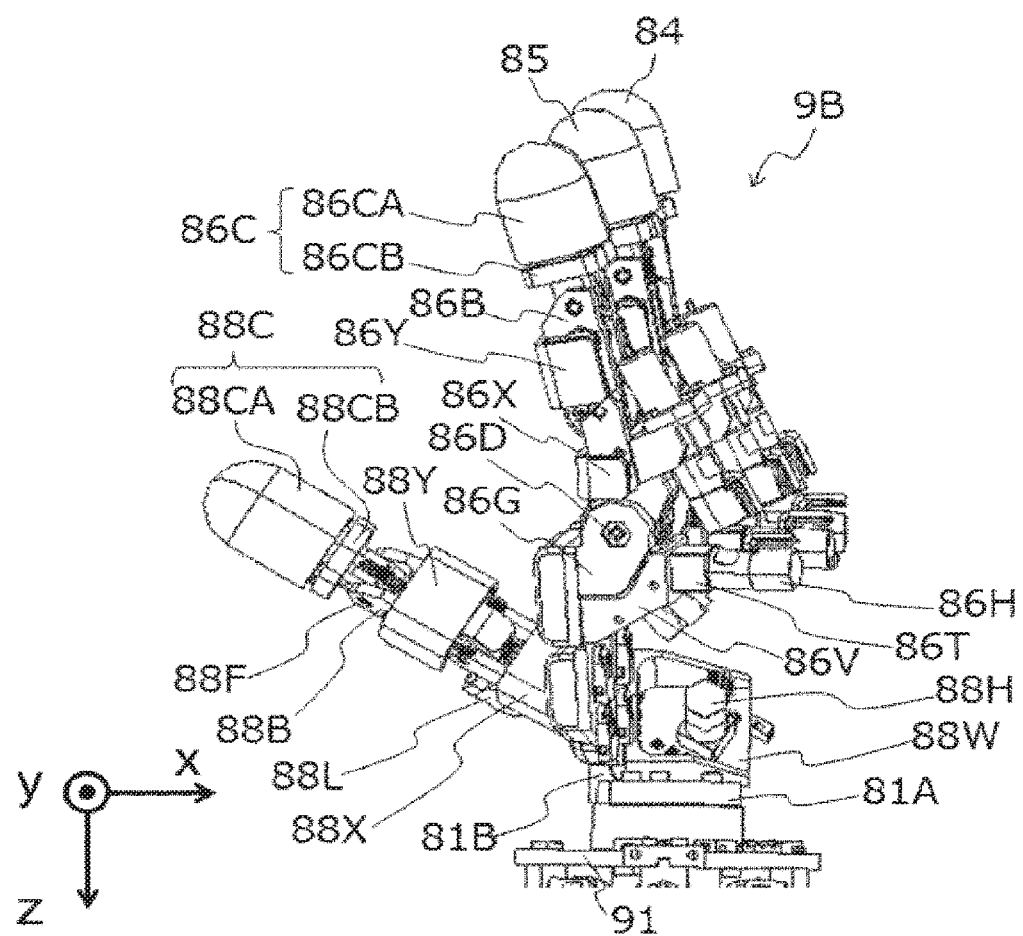
FIG. 107 is a side view illustrating the left hand included in the humanoid robot of the fourth embodiment when the hand breadth rotation finger is directed in the direction intersecting the palm plate viewing from the side on which the fourth finger exists.
Figure 108:
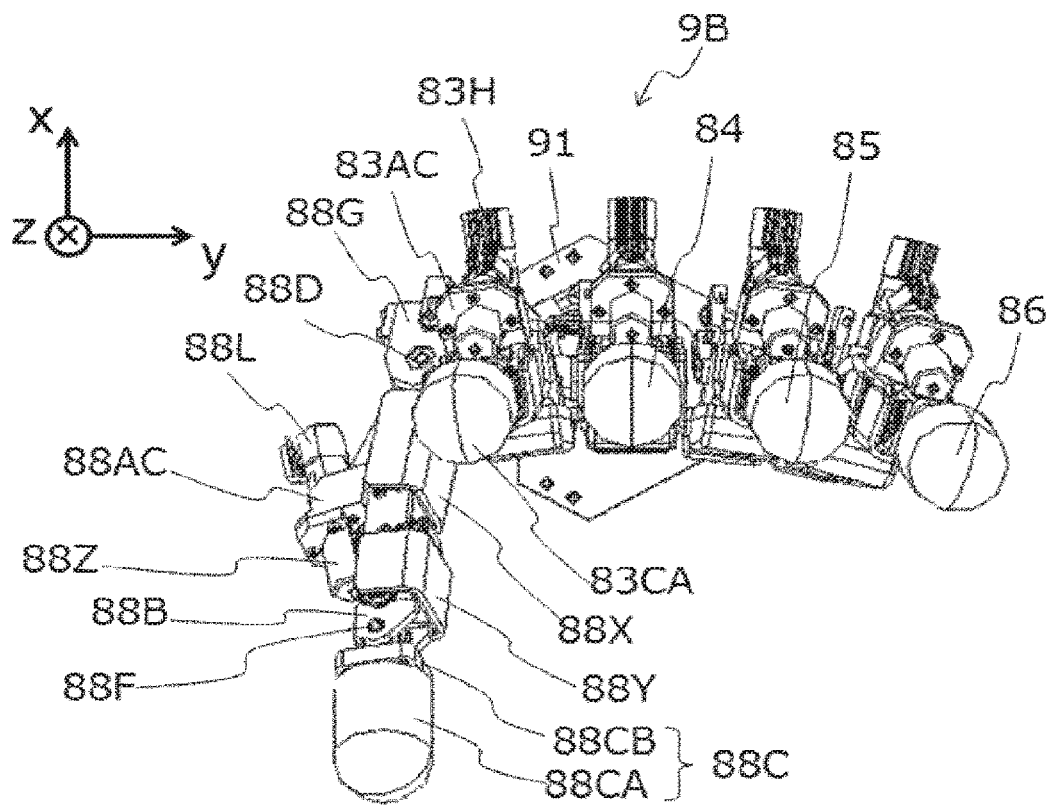
FIG. 108 is a side view illustrating the left hand included in the humanoid robot of the fourth embodiment when the hand breadth rotation finger is directed in the direction intersecting the palm plate viewing from the fingertip side.

Since opposed finger 87 includes second finger joint 87E and third finger joint 87F in addition to first finger joint 87D, the object can be held by bending second finger joint 87E as illustrated in FIG. 102. Second finger joint 87E and third finger joint 87F have the rotation axis parallel to first finger joint 87D. For this reason, hand 9A can hold a thin object such as paper with opposed finger 87 in the state in that only first finger joint 87D is bent, and second finger joint 87E and third finger joint 87F are extended.

In hand 9, first worm 93J protrudes to the side of palm plate 92 from first dactylus 93A. On the other hand, in hand 9A, first worm 83J exists on the backside of the hand. In first finger 83, first dactylus 83A, second dactylus 83B, and third dactylus 83C face palm plate 82. In holding the object between first finger 83 or the like and palm plate 82, the member that prevents first worm 83J or the like from contacting with the object is necessary in hand 9. In hand 9A the member that prevents first worm 83J or the like from contacting with the object is not necessary, and the structure of hand 9A is simplified as compared with hand 9.

First finger 83, second finger 84, third finger 85, and fourth finger 86 have the same structure. However, the structure may be changed depending on the fingers. In all the finger joints including the worm gear mechanism, the worm driven by the motor is made perpendicular to the base-side member. Alternatively, at least one worm gear mechanism of at least one finger may be made perpendicular to the base-side member.

The opposed finger including the three finger joints may be rotatable in the hand breadth direction with respect to the palm plate like the opposable finger.

The above is also applied to other embodiments.

Fourth Embodiment

Figure 97:
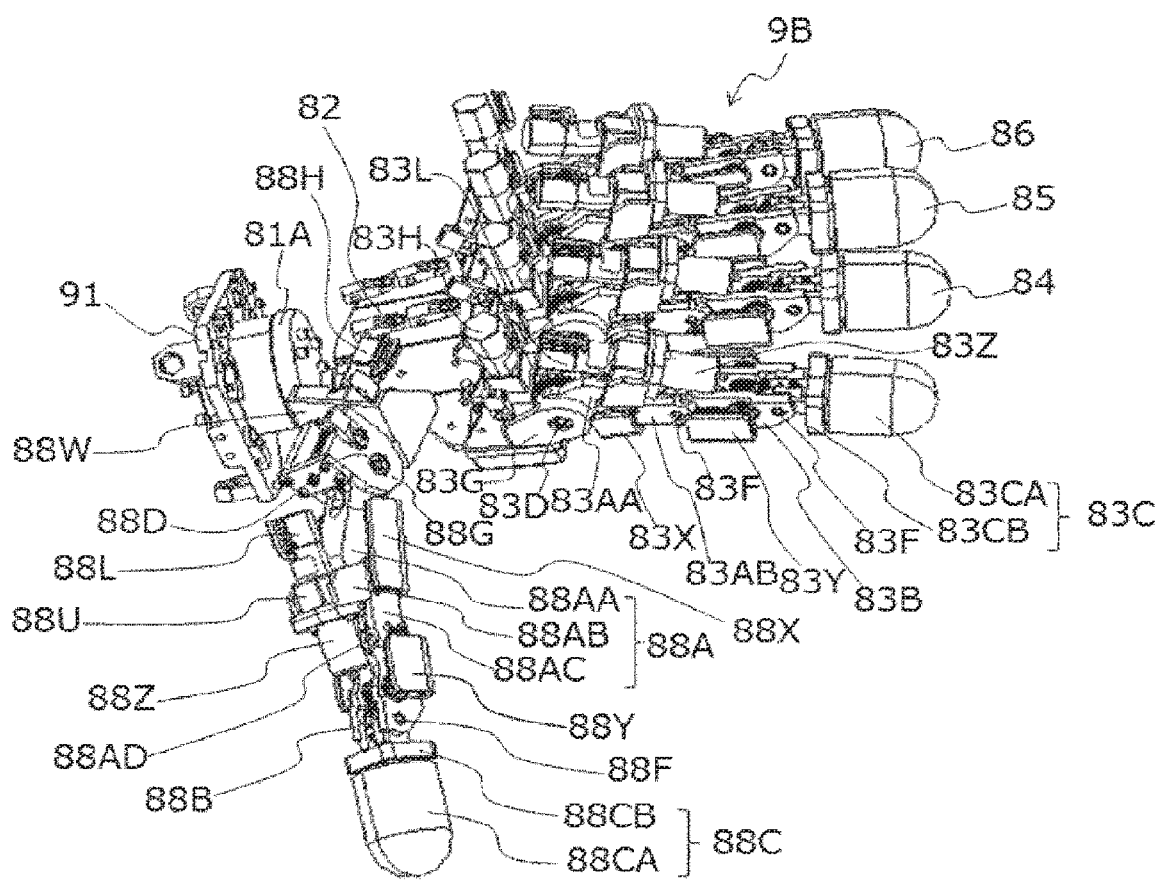
FIG. 97 is a perspective view illustrating a left hand included in a humanoid robot according to a fourth embodiment of the present disclosure when a hand breadth rotation finger extends viewing from the backside of the hand.
Figure 98:
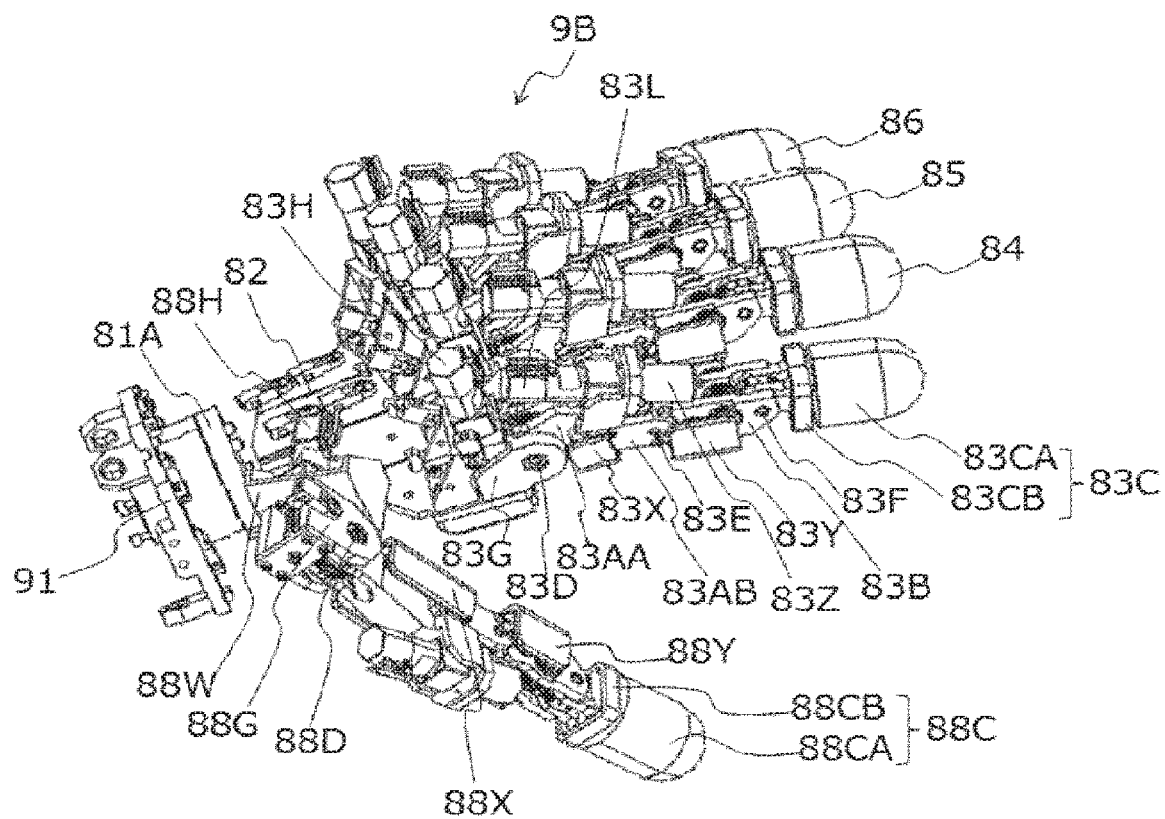
FIG. 98 is a perspective view illustrating the left hand included in the humanoid robot of the fourth embodiment when the hand breadth rotation finger is directed in a direction intersecting the palm plate viewing from the backside of the hand.
Figure 99:
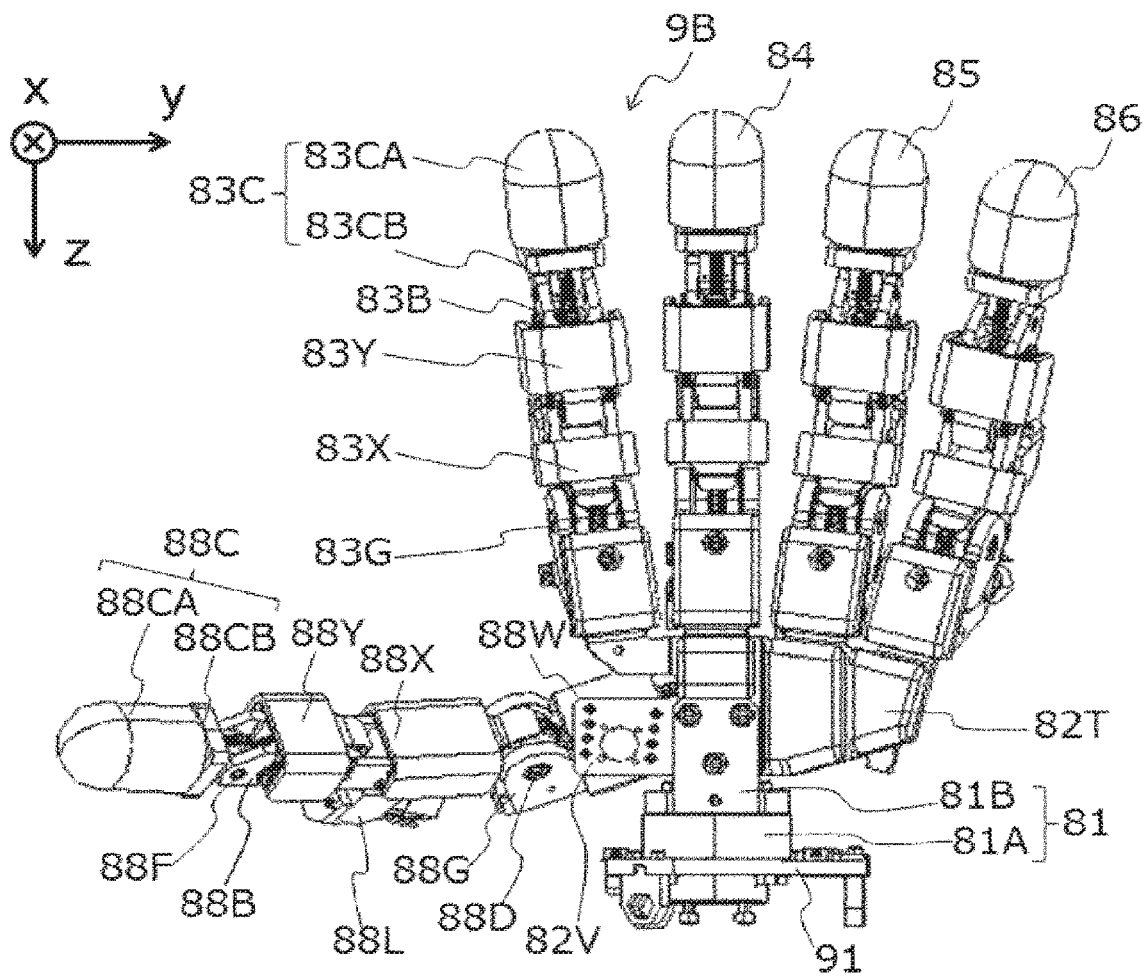
FIG. 99 is a front view illustrating the left hand included in the humanoid robot of the fourth embodiment with the hand breadth rotation finger extending.
Figure 100:
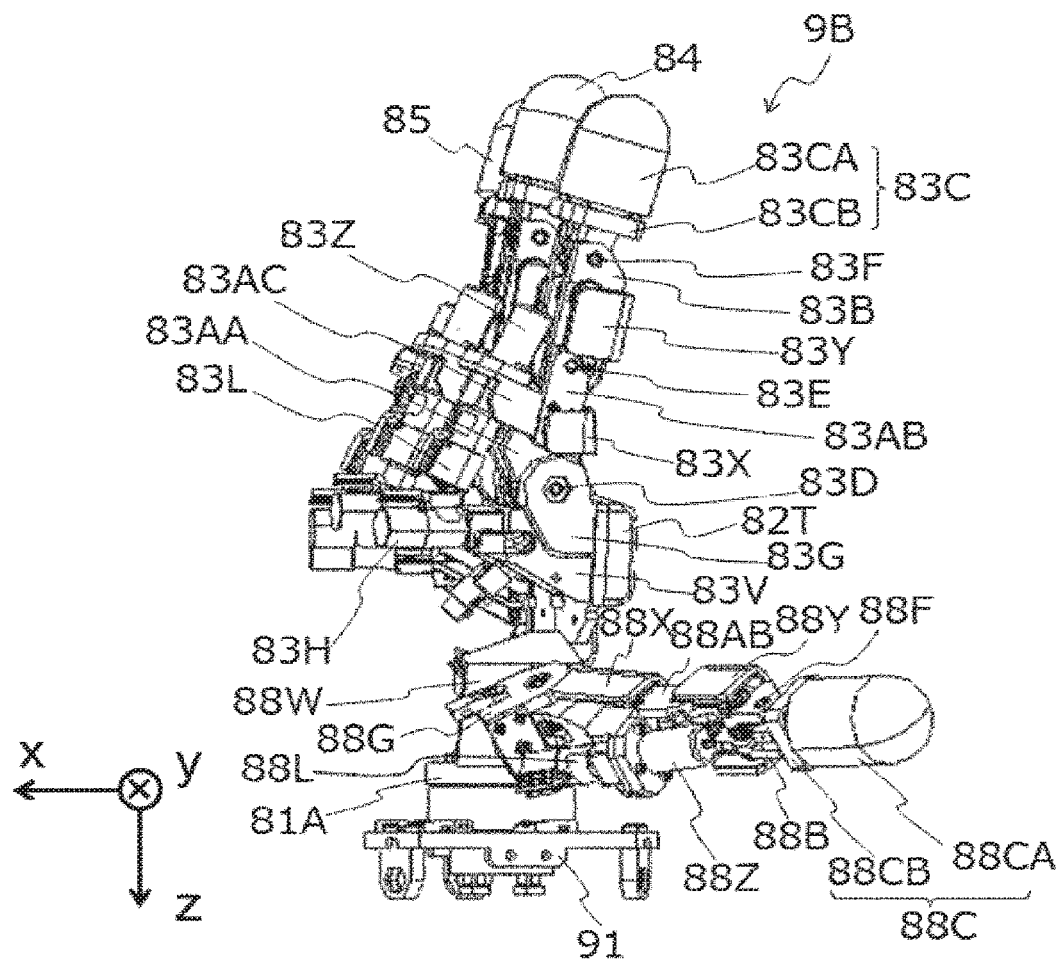
FIG. 100 is a side view illustrating the left hand included in the humanoid robot of the fourth embodiment when the hand breadth rotation finger extends viewing from the side on which the first finger exists.
Figure 101:
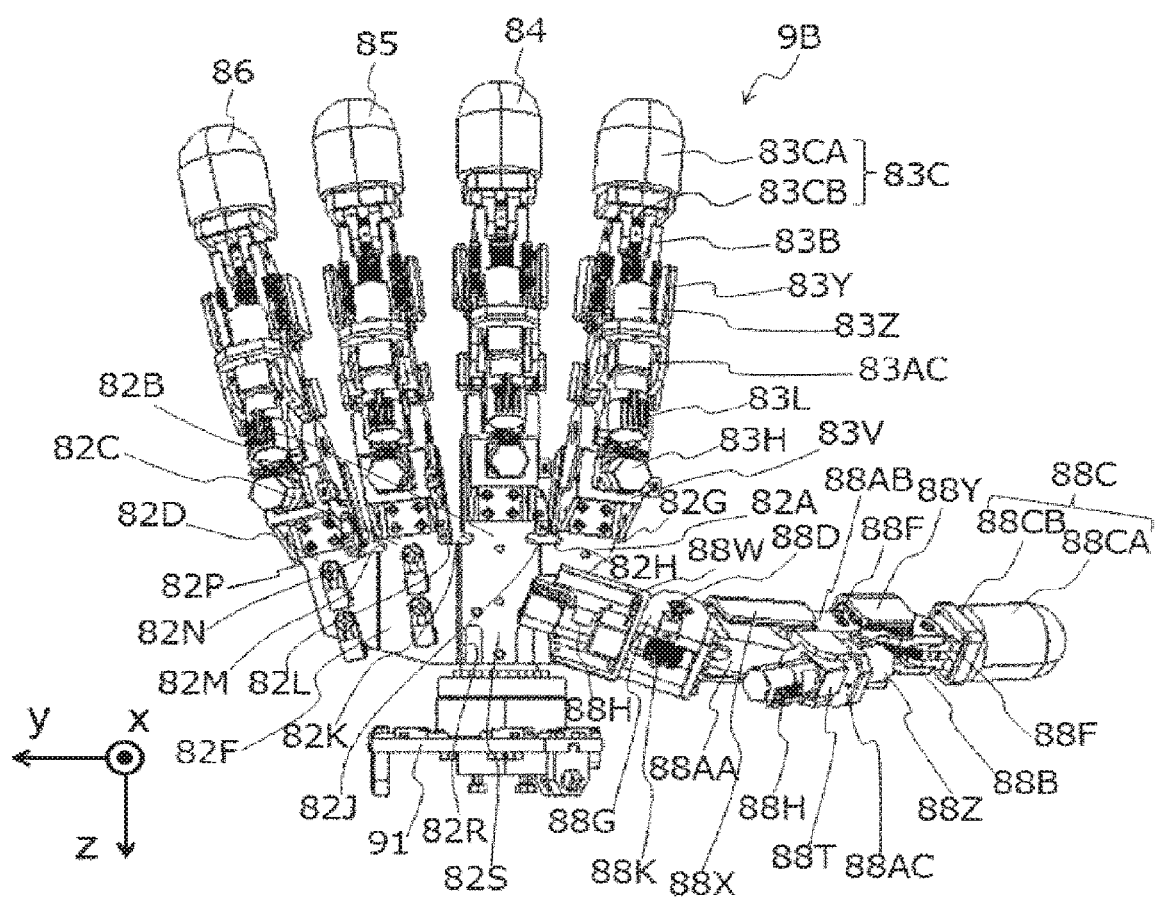
FIG. 101 is a rear view illustrating the left hand included in the humanoid robot of the fourth embodiment when the hand breadth rotation finger extends.
Figure 109:
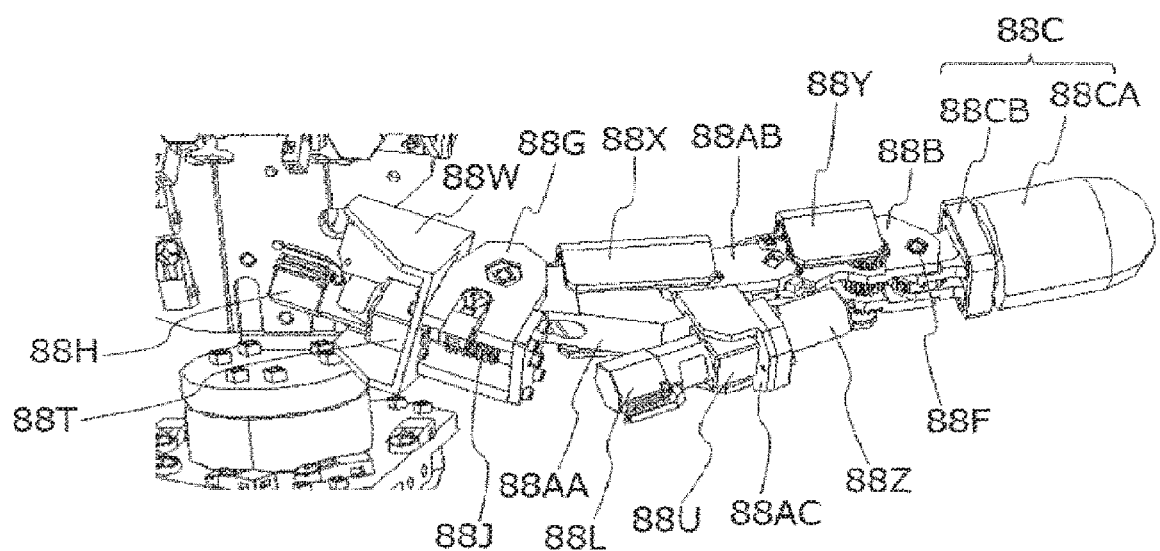
FIG. 109 is an enlarged perspective view illustrating the left hand included in the humanoid robot of the fourth embodiment when the hand breadth rotation finger extends viewing from the backside of the hand.
Figure 110:
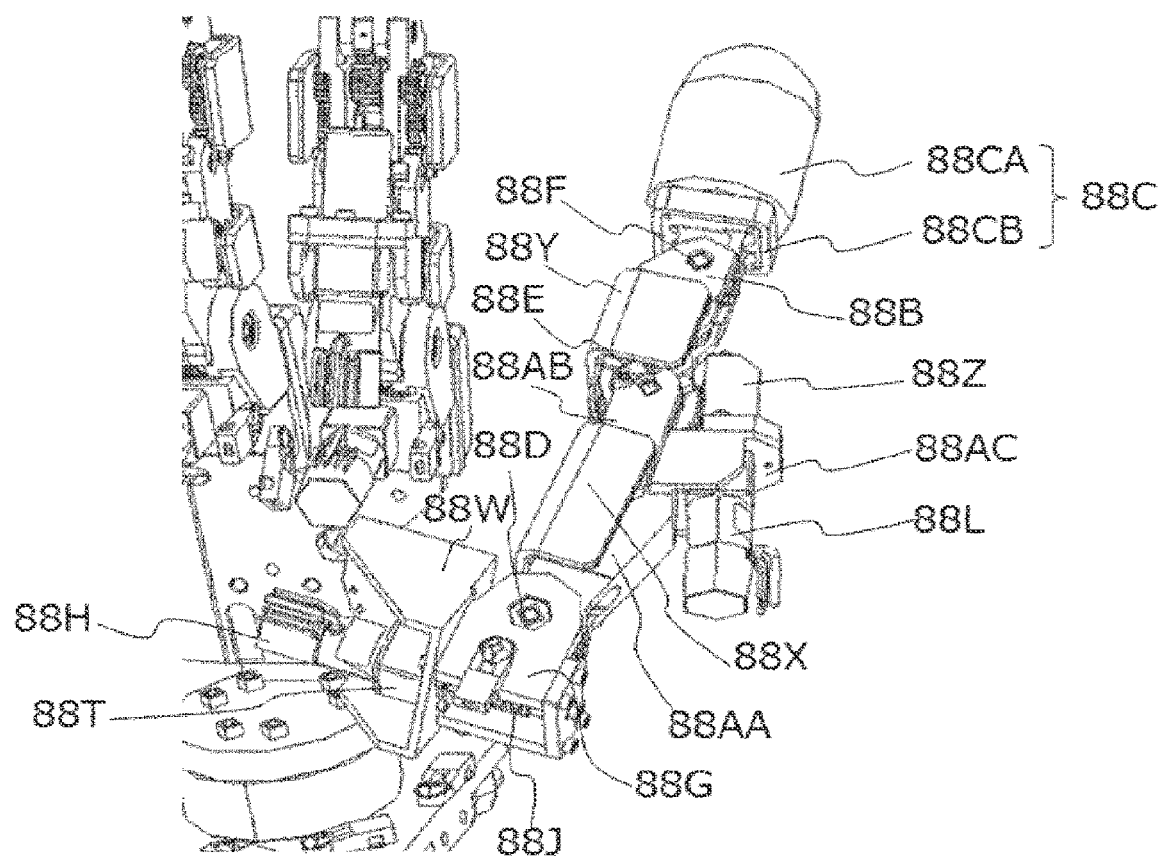
FIG. 110 is an enlarged perspective view illustrating the left hand included in the humanoid robot of the fourth embodiment when the hand breadth rotation finger is directed in the direction intersecting the palm plate viewing from the backside of the hand.

In a fourth embodiment, the third embodiment is changed such that the humanoid robot includes the hand including a hand breadth rotation finger in which the entire finger is rotated in the hand breadth direction instead of the opposed finger. FIG. 97 is a perspective view illustrating a left hand 9B included in a humanoid robot of the fourth embodiment when left hand 9B is viewed from the back side of the hand while a hand breadth rotation finger 88 extends. FIG. 98 is a perspective view illustrating left hand 9B when left hand 9B is viewed from the back side of the hand while hand breadth rotation finger 88 is directed in a direction intersecting with palm plate 82. FIGS. 99, 100, 101, 102, and 103 are a front view illustrating left hand 9B when hand breadth rotation finger 88 extends, a side view illustrating left hand 9B viewed from the side on which first finger 83 exists, a rear view, a side view illustrating left hand 9B viewed from the side on which fourth finger 86 exists, and a side view illustrating left hand 9B viewed from the fingertip side, respectively. FIGS. 104, 105, 106, 107, and 108 are a front view illustrating left hand 9B when hand breadth rotation finger 88 is directed in the direction intersecting with palm plate 82, a side view illustrating left hand 9B viewed from the side on which first finger 83 exists, a rear view, a side view illustrating left hand 9B viewed from the side on which fourth finger 86 exists, and a side view illustrating left hand 9B viewed from the fingertip side, respectively. FIGS. 109 and 110 are enlarged perspective views illustrating hand breadth rotation finger 88. FIG. 109 is a perspective view illustrating hand breadth rotation finger 88 when hand breadth rotation finger 88 extends. FIG. 110 is a perspective view illustrating hand breadth rotation finger 88 when hand breadth rotation finger 88 is directed in the direction intersecting palm plate 82.

In FIGS. 97 to 110, a portion up to wrist plate 91 is illustrated. Palm plate 82, first finger 83, second finger 84, third finger 85, and fourth finger 86 have the same structure as the first embodiment. In FIGS. 97 to 110, the cover and the like omitted in FIGS. 87 to 97 of the third embodiment are illustrated.

A first dactylus cover 83X is a cover that covers a portion in which a first yoke 83AB is attached to first wheel linked part 83AA. First dactylus cover 83X is a member formed by bending a substantially rectangular plate material into a U-shape. The substantially rectangular plate member includes a substantially rectangular protrusion in the center of one side. First dactylus cover 83X is put on first dactylus 83A from the palm side. The substantially rectangular protrusion has a rounded corner, and is bent such that a step can be formed in the middle of the protrusion.

A second dactylus cover 83Y is a cover that covers a second worm wheel 83N and a partial gear 83Q, an idler gear 83R, an outer-idler gear 83SA, and the like, which exist on the side not sandwiched between two second dactyli 83B. Second dactylus cover 83Y has the same shape as first dactylus cover 83X. Second dactylus cover 83Y in the direction along first finger 83 is longer than first dactylus cover 83X.

A second worm cover 83Z is a cover that covers second worm 83M from the backside of the hand. Second worm cover 83Z has a shape in which a cylinder including a bottom only on one side and a flange on the other side is cut into a half in the axial direction. Second worm 83M exists in the cylindrical portion. A flange is attached to the rear surface of the motor installation surface of a second motor installation part 83AC. The outer shape of the flange has the same shape as the motor installation surface.

Differences from hand 9A are described. Hand 9B includes hand breadth rotation finger 88 instead of opposed finger 87. Hand breadth rotation finger 88 is attached to palm plate 82 such that the entire finger can be rotated in the hand breadth direction. Hand breadth rotation finger 88 is attached to palm plate 82 at the same position as opposed finger 87. Hand breadth rotation finger 88 is attached to a hand breadth rotation finger attaching part 82V that is a part of palm plate 82. Similarly to opposed finger attaching part 82E, hand breadth rotation finger attaching part 82V exists at the corner of palm plate 82, the corner exists on the wrist side in the fingertip direction and on the side where first finger attaching part 82A exists in the hand breadth direction. Hand breadth rotation finger attaching part 82V has the same shape as opposed finger attaching part 82E.

In hand breadth rotation finger 88, a portion in the fingertip side from finger base yoke 88G has the same structure as opposed finger 87. Hand breadth rotation finger 88 and opposed finger 87 are different from each other only in the attaching direction to palm plate 82.

Hand breadth rotation finger 88 is attached to palm plate 82 being able to be rotated in the hand breadth direction with a box-shaped hand breadth finger base 88W which has two open sides. Hand breadth finger base 88W is interposed between hand breadth rotation finger 88 and palm plate 82. Hand breadth finger base 88W is attached onto the backside of the hand of hand breadth rotation finger attaching part 82V with an angle of about 20 degrees toward the wrist. Finger first motor 88H and second gear head 88T are accommodated in hand breadth finger base 88W, and attached to the motor installation surface that is the surface in the hand breadth direction of hand breadth finger base 88W. A through-hole is made in the motor installation surface, and the rotation shaft of second gear head 88T is inserted in the through-hole. Finger base yoke 88G is attached to the outer surface of the motor installation surface. Finger base yoke 88G is attached such that the shaft member of finger base yoke 88G is parallel to the motor installation surface and forms an angle of about 65 degrees with respect to palm plate 82. Consequently, in the case in that first finger joint 88D is rotated and hand breadth rotation finger 88 is extended, third dactylus 88C is located closer to the fingertip side as compared with palm plate 82, and the object is held easily between hand breadth rotation finger 88 and palm plate 82. Hand breadth finger base 88W includes the sides connected to both of the motor installation surface and the attaching surface to palm plate 82. The corners of the two sides have a shape that is largely cut by a straight line. The side surfaces of hand breadth finger base 88W each has a trapezoidal shape in which an upper base is short while a side is perpendicular to a lower base. On the side surface on the wrist side, the perpendicular side on the side on which the surface attached to palm plate 82 is shorter than that of the other side surface.

Similarly to opposed finger 87, in hand breadth rotation finger 88, first dactylus 88A is longer than first dactylus 83A and other first dactyli. For this reason, first dactylus cover 83X is longer than second dactylus cover 83Y.

The operation is described. In hand 9B, the motor is driven such that the first finger joint and the second finger joint of each finger are set to the designated angle, and such that the worm gear of each finger joint is located at the position corresponding to the designated angle.

Each finger joint is driven by the worm gear mechanism in which the worm and the worm wheel are used, so that large force to bend the finger can be generated. Each of the first finger joint and the second finger joint are driven by the worm gear mechanism, so that only one or both of the first finger joint and the second finger joint can be bent. When the electric power supply is interrupted, gripping force can be maintained by the worm gear mechanism.

By including hand breadth rotation finger 88 that is rotated in the hand breadth direction, the length in the hand breadth direction of hand 9B is larger than that of hand 9A when hand breadth rotation finger 88 is extended. Consequently, hand 9B can hold the larger object as compared with hand 9A. When palm plate 82 faces upward and right and left hands 9B are arranged at the same height, the large object can be held by both hands 9B.

Fifth Embodiment

Figure 111:
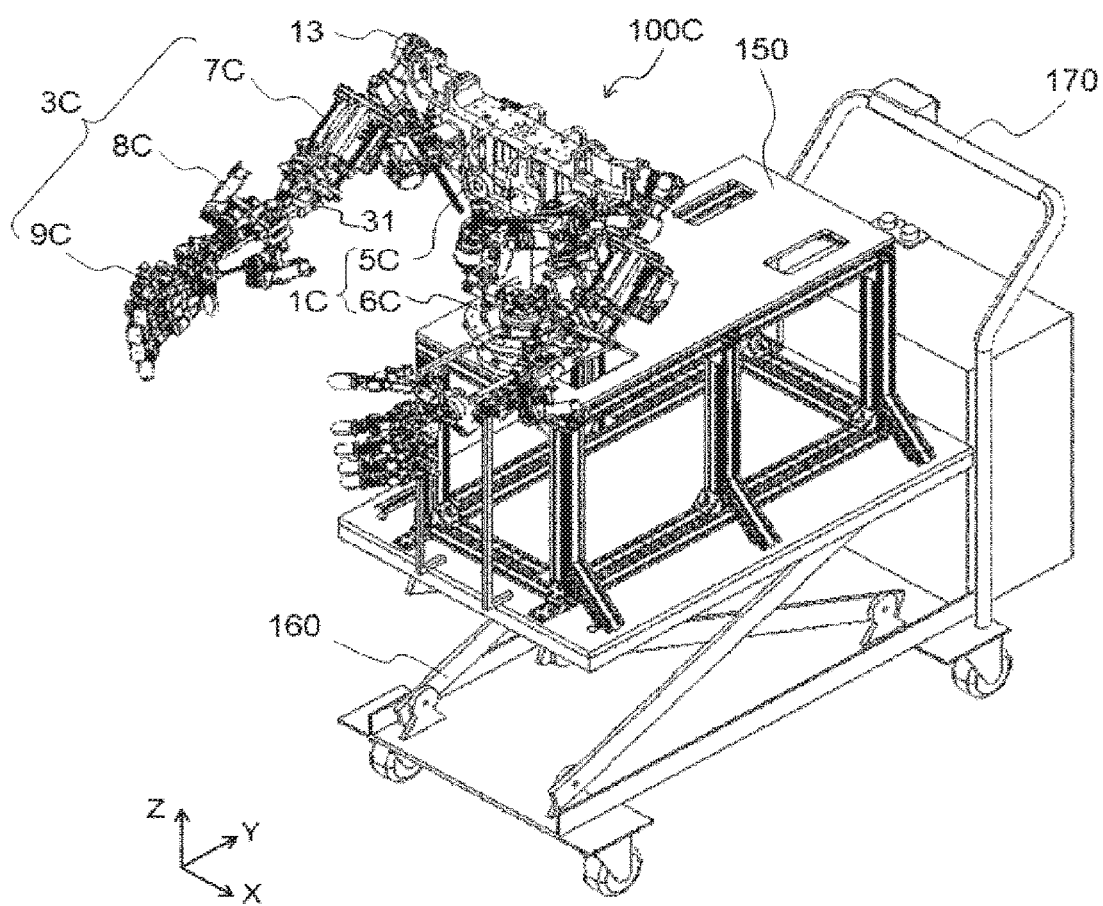
FIG. 111 is a perspective view illustrating the whole of a humanoid upper half body robot according to a fifth embodiment of the present disclosure.
Figure 112:
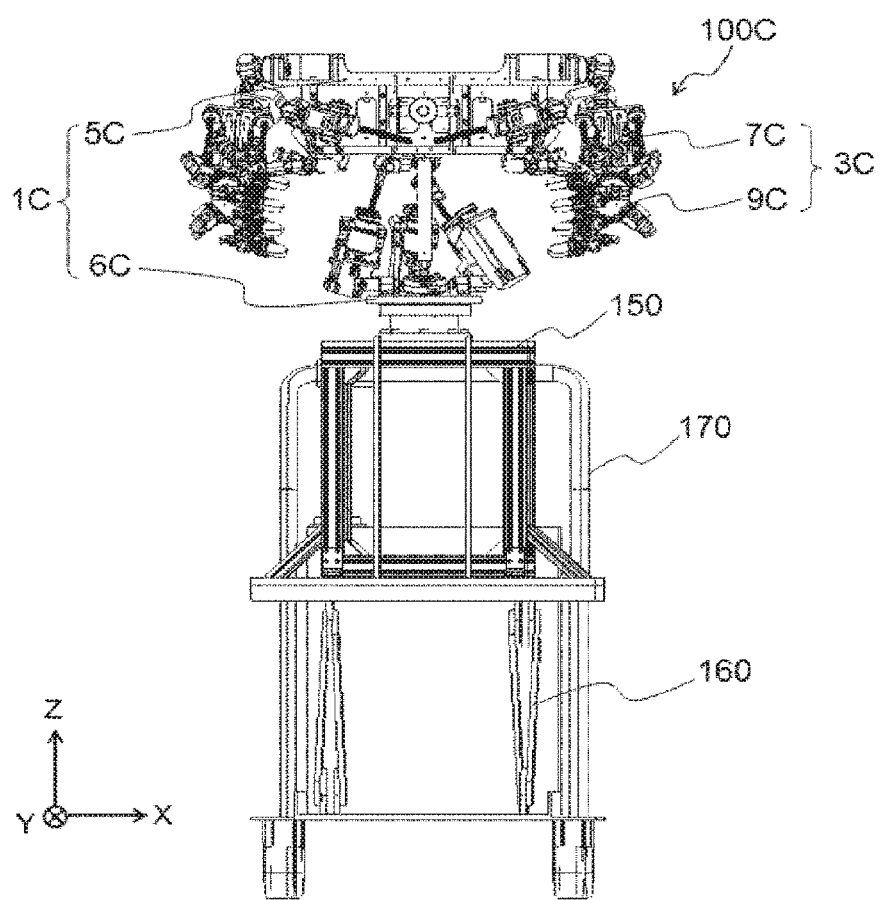
FIG. 112 is a front view illustrating the whole of the humanoid upper half body robot of the fifth embodiment.
Figure 113:
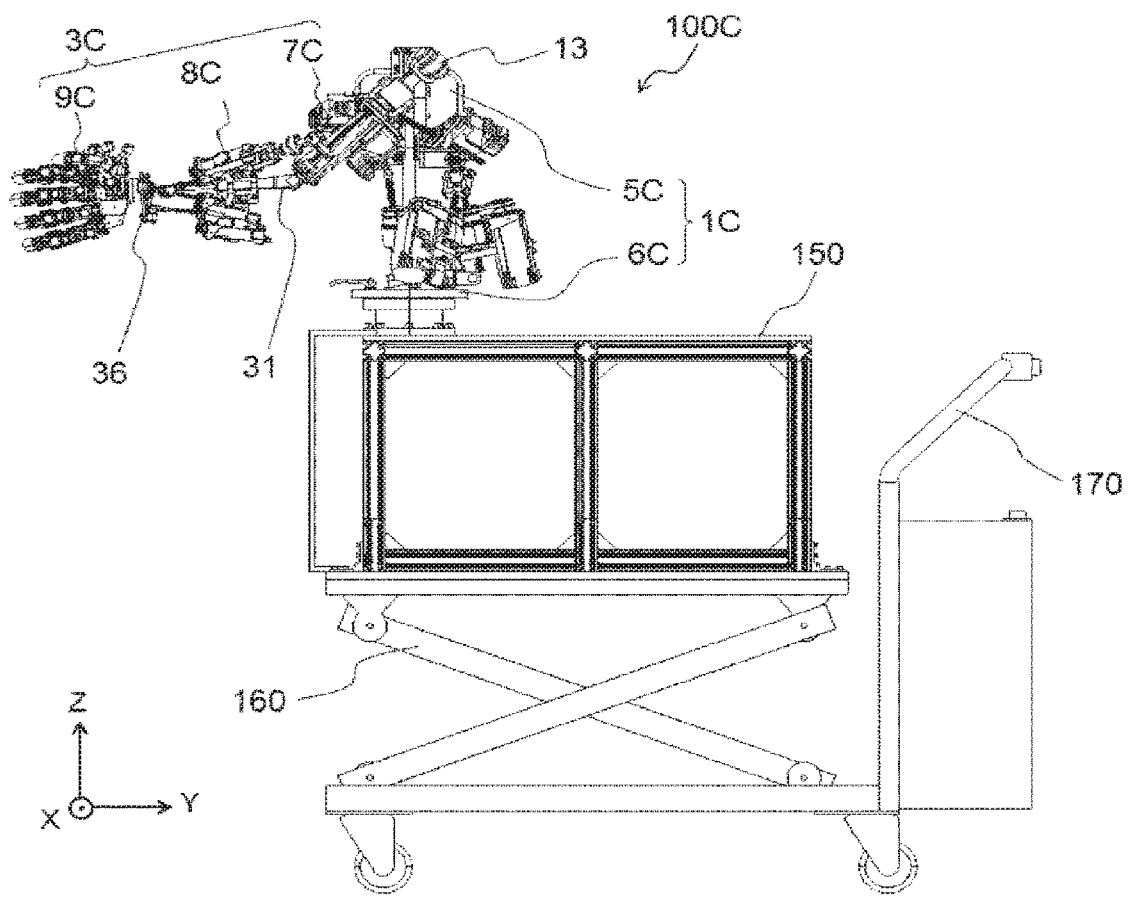
FIG. 113 is a left side view illustrating the whole of the humanoid upper half body robot of the fifth embodiment.

A fifth embodiment is the case where a humanoid upper half body robot is placed on a pedestal with a height that is changeable and movable. Referring to FIGS. 111 to 113, the whole configuration of the humanoid upper half body robot is described. FIGS. 111, 112, and 113 are a perspective view, a front view, and a side view of the whole of a humanoid upper half body robot according to the fifth embodiment of the present disclosure.

A humanoid upper half body robot 100C is a robot including an upper half body robot from the waist. Humanoid upper half body robot 100C is placed on an upper surface of a control device container 150 containing a control device (not illustrated) that controls humanoid upper half body robot 100C. The waist of humanoid upper half body robot 100C is fixed to the upper surface of control device container 150. Control device container 150 has a rectangular parallelepiped shape. Because the humanoid upper half body robot and the control device are under development, the control device container 150 is made larger such that the control device can be modified easily. When the humanoid robot is actually used, the control device is made to have a size of a small bag, and is disposed in, for example, the rear of the humanoid robot.

Control device container 150 is placed on a pedestal lifter 160. Pedestal lifter 160 is placed on a cart 170. Although pedestal lifter 160 is simply illustrated in the drawings, a height of the upper surface can be changed by changing the angle of the link connecting the upper surface and the lower surface. Cart 170 has a function of being pushed by a person or the like or having automatic drive. Pedestal lifter 160 is a height adjuster in which humanoid upper half body robot 100C is mounted and which moves humanoid upper half body robot 100C vertically. Cart 170 is a moving unit that moves humanoid upper half body robot 100C and pedestal lifter 160. The pedestal lifter and the cart may have a configuration other than those illustrated in the drawings.

Humanoid upper half body robot 100C is moved to a place to be used by cart 170, and is made to have a height suitable for the object to be operated by pedestal lifter 160. Furthermore, humanoid upper half body robot 100C can take a posture suitable for the work. Humanoid upper half body robot 100C, pedestal lifter 160, and cart 170 can be considered as one robot.

The lower half body having the same shape as a human may be provided similarly to humanoid robot 100 of the first embodiment. An upper half body robot including up to the chest without the waist may be used. The upper half body robot without the waist is mounted on control device container 150 by fixing the chest to the upper surface of control device container 150.

Figure 114:
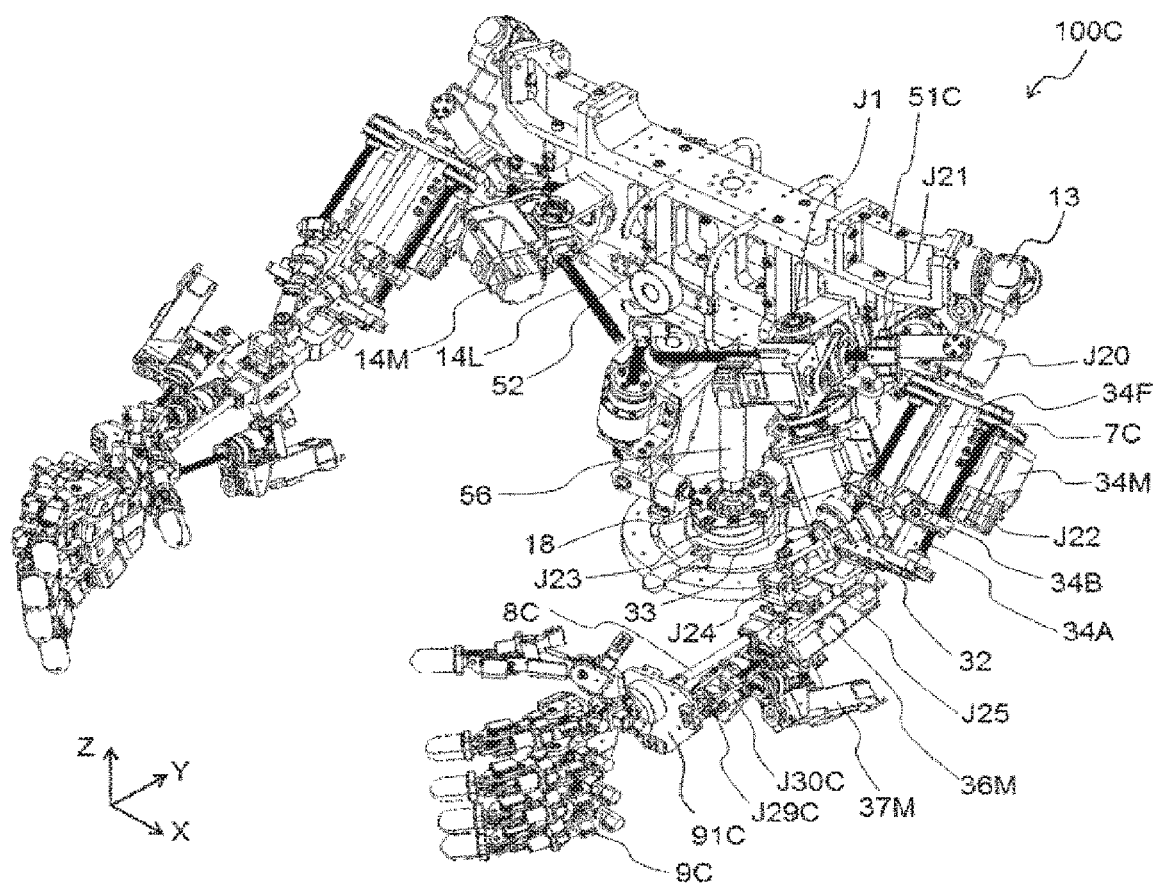
FIG. 114 is a perspective view illustrating the humanoid upper half body robot of the fifth embodiment viewing from the front.
Figure 115:
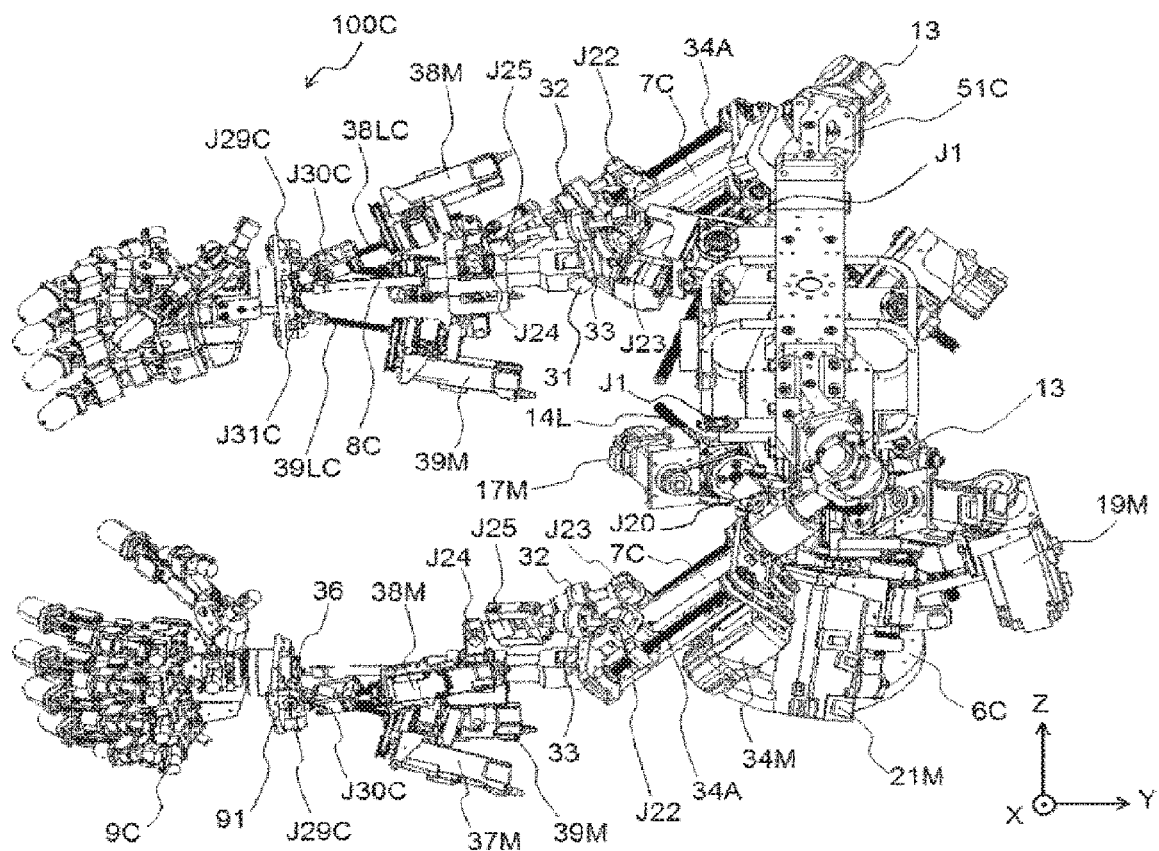
FIG. 115 is a perspective view illustrating the humanoid upper half body robot of the fifth embodiment viewing from a left arm side.
Figure 116:
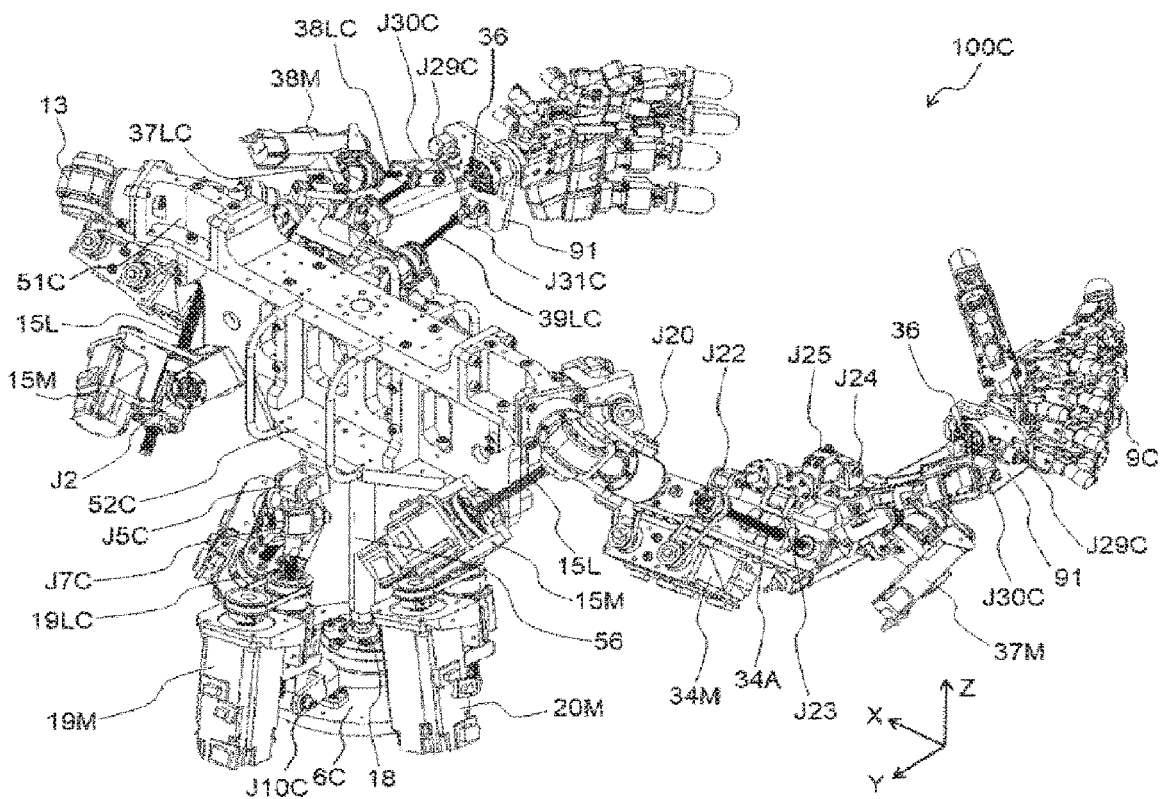
FIG. 116 is a perspective view illustrating the humanoid upper half body robot of the fifth embodiment viewing from a rear side.
Figure 117:
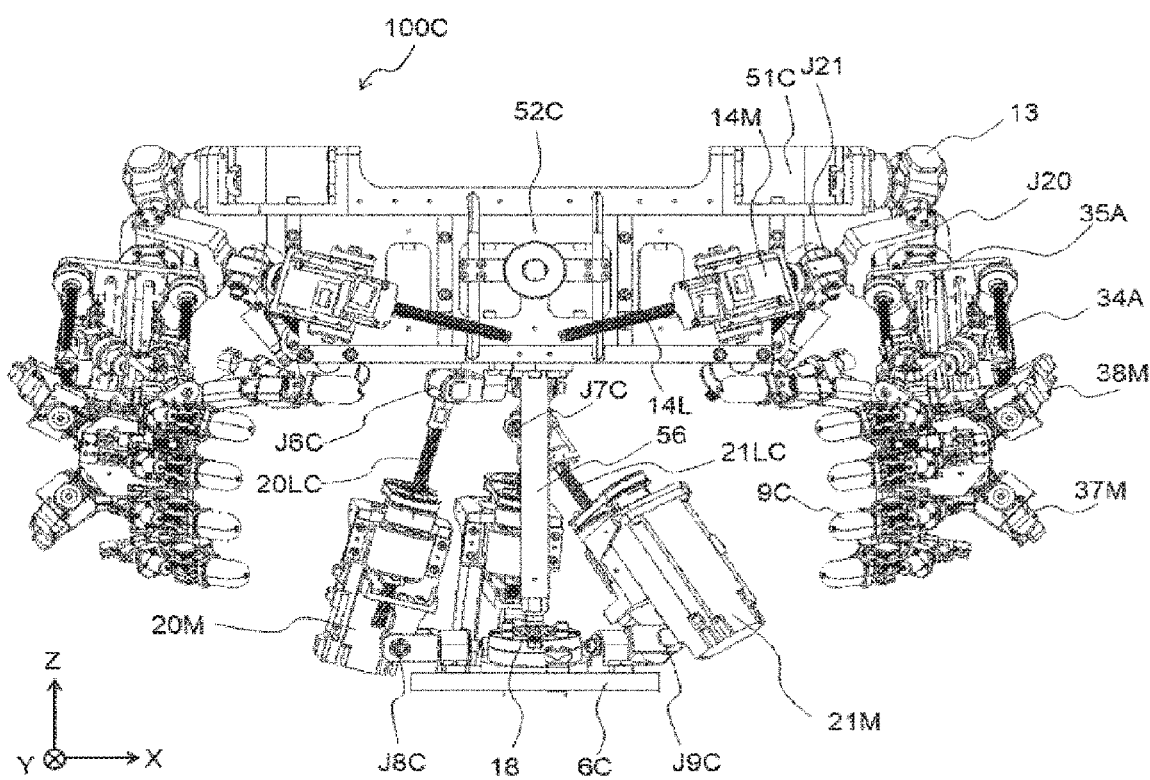
FIG. 117 is a front view illustrating the humanoid upper half body robot of the fifth embodiment.
Figure 118:
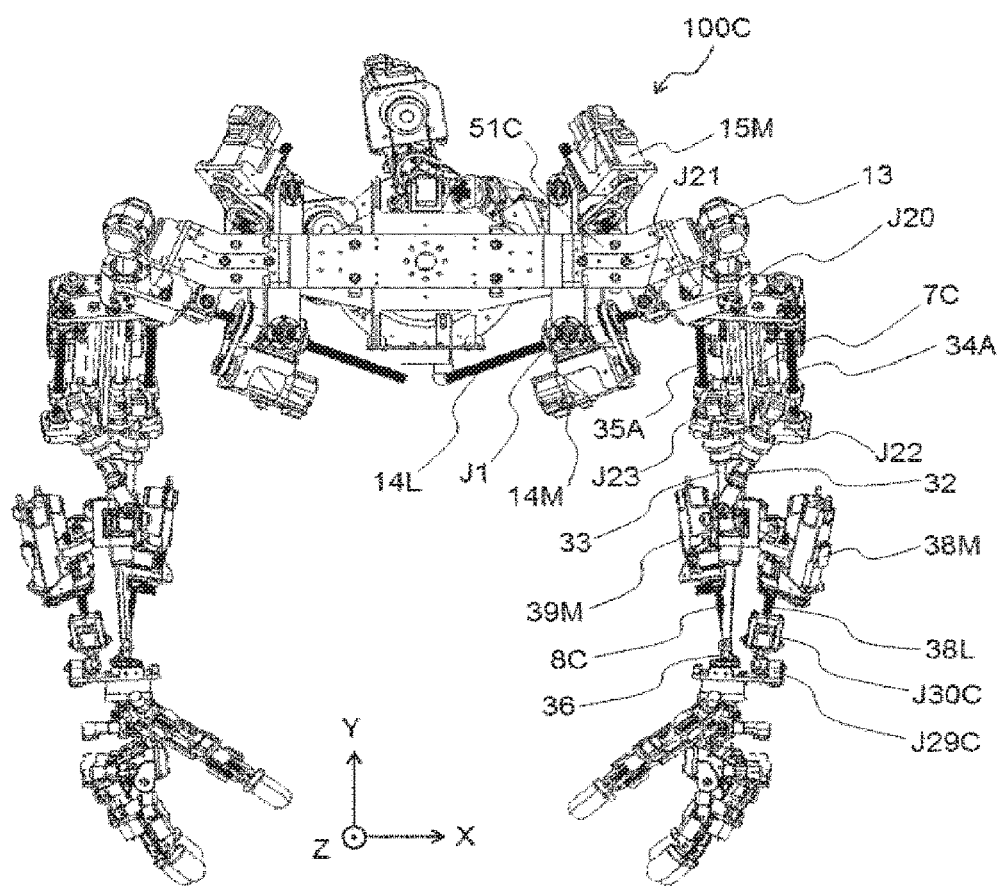
FIG. 118 is a plan view illustrating the humanoid upper half body robot of the fifth embodiment.
Figure 119:
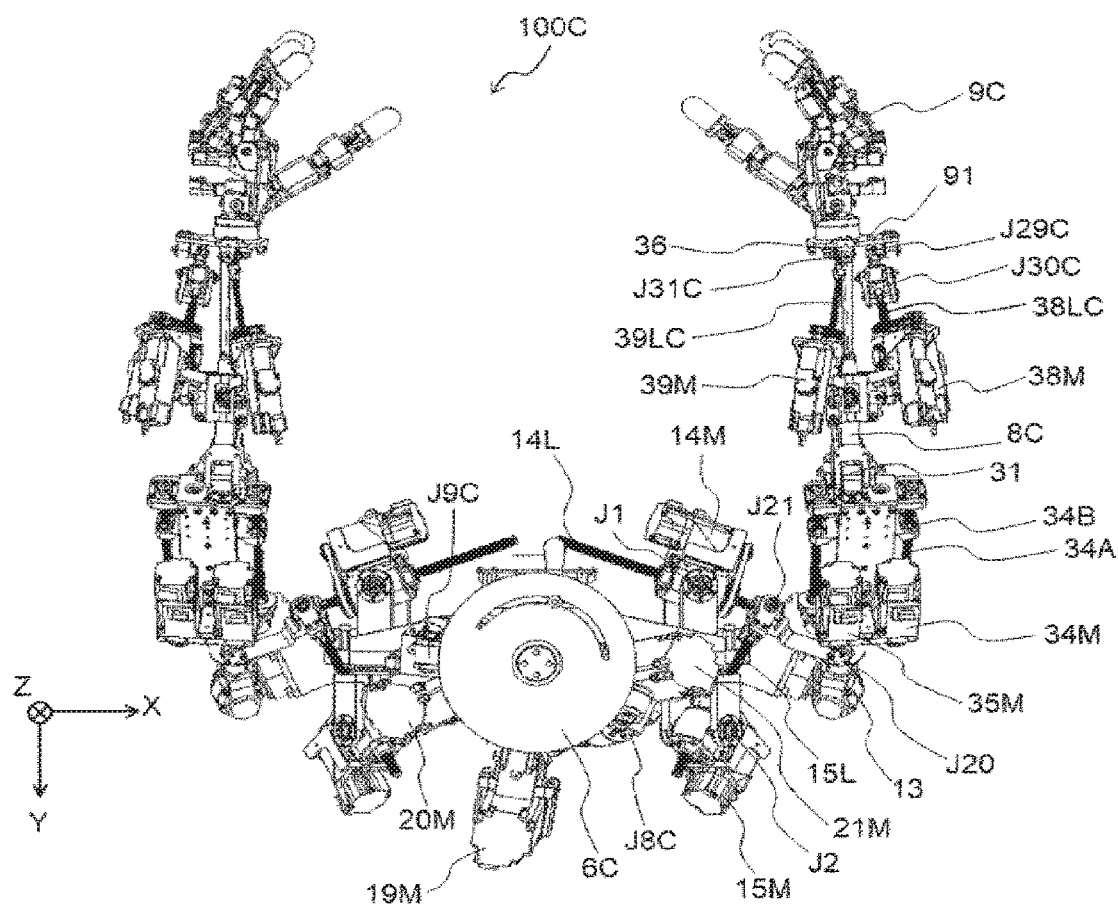
FIG. 119 is a bottom view illustrating the humanoid upper half body robot of the fifth embodiment.

As illustrated in FIGS. 114 to 119, humanoid upper half body robot 100C has the same structure as an upper structure of a human including from the waist. FIGS. 114, 115 and 116 are perspective views of humanoid upper half body robot 100C. FIG. 114 is a perspective view when humanoid upper half body robot 100C is viewed from the front. FIG. 115 is a perspective view when humanoid upper half body robot 100C is viewed from the left side. FIG. 116 is a perspective view when humanoid upper half body robot 100C is viewed from a rear side. FIGS. 117, 118 and 119 are a front view, a plan view, and a bottom view of humanoid upper half body robot 100C, respectively.

Humanoid upper half body robot 100C includes a trunk 1C and a pair of upper limbs 3C protruding from the right and left of an upper part of trunk 1C. Humanoid upper half body robot 100C does not include a head. The head may be provided above the center of trunk 1C.

Trunk 1C is divided into an upper-side, that is, chest 5C and a lower-side, that is, waist 6C. In upper limb 3C, an upper arm 7C, a forearm 8C, and a hand 9C are connected in series. The pair of right and left upper limbs 3C has a structure in which right upper limb 3C and left upper limb 3C have a mirror image relationship. Right and left upper limbs 3C may have a portion in which the mirror image relationship does not hold.

Each joint of humanoid upper half body robot 100C has three rotational degrees of freedom, at which the joint can be moved back and forth and right and left and twisting motion can be performed, in the wrist and a connection between chest 5C and waist 6C. The shoulder and the elbow have two rotational degrees of freedom, at which the joint can be moved back and forth and right and left. The shoulder, the elbow, or the like may have three rotational degrees of freedom.

Figure 127:
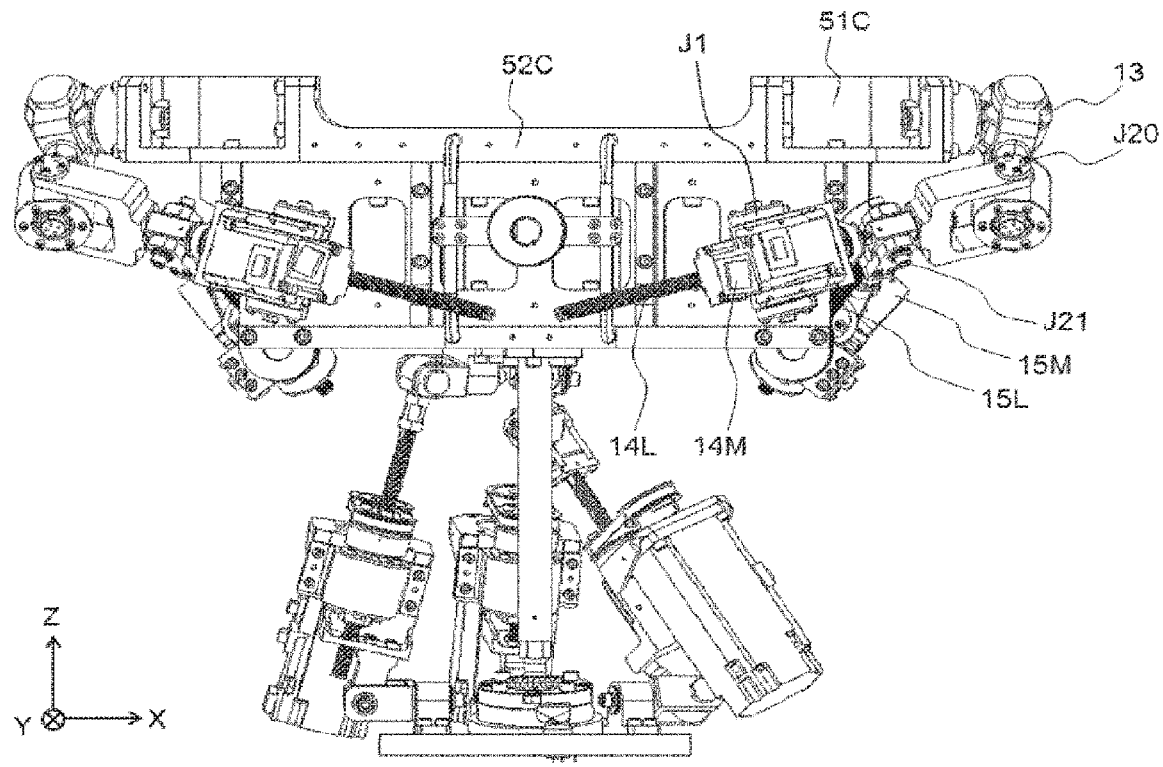
Figure 128:
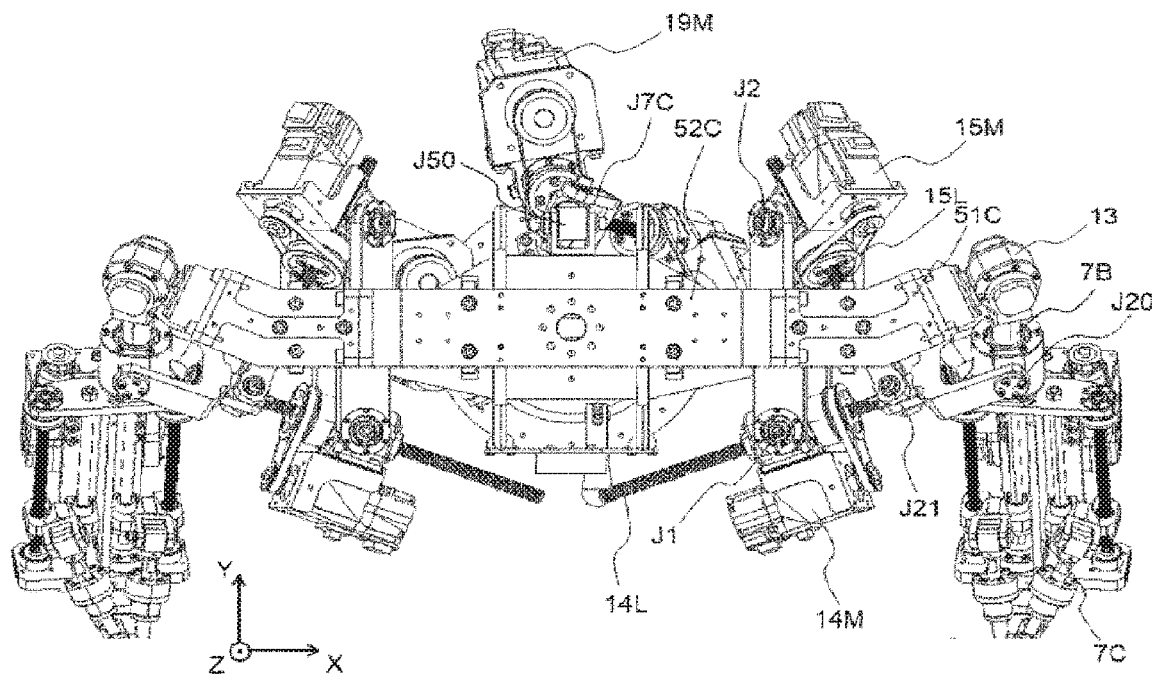
Figure 129:
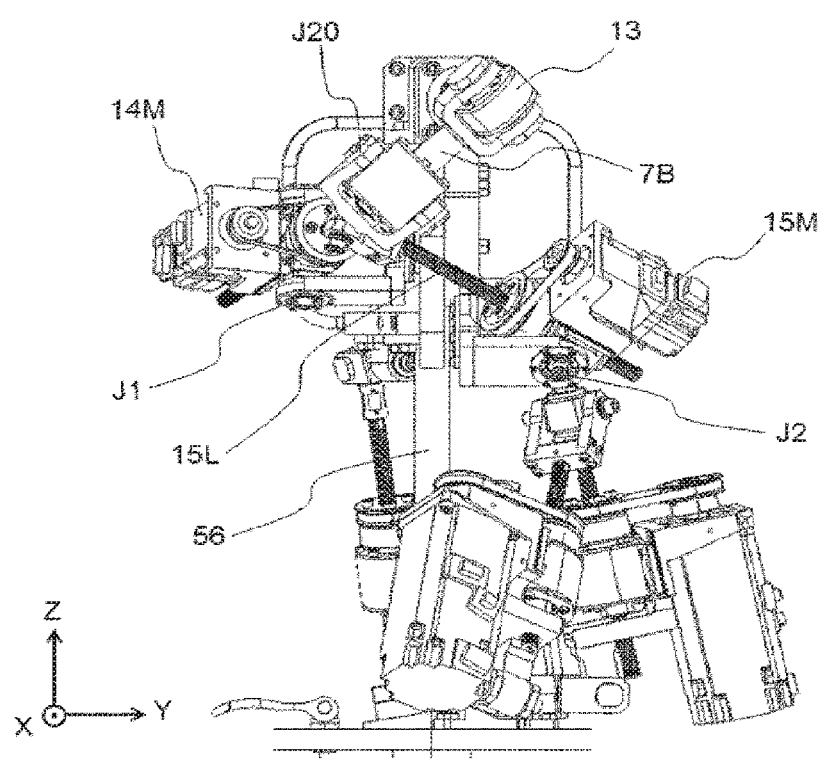
Figure 130:
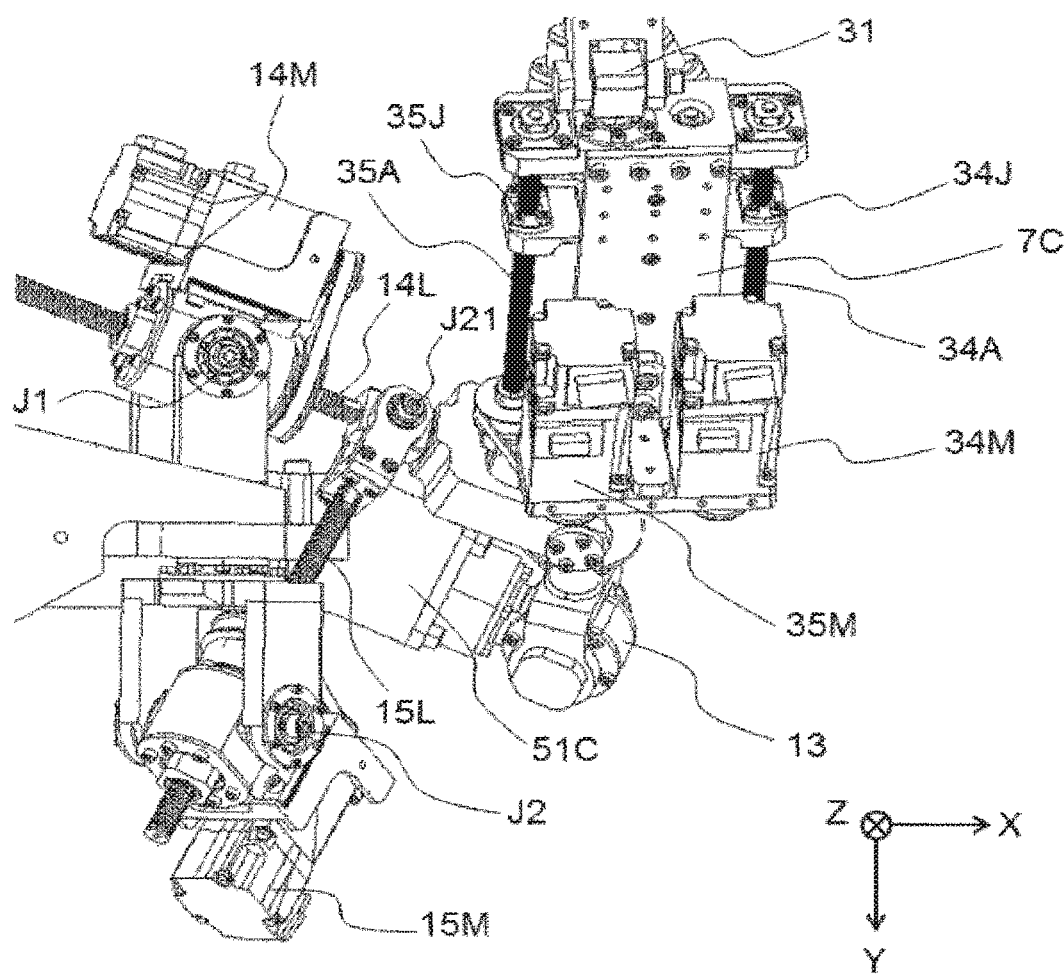
Figure 131:
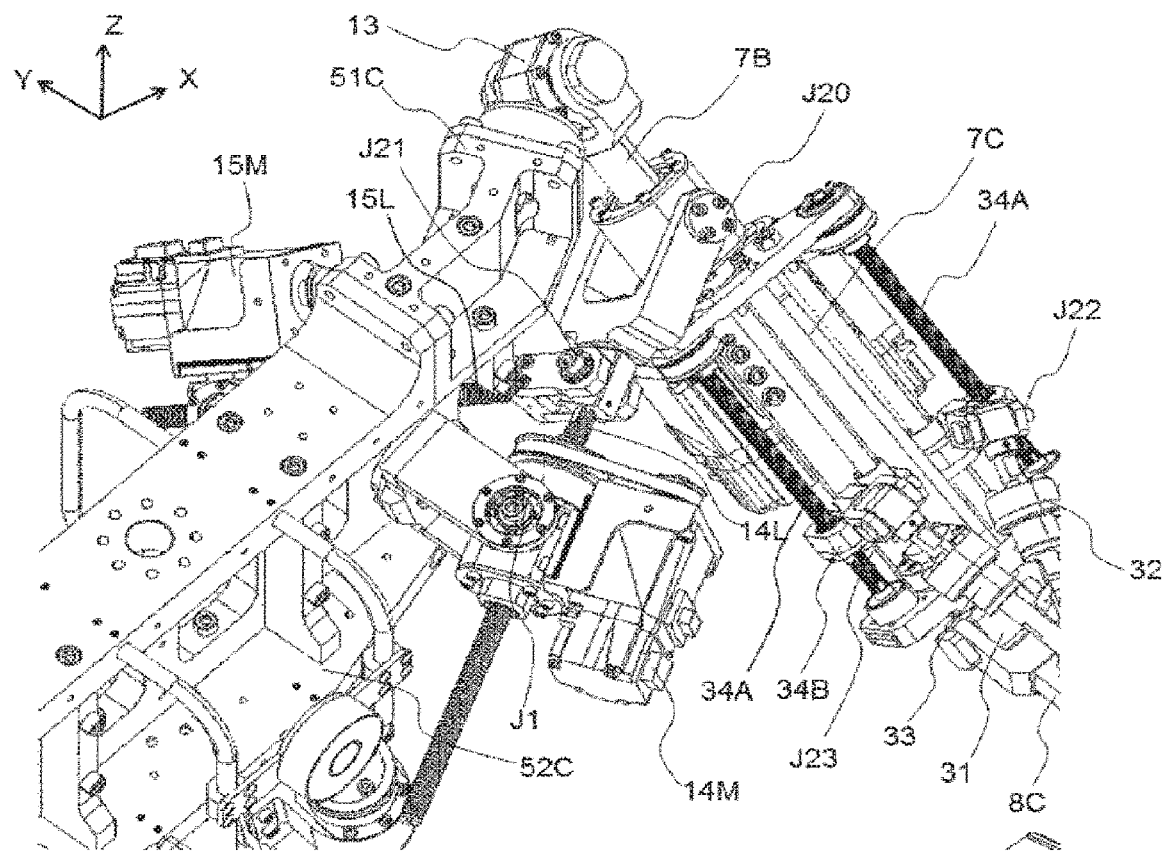
Figure 132:
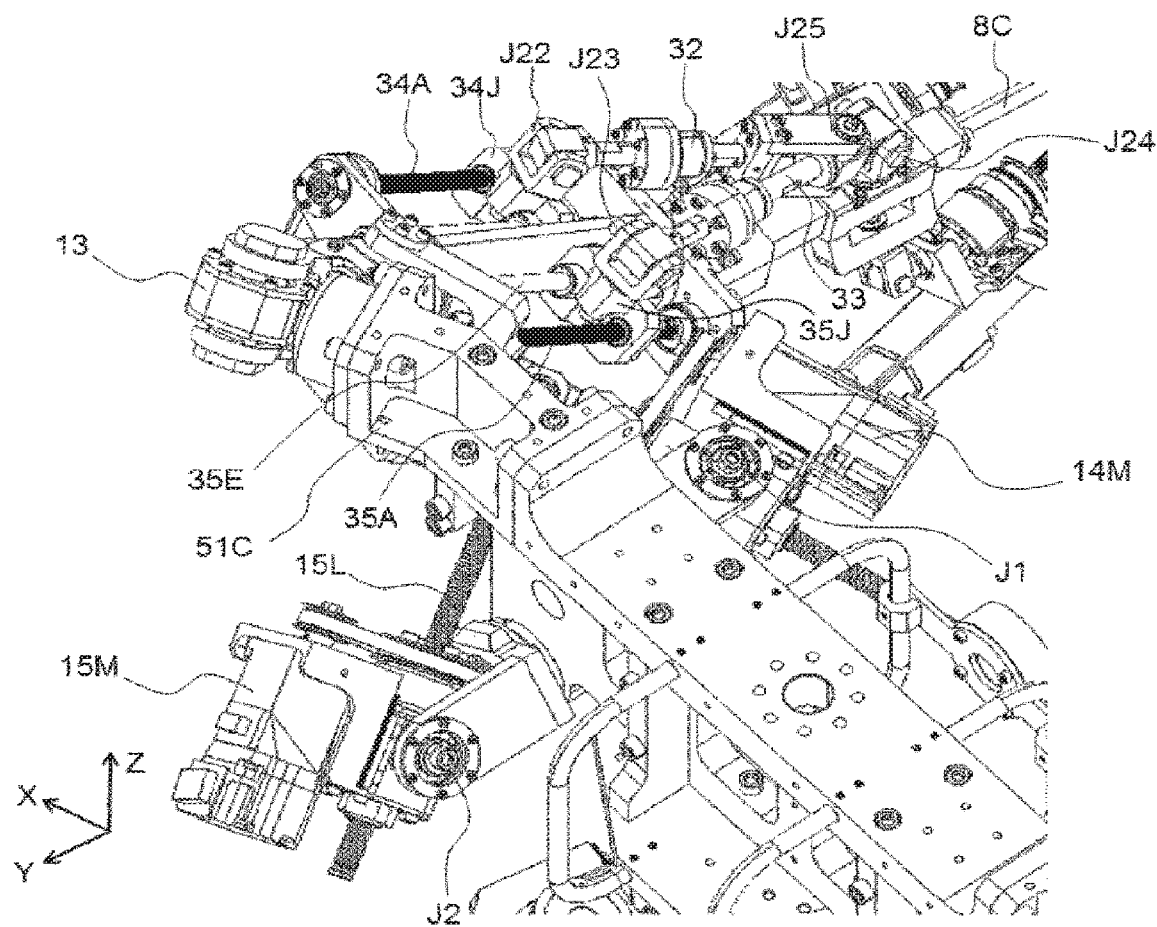

Referring to FIGS. 114 to 132, a structure of trunk 1C is described. FIGS. 120, 121, 122, and 123 are a perspective view, a front view, a left side view, and a right side view illustrating the body bending unit of humanoid upper half body robot 100C. In FIGS. 120 to 123, the humanoid upper half body robot 100C is in the state in which the actuators that drive upper limb 3C and a shoulder C4C and the like are removed. FIGS. 127, 128, and 129 are a front view, a plan view, and a left side view illustrating the shoulder included in humanoid upper half body robot 100C, respectively. In FIGS. 120 to 123, humanoid upper half body robot 100C is in the state in which the portion from upper arm 7C is removed from shoulder C4C. FIG. 130 is a view illustrating the left shoulder of humanoid upper half body robot 100C viewed from below. FIGS. 131 and 132 are perspective views illustrating the left shoulder of humanoid upper half body robot 100C. FIG. 131 is a perspective view illustrating the left shoulder of humanoid upper half body robot 100C viewed from the front upper side. FIG. 132 is a perspective view illustrating the left shoulder of humanoid upper half body robot 100C viewed from the upper rear side.

Chest 5C includes a shoulder frame 51C and a chest skeleton plate 52C. Chest skeleton plate 52C is a plate-shaped member extending in the right and left direction and the vertical direction of humanoid upper half body robot 100C. Chest 5 of the humanoid robot 100 has a structure including many frames. As compared with chest 5, chest 5C has a simple structure.

Chest skeleton plate 52C is located at the center in the front-back direction of humanoid upper half body robot 100C. Chest skeleton plate 52C has a substantially rectangular shape when viewed from the front. A portion in which the width in the right and left direction is gradually widened is connected onto the rectangle. Above the portion, there exists a portion in which the width in the right and left direction is narrowed so that a step-shaped portion is formed at each of right and left ends. Shoulder frame 51C is connected to the step-shaped portion from the right and left. The height of the portion in which the width in the right and left direction is narrowed stepwise is high only in the portions being near both ends in the right and left direction and connected with shoulder frame 51C. A semi-circularly protruding portion exists at the right and left ends of the lower end of the rectangle.

Chest skeleton plate 52C includes a plate-shaped portion that extends in the vertical direction when viewed from the side, and plate-shaped portions that extend in the front-back direction above and below the vertical plate-shaped portion. In the upper plate-shaped portion, the width in the front-back direction is the same at any portion in the right and left direction. In the lower plate-shaped portion, the width in the front-back direction is large at the center in the right and left direction. Reinforcing ribs extending vertically exist in the front surface and the rear surface at two places near the center of chest skeleton plate 52C. Chest skeleton plate 52C includes two openings in a portion between the reinforcing ribs and one opening outside each of the right and left reinforcing ribs for the purpose of weight reduction.

Shoulder frame 51C is connected to the portions located on the upper side of chest skeleton plate 52C and near the right and left ends, namely, the portions corresponding to both the shoulders. Shoulder frame 51C extends while being bent backward. A shoulder joint mounting hole 51H is made at the outside end of shoulder frame 51C. Shoulder joint 13 is mounted in shoulder joint mounting hole 51H.

Figure 120:
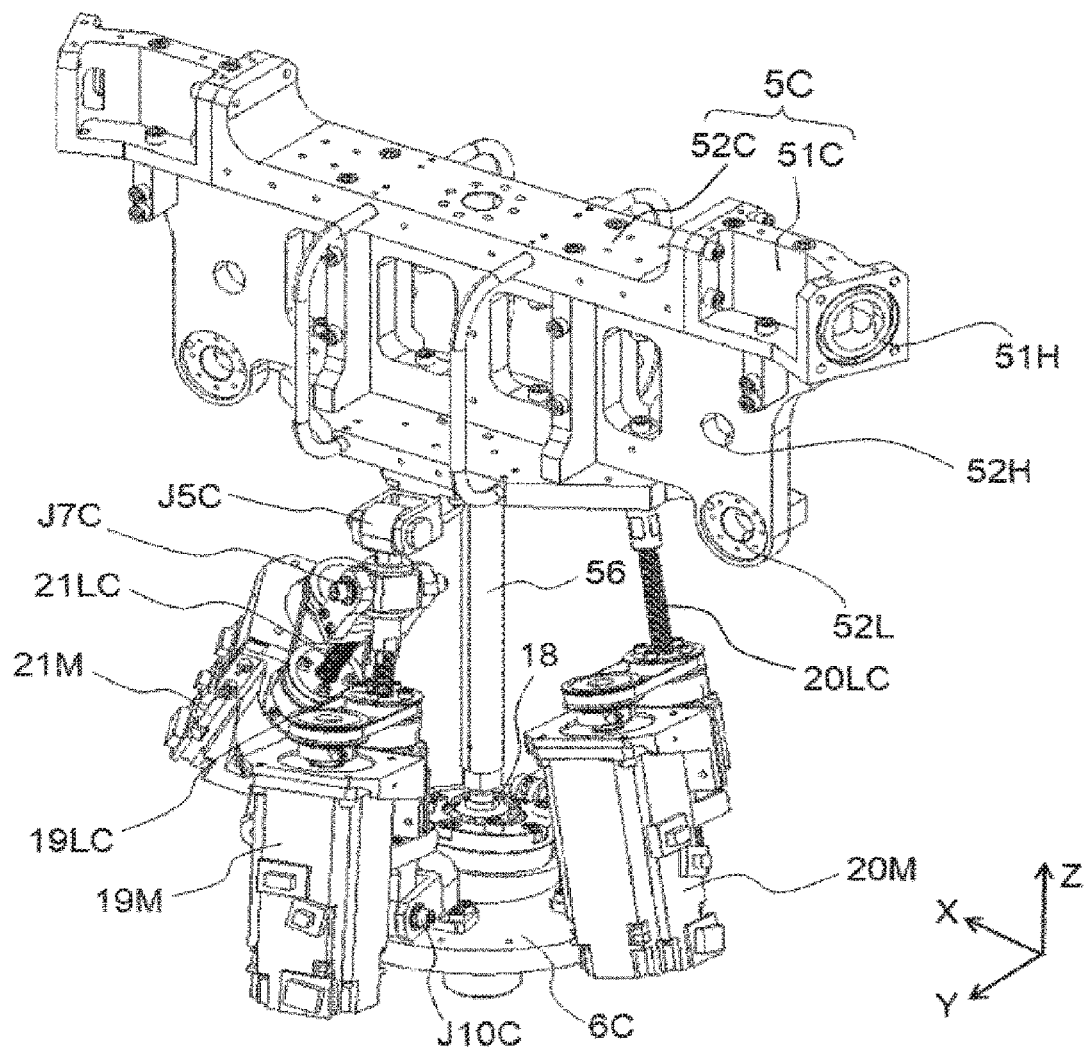
FIG. 120 is a perspective view illustrating the body bending unit included in the humanoid upper half body robot of the fifth embodiment.
Figure 121:
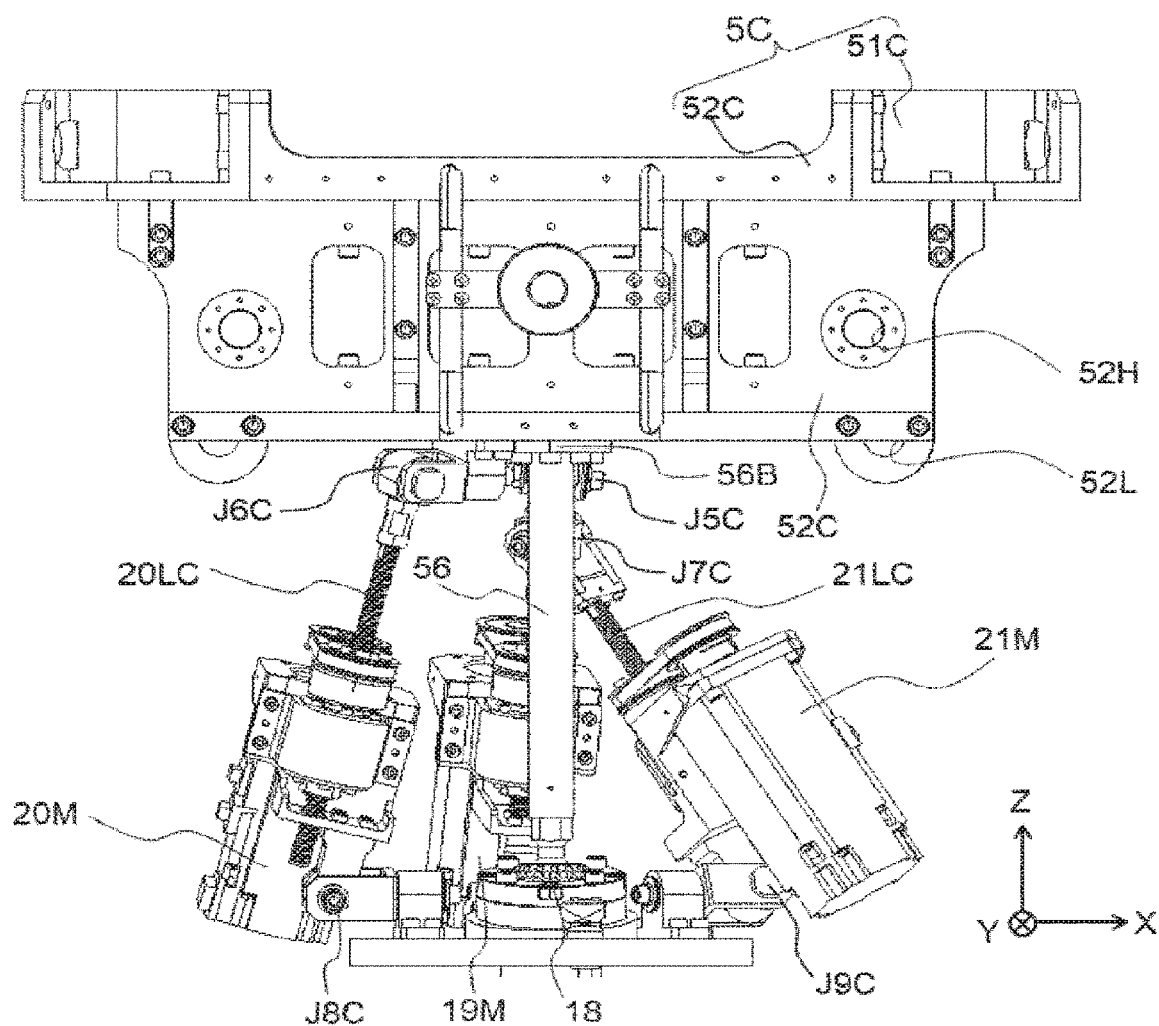
Figure 122:
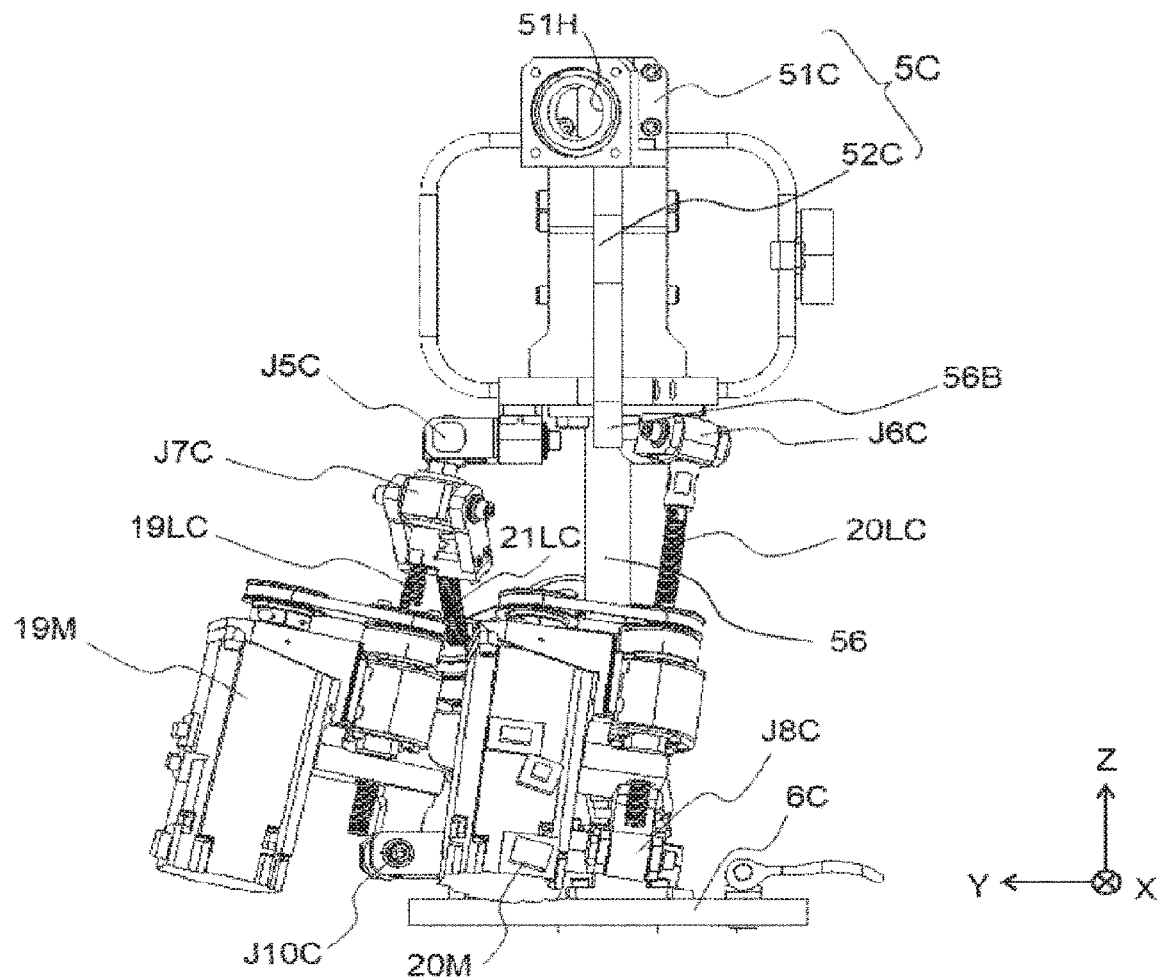
Figure 123:
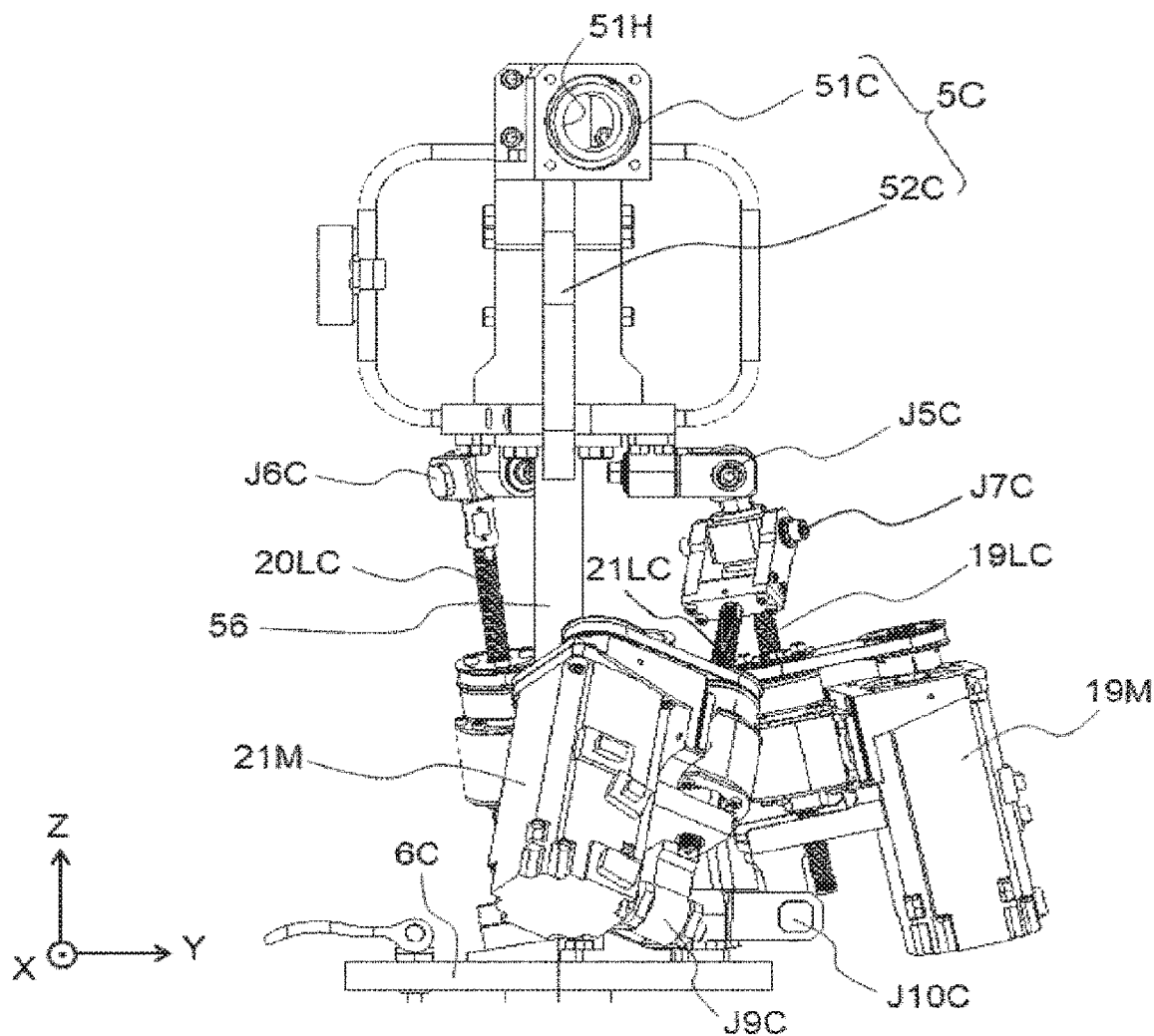

As illustrated in FIGS. 120 and 121, a shoulder first mounting hole 52H and a shoulder second mounting hole 52L are arranged near each of the right and left ends of chest skeleton plate 52C vertically. Shoulder second mounting holes 52L are made in the semi-circularly protruding portions at the right and left ends of the lower end of chest skeleton plate 52C. Chest-side main link attaching unit J1 is mounted from the front into upper shoulder first mounting hole 52H. Chest-side auxiliary link attaching unit J2 is attached from the rear into lower shoulder second mounting hole 52L. In humanoid robot 100, chest-side main link attaching unit J1 is attached rearward from the front portion of thorax frame 52. Chest-side auxiliary link attaching unit J2 is attached forward from the rear portion of thorax frame 52.

Chest-side main link attaching unit J1 is the biaxial gimbal in which upper arm driving main link 14L is sandwiched by the yoke provided in the rotation member that is rotated around the rotation axis perpendicular to chest skeleton plate 52C. Chest-side auxiliary link attaching unit J2 is the biaxial gimbal in which upper arm drive auxiliary link 15L is sandwiched by the yoke provided on the rotation member that is rotated around the rotation axis perpendicular to chest skeleton plate 52C. The direction of the rotation axes around which the rotation members of chest-side main link attaching unit J1 and chest-side auxiliary link attaching unit J2 rotate are different from the direction of the link moving plane rotation axis passing chest-side main link attaching unit J1 and chest-side auxiliary link attaching unit J2. Thus, upper arm drive main link 14L and upper arm drive auxiliary link 15L are required to have one degree of freedom around the axis.

Columnar backbone 56 is provided below chest skeleton plate 52C. Backbone 56 is perpendicular to the lower surface that is wide in the front-back direction of chest skeleton plate 52C. A thoracolumbar joint 18 connecting backbone 56 rotatably to waist 6 with three rotational degrees of freedom is provided at a lower end of backbone 56. A spherical bearing is used for thoracolumbar joint 18. Backbone 56 being the torsion axis is fixed with respect to chest 5C.

Waist 6C has a disc shape. Thoracolumbar joint 18 is provided at the center of the disc. Waist 6C around thoracolumbar joint 18 has a cylindrical shape, and is thicker than the other portions.

As illustrated in FIGS. 120 to 123, three actuators of a thoracolumbar center actuator 19C, a thoracolumbar right actuator 20C, and a thoracolumbar left actuator 21C are provided between chest 5C and waist 6C. Thoracolumbar center actuator 19C includes a thoracolumbar center link 19LC. Thoracolumbar right actuator 20C includes a thoracolumbar right link 20LC. Thoracolumbar left actuator 21C includes a thoracolumbar left link 21LC.

A chest center link attaching unit J5C and a chest right link attaching unit J6C are provided on the lower surface of chest skeleton plate 52C. One ends of thoracolumbar center link 19LC and thoracolumbar right link 20LC are connected rotatably to chest center link attaching unit J5C and chest right link attaching unit J6C with two rotational degrees of freedom. Chest center link attaching unit J5C has a structure in which one end of thoracolumbar center link 19LC is sandwiched rotatably by the yoke provided on chest skeleton plate 52C. The yoke of chest center link attaching unit J5C is provided on the rotation member that is rotated around the rotation axis being parallel to the Y-axis and extending from chest skeleton plate 52C to the rear side. Chest right link attaching unit J6C has a structure in which one end of thoracolumbar right link 20LC is sandwiched rotatably by the yoke provided on chest skeleton plate 52C. The yoke of chest right link attaching unit J6C is provided on the rotation member that is rotated around the horizontal rotation axis forming the angle of about 25 degrees with the X-axis extending from chest skeleton plate 52C to the front side.

Chest center link attaching unit J5C and chest right link attaching unit J6C exist at the same height. In backbone 56, the place having the height of chest center link attaching unit J5C and chest right link attaching unit J6C that are provided in chest 5C is called a backbone upper end 56B.

A center-link left link attaching unit J7C is provided on thoracolumbar center link 19LC at a position having a predetermined distance from chest center link attaching unit J5C. One end of thoracolumbar left link 21LC is connected rotatably to center link left link attaching unit J7C with two rotational degrees of freedom. Center-link left link attaching unit J7C has a structure in which a protrusion provided on thoracolumbar center link 19LC is sandwiched by the yoke provided at one end of thoracolumbar left link 21LC. The protrusion is provided on the same straight line extending to both side surfaces of a rectangular parallelepiped provided on thoracolumbar center link 19LC. The rectangular parallelepiped in which the protrusion is provided is rotatable around the axis of thoracolumbar center link 19LC. Center-link left link attaching unit J7C has two rotational degrees of freedom including one rotational degree around the axis of thoracolumbar center link 19LC. Chest center link attaching unit J5C, chest right link attaching unit J6C, and center-link left link attaching unit J7C are the biaxial gimbal.

A waist center link attaching unit J10C, a waist right link attaching unit J8C, and a waist left link attaching unit J9C are provided on the upper surface of waist 6C. Waist center link attaching unit J10C, waist right link attaching unit J8C and waist left link attaching unit J9C are connected rotatably to the other ends of thoracolumbar center link 19LC, thoracolumbar right link 20LC, and thoracolumbar left link 21LC with two rotational degrees of freedom, respectively. Waist center link attaching unit J10C, waist right link attaching unit J8C and waist left link attaching unit J9C, which are the biaxial gimbal, exist at the same height as thoracolumbar joint 18. Waist center link attaching unit J10C has a structure in which the other end of thoracolumbar center link 19LC is sandwiched rotatably by the yoke provided on waist 6C. The yoke of waist center link attaching unit J10C is provided on the rotation member that is rotated around the rotation axis parallel to the Y-axis extending from waist 6C to the rear side. Waist right link attaching unit J8C has a structure in which the other end of the thoracolumbar right link 20LC is sandwiched rotatably by the yoke provided on waist 6C. The yoke of waist right link attaching unit J8C is provided on the rotation member that is rotated around the rotation axis being parallel to the X-axis and extending from waist 6C to the right arm side. Waist left link attaching unit J9C has a structure in which the other end of thoracolumbar left link 21LC is sandwiched rotatably by the yoke provided on waist 6C. The yoke of waist left link attaching unit J9C is provided on the rotation member that is rotated around the horizontal rotation axis extending onto the rear side of waist 6C. The rotation axis and the X-axis forms the angle of about 25 degrees.

Each of thoracolumbar center link 19LC, thoracolumbar right link 20LC, and thoracolumbar left link 21LC is attached to waist 6C with an attachment interposed therebetween. The attachment is a member that is parallel to the screw rod. Because the attachment is used, each of thoracolumbar center link 19LC, thoracolumbar right link 20LC, and thoracolumbar left link 21LC is attached to waist 6C at a position having a predetermined distance in a predetermined direction from a straight line through which the screw rod extends. The determined direction is a direction orthogonal to the link in the plane in which there exist the link and the rotation axis around which the yoke of the link attaching unit is rotated.

Figure 124:
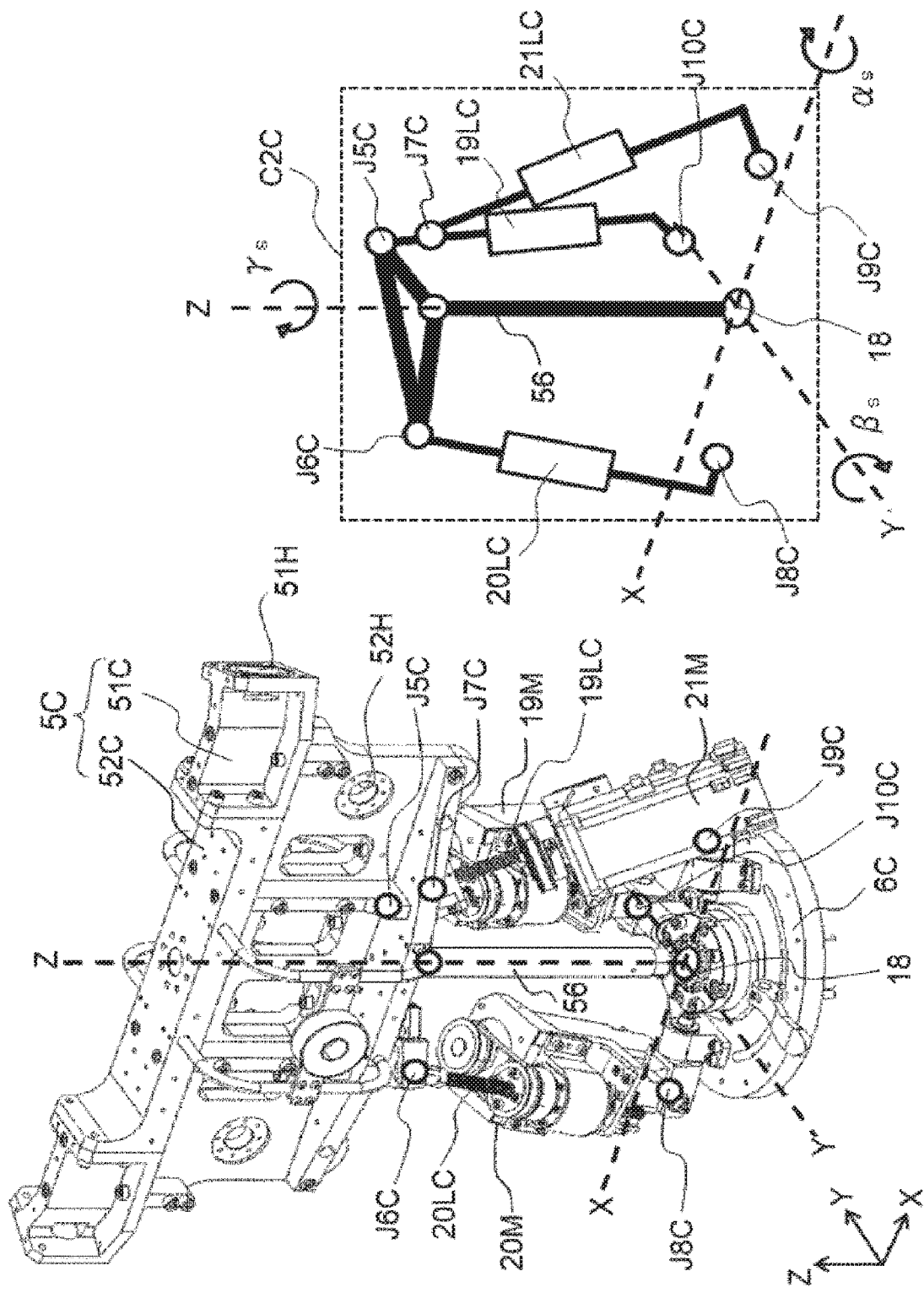
Figure 125:
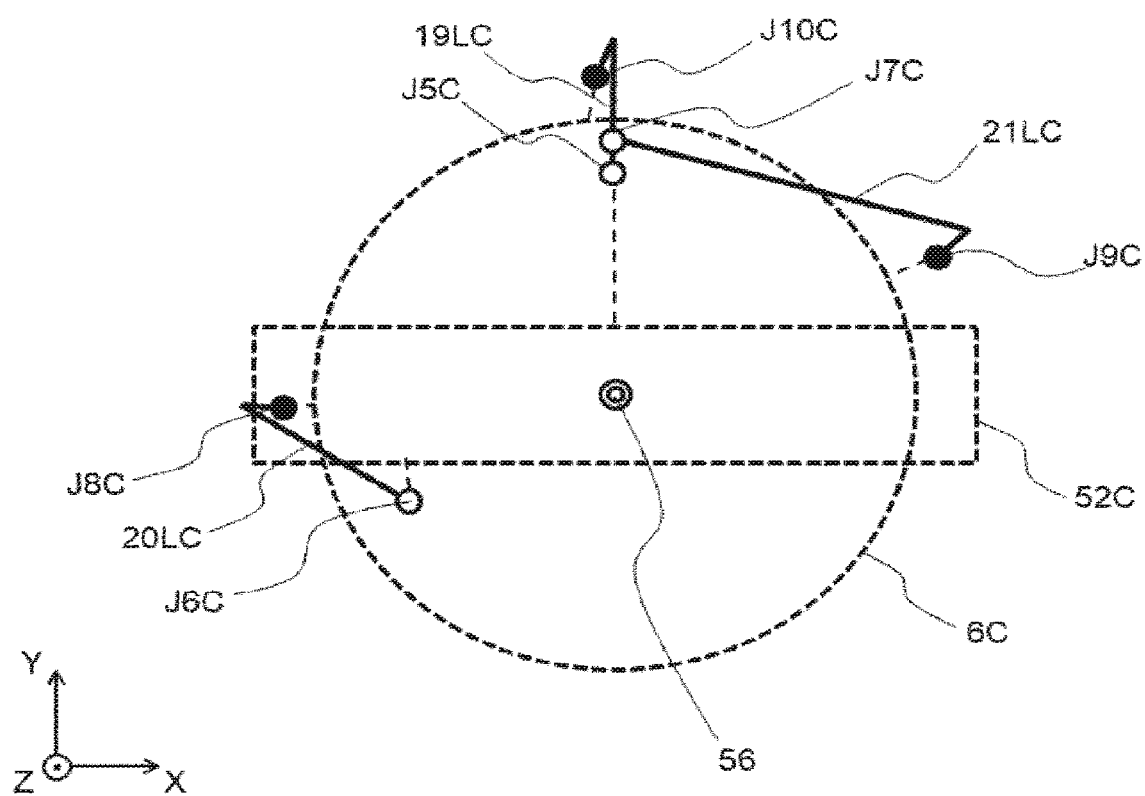

A body bending unit C2C is a rotation connecting mechanism that connects chest 5C rotatably to waist 6C with three rotational degrees of freedom around thoracolumbar joint 18. With reference to FIGS. 124 and 125, the arrangement of the link and the link attaching unit in body bending unit C2C is described. FIG. 124 is a perspective view illustrating the link arrangement of body bending unit C2C included in humanoid upper half body robot 100C. FIG. 125 is a view illustrating the link arrangement in the reference state of body bending unit C2C when the links are viewed from the direction in which the backbone extends.

As can be seen from FIG. 125, thoracolumbar center link 19LC exists right behind backbone 56 at the angle of several degrees or less with backbone 56. Thoracolumbar right link 20LC exists on the right side (left side when viewed from the front) of backbone 56. Thoracolumbar left link 21LC connects a point existing in the back of backbone 56 from the vicinity of the left side (right side when viewed from the front) end of waist 6C. On the side of waist 6C, waist center link attaching unit J10C, waist left link attaching unit J9C and waist right link attaching unit J8C are arranged on the back side of backbone 56 with a sufficient width in the right and left direction and the front-back direction. For this reason, a load of chest 5C can be dispersed and supported stably by backbone 56, thoracolumbar center link 19LC, thoracolumbar right link 20LC, and thoracolumbar left link 21LC. In a triangle formed by chest center link attaching unit J5C, chest right link attaching unit J6C, and backbone upper end 56B, the angle at a vertex corresponding to backbone upper end 56B is about 110 degrees. Chest center link attaching unit J5C and chest right link attaching unit J6C are separated from backbone upper end 56B by about a radius of waist 6C. For this reason, chest 5C can be tilted mainly in the front-back direction when thoracolumbar center link 19LC is expanded and contracted. Chest 5C can be tilted mainly in the right and left direction when thoracolumbar right link 20LC is expanded and contracted. Chest 5C can be rotated mainly around backbone 56 when thoracolumbar left link 21LC is expanded and contracted.

Figure 126:
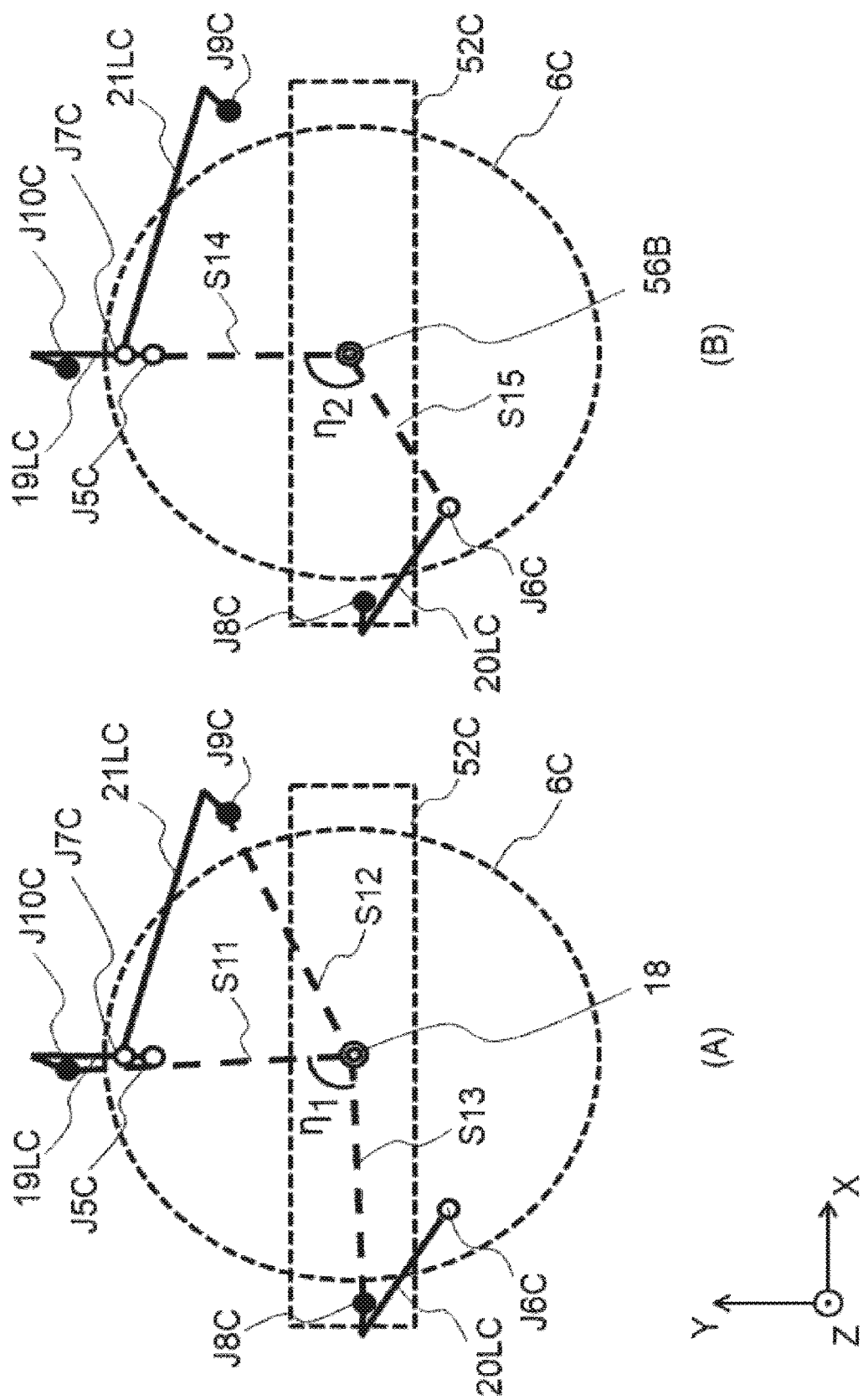

Referring to FIG. 126, line segments and others are defined to express the condition regarding the arrangement of the link attaching unit in the body bending unit. FIG. 126 is a view illustrating variables to evaluate the link arrangement in the reference state of the body bending unit. FIG. 126(A) illustrates the arrangement of the link attaching unit in waist 6C. FIG. 126(B) illustrates the arrangement of the link attaching unit in chest 5C. The plane determined by waist center link attaching unit J10C, waist left link attaching unit J9C, and waist right link attaching unit J8C is referred to as a waist reference plane. FIG. 126(A) illustrates the positional relationship among thoracolumbar joint 18, waist center link attaching unit J10C, waist left link attaching unit J9C, and waist right link attaching unit J8C on the waist reference plane. An intersection of waist reference plane and backbone 56 is referred to as a first twist center. In body bending unit C2C, the first twist center is matched with thoracolumbar joint 18. When thoracolumbar joint 18 is not located on the waist reference plane, the first twist center becomes a position different from that of thoracolumbar joint 18. The position of the first twist center is changed slightly by changing the connection angle at thoracolumbar joint 18. The distance between thoracolumbar joint 18 and the waist reference plane is determined to be equal to or less than an upper limit.

The line segment connecting waist center link attaching unit J10C and thoracolumbar joint 18 (first twist center) is referred to as a first line segment S11. The line segment connecting waist right link attaching unit J8C and thoracolumbar joint 18 is referred to as a third line segment S13. The line segment connecting waist left link attaching unit J9C and thoracolumbar joint 18 is referred to as a second line segment S12. The lengths of first line segment S11, second line segment S12, and third line segment S13 are represented by variables $L_{11}$, $L_{12}$, and $L_{13}$. The angle formed by first line segment S11 and third line segment S13 is represented by a variable $\eta_1$.

In body bending unit C2C, $\eta_1$ is about 90 degrees. That is, first line segment S11 and third line segment S13 are substantially orthogonal to each other. For this reason, a triangle (first member triangle) formed by waist center link attaching unit J10C, waist left link attaching unit J9C, and thoracolumbar joint 18 has a sufficient width when viewed from any direction. The load on chest 5C can be supported by the first member triangle stably. $\eta_1$ is not required to be orthogonal (intersect at 90 degrees), but may exist within a first crossing angle range that is determined to include 90 degrees, for example, 60 degrees to 120 degrees.

First line segment S11 exists between second line segment S12 and third line segment S13. Thus, the width of the first member triangle can be made wider as compared with the case where first line segment S11 does not exist between second line segment S12 and third line segment S13, and the load of chest 5C can be supported by the first member triangle stably. A value obtained by dividing shorter one of a length $L_{11}$ of first line segment S11 and a length $L_{13}$ of third line segment S13 by longer one is referred to as the long to short ratio. The long to short ratio is represented by a variable $\lambda$. $\lambda$=about 0.93 is obtained. Thus, the load on chest 5C can substantially equally be supported by waist left link attaching unit J9C and thoracolumbar joint 18. Long to short ratio $\lambda$ may be greater than or equal to a predetermined lower limit ratio such as 0.8.

An intersection of backbone 56 and the plane that passes chest center link attaching unit J5C and is perpendicular to backbone 56 is referred to as a second twist center 56B. Here, second twist center 56B is also the backbone upper end 56B. The plane passing chest center link attaching unit J5C, second twist center 56B, and chest right link attaching unit J6C is referred to as a chest reference plane. In humanoid upper half body robot 100C, the chest reference plane is perpendicular to backbone 56. FIG. 126(B) illustrates the positional relationship among second twist center 56B, chest center link attaching unit J5C, and chest right link attaching unit J6C on the chest reference plane. Here, on the chest reference plane, a line segment connecting second twist center 56B and chest center link attaching unit J5C is referred to as a fourth line segment S14. The line segment connecting second twist center 56B and chest right link attaching unit J6C is referred to as a fifth line segment S15. The angle formed by fourth line segment S14 and fifth line segment S15 is represented by a variable $\eta_2$.

In body bending unit C2C, $\eta_2$ is about 119 degrees. In center link left link attaching unit J7C, thoracolumbar left link 21LC is connected at an angle $\zeta$ of about 32 degrees with respect to thoracolumbar center link 19LC.

$\eta_2$ is about 119 degrees, which exists within a second crossing angle range that is determined to include 90 degrees, for example, 55 degrees to 125 degrees. Thus, the direction in which chest 5C is tilted by expanding or contracting the link to change one of the positions of chest center link attaching unit J5C and chest right link attaching unit J6C is sufficiently different from the direction in which chest 5C is tilted by expanding or contracting the link to change the other of the positions of chest center link attaching unit J5C and chest right link attaching unit J6C. As a result, chest 5C can be tilted adequately in any direction. Angle $\zeta$ is about 32 degrees, which is greater than or equal to a predetermined third crossing angle such as 20 degrees. For this reason, chest 5C can be rotated efficiently around backbone 56 by expanding or contracting thoracolumbar left link 21LC.

Body bending unit C2C is a rotation connecting mechanism that connects chest 5C being the second member rotatably to waist 6C being the first member by thoracolumbar joint 18. Thoracolumbar joint 18 is a joint that connects chest 5C rotatably to waist 6C with three rotational degrees of freedom. Body bending unit C2C changes the angle of thoracolumbar joint 18 and moves chest 5C with respect to waist 6C.

Thoracolumbar center link 19LC is the first link having five rotational degrees of freedom. Chest center link attaching unit J5C is the second-member first attaching unit provided on chest 5C. The positional relationship with respect to thoracolumbar joint 18 is fixed in chest center link attaching unit J5C. One end of thoracolumbar center link 19LC is attached rotatably to chest center link attaching unit J5C with at least two rotational degrees of freedom. Waist center link attaching unit J10C is the first-member first attaching unit provided in waist 6C. The other end of thoracolumbar center link 19LC is attached rotatably to waist center link attaching unit J10C with at least two rotational degrees of freedom. The positional relationship with respect to thoracolumbar joint 18 is fixed in waist center link attaching unit J10C. Waist center link attaching unit J10C is also the first reference point provided on waist 6C. Thoracolumbar center link 19LC itself has one rotational degree of freedom. Motor 19M is a first power source that generates the force changing the length of the thoracolumbar center link 19LC. The length of thoracolumbar center link 19LC is the distance between chest center link attaching unit J5C and waist center link attaching unit J10C. Thoracolumbar center actuator 19 including thoracolumbar center link 19LC, chest center link attaching unit J5C, waist center link attaching unit J10C, and motor 19M is the first actuator.

Thoracolumbar left link 21LC is the second link having five rotational degrees of freedom. Center-link left link attaching unit J7C is the first-link second attaching unit provided on thoracolumbar center link 19LC. The positional relationship with respect to chest center link attaching unit J5C is fixed in center link left link attaching unit J7C. One end of thoracolumbar left link 21LC is attached rotatably to center link left link attaching unit J7C with at least two rotational degrees of freedom. Waist left link attaching unit J9C is the first-member second attaching unit provided on waist 6C. The other end of thoracolumbar left link 21LC is attached rotatably to waist right link attaching unit J8C with at least two rotational degrees of freedom. The positional relationship with respect to thoracolumbar joint 18 is fixed in waist left link attaching unit J9C. Waist left link attaching unit J9C is also the second reference point provided on waist 6C. Thoracolumbar left link 21LC itself has one rotational degree of freedom. A motor 21M is the second power source that generates the force changing the length of thoracolumbar left link 21LC. The length of thoracolumbar left link 21LC is the distance between center-link left link attaching unit J7C and waist left link attaching unit J9C. Thoracolumbar left actuator 21 including thoracolumbar left link 21LC, center-link left link attaching unit J7C, waist left link attaching unit J9C, and motor 21M is the second actuator.

Thoracolumbar right link 20LC is the third link having five degrees of freedom. Chest right link attaching unit J6C is the second-member third attaching unit provided on chest 5C. The positional relationship with respect to chest 5C is fixed in chest right link attaching unit J6C. One end of thoracolumbar right link 20LC is attached rotatably to chest right link attaching unit J6C with at least two rotational degrees of freedom. Waist right link attaching unit J8C is the first-member third attaching unit provided on waist 6C. The other end of thoracolumbar right link 20LC is attached rotatably to waist right link attaching unit J8C with at least two rotational degrees of freedom. Thoracolumbar right link 20LC itself has one rotational degree of freedom. A motor 20M is the third power source that generates the force changing the length of thoracolumbar right link 20LC. The length of thoracolumbar right link 20LC is the distance between chest right link attaching unit J6C and waist right link attaching unit J8C. Thoracolumbar right actuator 20 including thoracolumbar right link 20LC, chest right link attaching unit J6C, waist right link attaching unit J8C, and motor 20M is a third actuator.

The waist reference plane is a first-member reference plane that is a plane passing the first-member first attaching unit, the first-member second attaching unit, and the first-member third attaching unit. The first twist center is the intersection of the first-member reference plane and the torsion axis. The first line segment is a line segment connecting the first twist center and the first-member first attaching unit. The second line segment is a line segment connecting the first twist center and the first-member second attaching unit. The third line segment is a line segment connecting the first twist center and the first-member third attaching unit.

In the second member, which has the fixed angle with the torsion axis like chest 5C, the intersection of the torsion axis and the plane that passes the second-member first attaching unit and is perpendicular to the torsion axis is referred to as the second twist center. The plane passing the second twist center, the second-member first attaching unit, and the second-member second attaching unit is referred to as a second-member reference plane. In chest 5C, the chest reference plane is the second-member reference plane. On the second-member reference plane, the line segment connecting the second twist center and the second-member first attaching unit is the fourth line segment. The fifth line segment is a line segment connecting the second twist center and the second-member first attaching unit.

Thoracolumbar center link 19LC, thoracolumbar right link 20LC, and thoracolumbar left link 21LC may not have one rotational degree of freedom around the axis, and the link attaching unit provided on chest 5C or waist 6C may have three rotational degrees of freedom.

The structure of shoulder C4C is basically the same as that of shoulder C4. Chest-side main link attaching unit J1 has the substantially same height as upper arm main link attaching unit J20. Chest-side auxiliary link attaching unit J2 is located lower than chest-side main link attaching unit J1, namely, closer to waist 6C. Upper arm drive auxiliary link 15L extends obliquely upward. Upper arm drive auxiliary link 15L is connected to upper arm drive main link 14L from obliquely below by upper arm drive main-link-side auxiliary link attaching unit J21. When upper arm 7C is moved up and down, upper arm drive auxiliary link 15L expands or contracts mainly. When upper arm 7C is moved in the right and left direction, upper arm drive main link 14L expands or contracts mainly. Because upper arm drive auxiliary link 15L is connected to upper arm drive main link 14L from obliquely below, upper arm drive auxiliary actuator 15 generates the force necessary for raising upper arm 7C easily. Chest-side auxiliary link attaching unit J2 is disposed at a position lower than chest-side main link attaching unit J1. That is, upper arm driving auxiliary link 15L supports upper arm 7C so that it pushes up upper arm 7C from below with upper arm drive main link 14L interposed therebetween. Consequently, humanoid upper half body robot 100C can hold the vertical position of upper limb 3C including upper arm 7C more stably.

Referring to FIGS. 134 to 137, the structure of elbow C5C is described. FIGS. 134, 135, and 136 are a perspective view, a front view, and a side view illustrating elbow C5C included in humanoid upper half body robot 100C. FIG. 137 is a perspective view illustrating the link arrangement of elbow C5C.

Humerus 7B is fitted in humerus mounting unit 7H provided on the upper surface of humerus inside frame 34F. An elbow tip 8D connected to forearm 8C is provided in elbow drive inside link attaching unit J24. Elbow tip 8D is mounted in an elbow mounting hole 8H (illustrated in FIG. 138) of forearm 8C. An elbow joint tip 31D is provided on the base side in the yoke of elbow joint 31. Elbow joint tip 31D is mounted in an elbow joint connecting hole 8J (illustrated in FIG. 138) of forearm 8C.

The structure of elbow C5C is basically the same as elbow C5. The points in which elbow C5C differs from elbow C5 are described. An upper arm outside actuator 34P does not include nut 34B, rail 34C, and gripper 34D that engages with rail 34C. Instead of them, upper arm outside actuator 34P includes a spline shaft 34E and a nut 34J. Nut 34J is a perforated member including a guide hole through which spline shaft 34E passes and a drive shaft hole (through-hole) through which screw rod 34A passes. The guide hole is made so as to penetrate nut 34J. Screw rod 34A and spline shaft 34E are parallel to each other. Because spline shaft 34E and screw rod 34A pass through nut 34J, nut 34J is not rotated when screw rod 34A is rotated. Spline shaft 34E is a guide shaft, which passes through the guide hole and is provided in parallel with screw rod 34A. The guide hole and spline shaft 34E constitute the second rotation preventing unit to prevent nut 34J from rotating. Upper arm outside link attaching unit J22 is provided in a portion sandwiched by the guide hole and the drive shaft hole of nut 34J.

A female screw that meshes with a male screw provided on an outer surface of screw rod 34A is provided on an inner surface of the drive shaft hole. When motor 34M rotates, the rotation is transmitted to screw rod 34A by a timing belt. When screw rod 34A is rotated, nut 34J is moved along screw rod 34A and spline shaft 34E because nut 34J cannot be rotated.

Spline shaft 34E is a metal cylinder having a smooth surface. A bearing or the like is provided on the inner surface of the guide hole to decrease friction with spline shaft 34E.

An upper arm outside linear guide 34GC includes screw rod 34A, spline shaft 34E, nut 34J, and upper arm outside frame 34F. Upper arm outside frame 34F contains screw rod 34A, spline shaft 34E, and nut 34J. A point where a straight line passing through screw rod 34A intersects with a portion closest to the shoulder in upper arm outside frame 34F is defined as a second reference point $P_{2N}$. The second reference point $P_{2N}$ is illustrated in FIG. 135. Upper arm outside linear guide 34GC constitutes the second guide that guides nut 34J to be moved along screw rod 34A. Upper arm outside linear guide 34GC is provided in upper arm 7C so that it has a fixed positional relationship with respect to elbow joint 31 and second reference point $P_{2N}$.

Similarly to upper arm outside actuator 34P, an upper arm inside actuator 35P includes a spline shaft 35E and a nut 35J. The guide hole made in nut 35J and spline shaft 35E constitute the first rotation preventing unit to prevent nut 35J from rotating. An upper arm inside linear guide 35GC has the same structure as upper arm outside linear guide 34GC. Upper arm inside linear guide 35GC includes a screw rod 35A, spline shaft 35E, nut 35J, and upper arm inside frame 35F. Upper arm outside frame 35F contains screw rod 35A, spline shaft 35E, and nut 35J. A point where a straight line passing through screw rod 35A intersects with a portion closest to the shoulder in upper arm inside frame 35F is defined as a first reference point $P_{1N}$. First reference point $P_{1N}$ is illustrated in FIG. 135. Upper arm inside link attaching unit J23 is provided in a portion between the guide hole and the drive shaft hole of nut 34J. Upper arm inside linear guide 35GC constitutes the first guide portion that guides nut 35J to be moved along screw rod 35A. Upper arm inside linear guide 35GC is provided in upper arm 7C so that it has a fixed positional relationship with respect to elbow joint 31 and first reference point $P_{1N}$ fixed.

Screw rod 34A and spline shaft 34E pass through nut 34J, so that the force acting on nut 34J can be distributed and received by the two rods. The same holds true for nut 35J.

The elbow joint may have three rotational degrees of freedom. When the elbow joint has three rotational degrees of freedom, the upper arm and the forearm are connected to each other by a variable length link (third link) being the third link. The variable length link has five rotational degrees of freedom, is attached rotatably to the upper arm with at least two rotational degrees of freedom, and is attached rotatably to the forearm with at least two rotational degrees of freedom. The variable length link being the third link may use a screw mechanism or a hydraulic mechanism. The third link may use a linear actuator that moves the other end of the link.

Referring to FIGS. 138 to 144, the structure of a wrist C6C is described. FIG. 138 is a perspective view illustrating wrist C6C included in humanoid upper half body robot 100C. FIG. 139 is another perspective view of wrist C6C. FIG. 140 is a front view of wrist C6C. FIG. 141 is a right side view of wrist C6C. FIG. 142 is a perspective view illustrating the link arrangement of wrist C6C. FIG. 143 is a view illustrating the link arrangement of wrist C6C in the reference state when the link arrangement is viewed from the direction in which the forearm extends. FIG. 144 is a view illustrating variables evaluating the link arrangement of wrist C6C in the reference state.

Wrist C6C is different from wrist C6 in that a forearm outside link 38LC is attached not to a wrist plate 91C but in a middle of a forearm front link 37LC. One end of forearm front link 37LC is attached to wrist plate 91C by a hand-side front link attaching unit J29C. The other end of forearm front link 37LC is attached to forearm 8C by a forearm front link attaching unit J26C. One end of a forearm outside link 38LC is attached to forearm front link 37LC by a front-link-side outside link attaching unit J30C. The other end of forearm outside link 38LC is attached to forearm 8C by a forearm outside link attaching unit J27C. One end of a forearm inside link 39LC is attached to wrist plate 91C by a hand-side inside link attaching unit J31C. The other end of forearm inside link 39LC is attached to forearm 8C by a forearm outside link attaching unit J27C.

As illustrated in FIG. 143, wrist plate 91C has an octagonal plate shape which is shaped by cutting corners of a substantially square shape so that one corner is cut largely, and the remaining three corners are cut small into a similar shape. In wrist plate 91C, wrist joint 36, hand-side front link attaching unit J29C, and hand-side inside link attaching unit J31C are arranged so that they form an isosceles right triangle. In the isosceles right triangle, the distance from an octagonal side of wrist plate 91C is almost the same on each side. The angle of wrist plate 91C with forearm bone 8B, which is the torsion axis, can be changed.

Wrist joint 36 is a spherical bearing. Wrist joint 36 has three rotational degrees of freedom. In wrist plate 91C, two protrusions are provided on the surface on which wrist joint 36 is provided. The two protrusions have substantially the same distance from wrist joint 36. Two line segments connecting each of the two protrusions and wrist joint 36 are substantially orthogonal to each other in wrist joint 36. The rotation member and the yoke that is rotated together with the rotation member are provided in each of the two protrusions. The rotation member is rotated around the rotation axis being parallel to wrist plate 91C and being directed in the direction toward wrist joint 36. One of the yokes constitutes hand-side front link attaching unit J29C. The other yoke constitutes hand-side inside link attaching unit J31C. The yoke included in hand-side front link attaching unit J29C sandwiches and holds the shaft member passing through a through-hole made at the other end of forearm front link 37LC. The yoke included in hand-side inside link attaching unit J31C sandwiches and holds the shaft member passing through a through-hole made at the other end of forearm inside link 39LC. In front-link-side outside link attaching unit J30C, the yoke is provided at one end of forearm outside link 38LC. Forearm front link 37LC is equipped with a member rotatable around the axis that is the extending direction of forearm front link 37LC. The yoke included in front-link-side outside link attaching unit J30C sandwiches and holds rotatably the protrusion protruding from the rotatable member. Front-link-side outside link attaching unit J30C has two rotational degrees of freedom including one rotational degree of rotation around the axis provided on forearm front link 37LC.

Forearm front link attaching unit J26C, forearm outside link attaching unit J27C, and forearm inside link attaching unit J28C are provided in portions of forearm 8C that protrude in three directions. The portions protruding in the three directions are provided at positions of the same length from wrist joint 36. Each of forearm front link attaching unit J26C, forearm outside link attaching unit J27C, and forearm inside link attaching unit J28C includes the yoke that is rotated around the rotation axis extending from the protruding portion to the outside perpendicular to forearm 8C. Forearm front link attaching unit J26C has a structure in which the yoke sandwiches and holds the shaft member passing through a through-hole made at one end of forearm front link 37LC. Forearm outside link attaching unit J27C and forearm inside link attaching unit J28C have the same structure. In forearm front link attaching unit 26C, forearm outside link attaching unit J27C, and forearm inside link attaching unit J28C, the directions in which the rotation axis of the yoke faces are the directions that are set to have at equal intervals of about 70 degrees. The rotation axis of forearm front link attaching unit 26C is disposed at the center.

With reference to FIG. 144, a line segment or the like is defined in order to express the condition regarding the arrangement of the link attaching unit in the wrist. FIG. 144 is a view illustrating variables used for evaluating the link arrangement of the wrist in the reference state. FIG. 144(A) illustrates the arrangement of the link attaching unit in upper arm 8C. FIG. 144(B) illustrates the arrangement of the link attaching unit on the side of wrist joint 36. A plane determined by forearm front link attaching unit J26C, forearm outside link attaching unit J27C, and forearm inside link attaching unit J28C is referred to as a forearm reference plane. FIG. 144(A) illustrates the positional relationship among forearm bone 8B, waist forearm front link attaching unit J26C, forearm outside link attaching unit J27C, and forearm inside link attaching unit J28C on the forearm reference plane. The intersection of the forearm reference plane and forearm bone 8B is referred to as the first twist center. A sign of first twist center is set to 8B that is the same as forearm bone. The direction of forearm bone 8B being the torsion axis is fixed to forearm 8 being the first member. For this reason, when the connection angle of wrist joint 36 is changed, the position of the first twist center is not changed.

The line segment connecting forearm front link attaching unit J26C and first twist center 8B is referred to as a first line segment S21. The line segment connecting forearm outside link attaching unit J27C and first twist center 8B is referred to as a third line segment S23. The line segment connecting forearm inside link attaching unit J28C and first twist center 8B is referred to as a second line segment S22. The lengths of first line segment S21, second line segment S22, and third line segment S23 are represented by variables $L_{21}$, $L_{22}$, and $L_{23}$. The angle formed by first line segment S21 and third line segment S23 is represented by a variable $\eta_{1A}$.

In wrist C6C, $\eta_{1A}$ is about 90 degrees. That is, first line segment S21 and third line segment S23 are substantially orthogonal to each other. That is, $\eta_{1A}$ is the angle within the first crossing angle range that is set to, for example, 60 degrees to 120 degrees. First line segment S21 exists between second line segment S22 and third line segment S23. Long to short ratio $\lambda$, which is a value obtained by dividing shorter one of $L_{21}$ and $L_{23}$ by longer one, is $\lambda=0.99$. Long to short ratio $\lambda$ is greater than or equal to the lower limit ratio determined to be, for example, 0.8. Similarly to body bending unit C2C, in wrist C6C, the load on hand 9C can be supported stably by the link attaching units at three places of forearm 8C.

The plane passing wrist joint 36, hand-side front link attaching unit J29C, and hand-side inside link attaching unit J31C is referred to as a wrist reference plane. The wrist reference plane is the second-member reference plane. FIG. 144(B) illustrates the positional relationship among wrist joint 36, hand-side front link attaching unit J29C, and hand-side inside link attaching unit J31C on the wrist reference plane. The line segment connecting wrist joint 36 and hand-side front link attaching unit J29C is referred to as a fourth line segment S24. The line segment connecting wrist joint 36 and hand-side inside link attaching unit J31C is referred to as a fifth line segment S25. The angle formed by fourth line segment S24 and fifth line segment S25 is represented by a variable $\eta_{2A}$.

In wrist C6C, $\eta_{2A}$ is about 92 degrees. $\eta_{2A}$ is the angle within the second crossing angle range that is set to, for example 55 degrees to 125 degrees. Similarly to body bending unit C2C, in wrist C6C, hand 9C can also be tilted adequately in any direction. An angle $\zeta_A$ formed by forearm front link 37LC and forearm outside link 38LC holds $\zeta_A$=about 26 degrees in front-link-side outside link attaching unit J30C. Angle $\zeta_A$ is greater than or equal to the determined third crossing angle such as 20 degrees. For this reason, hand 9C can be rotated efficiently around forearm bone 8B.

Wrist C6C is a rotation connecting mechanism that connects hand 9C being the second member rotatably to forearm 8C being the first member by wrist joint 36. Wrist joint 36 is a joint, which allows hand 9C to be rotated with respect to forearm 8C around the torsion axis in which the direction with respect to forearm 8C is fixed and connects hand 9C rotatably to forearm 8C with three rotational degrees of freedom.

Forearm front link 37LC is the first link having five rotational degrees of freedom. Forearm front link attaching unit J26C is the first-member first attaching unit provided in forearm 8C. The positional relationship with respect to wrist joint 36 is fixed in forearm front link attaching unit J26C. Forearm front link attaching unit J26C is also the first reference point provided in forearm 8C. The other end of forearm front link 37LC is attached rotatably to forearm front link attaching unit J26C with at least two rotational degrees of freedom. Hand-side front link attaching unit J29C is the second-member first attaching unit provided in hand 9C. One end of forearm front link 37LC is attached rotatably to hand-side front link attaching unit J29C with at least two rotational degrees of freedom. The positional relationship with respect to wrist joint 36 is fixed in hand-side front link attaching unit J29C. Forearm front link 37LC itself has one rotational degree of freedom. Motor 37M is the first power source that generates the force changing the length of forearm front link 37LC. The length of forearm front link 37LC is the distance between forearm front link attaching unit J26C and hand-side front link attaching unit J29C. Forearm front actuator 37 including forearm front link 37LC, forearm front link attaching unit J26C, hand-side front link attaching unit J29C, and motor 37M is the first actuator.

Forearm outside link 38LC is the second link having five rotational degrees of freedom. Forearm outside link attaching unit J27C is the first-member second attaching unit provided in forearm 8C. The positional relationship with respect to wrist joint 36 is fixed in forearm outside link attaching unit J27C. Forearm outside link attaching unit J27C is also the second reference point provided in forearm 8C. The other end of forearm outside link 38LC is attached rotatably to forearm outside link attaching unit J27C with at least two rotational degrees of freedom. Front-link-side outside link attaching unit J30C is the first-link second attaching unit provided in forearm front link 37LC. The positional relationship with respect to front-link-side front link attaching unit J29C is fixed in front-link-side outside link attaching unit J30C. One end of forearm outside link 38LC is attached rotatably to the front-link-side outside link attaching unit J30C with at least two rotational degrees of freedom. Forearm outside link 38LC itself has one rotational degree of freedom. A motor 38M is the second power source that generates the force changing the length of forearm outside link 38LC. The length of forearm outside link 38LC is the distance between forearm outside link attaching unit J27C and front-link-side outside link attaching unit J30C. Forearm outer actuator 38 including forearm outside link 38LC, forearm outside link attaching unit J27C, front-link-side outside link attaching unit J30C, and motor 38M is the second actuator.

Forearm inside link 39LC is the third link having five rotational degrees of freedom. Forearm inside link attaching unit J28C is the first-member third attaching unit provided in forearm 8C. The positional relationship with respect to wrist joint 36 is fixed in forearm inside link attaching unit J28C. The other end of forearm inside link 39LC is attached rotatably to forearm inside link attaching unit J28C with at least two rotational degrees of freedom. Hand-side inside link attaching unit J31C is the second-member third attaching unit provided in hand 9C. The positional relationship with respect to wrist joint 36 is fixed in hand-side inside link attaching unit J31C. One end of forearm inside link 39LC is attached rotatably to hand-side inside link attaching unit J31C with at least two rotational degrees of freedom. Forearm inside link 39LC itself has one rotational degree of freedom. A motor 39M is the third power source that generates the force changing the length of forearm inside link 39LC. The length of forearm inside link 39LC is the distance between forearm inside link attaching unit J28C and hand-side inside link attaching unit J31C. Forearm outer actuator 38 including forearm inside link 39LC, forearm inside link mount J28C, hand-side inside link mount J31C, and motor 39M is the third actuator.

The forearm reference plane is the first member reference plane. Hand 9C is the second member, which has the changeable angle with forearm bone 8B being the torsion axis. The hand reference plane is the second-member reference plane passing the second-member first attaching unit, the second-member third attaching unit, and the joint. On the second-member reference plane, the line segment connecting the joint and the second-member first attaching unit is the fourth line segment. The line segment connecting the joint and the second-member third attaching unit is the fifth line segment. When the direction of the torsion axis is fixed with respect to the second member, the fourth line segment and the fifth line segment are defined using the second twist center, instead of the joint. The second twist center is the intersection of the torsion axis and the plane being perpendicular to the torsion axis and passing the second-member first attaching unit. That is, the line segment connecting the second twist center and the second-member first attaching unit is the fourth line segment. The line segment connecting the second twist center and the second-member third attaching unit is the fifth line segment.

Referring to FIGS. 145 to 152, the structure of hand 9C is described. FIG. 145 is a view illustrating hand 9C including the wrist viewing from the backside of the hand. FIG. 146 is a side view illustrating hand 9C including the wrist when hand 9C is viewed from the side. FIGS. 147 to 149 are views illustrating hand 9C viewed from the back side of the hand, the palm side, and the side surface, respectively. FIGS. 150 and 151 are perspective views illustrating the finger base of hand 9C that rotates a two-way rotation finger around the axis of the finger base. FIGS. 150 and 151 illustrate a state in which a finger base 80 is separated from palm plate 82. FIG. 151 is a perspective view illustrating finger base 80 viewed from the side of first finger 83. FIG. 152 is a perspective view illustrating finger base 80 viewed from the side of palm plate 82.

In hand 9C, first finger 83, second finger 84, third finger 85, and fourth finger 86 are the same as hand 9B of the fourth embodiment. Hand 9C includes a two-way rotation finger 89 instead of hand breadth rotation finger 88 corresponding to the thumb of hand 9B. The portion including from fingertip to a first finger joint 89D provided in two-way rotation finger 89 is the same as the portion including from fingertip to first finger joint 88D provided in hand breadth rotation finger 88. Two-way rotation finger 89 includes finger base 80 that rotates the portion of the fingertip side including first finger joint 89D and that is provided between first finger joint 89D and palm plate 82.

Finger base 80 includes a finger base dactylus 80A, a finger base motor fixer 80B, a finger-base finger joint 80C, a finger base motor 80D, a finger base gear head 80E, a finger base worm 80F, and a finger base worm wheel 80G. Finger base dactylus 80A extends in the direction being substantially parallel to palm plate 82 and being substantially orthogonal to the direction in which first finger 83 extends. Finger base motor fixer 80B having a space inside thereof is fixed to palm plate 82. Finger base dactylus 80A is connected to the side surface of finger base motor fixer 80B. A first dactylus 89A is connected rotatably to finger base dactylus 80A by first finger joint 89D.

Finger-base finger joint 80C has a rotation axis Rx3 directed in the direction in which the finger base dactylus 80A extends. Finger base motor 80D and finger base gear head 80E are fixed to the outer surface of finger base motor fixer 80B so as to be orthogonal to palm plate 82. Finger base worm 80F is connected to the rotation shaft driven by finger base motor 80D. Finger base worm 80F and finger base worm wheel 80G, in which teeth mesh with each other, exist inside finger base motor fixer 80B. Rotation axis Rx3 connected to finger base worm wheel 80G is connected to finger base dactylus 80A through a through-hole made in a wall of finger base motor fixer 80B. When finger base motor 80D rotates, the finger base dactylus 80A is rotated around the rotation axis Rx3. That is, finger-base finger joint 80C rotates finger base dactylus 80A with respect to finger base motor fixer 80B and palm plate 82 by the worm gear mechanism having rotation axis Rx3. Finger-base finger joint 80C can generate the large force because the worm gear mechanism is used. Furthermore, the rotation angle around rotation axis Rx3 can be maintained when power supply is cut off.

Rotation axis Rx3 is a finger base rotation axis being the rotation axis extending in the direction having a predetermined angle with respect to first dactylus 89A. The direction having the determined angle is a direction in which first dactylus 89A forms an angle of about 30 degrees with respect to rotation axis Rx3 parallel to the Y-axis. Finger base 80 rotates finger base dactylus 80A around rotation axis Rx3.

Two projections 80AA and 80AB are provided in finger base dactylus 80A. A protrusion 80BA is provided in finger base motor fixer 80B. Protrusion 80BA exists between protrusions 80AA and 80AB that are rotated around rotation axis Rx3 together with finger base dactylus 80A. Protrusion 80BA and protrusions 80AA and 80AB restrict the range in which finger base dactylus 80A can be rotated around rotation axis Rx3.

Finger base dactylus 80A is connected to a first motor fixer 89V such that first motor fixer 89V faces to the palm side of the hand with respect to palm plate 82. First motor fixer 89V is connected to finger base dactylus 80A while inclined onto the palm side of the hand. First motor fixer 89V is a plate member bent in an L-shape when viewed from the side. Finger base dactylus 80A is obliquely connected to first motor fixer 89V on one surface of the L-shape. A finger base yoke 89G is connected to the inside of the two surface constituting the L-shape of first motor fixer 89V. A first worm wheel 89K, a first wheel linked part 89AA, and a first worm 89J, which are rotated in conjunction with the rotation shaft of first finger joint 89D, exist in finger base yoke 89G. A finger first motor 89H and a first gear head 89T are fixed to the other surface of the L-shape of first motor fixer 89V. A rotation axis Rz3 of first finger joint 89D is perpendicular to finger base yoke 89G and rotation axis Rx3. A worm tip holder 89VB is attached to finger base yoke 89G as a surface facing the surface to which finger first motor 89H and first gear head 89T are fixed. A hole into which the tip of first worm 89J is inserted is made in worm tip holder 89VB.

First worm 89J is connected to the rotation shaft of finger first motor 89H at the position surrounded by finger base yoke 89G and first motor fixer 89V. The teeth of first worm 89J mesh with the teeth of first worm wheel 89K. When finger first motor 89H rotates, first worm 89J and first worm wheel 89K are rotated to change the angle between first wheel linked part 89AA and finger base yoke 89G. Thus, first dactylus 89A can be bent and extended by first finger joint 89D.

Two-way rotation finger 89 can be rotated in two directions around rotation axis Rx3 and rotation axis Rz3 that are orthogonal to each other. When rotating around rotation axis Rz3, two-way rotating finger 89 is rotated in the direction in which the fingertip is moved away from palm plate 82. When rotating around rotation axis Rx3, two-way rotating finger 89 can be rotated from the direction being parallel with first finger 83 to the direction orthogonal to palm plate 82.

Two-way rotation finger 89 is rotated in two directions, so that hand 9C can bend five fingers adequately according to the shape of the object to hold the object adequately. For the large object, two-way rotation finger 89 can be moved to the position being parallel with first finger 83, and the object can be placed on palm plate 82 and five fingers. Hand 9C including two-way rotation finger 89 performs finger drive equivalent to that of a human, and has an effect that can perform various and advanced work using hands. At least two fingers may be used as the two-way rotation finger including the finger base.

The operation is described. The posture of humanoid upper half body robot 100C is determined by the angles taken by thoracolumbar joint 18, shoulder joint 13, elbow joint 31, and wrist joint 36. The angles of these joints are determined by the lengths of the links that drive the joints. The link that drives each joint of humanoid upper half body robot 100C is set to a value determined from a designated angle that is the angle of each joint that allow to take the designated posture. Consequently, humanoid upper half body robot 100C can take the designated posture. When humanoid upper half body robot 100C is moved, a time series of the designated angle corresponding to a change in the posture is converted into a time series of the link length, and the link length is changed according to the determined time series, which allow humanoid upper half body robot 100C to be moved as designated.

The positions of the joint and the link attaching units in thoracolumbar joint 18 are expressed by the following variables. FIG. 153 is a view illustrating the variables expressing the positions of the joint and the link attaching units in the thoracolumbar joint.

The variable representing the position of each point is defined as follows.

$P_{0s}$: position of thoracolumbar joint 18.
$P_{1s}$: position of waist-side center link attaching unit J10C.
$P_{2s}$: position of waist-side right link attaching unit J8C.
$P_{3s}$: position of waist-side left link attaching unit J9C.
$P_{4s}$: position of chest-side center link attaching unit J5C.
$P_{4s0}$: position of chest-side center link attaching unit J5 in reference state.
$P_{5s}$: position of chest-side right link attaching unit J6C.
$P_{5s0}$: position of chest-side right link attaching unit J6C in reference state.
$P_{6sA}$: position of center-link left link attaching unit J7C.
$P_{10s}$: position of intersection of thoracolumbar center link 19LC and plane, which passes waist-side center link attaching unit J10C and is perpendicular to thoracolumbar center link 19LC.
$P_{11s}$: position of intersection of thoracolumbar left link 21LC and plane, which passes waist-side left link attaching unit J9C and is perpendicular to thoracolumbar left link 21LC.
$P_{12s}$: position of intersection of thoracolumbar right link 20LC and plane, which passes waist-side right link attaching unit J8C and is perpendicular to thoracolumbar right link 20LC.

The rotation angle of the thoracolumbar joint 18 is expressed by the following variables as in the case of the first embodiment.

$\alpha_s$: rotation angle around X-axis of thoracolumbar joint 18. $\alpha_s=0$ in reference state
$\beta_s$: rotation angle around Y-axis of thoracolumbar joint 18. $\beta_s=0$ in reference state
$\gamma_s$: rotation angle around Z-axis of thoracolumbar joint 18. $\gamma_s=0$ in reference state

[Rs]: rotation matrix of thoracolumbar joint 18. The rotation matrix [R2] is given as follows.

$$[Rs] = \begin{pmatrix} 1 & 0 & 0 \\ 0 & \cos\alpha s & -\sin\alpha s \\ 0 & \sin\alpha s & \cos\alpha s \end{pmatrix}$$ [Mathematical Formula 8]

$$\begin{pmatrix} \cos\beta s & 0 & -\sin\beta s \\ 0 & 1 & 0 \\ \sin\beta s & 0 & \cos\beta s \end{pmatrix} \begin{pmatrix} \cos\gamma s & -\sin\gamma s & 0 \\ \sin\gamma s & \cos\gamma s & 0 \\ 0 & 0 & 1 \end{pmatrix}.$$

The lengths of the links are expressed by the following variables.

$L_{1s}$: length of thoracolumbar center link 19LC. Length of line segment $P_{10s}P_{4S}$.

$L_{1sd}$: length of line segment $P_{1s}P_{4s}$.

$L_{2s}$: length of thoracolumbar right link 20LC. Length of line segment $P_{11s}P_{5s}$.

$L_{2sd}$: length of line segment $P_{2s}P_{5s}$.

$L_{3s}$: length of thoracolumbar left link 21LC. Length of line segment $P_{12s}P_{6sA}$.

$L_{3sd}$: length of line segment $P_{3s}P_{6sA}$.

Hd: distance between the link attaching unit and the screw rod, which are provided in waist 6C in thoracolumbar center link 19LC, thoracolumbar right link 20LC, and thoracolumbar left link 21LC.

A procedure for calculating each point and the length of each link is described. The positions of points $P_{0s}$, $P_{1s}$, $P_{2s}$, $P_{3s}$ are fixed. [Rs] is determined when the angle of thoracolumbar joint 18 is determined. The positions of points $P_{4s}$, $P_{5s}$ are determined as follows.

$$P_{4s} = [Rs] * P_{4s0}$$

$$P_{5s} = [Rs] * P_{5s0}$$

$L_{1sd}$, $L_{2sd}$ are also determined when the positions of points $P_{4s}$, $P_{5s}$ are determined.

The position of point $P_{10s}$ is determined from the positions of points $P_{1s}$, $P_{4s}$. A plane including point $P_{1s}$ and the rotation axis around which the yoke of the waist-side center link attaching unit J10C is rotated is referred to as a first link plane. Point $P_{10s}$ exists on the first link plane. Based on the Pythagorean theorem, $L_{1s}$ is determined as follows.

$$L_{1s} = \sqrt{(L_{1sd}^2 - Hd^2)}$$

The position of point $P_{10s}$ is the point having the distance of Hd from point $P_{1s}$ and the distance of $L_{1s}$ from point $P_{4s}$ on the first link plane.

When the position of point $P_{10s}$ is determined, the position of point $P_{6sA}$ is determined. The position of point $P_{6sA}$ is the position at the predetermined distance from point $P_{4s}$ on a straight line passing points $P_{4s}$, $P_{10s}$. $L_{3sd}$ is also determined when the position of point $P_{6sA}$ is determined.

The position of point $P_{12s}$ is determined from the positions of points $P_{3s}$, $P_{6sA}$. A plane including point $P_{3s}$ and the rotation axis around which the yoke of waist right link attaching unit J8C is rotated is referred to as a second link plane. Point $P_{12s}$ exists on the second link plane. Based on the Pythagorean theorem, $L_{3s}$ is determined as follows.

$$L_{3s} = \sqrt{(L_{3sd}^2 - Hd^2)}$$

The position of point $P_{12s}$ is the position having the distance of Hd from point $P_{3s}$ and the distance of $L_{3s}$ from point $P_{6sA}$ on the second link plane.

The position of point $P_{11s}$ is determined from the positions of points $P_{2s}$, $P_{5s}$. A plane including point $P_{2s}$ and the rotation axis around which the yoke of waist left link attaching unit J9C is rotated is referred to as a third link plane. Point $P_{11s}$ exists on the third link plane. Based on the Pythagorean theorem, $L_{2s}$ is determined as follows.

$$L_{2s} = \sqrt{(L_{2sd}^2 - Hd^2)}$$

The position of point $P_{12s}$ is the point of the distance of Hd from point $P_{2s}$ and the distance of $L_{2s}$ from point $P_{5s}$ on the third link plane. In this way, the positions of all the link attaching units and the length of each link can be determined.

When the length of each link is determined, how to determine the rotation angle of thoracolumbar joint 18 is studied. In body bending unit C2C, an influence of the change in the link length on the rotation angle of thoracolumbar joint 18 is considered easily as compared with body bending unit C2.

FIG. 154 is a view illustrating a point where the position is fixed by determining the link length in body bending unit C2C included in humanoid upper half body robot 100C. FIG. 154(A) illustrates a state in which the lengths of the three links are not determined. FIG. 154(B) illustrates a state in which the lengths of thoracolumbar center link 19LC being the first link and thoracolumbar left link 21LC being the second link are determined. FIG. 154(C) illustrates a state in which the lengths of the three links are determined. In FIG. 154, the link having the determined length is expressed by a thick solid line, and the link of which length is not determined is expressed by a thin dotted line. A point with the position that is determined is expressed by a double circle, and a point with the position that is not determined is expressed by a white circle. The point representing thoracolumbar joint 18 being the joint is expressed by a double circle when the rotation angle of thoracolumbar joint 18 is determined.

As illustrated in FIG. 154(A), the rotation angle of thoracolumbar joint 18 and the position of the point existing in chest 5C being the second member are not determined in the state in which the lengths of the three variable-length links are not determined. When the lengths of first link 19LC and second link 21LC are determined, the distance of point $P_{4s}$ from points $P_{0S}$, $P_{1S}$, $P_{3S}$ is determined. As a result, as illustrated in FIG. 154(B), the position of point $P_{4S}$ is determined uniquely. The fact that the position of point $P_{4S}$ is determined means that the rotation angle around the backbone 56 being the torsion axis of chest 5C and the tilt angle of backbone 56 in the direction toward waist-side center link attaching unit J10C being the second-member first attaching unit are determined.

In the state of FIG. 154(B), thoracolumbar joint 18 can be rotated around a rotation axis R11 passing points $P_{0S}$, $P_{4S}$. For this reason, point $P_{5S}$ is rotated around rotation axis R11 while the distance from point $P_{0S}$ and the distance from point $P_{4S}$ are kept unchanged. Rotation axis R11 connecting point $P_{0S}$ (joint) and point $P_{4S}$ (second-member first attaching unit) is referred to as a first attaching unit direction axis. In FIG. 154(B), rotation axis R11 is illustrated as existing on an XZ-plane. However, rotation axis R11 does not necessarily exist on the XZ-plane. When the position of point $P_{4S}$ determined by the lengths of first link 19LC and second link 21LC does not exist on the XZ-plane, rotation axis R11 is in the direction intersecting the XZ-plane.

Furthermore, when the length of third link 20LC is determined, point $P_{5S}$ and the rotation angle of thoracolumbar joint 18 are determined. Thus, the state shown in FIG. 154(C) is obtained.

In the rotation connecting mechanism of the present disclosure including the joint having three rotational degrees of freedom, the rotation angle around the torsion axis and the tilt angle (referred to as a first attaching unit tilt angle) of the torsion axis within the plane (referred to as a first attaching unit existing plane) including the torsion axis and the second-member first attaching unit can be determined by determining the lengths of the first link and the second link. The rotation axis orthogonal to the first attaching unit existing plane is referred to as a first attaching unit tilt axis. The first attaching unit tilt angle is a rotation angle around the first attaching unit tilt axis.

In the state where the lengths of the first link and the second link are determined, the joint can be rotated around the first attaching unit direction axis by changing the length of the third link.

When the length of thoracolumbar right link 20LC being the third link is determined, the state shown in FIG. 154(C) is obtained. Point $P_{5S}$ is also determined by the distance from point $P_{2S}$ in addition to distances from points $P_{0S}$, $P_{4S}$. Because the distance from the three points is determined, the position of point $P_{5S}$ is determined uniquely. When the position of point $P_{5S}$ is determined, the angle of joint 18 is also determined.

Thus, the rotation angle around the torsion axis and the first attaching unit tilt angle can be determined by determining the lengths of the first link and the second link. Furthermore, the rotation angle around the first attaching unit direction axis can be determined when the length of the third link is determined. The shape of the triangle determined by three points $P_{0S}$, $P_{1S}$, $P_{4S}$ is determined in the state in which only the length of the first link is determined. When the length of the second link is changed in this state, vertex $P_{4S}$ of the triangle is rotated around the rotation axis passing points $P_{0S}$, $P_{1S}$. Body bending unit C2C has a characteristic that the relationship of the joint angle with respect to the length of each link is analyzed easily.

The case of body bending unit C2 in the first embodiment is described as a comparative example. FIG. 155 is a view illustrating a point where the position is fixed by determining the link length in body bending unit C2 included in humanoid robot 100. FIG. 155(A) illustrates a state in which the lengths of the three links are not determined. FIG. 155(B) illustrates a state in which the lengths of thoracolumbar center link 19L being the first link and thoracolumbar left link 21L being the second link are determined. FIG. 155(C) illustrates a state in which the lengths of the three links are determined.

As illustrated in FIG. 155(A), the position of the point existing on chest 5 being the second member is not determined in the state in which the lengths of the three variable-length links are not determined. When the lengths of first link 19L and second link 21L are determined, the state shown in FIG. 155(B) is obtained. First link 19L is connected to chest 5 at point $P_{4S}$. Second link 21L is connected to chest 5 at point $P_{6S}$. For this reason, neither the position of point $P_{4S}$ nor the position of point $P_{5S}$ can be determined uniquely.

In the state of FIG. 155(B), a first triangle that is a triangle determined by three points $P_{1S}$, $P_{2S}$, $P_{4S}$ and a second triangle that is a triangle determined by three points $P_{2S}$, $P_{4S}$, $P_{6S}$ are formed while sharing a bottom side S30 connecting points $P_{2S}$, $P_{4S}$. The angle of vertex $P_{1S}$ against bottom side S30 of the first triangle is set to ε1. The angle of vertex $P_{6S}$ against bottom side S30 of the second triangle is set to ε2. Angles ε1, ε2 must be determined to keep a constraint condition that bottom side S30 have the same length. Angles ε1, ε2 can be changed when the constraint condition is kept.

The position of point $P_{5S}$ is also changed when angles ε1, ε2 change. The length of thoracolumbar right link 20L being the third link is changed when the position of point $P_{5S}$ is changed. Thus, when the length of third link 20L is determined, the positions of points $P_{5S}$, $P_{4S}$, $P_{6S}$ and the angle of thoracolumbar joint 18 being the joint are also determined uniquely. FIG. 155(C) illustrates the state in which the length of third link 20L is also determined. As described above, in body bending unit C2, the angle of the joint can be determined only when the lengths of the three variable length links are determined. In body bending unit C2, part of the three components of the joint angle cannot be determined at a point of time when the lengths of the two variable length links are determined.

The connection relationship between the link of shoulder C4C and the link attaching unit is the same as shoulder C4. In shoulder C4C, the method for determining the length of the variable-length link such that shoulder joint 13 takes the designated angle is the same as shoulder C4. Shoulder joint 13 is a joint having two rotational degrees of freedom. Because upper arm drive auxiliary link 15L being the second link is connected to upper arm drive main link 14L being the first link, the rotation angle of joint 13 can be determined uniquely by determining the lengths of first link 14L and second link 15L.

When second link 15L is connected to humerus 7B being the second member, the rotation angle of joint 13 can be determined uniquely by determining the lengths of first link 14L and second link 15L. However, because two link attaching units are provided in second member 7B, the method for determining the rotation angle of joint 13 becomes slightly complicated.

The connection relationship between the link and the link attaching unit in elbow C5C is the same as elbow C5. In elbow C5C, the method for determining the attaching positions of the first link and the second link such that elbow joint 31 takes the designated angle is the same as elbow C5. Elbow joint 31 is a joint having two rotational degrees of freedom.

Wrist C6C has the same link arrangement as body bending unit C2C. Thus, the lengths of the three variable length links such that wrist joint 36 being a joint having three rotational degrees of freedom takes a designated angle can be determined by the same method as body bending unit C2C. In wrist C6C, because the link attaching units on both sides of the link exist on the same straight line, processing is simplified as compared with body bending unit C2C.

In hand 9C, the motor is driven such that the worm gear of each finger joint is located at the position corresponding to the designated angle. In hand 9C, when the worm gear of each finger joint is located at the position corresponding to the designated angle, the first finger joint and the second finger joint of each finger are set to the designated angle. Two-way rotation finger 89 includes finger base 80 that rotates the entire finger including the first finger joint. In two-way rotation finger 89, the motor is driven such that the finger is directed in the designated direction, and such that the worm gear at the finger base is located at the position corresponding to the designated angle. The number of fingers including the finger base may be two or more.

The rotation connecting mechanism of the present disclosure including the joint having two rotational degrees of freedom or three rotational degrees of freedom may be applied to at least one of neck C3, crotch C7, knee C8, and ankle C9 of humanoid robot 100.

The rotation connecting mechanism of the present disclosure may be applied to not the humanoid robot but a robot arm including the hand and one or a plurality of arm section units connected in series from the hand. The rotation connecting mechanism may be used such that the second member being one of the hand and the arm section unit is connected rotatably to the first member located on the side far from the hand with two rotational degrees of freedom or three rotational degrees of freedom. In the robot arm, the hand can be at a proper position and can be directed to a proper angle.

Hand 9 of the first embodiment, hand 9A of the third embodiment, hand 9B of the fourth embodiment, or another hand may be used as the hand.

The above is also applied to other embodiments.

Sixth Embodiment

A sixth embodiment is the case where the fifth embodiment is modified such that the position of the joint of the body bending unit of the humanoid upper half body robot is moved to the upper end of the backbone. FIG. 156 is a front view illustrating a humanoid upper half body robot according to the sixth embodiment of the present disclosure. In a humanoid upper half body robot 100D, a thoracolumbar joint 18D is provided at the end (upper end) connecting backbone 56 and a chest 5E. For this reason, the axial direction of backbone 56 is fixed in a direction perpendicular to a waist 6D. In backbone 56, a place at the height of waist center link attaching unit J10C is referred to as a backbone lower end 56D. Backbone lower end 56D is the first twist center that is the intersection of the waist reference plane and backbone 56 being the torsion axis.

Thoracolumbar joint 18D includes a spherical bearing. Thoracolumbar joint 18D connects chest 5E rotatably to waist 6D with three rotational degrees of freedom. The angle formed by backbone 56 and chest 5E being the second member can be changed. In other respects, humanoid upper half body robot 100D is the same as humanoid upper half body robot 100C.

FIG. 157 is a perspective view illustrating the link arrangement of the body bending unit included in the humanoid upper half body robot of the sixth embodiment. As compared with FIG. 124 for humanoid upper half body robot 100C, the difference is that thoracolumbar joint 18D is located at the upper end of backbone 56. Because thoracolumbar joint 18D is located at the upper end of backbone 56, the X-axis and the Y-axis that rotate chest 5E are located at a higher position than the case in FIG. 124.

A body bending unit C2D of humanoid upper half body robot 100D is a rotation connecting mechanism that connects chest 5E being the second member rotatably to waist 6D being the first member by thoracolumbar joint 18D being the joint.

The operation is described. The posture of humanoid upper half body robot 100D is determined by the angles taken by thoracolumbar joint 18D, shoulder joint 13, elbow joint 31, and wrist joint 36. For each joint, how to determine the length of the variable length link such that the joint can take a designated angle and how to determine the position of the link attaching unit in the linear guide are the same as humanoid upper half body robot 100C.

Even in body bending unit C2D, the influence of the change in the link length on the rotation angle of thoracolumbar joint 18D is considered easily. FIG. 158 is a view illustrating a point where the position is fixed by determining the link length in body bending unit C2D included in humanoid upper half body robot 100D. FIG. 158(A) illustrates a state in which the lengths of the three links are not determined. FIG. 158(B) illustrates a state in which the lengths of thoracolumbar center link 19LC being the first link and thoracolumbar left link 21LC being the second link are determined. FIG. 158(C) illustrates a state in which the lengths of the three links are determined. The meaning of the sign illustrated in the drawing as the same as the case in FIG. 154.

As illustrated in FIG. 158(A), the rotation angle of thoracolumbar joint 18D being the joint and the position of the point existing in chest 5E being the second member are not determined in the state in which the lengths of the three variable-length links are not determined. The position of point $P_{0S}$ corresponding to joint 18D is not changed when the length of each link is changed. When the lengths of first link 19LC and second link 21LC are determined, the distance between point $P_{4S}$ and each of three points $P_{0S}$, $P_{1S}$, $P_{3S}$ is determined, so that the position of point $P_{4S}$ is determined uniquely as illustrated in FIG. 158(B). The fact that the position of point $P_{4S}$ is determined means that the rotation angle around the backbone 56 being the torsion axis of chest 5E and the tilt angle of backbone 56 in the direction toward waist-side center link attaching unit J10C being the second-member first attaching unit are determined.

In the state of FIG. 158(B), joint 18D can be rotated around a rotation axis R21 passing two points $P_{0S}$, $P_{4S}$. For this reason, point $P_{5S}$ is rotated around rotation axis R21 while the distance from point $P_{0S}$ and the distance from point $P_{0S}$ are kept unchanged. Rotation axis R21 is referred to as the first attaching unit direction axis. In FIG. 158(B), rotation axis R21 is illustrated as existing on the XZ-plane and to be parallel to the X-axis. However, rotation axis R21 does not necessarily exist on the XZ-plane and is not necessarily parallel to the X-axis.

Furthermore, when the length of third link 20LC is determined, point $P_{5S}$ and the rotation angles of thoracolumbar joint 18D are determined. Thus, the state shown in FIG. 158(C) is obtained.

As described above, in humanoid upper half body robot 100D, similarly to humanoid upper half body robot 100C, the rotation angle around the torsion axis and the first attaching unit tilt angle can be determined by determining the lengths of the first link and the second link. Furthermore, the rotation angle around the first attaching unit direction axis can be determined when the length of the third link is determined. Humanoid upper half body robot 100D also has the characteristic that the relationship of the joint angle with respect to the length of each link is analyzed easily.

The positions of not only the thoracolumbar joint 18D but also other joints can be changed. As long as the positions with respect to the first member and the second member are fixed, and as long as the second member is connected rotatably to the first member with predetermined rotational degrees of freedom, the joint may be located anywhere. For the joint having three rotational degrees of freedom, the direction of the torsion axis may be fixed to either the first member or the second member.

The above is also applied to other embodiments.

The freely combination of the embodiments or the modification or omission of each embodiment can be made without departing from the scope of the present disclosure.

REFERENCE SIGNS LIST 100, 100Z: humanoid robot
100C, 100D: humanoid upper half body robot
150: control device container
160: pedestal lifter
170: cart
1: trunk
2: head (second member)
2A: head base plate
3: upper limb
4: lower limb
5, 5C, 5E: chest (first member, second member)
5U: chest upper portion
5D: chest lower portion
6, 6C, 6D: waist (first member)
7, 7C: upper arm
7A: motor holder
7B: humerus
7H: humerus mounting unit
8, 8C: forearm (first member)
8B: forearm bone (torsion axis)
8D: elbow tip
8H: elbow mounting hole
8J: elbow joint connecting hole
9, 9A, 9B, 9C: hand (second member)
10: thigh (second member)
10A: thighbone (torsion axis)
10B: knee-side link attaching plate
10C: knee connecting frame
10D: thigh-side auxiliary tool attaching unit
11: lower leg
12: foot
12A: foot main body
12B: toe
12C: toe joint
12D: heel wheel
12E: foot side-surface wheel
13: shoulder joint (joint)
14: upper arm drive main actuator (first actuator)
14L: upper arm drive main link (first link)
14M: motor (power source, first power source)
15: upper arm drive auxiliary actuator (second actuator)
15L: upper arm drive auxiliary link (second link)
15M: motor (power source, second power source)
16: intrathoracic joint
17: intrathoracic actuator
17L: intrathoracic link
17M: motor (power source)
18, 18D: thoracolumbar joint (joint)
19: thoracolumbar center actuator
19A: screw rod
19B: nut (perforated member)
19C: cylinder (tube)
19D: nut position fixer (perforated member position fixer)
19E: nut rotation holder (perforated member holder)
19F: nut gear
19G: drive gear
19, 19Z: thoracolumbar center actuator
19C: thoracolumbar center actuator (first actuator)
19L: thoracolumbar center link (variable length link)
19LC: thoracolumbar center link (first link)
19LZ: thoracolumbar center link (variable length link)
19H: cylinder
19J: piston
19K: pipe
19N: pump
19P: first chamber
19Q: second chamber
19M: motor (power source, first power source)
20: thoracolumbar right actuator
20C: thoracolumbar right actuator (third actuator)
20L: thoracolumbar right link (variable length link)
20LC: thoracolumbar right link (third link)
20M: motor (power source, third power source)
21: thoracolumbar left actuator
21C: thoracolumbar left actuator (second actuator)
21L: thoracolumbar left link (variable length link)
21LC: thoracolumbar left link (second link)
21M: motor (power source, third power source)
22: hip joint (joint)
23: thigh front actuator
23L: thigh front link (variable length link)
23M: motor
24: thigh outside actuator
24L: thigh outside link (variable length link)
24M: motor (power source)
25: thigh inside actuator
25L: thigh inside link (variable length link)
25M: motor (power source)
26: neck center rod (torsion axis)
27: neck joint (joint)
28: neck rear actuator
28L: neck rear link (variable length link)
28M: motor (power source)
28N: link attachment
29: neck right-side actuator
29L: neck right-side link (variable length link)
29M: motor (power source)
29N: link attachment
30: neck left-side actuator
30L: neck left-side link (variable length link)
30M: motor (power source)
30N: link attachment
31: elbow joint (joint)
31D: elbow joint tip
32: elbow drive outside link (second link)
33: elbow drive inside link (first link)
34, 34P: upper arm outside actuator (second actuator)
34A: screw rod (second moving shaft)
34B, 34J: nut (second moving member)
34C: rail (second rotation preventing unit)
34D: gripper (second rotation preventing unit)
34E: spline shaft (guide shaft, second rotation preventing unit)
34F: upper arm outside frame
34G, 34GC: upper arm outside linear guide (second guide)
34M: motor (power source, second power source)
35, 35P: upper arm inside actuator (first actuator)
35A: screw rod (first moving shaft)
35B, 35J: nut (first moving member)
35C: rail (first rotation preventing unit)
35D: gripper (first rotation preventing unit)
35E: spline shaft (guide shaft, first rotation preventing unit)
35F: upper arm inside frame
35G, 35GC: upper arm inside linear guide (first guide)
35M: motor (power source, first power source)
36: wrist joint (joint)
37: forearm front actuator
37C: forearm front actuator (first actuator)
37L: forearm front link (variable length link)
37LC: forearm front link (first link)

37M: motor (power source, first power source)
37N: link attachment
38: forearm outside actuator
38C: forearm outside actuator (second actuator)
38L: forearm outside link (variable length link)
38LC: forearm outside link (second link)
38M: motor (power source, second power source)
38N: link attachment
39: forearm inside actuator
39C: forearm inside actuator (third actuator)
39L: forearm inside link (variable length link)
39LC: forearm inside link (third link)
39M: motor (power source, third power source)
39N: link attachment
40: knee joint (joint)
41: ankle joint (joint)
41A: front-back rotation yoke
41B: right and left rotation yoke
42: knee drive actuator
42L: knee drive link
42M: motor (power source)
43: thigh-side auxiliary tool
44: lower leg-side auxiliary tool
45: lower leg outside actuator
45L: lower leg outside link
45M: motor (power source)
46: lower leg inside actuator
46L: lower leg inside link
46M: motor (power source)
51: shoulder frame
51H: shoulder joint mounting hole
52: thorax frame
52C, 52D: chest skeleton plate
52H: shoulder first mounting hole
52L: shoulder second mounting hole
53: thorax front-back coupling frame
54: chest center coupling frame
55: intrathoracic joint frame
56: backbone (torsion axis, coupling rod)
56B: backbone upper end (second twist center)
56D: backbone lower end (first twist center)
56T: intrathoracic rotation shaft
57: link attaching frame
58: neck lower frame
61: waist main frame
62: lower limb connecting frame
63: waist cover
64: protrusion
65: protrusion
66: protrusion
67: protrusion
81: hand attaching tool
81A: attaching plate
81B: palm plate connecting part
82: palm plate (base)
82A: first finger attaching part (finger attaching part)
82B: second finger attaching part (finger attaching part)
82C: third finger attaching part (finger attaching part)
82D: fourth finger attaching part (finger attaching part)
82E: opposed finger attaching part (finger attaching part)
82F: palm plate main body (main body)
82G, 82P: difference in width
82H, 82J, 82K, 82L, 82M, 82N, 82Q, 82R: notch
82S: wrist attaching part
82T: palm flesh
82U: through-hole
82V: hand breadth rotation finger attaching part (finger attaching part)
83: first finger (ordinary finger)
84: second finger (ordinary finger)
85: third finger (ordinary finger)
86: fourth finger (ordinary finger)
87: opposed finger
88: hand breadth rotation finger
83A, 84A, 85A, 86A, 87A, 88A: first dactylus
83AA, 84AA, 85AA, 86AA, 87AA, 88AA: first wheel linked part
83AB, 84AB, 85AB, 86AB, 87AB, 88AB: first yoke
83AC, 84AC, 85AC, 86AC, 87AC, 88AC: second motor installation part
83AD, 84AD, 85AD, 86AD, 87AD, 88AD: protrusion
83B, 84B, 85B, 86B, 87B, 88B: second dactylus
83C, 84C, 85C, 86C, 87C, 88C: third dactylus
83CA, 84CA, 85CA, 86CA, 87CA, 88CA: fingertip
83CB, 84CB, 85CB, 86CB, 87CB, 88CB: fingertip base
83D, 84D, 85D, 86D, 87D, 88D: first finger joint
83E, 84E, 85E, 86E, 87E, 88E: second finger joint
83F, 84F, 85F, 86F, 87F, 88F: third finger joint
83G, 84G, 85G, 86G, 87G, 88G: finger base yoke
83H, 84H, 85H, 86H, 87H, 88H: finger first motor
83J, 84J, 85J, 86J, 87J, 88J: first worm
83K, 84K, 85K, 86K, 87K, 88K: first worm wheel
83L, 84L, 85L, 86L, 87L, 88L: finger second motor
83M, 84M, 85M, 86M, 87M, 88M: second worm
83N, 84N, 85N, 86N, 87N, 88N: second worm wheel
83P, 84P, 85P, 86P, 87P, 88P: third dactylus drive gear
83Q, 84Q, 85Q, 86Q, 87Q, 88Q: partial gear
83R, 84R, 85R, 86R, 87R, 88R: idler gear
83SA, 84SA, 85SA, 86SA, 87SA, 88SA: outer-idler gear
83SB, 84SB, 85SB, 86SB, 87SB, 88SB: inner-idler gear
83T, 84T, 85T, 86T, 87T, 88T: first gear head
83U, 84U, 85U, 86U, 87U, 88U: second gear head
83V, 84V, 85V, 86V: first motor fixer
88W: hand breadth finger base
89: two-way rotation finger
89A: first dactylus
89AA: first wheel linked part
89AB: first yoke
89AC: second motor installation part
89AD: protrusion
89B: second dactylus
89C: third dactylus
89CA: fingertip
89CB: fingertip base
89D: first finger joint
89E: second finger joint
89F: third finger joint
89G: finger base yoke
89H: finger first motor
89J: first worm
89K: first worm wheel
89L: finger second motor
89M: second worm
89N: second worm wheel
89P: third dactylus drive gear
89Q: partial gear
89R: idler gear
89SA: outer-idler gear
89SB: inner-idler gear
89T: first gear head
89U: second gear head
89V: first motor fixer
89VB: worm tip holder 80: finger base
80A: finger base dactylus
80AA: protrusion
80AB: protrusion
80B: finger base motor fixer
80BA: protrusion
80C: finger-base finger joint
80D: finger base motor
80E: finger base gear head
80F: finger base worm
80G: finger base worm wheel
83X, 84X, 85X, 86X, 88X, 89X: first dactylus cover
83Y, 84Y, 85Y, 86Y, 88Y, 89Y: second dactylus cover
83Z, 84Z, 85Z, 86Z, 88Z, 89Z: second worm cover
91, 91C: wrist plate
98: hand attaching tool
98A: attaching plate
98B: palm plate connecting part
92: palm plate (base)
93: first finger (ordinary finger)
94: second finger (ordinary finger)
95: third finger (ordinary finger)
96: fourth finger (ordinary finger)
97: opposable finger
97T: first dactylus base
97U: first dactylus tip
93A, 94A, 95A, 96A, 97A: first dactylus
93B, 94B, 95B, 96B, 97B: second dactylus
93C, 94C, 95C, 96C, 97C: third dactylus
93D, 94D, 95D, 96D, 97D: first finger joint
93E, 94E, 95E, 96E, 97E: second finger joint
93F, 94F, 95F, 96F, 97F: third finger joint
93G, 94G, 95G, 96G, 97G: finger base yoke
93H, 94H, 95H, 96H, 97H: finger first motor
93J, 94J, 95J, 96J, 97J: first worm
93K, 94K, 95K, 96K, 97K: first worm wheel
93L, 94L, 95L, 96L, 97L: finger second motor
93M, 94M, 95M, 96M, 97M: second worm
93N, 94N, 95N, 96N, 97N: second worm wheel
93P, 94P, 95P, 96P, 97P: third dactylus drive gear
93Q, 94Q, 95Q, 96Q, 97Q: idler gear
93R, 94R, 95R, 96R, 97R: idler gear
93S, 94S, 95S, 96S, 97S: idler gear
J1: chest-side main link attaching unit (first-member first attaching unit)
J2: chest-side auxiliary link attaching unit (first-member second attaching unit)
J3: lower intrathoracic link attaching unit
J4: upper intrathoracic link attaching unit
J5: chest center link attaching unit (second-member-side link attaching unit)
J5C: chest center link attaching unit (second-member first attaching unit)
J6: chest right link attaching unit (second-member-side link attaching unit)
J6C: chest right link attaching unit (second-member third attaching unit)
J7: chest left link attaching unit (second-member-side link attaching unit)
J7C: center-link left link attaching unit (first-link second attaching unit)
J8: waist right link attaching unit (first-member-side link attaching unit)
J8C: waist right link attaching unit (first-member third attaching unit)
J9: waist left link attaching unit (first-member-side link attaching unit)
J9C: waist left link attaching unit (first-member second attaching unit)
J10: waist center link attaching unit (first-member-side link attaching unit)
J10C: waist center link attaching unit (first-member first attaching unit)
J11: crotch front link attaching unit (first-member-side link attaching unit)
J12: crotch outside link attaching unit (first-member-side link attaching unit)
J12: crotch outside link attaching unit (first-member-side link attaching unit)
J13: crotch inside link attaching unit (first-member-side link attaching unit)
J14: neck rear link attaching unit (first-member-side link attaching unit)
J15: neck right-side link attaching unit (first-member-side link attaching unit)
J16: neck left-side link attaching unit (first-member-side link attaching unit)
J17: head rear link attaching unit (second-member-side link attaching unit)
J18: head right-side link attaching unit (second-member-side link attaching unit)
J19: head left-side link attaching unit (second-member-side link attaching unit)
J20: upper arm main link attaching unit (second-member first attaching unit)
J21: upper arm drive main-link-side auxiliary link attaching unit (first-link second attaching unit)
J22: upper arm outside link attaching unit (upper-arm-side link attaching unit, first-member second attaching unit)
J23: upper arm inside link attaching unit (upper-arm-side link attaching unit, first-member first attaching unit)
J24: elbow drive inside link attaching unit (forearm-side main link attaching unit, second-member first attaching unit)
J25: elbow drive outside link attaching unit (elbow drive main-link-side auxiliary link attaching unit, first-link second attaching unit)
J26: forearm front link attaching unit (first-member-side link attaching unit)
J26C: forearm front link attaching unit (first-member first attaching unit)
J27: forearm outside link attaching unit (first-member-side link attaching unit)
J27C: forearm outside link attaching unit (first-member second attaching unit)
J28: forearm inside link attaching unit (first-member-side link attaching unit)
J28C: forearm inside link attaching unit (first-member third attaching unit)
J29: hand-side front link attaching unit (second-member-side link attaching unit)
J29C: hand-side front link attaching unit (second-member first attaching unit)
J30: hand-side outside link attaching unit (second-member-side link attaching unit)
J30C: front-link-side outside link attaching unit (first-link second attaching unit)
J31: hand-side inside link attaching unit (second-member-side link attaching unit)
J31C: hand-side inside link attaching unit (second-member third attaching unit)
J32: knee front link attaching unit (second-member-side link attaching unit)

J33: knee outside link attaching unit (second-member-side link attaching unit)
J34: knee inside link attaching unit (second-member-side link attaching unit)
J35: knee drive link attaching unit
J36: thigh-side auxiliary tool attaching unit
J37: knee drive link auxiliary tool connecting unit
J38: lower leg-side auxiliary tool attaching unit
J39: lower leg outside link attaching unit (lower leg-side link attaching unit)
J40: lower leg inside link attaching unit (lower leg-side link attaching unit)
J41: foot outside link attaching unit (foot-side link attaching unit)
J42: foot inside link attaching unit (foot-side link attaching unit)
C1: chest bending unit
C2: body bending unit (three-rotational-degree-of-freedom connection mechanism)
C2C, C2D: body bending unit (rotation connecting mechanism)
C3: neck (three-rotational-degree-of-freedom connection mechanism)
C4, C4C: shoulder (rotation connecting mechanism)
C5, C5C: elbow (rotation connecting mechanism)
C6: wrist (three-rotational-degree-of-freedom connection mechanism)
C6C: wrist (rotation connecting mechanism)
C7: crotch (three-rotational-degree-of-freedom connection mechanism)
C8: knee
C9: ankle
G1, G2, G3: torsion axis
L1, L2, L3: variable length link
T1, T2, T3, T4: second-member-side triangle
Rx1: rotation axis of shoulder joint 13
Rz2: rotation axis of elbow joint 22
Rx3: rotation axis around which whole two-way finger rotation axis 89 is rotated
Rz3: rotation axis of first finger joint 89D of two-way finger rotation axis 89
Rz4: rotation axis of second finger joint 89E of two-way finger rotation axis 89
Rz5: rotation axis of third finger joint 89F of two-way finger rotation axis 89
R11: rotation axis of rotation due to expansion and contraction of third link 20LC of body bending unit C2C
R21: rotation axis of rotation due to expansion and contraction of third link 20LC of body bending unit C2D
S30: base common to first triangle and second triangle, which can be formed by determining lengths of two links using body bending unit C2
$\varepsilon_1$: angle of vertex with respect to base S30 of first triangle formed using body bending unit C2
$\varepsilon_2$: angle of vertex with respect to base S30 of second triangle formed using body bending unit C2
S11, S21: first line segment
S12, S22: second line segment
S13, S23: third line segment
S14, S24: fourth line segment
S15, S25: fifth line segment
$\eta_{11}, \eta_{1A}$: angle formed by first line segment and third line segment
$\eta_2, \eta_{2A}$: angle formed by fourth line segment and fifth line segment
$\zeta, \zeta_A$: angle formed by first link and second link at first link second attaching unit
$P_{1N}$: first reference point
$P_{2N}$: second reference point

The invention claimed is:

1. A rotation connecting mechanism comprising:
a joint to connect a second member rotatably to a first member with at least two rotational degrees of freedom;
a first actuator including a first link having four rotational degrees of freedom or five rotational degrees of freedom, a second-member first attaching unit provided in the second member to have a fixed positional relationship with respect to the joint in the second member, one end of the first link being attached rotatably to the second-member first attaching unit with at least two rotational degrees of freedom, a first-member first attaching unit to which the other end of the first link is attached rotatably with at least two rotational degrees of freedom, and a first power source to generate force changing a distance between the second-member first attaching unit and a first reference point provided in the first member to have a fixed positional relationship with respect to the joint in the first member; and
a second actuator including a second link having three rotational degrees of freedom, four rotational degrees of freedom, or five rotational degrees of freedom, a first-link second attaching unit provided on the first link to have a fixed positional relationship with respect to the second-member first attaching unit on the first link, one end of the second link being attached rotatably to the first-link second attaching unit with at least one rotational degree of freedom, a first-member second attaching unit to which the other end of the second link is attached rotatably with at least two rotational degrees of freedom, and a second power source to generate force changing a distance between the first-link second attaching unit and a second reference point provided in the first member and to have a fixed positional relationship with respect to the joint in the first member.

2. The rotation connecting mechanism according to claim 1, wherein at the first-link second attaching unit, an angle formed by the first link and the second link is greater than or equal to a predetermined third crossing angle.

3. A robot comprising:
a chest;
a pair of right and left upper limbs, each of the upper limbs including an upper arm, a forearm, and a hand, the upper arm, the forearm, and the hand being connected in series to either a right or a left in an upper portion of the chest; and
the rotation connecting mechanism according to claim 1 having the second member being one of the hand, the forearm, and the upper arm, and the first member provided far from the hand and being connected rotatably with the second member with at least two rotational degrees of freedom.

4. The robot according to claim 3, further comprising:
a height adjuster to move the waist or the chest vertically, the waist or the chest being mounted on height adjuster; and
a moving unit to move the height adjuster.

5. The robot according to claim 3, further comprising a pair of right and left wrists, each of the wrists being a rotation connecting mechanism comprising:

a joint to connect a second member rotatably to a first member with at least two rotational degrees of freedom;

a first actuator including a first link having a variable length and four rotational degrees of freedom or five rotational degrees of freedom, a second-member first attaching unit provided in the second member to have a fixed positional relationship with respect to the joint in the second member, one end of the first link being attached rotatably to the second-member first attaching unit with at least two rotational degrees of freedom, a first-member first attaching unit provided in the first member to have a fixed positional relationship with respect to the joint in the first member, the other end of the first link being attached rotatably to the first-member first attaching unit with at least two rotational degrees of freedom, and a first power source to generate force changing a length of the first link;

a second actuator including a second link having a variable length and three rotational degrees of freedom, four rotational degrees of freedom, or five rotational degrees of freedom, a first-link second attaching unit provided on the first link to have a fixed positional relationship with respect to the second-member first attaching unit on the first link, one end of the second link being attached rotatably to the first-member second attaching unit with at least one rotational degree of freedom, a first-member second attaching unit provided in the first member to have a fixed positional relationship with respect to the joint in the first member, the other end of the second link being attached rotatably to the first-member second attaching unit with at least two rotational degrees of freedom, and a second power source to generate force changing a length of the second link; and a third actuator including a third link having a variable length and five rotational degrees of freedom, a second-member third attaching unit provided in the second member to have a fixed positional relationship with respect to the joint in the second member, one end of the third link being attached rotatably to the second-member third attaching unit with at least two rotational degrees of freedom, a first-member third attaching unit provided in the first member to have a fixed positional relationship with respect to the joint in the first member, the other end of the third link being attached rotatably to the first-member third attaching unit with at least two rotational degrees of freedom, and a third power source to generate force changing a length of the third link, wherein the joint allows the second member to be rotated with respect to the first member around a torsion axis having a direction fixed with respect to the first member or the second member, and connects the second member rotatably to the first member with three rotational degrees of freedom, the first link and the second link have five rotational degrees of freedom, and the first-link second attaching unit attaches the second link rotatably to the first link with at least two rotational degrees of freedom, and having the second member being either the right hand or the left hand and the first member being the forearm and being connected rotatably with the second member with three rotational degrees of freedom.

6. The robot according to claim 3, further comprising a pair of right and left shoulders, each of the shoulders being a rotation connecting mechanism comprising:

a joint to connect a second member rotatably to a first member with at least two rotational degrees of freedom;

a first actuator including a first link having a variable length and four rotational degrees of freedom or five rotational degrees of freedom, a second-member first attaching unit provided in the second member to have a fixed positional relationship with respect to the joint in the second member, one end of the first link being attached rotatably to the second-member first attaching unit with at least two rotational degrees of freedom, a first-member first attaching unit provided in the first member to have a fixed positional relationship with respect to the joint in the first member, the other end of the first link being attached rotatably to the first-member first attaching unit with at least two rotational degrees of freedom, and a first power source to generate force changing a length of the first link; and a second actuator including a second link having a variable length and three rotational degrees of freedom, four rotational degrees of freedom, or five rotational degrees of freedom, a first-link second attaching unit provided on the first link to have a fixed positional relationship with respect to the second-member first attaching unit on the first link, one end of the second link being attached rotatably to the first-member second attaching unit with at least one rotational degree of freedom, a first-member second attaching unit provided in the first member to have a fixed positional relationship with respect to the joint in the first member, the other end of the second link being attached rotatably to the first-member second attaching unit with at least two rotational degrees of freedom, and a second power source to generate force changing a length of the second link, wherein the joint has two rotational degrees of freedom,
the first link has four rotational degrees of freedom,
the second link has three rotational degrees of freedom,
the first-link second attaching unit has one rotational degree of freedom in which the second link is rotated on a link moving plane, the link moving plane being a plane determined by the first-member first attaching unit, the first-link second attaching unit, and the first-member second attaching unit, the first-member first attaching unit and the first-member second attaching unit have two rotational degrees of freedom by a link moving plane rotation axis and a vertical rotation axis, the link moving plane rotation axis passing the first-member first attaching unit and the first-member second attaching unit, the vertical rotation axis being perpendicular to the link moving plane, and the second-member first attaching unit has two rotational degrees of freedom, and having the second member being either the right upper arm or the left upper arm and the first member being the chest and being connected rotatably with the second member with two rotational degrees of freedom.

7. The robot according to claim 6, wherein the first-member first attaching unit and the first-member second attaching unit are provided at different heights in the shoulder.

8. The robot according to claim 3, further comprising a pair of right and left elbows, each of the elbows being a rotation connecting mechanism comprising:

a joint to connects a second member rotatably to a first member with at least two rotational degrees of freedom;

a first actuator including a first link having a fixed length and five rotational degrees of freedom, a second-member first attaching unit provided in the second member and to have a fixed positional relationship with respect to the joint in the second member, one end of the first link being attached rotatably to the second-member first attaching unit with at least two rotational degrees of freedom, a first-member first attaching unit to which the other end of the first link is attached rotatably with at least two rotational degrees of freedom, a first moving member in which the first-member first attaching unit is provided, a first guide including a first moving shaft, and to guide the first moving member such that the first moving member is moved along the first moving shaft, the first guide being provided in the first member to have a fixed positional relationship with respect to the joint in the first member, and a first power source to generate force changing a position of the first moving member with respect to the first guide; and a second actuator including a second link having a fixed length and five rotational degrees of freedom, a first-link second attaching unit provided on the first link to have a fixed positional relationship with respect to the second-member first attaching unit on the first link, one end of the second link being attached rotatably to the first-link second attaching unit with at least two rotational degrees of freedom, a first-member second attaching unit to which the other end of the second link is attached rotatably with at least two rotational degrees of freedom, a second moving member in which the first-member second attaching unit is provided, a second guide including a second moving shaft, and to guide the second moving member such that the second moving member is moved along the second moving shaft, the second guide being provided in the first member to have a fixed positional relationship with respect to the joint in the first member, and a second power source to generate force changing a position of the second moving member with respect to the second guide, and having the second member being either the right forearm or the left forearm and the first member being the upper arm.

9. A robot comprising:

a waist;

a chest connected above the waist;

a pair of right and left upper limbs, each of the upper limbs including an upper arm, a forearm, and a hand, the upper arm, the forearm, and the hand being connected in series to either a right or a left in an upper portion of the chest; and the rotation connecting mechanism according to claim 1 having the second member being one of the hand, the forearm, the upper arm, and the chest, and the first member provided on a side closer to the waist and being connected rotatably with the second member with at least two rotational degrees of freedom.

10. The robot according to claim 9, further comprising a body bending unit being a rotation connecting mechanism comprising:

a joint to connect a second member rotatably to a first member with at least two rotational degrees of freedom;

a first actuator including a first link having a variable length and four rotational degrees of freedom or five rotational degrees of freedom, a second-member first attaching unit provided in the second member to have a fixed positional relationship with respect to the joint in the second member, one end of the first link being attached rotatably to the second-member first attaching unit with at least two rotational degrees of freedom, a first-member first attaching unit provided in the first member to have a fixed positional relationship with respect to the joint in the first member, the other end of the first link being attached rotatably to the first-member first attaching unit with at least two rotational degrees of freedom, and a first power source to generate force changing a length of the first link;

a second actuator including a second link having a variable length and three rotational degrees of freedom, four rotational degrees of freedom, or five rotational degrees of freedom, a first-link second attaching unit provided on the first link to have a fixed positional relationship with respect to the second-member first attaching unit on the first link, one end of the second link being attached rotatably to the first-member second attaching unit with at least one rotational degree of freedom, a first-member second attaching unit provided in the first member to have a fixed positional relationship with respect to the joint in the first member, the other end of the second link being attached rotatably to the first-member second attaching unit with at least two rotational degrees of freedom, and a second power source to generate force changing a length of the second link; and a third actuator including a third link having a variable length and five rotational degrees of freedom, a second-member third attaching unit provided in the second member to have a fixed positional relationship with respect to the joint in the second member, one end of the third link being attached rotatably to the second-member third attaching unit with at least two rotational degrees of freedom, a first-member third attaching unit provided in the first member to have a fixed positional relationship with respect to the joint in the first member, the other end of the third link being attached rotatably to the first-member third attaching unit with at least two rotational degrees of freedom, and a third power source to generate force changing a length of the third link, wherein the joint allows the second member to be rotated with respect to the first member around a torsion axis having a direction fixed with respect to the first member or the second member, and connects the second member rotatably to the first member with three rotational degrees of freedom, the first link and the second link have five rotational degrees of freedom, and the first-link second attaching unit attaches the second link rotatably to the first link with at least two rotational degrees of freedom, and having the second member being the chest and the first member being the waist and being connected rotatably with the second member with three rotational degrees of freedom.

11. A robot comprising:

a waist;

a chest connected above the waist;

a pair of right and left upper limbs, each of the upper limbs including an upper arm, a forearm, and a hand, the upper arm, the forearm, and the hand being connected in series to either a right or a left of an upper portion of the chest;

a pair of right and left lower limbs, each of the lower limbs including a thigh, a lower leg, and a foot, the thigh, the lower leg, and the foot being connected in series to either a right or a left of a lower portion of the waist; and the rotation connecting mechanism according to claim 1 having the second member being one of the hand, the forearm, the upper arm, the chest, the foot, the lower leg, and the thigh, and the first member provided on a side closer to the waist and being connected rotatably with the second member with at least two rotational degrees of freedom.

12. The robot according to claim 11, further comprising a pair of right and left crotches, each of the crotches being a rotation connecting mechanism comprising:

a joint to connect a second member rotatably to a first member with at least two rotational degrees of freedom;

a first actuator including a first link having a variable length and four rotational degrees of freedom or five rotational degrees of freedom, a second-member first attaching unit provided in the second member to have a fixed positional relationship with respect to the joint in the second member, one end of the first link being attached rotatably to the second-member first attaching unit with at least two rotational degrees of freedom, a first-member first attaching unit provided in the first member to have a fixed positional relationship with respect to the joint in the first member, the other end of the first link being attached rotatably to the first-member first attaching unit with at least two rotational degrees of freedom, and a first power source to generate force changing a length of the first link;

a second actuator including a second link having a variable length and three rotational degrees of freedom, four rotational degrees of freedom, or five rotational degrees of freedom, a first-link second attaching unit provided on the first link to have a fixed positional relationship with respect to the second-member first attaching unit on the first link, one end of the second link being attached rotatably to the first-member second attaching unit with at least one rotational degree of freedom, a first-member second attaching unit provided in the first member to have a fixed positional relationship with respect to the joint in the first member, the other end of the second link being attached rotatably to the first-member second attaching unit with at least two rotational degrees of freedom, and a second power source to generate force changing a length of the second link; and a third actuator including a third link having a variable length and five rotational degrees of freedom, a second-member third attaching unit provided in the second member to have a fixed positional relationship with respect to the joint in the second member, one end of the third link being attached rotatably to the second-member third attaching unit with at least two rotational degrees of freedom, a first-member third attaching unit provided in the first member to have a fixed positional relationship with respect to the joint in the first member, the other end of the third link being attached rotatably to the first-member third attaching unit with at least two rotational degrees of freedom, and a third power source to generate force changing a length of the third link, wherein the joint allows the second member to be rotated with respect to the first member around a torsion axis having a direction fixed with respect to the first member or the second member, and connects the second member rotatably to the first member with three rotational degrees of freedom, the first link and the second link have five rotational degrees of freedom, and the first-link second attaching unit attaches the second link rotatably to the first link with at least two rotational degrees of freedom, and having the second member being either the right thigh or the left thigh and the first member being the waist and being connected rotatably with the second member with three rotational degrees of freedom.

13. A robot arm comprising:

a hand;

one or a plurality of arm section units connected in series from the hand; and the rotation connecting mechanism according to claim 1, connecting the second member being one of the hand and the arm section unit rotatably to the first member provided on a side far from the hand with three rotational degrees of freedom.

14. A rotation connecting mechanism comprising:

a joint to connect a second member rotatably to a first member with at least two rotational degrees of freedom;

a first actuator including a first link having a variable length and four rotational degrees of freedom or five rotational degrees of freedom, a second-member first attaching unit provided in the second member to have a fixed positional relationship with respect to the joint in the second member, one end of the first link being attached rotatably to the second-member first attaching unit with at least two rotational degrees of freedom, a first-member first attaching unit provided in the first member to have a fixed positional relationship with respect to the joint in the first member, the other end of the first link being attached rotatably to the first-member first attaching unit with at least two rotational degrees of freedom, and a first power source to generate force changing a length of the first link; and a second actuator including a second link having a variable length and three rotational degrees of freedom, four rotational degrees of freedom, or five rotational degrees of freedom, a first-link second attaching unit provided on the first link to have a fixed positional relationship with respect to the second-member first attaching unit on the first link, one end of the second link being attached rotatably to the first-member second attaching unit with at least one rotational degree of freedom, a first-member second attaching unit provided in the first member to have a fixed positional relationship with respect to the joint in the first member, the other end of the second link being attached rotatably to the first-member second attaching unit with at least two rotational degrees of freedom, and a second power source to generate force changing a length of the second link.

15. The rotation connecting mechanism according to claim 14, wherein the joint has two rotational degrees of freedom, the first link has four rotational degrees of freedom, the second link has three rotational degrees of freedom, the first-link second attaching unit has one rotational degree of freedom in which the second link is rotated on a link moving plane, the link moving plane being a plane determined by the first-member first attaching unit, the first-link second attaching unit, and the first-member second attaching unit, the first-member first attaching unit and the first-member second attaching unit have two rotational degrees of freedom by a link moving plane rotation axis and a vertical rotation axis, the link moving plane rotation axis passing the first-member first attaching unit and the first-member second attaching unit, the vertical rotation axis being perpendicular to the link moving plane, and the second-member first attaching unit has two rotational degrees of freedom.

16. The rotation connecting mechanism according to claim 14, further comprising a third actuator including a third link having a variable length and five rotational degrees of freedom, a second-member third attaching unit provided in the second member to have a fixed positional relationship with respect to the joint in the second member, one end of the third link being attached rotatably to the second-member third attaching unit with at least two rotational degrees of freedom, a first-member third attaching unit provided in the first member to have a fixed positional relationship with respect to the joint in the first member, the other end of the third link being attached rotatably to the first-member third attaching unit with at least two rotational degrees of freedom, and a third power source to generate force changing a length of the third link, wherein the joint allows the second member to be rotated with respect to the first member around a torsion axis having a direction fixed with respect to the first member or the second member, and connects the second member rotatably to the first member with three rotational degrees of freedom, the first link and the second link have five rotational degrees of freedom, and the first-link second attaching unit attaches the second link rotatably to the first link with at least two rotational degrees of freedom.

17. The rotation connecting mechanism according to claim 16, wherein each of the first link, the second link, and the third link includes a screw rod on which a male screw is provided, a perforated member including a through-hole having an inner-surface on which a female screw meshing with the male screw provided on the screw rod is provided, a cylinder containing the perforated member and the screw rod, and a perforated member position fixer fixing a position of the perforated member with respect to the cylinder in an axial direction of the screw rod, in the first link, one of the screw rod and the cylinder is attached to the first-member first attaching unit, and the other is attached to the second-member first attaching unit, in the second link, one of the screw rod and the cylinder is attached to the first-member second attaching unit, and the other is attached to the first-link second attaching unit, in the third link, one of the screw rod and the cylinder is attached to the first-member third attaching unit, and the other is attached to the second-member third attaching unit, and each of the first power source, the second power source, and the third power source generates force moving the screw rod.

18. The rotation connecting mechanism according to claim 16, wherein each of the first link, the second link and the third link includes a cylinder filled with a liquid, a movable piston dividing an inside of the cylinder into a first chamber and a second chamber, a pipe filled with the liquid, the pipe connecting the first chamber and the second chamber, and a pump to move the liquid from the first chamber to the second chamber and to move the liquid from the second chamber to the first chamber, the pump being provided in a middle of the pipe, in the first link, one of the piston and the cylinder is attached to the first-member first attaching unit, and the other is attached to the second-member first attaching unit, in the second link, one of the piston and the cylinder is attached to the first-member second attaching unit, and the other is attached to the first-link second attaching unit, and in the third link, one of the piston and the cylinder is attached to the first-member third attaching unit, and the other is attached to the second-member third attaching unit, and each of the first power source, the second power source, and the third power source generates force moving the pump.

19. The rotation connecting mechanism according to claim 16, wherein an angle formed by a first line segment and a third line segment is within a predetermined first crossing angle range, the first line segment connecting the first-member first attaching unit and a first twist center, the first twist center being an intersection of a first-member reference plane and the torsion axis, the first-member reference plane being a plane passing the first-member first attaching unit, the first-member second attaching unit, and the first-member third attaching unit, the third line segment connecting the first twist center and the first-member third attaching unit.

20. The rotation connecting mechanism according to claim 19, wherein a long to short ratio obtained by dividing shorter one of the lengths of the first line segment and the third line segment by longer one is greater than or equal to a predetermined lower limit ratio.

21. The rotation connecting mechanism according to claim 16, wherein an angle formed by a fourth line segment and a fifth line segment is within a predetermined second crossing angle range, the fourth line segment connecting the second-member first attaching unit and a second twist center, the second twist center being an intersection of the torsion axis and a plane passing the second-member first attaching unit provided in the second member, the second member having a fixed angle with the torsion axis, the plane being perpendicular to the torsion axis, the fifth line segment connecting the second twist center and the second-member third attaching unit.

22. The rotation connecting mechanism according to claim 16, wherein an angle formed by a fourth line segment and a fifth line segment is within a predetermined second crossing angle range, the fourth line segment connecting the joint and the second-member first attaching unit provided in the second member, the second member having a changeable angle with the torsion axis, the fifth line segment connecting the joint and the second-member third attaching unit.

23. The rotation connecting mechanism according to claim 14, wherein each of the first link and the second link includes a screw rod on which a male screw is provided, a perforated member including a through-hole having an inner-surface on which a female screw meshing with the male screw provided on the screw rod is provided, a cylinder containing the perforated member and the screw rod, and a perforated member position fixer fixing a position of the perforated member with respect to the cylinder in an axial direction of the screw rod, in the first link, one of the screw rod and the cylinder is attached to the first-member first attaching unit, and the other is attached to the second-member first attaching unit, in the second link, one of the screw rod and the cylinder is attached to the first-member second attaching unit, and the other is attached to the first-link second attaching unit, and each of the first power source and the second power source generates force moving the screw rod.

24. The rotation connecting mechanism according to claim 14, wherein each of the first link and the second link includes a cylinder filled with a liquid, a movable piston dividing an inside of the cylinder into a first chamber and a second chamber, a pipe filled with the liquid, the pipe connecting the first chamber and the second chamber, and a pump to move the liquid from the first chamber to the second chamber and to move the liquid from the second chamber to the first chamber, the pump being provided in a middle of the pipe, in the first link, one of the piston and the cylinder is attached to the first-member first attaching unit, and the other is attached to the second-member first attaching unit, in the second link, one of the piston and the cylinder is attached to the first-member second attaching unit, and the other is attached to the first-link second attaching unit, and each of the first power source and the second power source generates force driving the pump.

25. A rotation connecting mechanism comprising:

a joint to connects a second member rotatably to a first member with at least two rotational degrees of freedom;

a first actuator including a first link having a fixed length and five rotational degrees of freedom, a second-member first attaching unit provided in the second member to have a fixed positional relationship with respect to the joint in the second member, one end of the first link being attached rotatably to the second-member first attaching unit with at least two rotational degrees of freedom, a first-member first attaching unit to which the other end of the first link is attached rotatably with at least two rotational degrees of freedom, a first moving member in which the first-member first attaching unit is provided, a first guide including a first moving shaft, and to guide the first moving member such that the first moving member is moved along the first moving shaft, the first guide being provided in the first member to have a fixed positional relationship with respect to the joint in the first member, and a first power source to generate force changing a position of the first moving member with respect to the first guide; and a second actuator including a second link having a fixed length and five rotational degrees of freedom, a first-link second attaching unit provided on the first link to have a fixed positional relationship with respect to the second-member first attaching unit on the first link, one end of the second link being attached rotatably to the first-link second attaching unit with at least two rotational degrees of freedom, a first-member second attaching unit to which the other end of the second link is attached rotatably with at least two rotational degrees of freedom, a second moving member in which the first-member second attaching unit is provided, a second guide including a second moving shaft, and to guide the second moving member such that the second moving member is moved along the second moving shaft, the second guide being provided in the first member to have a fixed positional relationship with respect to the joint in the first member, and a second power source to generate force changing a position of the second moving member with respect to the second guide.

26. The rotation connecting mechanism according to claim 25, further comprising a third actuator including a third link having a variable length and five rotational degrees of freedom, a second-member third attaching unit provided in the second member to have a fixed positional relationship with respect to the joint in the second member, one end of the third link being attached rotatably to the second-member third attaching unit with at least two rotational degrees of freedom, a first-member third attaching unit provided in the first member to have a fixed positional relationship with respect to the joint in the first member, the other end of the third link being attached to the first-member third attaching unit with at least two rotational degrees of freedom, and a third power source to generate force changing a length of the third link, wherein the joint allows the second member to be rotated with respect to the first member around a torsion axis having a direction fixed with respect to the first member or the second member, and connects the second member rotatably to the first member with three rotational degrees of freedom.

27. The rotation connecting mechanism according to claim 26, further comprising:

a first rotation preventing unit to prevent the first moving member from rotating; and a second rotation preventing unit to prevent the second moving member from rotating, wherein the third link includes a screw rod on which a male screw is provided, a perforated member including a through-hole having an inner-surface on which a female screw meshing with the male screw provided on the screw rod is provided, a cylinder containing the perforated member and the screw rod, and a perforated member position fixer fixing a position of the perforated member with respect to the cylinder in an axial direction of the screw rod, in the third link, one of the screw rod and the cylinder is attached to the first-member third attaching member, and the other is attached to the first-link third attaching member, each of the first moving shaft and the second moving shaft is the screw rod, each of the first moving member and the second moving member is the perforated member, each of the first power source and the second power source generates force rotating the screw rod, and the third power source generates force moving the screw rod.

28. The rotation connecting mechanism according to claim 26, further comprising:

a first rotation preventing unit to prevent the first moving member from rotating; and a second rotation preventing unit to prevent the second moving member from rotating, wherein the third link includes a cylinder filled with a liquid, a movable piston dividing an inside of the cylinder into a first chamber and a second chamber, a pipe filled with the liquid, the pipe connecting the first chamber and the second chamber, and a pump to move the liquid from the first chamber to the second chamber and to move the liquid from the second chamber to the first chamber, the pump being provided in a middle of the pipe, the third power source generates force moving the pump, one of the piston and the cylinder is attached to the first-member third attaching unit, and the other is attached to the second-member third attaching unit, each of the first moving shaft and the second moving shaft is a screw rod on which a male screw is provided, each of the first moving member and the second moving member is a perforated member including a through-hole having an inner-surface on which a female screw meshing with the male screw provided on the screw rod is provided, and each of the first power source and the second power source generates force rotating the screw rod.

29. The rotation connecting mechanism according to claim 25, further comprising:

a first rotation preventing unit to prevent the first moving member from rotating; and a second rotation preventing unit to prevent the second moving member from rotating, wherein each of the first moving shaft and the second moving shaft is a screw rod on which a male screw is provided, each of the first moving member and the second moving member is a perforated member including a through-hole having an inner-surface on which a female screw meshing with the male screw provided on the screw rod is provided, and each of the first power source and the second power source generates force rotating the screw rod.

* * * * *